(12) United States Patent
Cheney et al.

(10) Patent No.: US 10,329,647 B2
(45) Date of Patent: Jun. 25, 2019

(54) TOUGH AND WEAR RESISTANT FERROUS ALLOYS CONTAINING MULTIPLE HARDPHASES

(71) Applicant: Scoperta, Inc., San Diego, CA (US)

(72) Inventors: Justin Lee Cheney, Encinitas, CA (US); Cameron Eibl, La Jolla, CA (US)

(73) Assignee: Scoperta, Inc., San Diego, CA (US)

( * ) Notice: Subject to any disclaimer, the term of this patent is extended or adjusted under 35 U.S.C. 154(b) by 569 days.

(21) Appl. No.: 14/969,938

(22) Filed: Dec. 15, 2015

(65) Prior Publication Data

US 2016/0168670 A1 Jun. 16, 2016

Related U.S. Application Data

(60) Provisional application No. 62/189,904, filed on Jul. 8, 2015, provisional application No. 62/127,128, filed on Mar. 2, 2015, provisional application No. 62/092,672, filed on Dec. 16, 2014.

(51) Int. Cl.

| | |
|---|---|
| *C22C 38/36* | (2006.01) |
| *C22C 38/32* | (2006.01) |
| *C22C 38/28* | (2006.01) |
| *C22C 38/26* | (2006.01) |
| *C22C 38/24* | (2006.01) |
| *C22C 38/22* | (2006.01) |
| *C22C 38/02* | (2006.01) |
| *B23K 9/04* | (2006.01) |
| *B23K 26/34* | (2014.01) |
| *B22D 19/08* | (2006.01) |
| *C23C 4/18* | (2006.01) |
| *C23C 4/067* | (2016.01) |
| *C22C 33/02* | (2006.01) |

(52) U.S. Cl.
CPC .............. *C22C 38/36* (2013.01); *B22D 19/08* (2013.01); *B23K 9/04* (2013.01); *B23K 26/34* (2013.01); *C22C 38/02* (2013.01); *C22C 38/22* (2013.01); *C22C 38/24* (2013.01); *C22C 38/26* (2013.01); *C22C 38/28* (2013.01); *C22C 38/32* (2013.01); *C23C 4/067* (2016.01); *C23C 4/18* (2013.01); *C22C 33/0285* (2013.01); *C22C 33/0292* (2013.01)

(58) Field of Classification Search
CPC ......... B22D 19/08; B23K 26/34; B23K 9/04; C22C 33/0285; C22C 33/0292; C22C 38/02; C22C 38/22; C22C 38/24; C22C 38/26; C22C 38/28; C22C 38/32; C22C 38/36; C23C 4/067; C23C 4/18
See application file for complete search history.

(56) References Cited

U.S. PATENT DOCUMENTS

| | | |
|---|---|---|
| 2,043,952 A | 6/1936 | Ffield |
| 2,156,306 A | 5/1939 | Rapatz |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Penson et al. |
| 3,554,792 A | 1/1971 | Johnson |
| 3,650,734 A | 3/1972 | Kantor et al. |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,255,709 A | 3/1981 | Zatsepium et al. |
| 4,277,108 A | 7/1981 | Wallace |
| 4,297,135 A | 10/1981 | Giessen et al. |
| 4,318,733 A | 3/1982 | Ray et al. |
| 4,365,994 A | 12/1982 | Ray |
| 4,415,530 A | 11/1983 | Hunt |
| 4,419,130 A | 12/1983 | Slaughter |

(Continued)

FOREIGN PATENT DOCUMENTS

| | | |
|---|---|---|
| CA | 2774546 | 1/2015 |
| CN | 102233490 A | 11/2011 |

(Continued)

OTHER PUBLICATIONS

Audouard, et al.: "Corrosion Performance and Field Experience With Super Duplex and Super Austenitic Stainless Steels in FGD Systems", CORROSION 2000; p. 4, table 2. vol. 33, No. 6, Jun. 1, 2002, pp. 855-859.
Cheney, et al.: "Development of quaternary Fe-based bulk metallic glasses," Materials Science and Engineering, vol. 492, No. 1-2, Sep. 25, 2008, pp. 230-235.
Cheney: Modeling the Glass Forming Ability of Metals. A Dissertation submitted in partial satisfaction of the Requirements for the degree of Doctor of Philosophy. University of California, San Diego. Dec. 2007.

(Continued)

*Primary Examiner* — Jenny R Wu
(74) *Attorney, Agent, or Firm* — Knobbe Martens Olson and Bear, LLP

(57) ABSTRACT

Embodiments of wear resistant ferrous alloys are disclosed herein. In some embodiments, ferrous alloys can have a matrix which includes near spherical and hypereutectic borides and/or borocarbides while at the same time avoiding the formation of rod-like borides and/or borocarbides. In some embodiments, the wear resistant ferrous alloys can be used as a coating, such as a hardfacing layer, to add protection to different components.

21 Claims, 10 Drawing Sheets

(56) References Cited

U.S. PATENT DOCUMENTS

| | | |
|---|---|---|
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,822,415 A | 4/1989 | Dorfman et al. |
| 4,919,728 A | 4/1990 | Kohl et al. |
| 4,943,488 A | 7/1990 | Sung et al. |
| 4,981,644 A | 1/1991 | Chang |
| 5,094,812 A | 3/1992 | Dulmaine et al. |
| 5,252,149 A | 10/1993 | Dolman |
| 5,306,358 A | 4/1994 | Lai et al. |
| 5,375,759 A | 12/1994 | Hiraishi et al. |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,858,558 A | 1/1999 | Zhao et al. |
| 5,861,605 A | 1/1999 | Ogawa et al. |
| 5,907,017 A | 5/1999 | Ober et al. |
| 5,935,350 A | 8/1999 | Raghu et al. |
| 5,942,289 A | 8/1999 | Jackson |
| 5,988,302 A | 11/1999 | Sreshta et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,553,382 B2 | 6/2009 | Branagan et al. |
| 7,569,286 B2 | 8/2009 | Daemen et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,911,662 B2 | 12/2014 | Larsson |
| 8,920,938 B2 | 12/2014 | Hesse et al. |
| 8,973,806 B2 | 3/2015 | Cheney |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Lee |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |
| 9,580,773 B2 | 2/2017 | Aimone et al. |
| 9,631,262 B2 | 4/2017 | Wright et al. |
| 2001/0019781 A1 | 9/2001 | Hasz |
| 2002/0054972 A1 | 5/2002 | Charpentier et al. |
| 2002/0098298 A1 | 7/2002 | Bolton et al. |
| 2002/0148533 A1 | 10/2002 | Kim et al. |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2006/0063020 A1 | 3/2006 | Barbezat |
| 2006/0093752 A1 | 5/2006 | Darolia et al. |
| 2006/0191606 A1 | 8/2006 | Ogawa et al. |
| 2006/0260583 A1 | 11/2006 | Abi-Akar et al. |
| 2007/0029295 A1 | 2/2007 | Branagan |
| 2007/0090167 A1 | 4/2007 | Arjakine et al. |
| 2007/0187369 A1 | 8/2007 | Menon et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0149397 A1 | 6/2008 | Branagan |
| 2008/0241580 A1 | 10/2008 | Kiser et al. |
| 2008/0241584 A1 | 10/2008 | Daemen et al. |
| 2009/0017328 A1 | 1/2009 | Katoh et al. |
| 2009/0123765 A1 | 5/2009 | Branagan |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0101780 A1 | 4/2010 | Ballew et al. |
| 2010/0155236 A1 | 6/2010 | Lee et al. |
| 2010/0166594 A1 | 7/2010 | Hirata et al. |
| 2010/0189588 A1 | 7/2010 | Kawatsu et al. |
| 2010/0258217 A1 | 10/2010 | Kuehmann |
| 2011/0004069 A1 | 1/2011 | Ochs et al. |
| 2011/0031222 A1 | 2/2011 | Branagan et al. |
| 2011/0064963 A1 | 3/2011 | Cheney et al. |
| 2011/0100720 A1 | 5/2011 | Branagan et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055903 A1 | 3/2012 | Izutani et al. |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0288400 A1 | 11/2012 | Hirata et al. |
| 2013/0094900 A1 | 4/2013 | Folkmann et al. |
| 2013/0167965 A1 | 4/2013 | Cheney et al. |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0294962 A1 | 11/2013 | Wallin et al. |
| 2014/0006531 A1 | 1/2014 | Sakiyama |

(56) References Cited

U.S. PATENT DOCUMENTS

| | | |
|---|---|---|
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0065316 A1 | 3/2014 | Cheney |
| 2014/0105780 A1 | 4/2014 | Cheney |
| 2014/0131338 A1 | 5/2014 | Postle |
| 2014/0171367 A1 | 6/2014 | Murthy et al. |
| 2014/0190594 A1 | 7/2014 | Branagan et al. |
| 2014/0219859 A1 | 8/2014 | Cheney |
| 2014/0234154 A1 | 8/2014 | Cheney et al. |
| 2014/0248509 A1 | 9/2014 | Cheney |
| 2014/0263248 A1 | 9/2014 | Postle |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0147591 A1 | 5/2015 | Cheney |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0298986 A1 | 10/2015 | Billieres et al. |
| 2015/0307968 A1 | 10/2015 | Mars et al. |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0138144 A1 | 5/2016 | Olsérius |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0376686 A1 | 12/2016 | Jou |
| 2017/0014865 A1 | 1/2017 | Kusinski et al. |
| 2017/0044646 A1 | 2/2017 | Gong et al. |
| 2017/0080531 A1 | 3/2017 | Cheney |
| 2017/0130311 A1 | 5/2017 | Cheney |

FOREIGN PATENT DOCUMENTS

| | | |
|---|---|---|
| CN | 102357750 A | 2/2012 |
| CN | 102686762 | 3/2014 |
| CN | 103635284 | 3/2014 |
| CN | 104039483 | 9/2014 |
| CN | 104838032 | 8/2015 |
| DE | 2754437 | 7/1979 |
| DE | 33 20 513 | 12/1983 |
| DE | 4202828 | 8/1993 |
| EP | 0 365 884 | 5/1990 |
| EP | 1270755 | 1/2003 |
| EP | 1 338 663 | 8/2003 |
| EP | 2 305 415 | 8/2003 |
| EP | 1857204 | 11/2007 |
| EP | 2050533 | 4/2009 |
| EP | 2064359 | 6/2009 |
| EP | 2388345 | 11/2011 |
| EP | 2660342 | 11/2013 |
| EP | 2072627 | 4/2014 |
| EP | 2730355 | 5/2014 |
| EP | 2743361 | 6/2014 |
| EP | 2104753 | 7/2014 |
| EP | 2 778 247 | 9/2014 |
| EP | 2 563 942 | 10/2015 |
| EP | 3034637 | 6/2016 |
| EP | 2235225 | 10/2016 |
| EP | 2659014 | 4/2017 |
| EP | 2147445 | 5/2017 |
| EP | 2265559 | 6/2017 |
| EP | 2329507 | 6/2017 |
| GB | 2 153 846 A | 8/1985 |
| IN | MUMNP-2003-00842 | 4/2005 |
| JP | 58-132393 | 8/1983 |
| JP | 60-31897 B2 | 7/1985 |
| JP | 60-133996 A | 7/1985 |
| JP | 63-026205 A | 2/1988 |
| JP | 63-65056 A | 3/1988 |
| JP | 03-133593 A | 6/1991 |
| JP | 04-358046 A | 12/1992 |
| JP | 2012-000616 | 1/2012 |
| KR | 10-0935816 B1 | 1/2010 |
| TW | 200806801 A | 2/2008 |
| WO | WO 1984/000385 | 2/1984 |
| WO | WO 1984/004760 | 12/1984 |
| WO | WO 2006/086350 | 8/2006 |
| WO | WO 2008/082353 | 7/2008 |
| WO | WO 2008/153499 | 12/2008 |
| WO | WO 2010/044740 | 4/2010 |
| WO | WO 2010/046224 | 4/2010 |
| WO | WO 2010/074634 | 7/2010 |
| WO | WO 2011/035193 | 9/2010 |
| WO | WO 2011/021751 | 2/2011 |
| WO | WO 2011/071054 | 6/2011 |
| WO | WO 2011/152774 | 12/2011 |
| WO | WO 2011/158706 | 12/2011 |
| WO | WO 2012/021186 | 2/2012 |
| WO | WO 2012/022874 | 2/2012 |
| WO | WO/2012/037339 | 3/2012 |
| WO | WO 2012/112844 | 8/2012 |
| WO | WO/2012/129505 | 9/2012 |
| WO | WO 2013/055652 | 4/2013 |
| WO | WO 2013/060839 | 5/2013 |
| WO | WO 2013/101561 | 7/2013 |
| WO | WO 2013/102650 | 7/2013 |
| WO | WO 2013/126134 | 8/2013 |
| WO | WO/2013/133944 | 9/2013 |
| WO | WO 2013/1512306 | 10/2013 |
| WO | WO 2014/001544 | 1/2014 |
| WO | WO 2014/023646 | 2/2014 |
| WO | WO 2014/059177 | 4/2014 |
| WO | WO 2014/070006 | 5/2014 |
| WO | WO 2014/081491 | 5/2014 |
| WO | WO 2014/083544 | 6/2014 |
| WO | WO 2014/085319 | 6/2014 |
| WO | WO 2014/090922 | 6/2014 |
| WO | WO 2014/114714 | 7/2014 |
| WO | WO 2014/114715 | 7/2014 |
| WO | WO 2014/187867 | 11/2014 |
| WO | WO 2014/197088 | 12/2014 |
| WO | WO 2014/201239 | 12/2014 |
| WO | WO 2014/202488 | 12/2014 |
| WO | WO 2015/028358 | 3/2015 |
| WO | WO 2015/049309 | 4/2015 |
| WO | WO 2015/075122 | 5/2015 |
| WO | WO 2015/081209 | 6/2015 |
| WO | WO 2015/157169 | 10/2015 |
| WO | WO 2015/183955 | 12/2015 |
| WO | WO 2015/191458 | 12/2015 |
| WO | WO 2016/003520 | 1/2016 |
| WO | WO 2016/010599 | 1/2016 |
| ZA | 2013/02311 | 12/2013 |

OTHER PUBLICATIONS

Branagan, et al.: Developing extreme hardness (>15GPa) in iron based nanocomosites, Composites Part A: Applied Science and Manufacturing, Elsevier Science Publishers B.V., Amsterdam, NL,

(56) References Cited

OTHER PUBLICATIONS

Cr-C Phase Diagram [online], [retrieved on Jan. 27, 2015]. Retrieved from the Internet: http://www.azom.com/work/3ud2quvLOU9g4VBMjVEh_files/image002.gif.

Davis, Jr, ed. Stainless steels. ASM International, 1994; p. 447.

Iron-Carbon (Fe—C) Phase diagram [online], [retrieved on Jan. 27, 2014]. Retrieved from the internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Miracle, D.B.: The efficient cluster packing model—An atomic structural model for metallic glasses, Acta Materialia vol. 54, Issue 16, Sep. 2006, pp. 4317-4336.

Mo—C Phase Diagram [online], [retrieved on Jan. 27, 2015]. Retrieved from the Internet: <URL.

Nb—C Phase Diagram [online], [retrieved on Jan. 27, 2015]. Retrieved from the Internet: <URL.

Tillack, et al.: "Selection of Nickel, Nickel-Copper, Nickel-Cromium, and Nickel-Chromium-Iron Allows", AMS Handbook, Welding, Brazing and Soldering, vol. 6, Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet:<URL:http://www.calphad.com/titaniumboron.html>.

Yoo et al.: "The effect of boron on the wear behavior of iron-based hardfacing alloys for nuclear power plants valves," Journal of Nuclear Materials 352 (2006) 90-96.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

International Search Report and Written Opinion re PCT Application No. PCT/US2015/06587, dated Feb. 23, 2016.

International Preliminary Report on Patentability re PCT Application No. PCT/US2015/06587, dated Jun. 29, 2017.

Extended Search Report for Application No. 15870896.6 dated Jun. 18, 2018.

TOUGH AND WEAR RESISTANT FERROUS ALLOYS CONTAINING MULTIPLE HARDPHASES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosed technology relates generally to wear resistant ferrous alloys. More specifically, this disclosure relates to wear resistant ferrous alloys made into bulk products, bulk welded overlay, wires, powder, and applied with various hardfacing and welding methods such as: GMAW, GTAW, SAW, OAW, PTAW, and laser cladding.

Description of the Related Art

Materials used in high wear applications frequently fail due to abrasion, erosion, and impact. Currently, wear resistant alloys and cermets use a high fraction of hard phases to provide wear resistance. However, the morphology of these hard phases results in poor toughness and impact performance. Therefore new materials that combine both a high fraction of hardphases and a good morphology are necessary to create a wear and impact resistant alloy.

SUMMARY

Disclosed herein are embodiments of a wear resistant ferrous alloy, wherein a matrix of the alloy comprises near spherical and hypereutectic borides and/or borocarbides, wherein a volume fraction of the near spherical and hypereutectic borides and/or borocarbides is ≥5%, where a near spherical phase has an aspect ratio ≤2:1, the aspect ratio being defined as the ratio between a major axis in cross section to an orthogonal diameter of the near spherical and hypereutectic borides and/or borocarbides, wherein the volume fraction of hypereutectic and rod-like phases with a maximum dimension in cross section ≥50 um and an aspect ratio greater than 2:1 is ≤5%.

In some embodiments, the near spherical and hypereutectic borides and/or borocarbides can comprise $M_2(C,B)$ or $M_3(C,B)_2$, wherein M comprises Fe, Cr, Mo, and/or W and where M is ≥15 wt % Mo+W. In some embodiments, all hardphases in the matrix can have a maximum dimension in cross section of ≤50 μm. In some embodiments, the alloy can further comprise a volume fraction of carbides that form from the liquid between 1% and 25%, wherein said carbides have a metallic constituent ≥75 wt % of one or more of: Ti, V, Zr, W, Mo, Hf. In some embodiments, the alloy can further comprise a volume fraction of borocarbides with one or more of the formulas: $M_{23}(C,B)_6$, $M_7(C,B)_3$, and $M_3(C,B)$ that form in the liquid of ≤15%.

Embodiments of the disclosed alloy can be applied as a hardfacing layer via GMAW, GTAW, OAW, SAW, PTAW, bulk welding, laser welding, casting, or any other welding or coating process. In some embodiments, the alloy can be used in comminution, wear packages, SAG mills, AG mills, all crushing and grinding processes, on downhole tools for oil drilling, crusher teeth, ground engaging tools, wear plate, shaker screens, slurry pipe, agricultural tools, and any other process where wear and/or impact are sources of material failure.

Also disclosed herein are embodiments of a wear resistant ferrous alloy, a matrix of the alloy comprising a mole fraction of $M_2B$ or $M_3B_2$ at the liquidus of ≥2%, wherein M comprises Fe, Cr, Mo, and/or W and where M is ≥15 wt % Mo+W, and a mole fraction of hypereutectic and rod like phases at the liquidus of ≤5%, wherein a total mole fraction of all borides at 1300K is ≥10%.

In some embodiments, the alloy can further comprise a mole fraction of carbides at 1300K between 1% and 25%, and wherein said carbides have a metallic constituent ≥75 wt % of one or more of: Ti, V, Zr, W, Mo, Hf. In some embodiments, the alloy can further comprise, under scheil solidification or equilibrium conditions, a mole fraction of borides or borocarbides with one or more of the formulas: $M_{23}(C,B)_6$, $M_7(C,B)_3$, and $M_3(C,B)$ at the solidus of ≤15%.

In some embodiments, the alloy can be applied as a hardfacing layer via GMAW, GTAW, OAW, SAW, PTAW, bulk welding, laser welding, casting, or any other welding or coating process. In some embodiments, the alloy can be used in comminution, wear packages, SAG mills, AG mills, all crushing and grinding processes, on downhole tools for oil drilling, crusher teeth, ground engaging tools, wear plate, shaker screens, slurry pipe, agricultural tools, and any other process where wear and/or impact are sources of material failure.

Also disclosed herein are embodiments of an alloy in an as welded or as cast condition which possesses an ASTM G65 abrasion loss of ≤0.3 g, a hardness of ≥30HRC, and that withstands ≥500 impacts at 20 J without failure.

In some embodiments, the alloy can have a matrix comprising near spherical and hypereutectic borides and/or borocarbides, wherein a volume fraction of the near spherical and hypereutectic borides and/or borocarbides is ≥5% where a near spherical phase has an aspect ratio ≤2:1, the aspect ratio being defined as the ratio between a major axis in cross section to an orthogonal ferret diameter of the near spherical and hypereutectic borides and/or borocarbides, wherein a volume fraction of hypereutectic and rod like phases with a maximum dimension in cross section ≥50 um and an aspect ratio greater than 2:1 is ≤5%, and wherein a the total volume fraction of borides and borocarbides is ≥10%.

Disclosed herein are embodiments of a wear resistant ferrous alloy, wherein a matrix of the alloy comprises one or more of ferrite, austenite, martensite, pearlite, and/or bainite, wherein a volume fraction of borides with a metallic constituent of ≥75 wt % iron plus chromium is ≥5%, wherein a volume fraction of one or more carbides, borides, and/or borocarbides with a metallic constituent ≥75 wt % of one or more of Nb, Ti, V, Zr, W, Mo, Hf is ≥5%, wherein a volume fraction of primary carbides or borocarbides that form from the liquid during solidification with a metallic constituent ≥75 wt % iron plus chromium is ≤5%, and wherein a volume fraction of borides that have a largest dimension ≥50 μm, form before the liquidus, and have a metallic constituent of ≥75 wt % iron plus chromium is ≤15%.

In some embodiments, the same boride can satisfy all of the criteria. In some embodiments, the same boride can satisfy one or more of the criteria. In some embodiments, different borides can satisfy different criteria.

In some embodiments, alloys can comprise iron and the following composition in wt %:
X16—B:2.62 C:1.84 Cr:20.7 Si:1.2 Ti:4.2 W:4.6;
X36—B:1.56 C:2.01 Cr:18.8 Si:1.2 Zr:14;

X37—B:1.91 C:2.57 Cr:21.1 Si:1.2 Ti:3.8 Zr:5.7;
X38—B:1.2 C:1.94 Cr:16.7 Si:1.36 Zr:12;
X39—B:3.16 C:2.15 Cr:14.9 Si:1 Ti:7.5 Zr:6.5;
X40—B:1.3 C:2.16 Cr:18.5 Zr:10.7;
X42—B:1.68 C:1.65 Cr:21.6 Ti:4.93; or
X42-MW—B:1.1 C:1.46 Cr:19.4 Ti:4.57.

In some embodiments, the alloy can comprise Fe and the following in wt. %:
B: 1.1-2.62;
C: 1.46-2.57;
Cr: 14.9-21.6;
Si: 0-1.36;
Ti: 0-7.5;
W: 0-4.6; and
Zr: 0-14.

Also disclosed herein are embodiments of a wear resistant ferrous alloy, wherein a matrix of the alloy comprises one or more of ferrite, austenite, martensite, pearlite, and/or bainite, wherein a mole fraction, measured at 1300K, of borides with a metallic constituent of ≥75 wt % iron plus chromium is ≥5%, wherein a mole fraction, when measured at 1300K, of one or more carbides, borides, and/or borocarbides with a metallic constituent ≥75 wt % of one or more of Nb, Ti, V, Zr, W, Mo, Hf is ≥5%, wherein a mole fraction, measured at the solidus during solidification, of carbides or borocarbides with a metallic constituent ≥75 wt % iron plus chromium is ≤5%, and wherein a mole fraction of borides that are hyper eutectic (form before the liquidus) and have a metallic constituent of ≥75 wt % iron plus chromium is ≤15%.

In some embodiments, alloys can comprise iron and the following composition in wt %:
X16—B:2.62 C:1.84 Cr:20.7 Si:1.2 Ti:4.2 W:4.6;
X36—B:1.56 C:2.01 Cr:18.8 Si:1.2 Zr:14;
X37—B:1.91 C:2.57 Cr:21.1 Si:1.2 Ti:3.8 Zr:5.7;
X38—B:1.2 C:1.94 Cr:16.7 Si:1.36 Zr:12;
X39—B:3.16 C:2.15 Cr:14.9 Si:1 Ti:7.5 Zr:6.5;
X40—B:1.3 C:2.16 Cr:18.5 Zr:10.7;
X42—B:1.68 C:1.65 Cr:21.6 Ti:4.93; or
X42-MW—B:1.1 C:1.46 Cr:19.4 Ti:4.57.

In some embodiments, the alloy can comprise Fe and the following in wt %:
B: 1.1-2.62;
C: 1.46-2.57;
Cr: 14.9-21.6;
Si: 0-1.36;
Ti: 0-7.5;
W: 0-4.6; and
Zr: 0-14.

Also disclosed herein are embodiments of a wear resistant ferrous alloy, wherein a matrix of the alloy comprises one or more of ferrite, austenite, martensite, pearlite, and/or bainite, wherein a volume fraction of borides with a metallic constituent of ≥75 wt % iron plus chromium is ≥5%, wherein a volume fraction of one or more carbides, borides, and/or borocarbides with a metallic constituent ≥75 wt % of one or more of Nb, Ti, V, Zr, W, Mo, Hf is ≥2%, wherein a volume fraction of $M_2B$ and/or $M_3B_2$ is ≥5% and where: a) M in $M_2B$ is ≥10 wt % of each of the following elements: Fe, Cr, Mo, and W, and M in $M_3B_2$ is ≥15 wt % of each of the following elements: Fe, Mo, and W; and b) Fe+Cr+Mo+W is ≥70 wt % of M, and wherein a portion of the phases volume fraction does not form in a eutectic structure but instead a near spherical morphology, and wherein a volume fraction of primary carbides or borocarbides that form from the liquid during solidification with a metallic constituent of ≥75 wt % iron plus chromium is ≤5%.

In some embodiments, alloys can comprise iron and about the following compositions in wt %:
X26—B:3.68 C:1.76 Cr:17.8 Mo:4.49 Nb:2.79 Ti:2.45 W:6.84;
X30—B:3.33 C:1.81 Cr:18.2 Mo:6.26 Si:3 W:9.5;
X31A—B4.1 C:1.67 Cr:18.9 Mo:10.9 Si:0.97 W:8.84 Zr:3.19;
X35—B:4.6 C:1.51 Cr:19.4 Mo:6.77 Ni:3.47 Si:0.33 W:6.65 Zr:3.2;
X41—B:3.31 C:1.49 Cr:16.5 Mo:5.76 Ti:5.34 W:7.69;
X47—B:3.34 C:0.763 Cr:12 Mo:6.42 Ti:2.24 W:8.79;
X47A B:3.76 C:0.992 Cr:10.3 Mo:5.53 Ti:2.57 W:8.86;
X48—B:2.99 C:0.8 Cr:17 Mo:6.47 Ti:7.21 W:8; or
X48A B:3.83 C:0.851 Cr:16.9 Mo:5.82 Ti:6.92 W:10.6.
W-X47A: B:3.15 C:0.86 Cr:12.8 Mo: 5.97 Ti:1.92 W:8.75
W-X47B: B:2.76 C:0.8 Cr:12.1 Mo:5.79 Ti:1.86 W:8.9
W-X47C: B:4.41 C:1.14 Cr:15.9 Mo:8.1 Ti:2.8 W:10.9
W-X47D: B:4 C:1.1 Cr:12 Mo:5.6 Ti:1.9 W:7.75
MW-X47A-4: B:1.95 C:0.57 Cr:8.66 Mo:4.04 Ti:1.78 W:6.17
MW-X47B: B:1.73 C:0.5 Cr:7.94 Mo:3.99 Ti:1.76 W:5.97
MW-X47C-1: B:2.57 C:0.94 Cr:11.5 Mo:5.56 Ti:2.16 W:7.73
MW-X47C-3: B:2.94 C:0.87 Cr: 12.6 Mo:5.88 Ti:2.21 W:8.52
MW-X47C-4: B:2.52 C:0.79 Cr: 11.9 Mo:5.32 Ti:1.92 W:7.97
MW-X47C-6: B:2.51 C:0.76 Cr: 10.9 Mo:5.14 Ti:2 W:7.55
MW-X47D-1: B:2.43 C:0.8 Cr:8.04 Mo:3.81 Ti:1.66 W:6.1
X50: B:3.97 C:0.96 Cr:8.97 Mo:3.91 Ti:2.5 W:12.9
X51: B:4.27 C:1.2 Cr:15 Mo:7.21 Ti:3.07 W:14.8
X52: B:5.02 C:0.36 Cr:14.3 Mo:4.57 Ti:2.37 W:19
X53: B:4.34 C:1 Cr:11.9 Mo:4.45 Ti:2.76 W:14
X53.1: B:3.98 C:0.95 Cr:8.59 Mo:4.22 Ti:2.47 W:11
X54: B:4.95 C:0.98 Cr:7.88 Mo:3.02 Ti:2.24 W:11.7
X55: B:4.04 C:1.01 Cr:1.52 Mo:9.61 Ti:2.26 W:17.5
X55.1: B:3.89 C:1.46 Cr:1.95 Mo:10 Ti:2.8 W:19
X58: B:2.66 C:0.84 Cr:11.1 Mo:5.24 Ti:1.68 W:10.5
X71: B:2.96 C:2.08 Cr:12.3 Mo:4.56 Ti:4.78 W:7.42
X72: B:2.53 C:2 Cr:14.1 Mo:6.12 Ti:5.79 W:7.95
X73: B:3.91 C:1.88 Cr:22 Mo:8.18 Ti:5.32 W:19.2
X74: B:2.54 C:0.83 Cr:24 Mo:8.95 Ti:4.13 W:19.1
X47A 14: B:3.25 C:1.08 Cr:16.3 Mo:6.32 Ti:2.2 W:9.95
W-X47A-D: B:2 C:0.6 Cr:8.1 Mo:4.22 Ti:1.53 W:6.24
W-X47C-D: B:2.57 C:0.766 Cr:10.7 Mo:4.87 Ti:1.8 W:7.6
W-X47D-D: B:2.39 C:0.70 Cr:8.0 Mo:3.95 Ti:1.62 W:6.81

In some embodiments, the alloy can comprise Fe and about the following in wt %:
B: 1.95-5.02;
C: 0.5-2.08;
Cr: 1.52-24;
Mo: 2.9-10;
Ti: 0-7.21;
W: 3.19-19.2;
Nb: 0-1.86; and
Zr: 0-3.2

Also disclosed herein are embodiments of a wear resistant ferrous alloy, wherein a matrix of the alloy comprises one or more of ferrite, austenite, pearlite, and/or bainite, wherein a mole fraction of borides with a metallic constituent of ≥75 wt % iron plus chromium is ≥5%, wherein a mole fraction of one or more carbides, borides, and/or borocarbides with a metallic constituent having ≥90 wt % of one or more of Nb, Ti, V, Zr, W, Mo, Hf is ≥2%, wherein a mole fraction of $M_2B$ and/or $M_3B_2$ is ≥5% and where: a) M in $M_2B$ is ≥10 wt % of each of the following elements: Fe, Cr, Mo, and W, and M in $M_3B_2$ is ≥15 wt % of each of the following elements: Fe, Mo, and W; b) Fe+Cr+Mo+W is ≥70 wt % of M; and c) a portion of one or more of $M_2B$ and/or $M_3B_2$ that form before the matrix liquidus, and wherein a mole fraction of primary carbides or borocarbides that form from the liquid during solidification with a metallic constituent of ≥75 wt % iron plus chromium is ≤5%.

In some embodiments, alloys can comprise comprises iron and the following compositions in wt %:

X26—B:3.68 C:1.76 Cr:17.8 Mo:4.49 Nb:2.79 Ti:2.45 W:6.84;
X30—B:3.33 C:1.81 Cr:18.2 Mo:6.26 Si:3 W:9.5;
X31A—B4.1 C:1.67 Cr:18.9 Mo:10.9 Si:0.97 W:8.84 Zr:3.19;
X35—B:4.6 C:1.51 Cr:19.4 Mo:6.77 Ni:3.47 Si:0.33 W:6.65 Zr:3.2;
X41—B:3.31 C:1.49 Cr:16.5 Mo:5.76 Ti:5.34 W:7.69;
X47—B:3.34 C:0.763 Cr:12 Mo:6.42 Ti:2.24 W:8.79;
X47A B:3.76 C:0.992 Cr:10.3 Mo:5.53 Ti:2.57 W:8.86;
X48—B:2.99 C:0.8 Cr:17 Mo:6.47 Ti:7.21 W:8; or
X48A B:3.83 C:0.851 Cr:16.9 Mo:5.82 Ti:6.92 W:10.6.
W-X47A: B:3.15 C:0.86 Cr:12.8 Mo: 5.97 Ti:1.92 W:8.75
W-X47B: B:2.76 C:0.8 Cr:12.1 Mo:5.79 Ti:1.86 W:8.9
W-X47C: B:4.41 C:1.14 Cr:15.9 Mo:8.1 Ti:2.8 W:10.9
W-X47D: B:4 C:1.1 Cr:12 Mo:5.6 Ti:1.9 W:7.75
MW-X47A-4: B:1.95 C:0.57 Cr:8.66 Mo:4.04 Ti:1.78 W:6.17
MW-X47B: B:1.73 C:0.5 Cr:7.94 Mo:3.99 Ti:1.76 W:5.97
MW-X47C-1: B:2.57 C:0.94 Cr:11.5 Mo:5.56 Ti:2.16 W:7.73
MW-X47C-3: B:2.94 C:0.87 Cr: 12.6 Mo:5.88 Ti:2.21 W:8.52
MW-X47C-4: B:2.52 C:0.79 Cr: 11.9 Mo:5.32 Ti:1.92 W:7.97
MW-X47C-6: B:2.51 C:0.76 Cr: 10.9 Mo:5.14 Ti:2 W:7.55
MW-X47D-1: B:2.43 C:0.8 Cr:8.04 Mo:3.81 Ti:1.66 W:6.1
X50: B:3.97 C:0.96 Cr:8.97 Mo:3.91 Ti:2.5 W:12.9
X51: B:4.27 C:1.2 Cr:15 Mo:7.21 Ti:3.07 W:14.8
X52: B:5.02 C:0.36 Cr:14.3 Mo:4.57 Ti:2.37 W:19
X53: B:4.34 C:1 Cr:11.9 Mo:4.45 Ti:2.76 W:14
X53.1: B:3.98 C:0.95 Cr:8.59 Mo:4.22 Ti:2.47 W:11
X54: B:4.95 C:0.98 Cr:7.88 Mo:3.02 Ti:2.24 W:11.7
X55: B:4.04 C:1.01 Cr:1.52 Mo:9.61 Ti:2.26 W:17.5
X55.1: B:3.89 C:1.46 Cr:1.95 Mo:10 Ti:2.8 W:19
X58: B:2.66 C:0.84 Cr:11.1 Mo:5.24 Ti:1.68 W:10.5
X71: B:2.96 C:2.08 Cr:12.3 Mo:4.56 Ti:4.78 W:7.42
X72: B:2.53 C:2 Cr:14.1 Mo:6.12 Ti:5.79 W:7.95
X73: B:3.91 C:1.88 Cr:22 Mo:8.18 Ti:5.32 W:19.2
X74: B:2.54 C:0.83 Cr:24 Mo:8.95 Ti:4.13 W:19.1
X47A 14: B:3.25 C:1.08 Cr:16.3 Mo:6.32 Ti:2.2 W:9.95
W-X47A-D: B:2 C:0.6 Cr:8.1 Mo:4.22 Ti:1.53 W:6.24
W-X47C-D: B:2.57 C:0.766 Cr:10.7 Mo:4.87 Ti:1.8 W:7.6
W-X47D-D: B:2.39 C:0.70 Cr:8.0 Mo:3.95 Ti:1.62 W:6.81

In some embodiments, the alloy can comprise Fe and the following in wt %:
B: 1.95-5.02;
C: 0.5-2.08;
Cr: 1.52-24;
Mo: 2.9-10;
Ti: 0-7.21;
W: 3.19-19.2;
Nb: 0-1.86; and
Zr: 0-3.2

Also disclosed herein are embodiments of a wear resistant ferrous alloy, wherein a matrix of the alloy comprises one or more of ferrite, austenite, martensite, pearlite, and/or bainite, wherein a volume fraction of borides with a metallic constituent of ≥75 wt % iron plus chromium is ≥5%, wherein a volume fraction of carbides and/or borocarbides forming from the liquid is ≤5%, wherein a volume fraction of $M_2B$ and/or $M_3B_2$ is ≥5% and where: a) M in $M_2B$ is ≥10 wt % of each of the following elements: Fe, Cr, Mo, and W, and M in $M_3B_2$ is ≥15 wt % of each of the following elements: Fe, Mo, and W; and b) Fe+Cr+Mo+W is ≥70 wt % of M, and wherein a portion of the phases volume fraction does not form in a eutectic structure but instead a near spherical morphology.

In some embodiments, alloys can comprise iron and the following compositions in wt %:

X56: B:3 C:0.6 Cr:4 Mo:14 W:16
X57: B:3.08 C:0.4 Mo:7.56 W:8.61
X59: B:3.43 Mo:10.4 W:10.6
X60: B:4.48 Cr:7.62 Mo:4.6 W:9.48
X61: B:3.73 C:0.14 Cr:5.47 Mo:3.94 W:7.58
X62: B:4.16 C:0.04 Cr:6.59 Mo:4.51 W:8.22
X76: B:3 C:0.29 Cr: 11.7 Mo:5.35 W:7.87
P42-X85: B3.5 C0.85 Cr8 Mo5 Ti3.2 W10.5
P42-X86: B3.5 C0.85 Cr8 Ti3.2 W15
P42-X87: B3.8 C1.1 Cr8 Ti4.25 W17
P42-X88: B4.0 C1.15 Cr8 Ti4 W17
P42-X89: B3.9 C1.15 Cr8 Ti3.5 W18.5
P42-X90: B3.8 C1.1 Cr8 Mo13.5 Ti3.6 W3
P42-X91: B4 C1.15 Cr8 Mo16.5 Ti3.7 W3
P42-X92: B4.1 C1.15 Cr8 Mo16.5 Ti3 W3
P42-X93: B4.4 C1.2 Cr8 Mo16.5 Ti3 W3
P42-X93B: B4.1 C1.09 Cr7.5 Mn0.7 Mo12.05 Si0.35 Ti3.5
P42-X47F: B3 C0.8 Cr11.25 Mo10.15 Ti2
P42-X47G: B3 C0.8 Cr7.5 Mo10.15 Ti2
P42-X47H: B3 C0.8 Cr7.5 Mo10.15 Ti2.6
P42-X97: B4 C0.55 Cr7.5 Mo12.5
P42-X98: B4 C1.15 Cr7.5 Mo12.5 Nb6
P42-X99: B4.4 C1.2 Cr7.5 Mo13 Nb4
P42-X99 MOD: B4.4 C1.2 Cr7.5 Mo13 Nb6
P42-X47I: B3.25 C0.88 Cr7.5 Mo10.15 Ti2
P42-X47J: B3.5 C0.95 Cr7.5 Mo10.15 Ti2
P42-X93D: B4.1 C1.1 Cr7.5 Mo13 Ti2
P42-X47C5—B4.9 C1.1 Cr16.3 Mo8.2 Ti3.1 W13
P42-X47C6 B5.2 C1.15 Cr16.3 Mo8.2 Ti3.1 W13
P42-X47C7—B5.2 C1.18 Cr14.9 Mo8.2 Ti5 W13
P42-X93 MOD—B6.15 C1.65 Cr12.8 Mo21 Ti6.45 W3.2
P42-X47E—B4.25 C1.07 Cr14.8 Mo7.1 Ti4 W11.5
X93B 0.063—B5.85 C1.55 Cr10.7 Mn1 Mo17.2 Si0.5 Ti4.95
X93B 0.109—B6.8 C1.8 Cr13.35 Mn1 Mo22 Si0.5 Ti5.8
X93C—B5.85 C1.55 Cr10.7 Mn1 Mo18 Si0.5 Ti4.95
X93C MOD—B5.5 C1.47 Cr11.45 Mn1 Mo16.3 Si0.5 Ti4.7
P42-X84—B4 C0.76 Cr10.7 Ti 2.8 W15.8
X47I—B5 C1.35 Cr11.5 Mn1 Mo15.5 Si0.5 Ti3.4
X47I MOD—B5.1 C1.1 Cr11.5 Mn1 Mo15.5 Si0.5 Ti2.6
X47I MOD 2—B5 C1.35 Cr11.5 Mn1 Mo15.5 Nb2.5 Si0.5 Ti1.5

In some embodiments, the alloy can comprise Fe and the following in wt %:

B:3-4.48
C: 0-0.6
Cr: 0-11.7
Mo: 3.94-14
W: 7.58-16

Also disclosed herein are embodiments of a wear resistant ferrous alloy, wherein a matrix of the alloy comprises one or more of ferrite, austenite, martensite, pearlite, and/or bainite, wherein a mole fraction of borides with a metallic constituent of ≥75 wt % iron plus chromium is ≥5%, wherein a mole fraction of carbides and/or borocarbides that form before the solidus is ≤5%, wherein a mole fraction of $M_2B$ and/or $M_3B_2$ is ≥5% and where: a) M in $M_2B$ is ≥10 wt % of each of the following elements: Fe, Cr, Mo, and W, and M in $M_3B_2$ is ≥15 wt % of each of the following elements: Fe, Mo, and W; b) Fe+Cr+Mo+W is ≥70 wt % of M; and c) a portion of one or more of $M_2B$ and/or $M_3B_2$ form before the matrix liquidus.

In some embodiments, alloys can comprise iron and the following compositions in wt %:

X56: B:3 C:0.6 Cr:4 Mo:14 W:16
X57: B:3.08 C:0.4 Mo:7.56 W:8.61
X59: B:3.43 Mo:10.4 W:10.6
X60: B:4.48 Cr:7.62 Mo:4.6 W:9.48
X61: B:3.73 C:0.14 Cr:5.47 Mo:3.94 W:7.58
X62: B:4.16 C:0.04 Cr:6.59 Mo:4.51 W:8.22
X76: B:3 C:0.29 Cr: 11.7 Mo:5.35 W:7.87

In some embodiments, the alloy can comprise Fe and the following in wt %:

B:3-4.48
C: 0-0.6
Cr: 0-11.7
Mo: 3.94-14
W: 7.58-16

Disclosed herein are embodiments of a ferrous alloy, the ferrous alloy configured to form a matrix comprising near spherical and hypereutectic borides and/or borocarbides, wherein a volume fraction of the near spherical and hypereutectic borides and/or borocarbides is ≥5%, where a near spherical phase has an aspect ratio ≤2:1, the aspect ratio being defined as the ratio between a major axis in cross section to an orthogonal diameter of the near spherical and hypereutectic borides and/or borocarbides, wherein the volume fraction of hypereutectic and rod-like phases with a maximum dimension in cross section ≥50 um and an aspect ratio greater than 2:1 is ≤5%, and wherein the total volume fraction of borides and borocarbides is ≥10%.

In some embodiments, the near spherical and hypereutectic borides and/or borocarbides can comprise $M_2(C,B)$ or $M_3(C,B)_2$, wherein M comprises Fe, Cr, Mo, and/or W and where M is ≥15 wt % Mo+W. In some embodiments, all hardphases in the matrix can have a maximum dimension in cross section of ≤50 μm.

In some embodiments, the matrix can further comprise a volume fraction of carbides that form from the liquid between 1% and 25%, wherein said carbides have a metallic constituent ≥75 wt % of one or more of: Ti, V, Zr, W, Mo, Hf, Nb. In some embodiments, the matrix can further comprise a volume fraction of borocarbides with one or more of the formulas: $M_{23}(C,B)_6$, $M_7(C,B)_3$, and $M_3(C,B)$ that form in the liquid of ≤15%.

In some embodiments, the alloy comprises Fe and the following in wt %, B: 1.95-5.5, C: 0-2.08, Cr: 1.52-24, Mo: 2.9-22, Ti: 0-7.21, W: 0-19.2, Nb: 0-6, and Zr: 0-3.2.

Also disclosed herein are embodiments of a wear resistant layer formed from the alloys disclosed herein. In some embodiments, the layer can be formed via GMAW, GTAW, OAW, SAW, PTAW, bulk welding, laser welding, casting, or any other welding or coating process. In some embodiments, the disclosed alloys can be used in comminution, wear packages, SAG mills, AG mills, all crushing and grinding processes, on downhole tools for oil drilling, crusher teeth, ground engaging tools, wear plate, shaker screens, slurry pipe, agricultural tools, and any other process where wear and/or impact are sources of material failure.

Also disclosed herein are embodiments of a wear resistant ferrous alloy comprising a mole fraction of $M_2B$ or $M_3B_2$ at the liquidus of ≥5%, wherein M comprises Fe, Cr, Mo, and/or W and where M is ≥15 wt % Mo+W, and a mole fraction of hypereutectic and rod like phases at the liquidus of ≤5%, wherein a total mole fraction of all borides and borocarbides at 1300K is ≥10%.

In some embodiments, the total mole fraction of borides and borocarbides can be ≥10%. In some embodiments, the alloy can further comprise a mole fraction of carbides at 1300K between 1% and 25%, and wherein said carbides have a metallic constituent ≥75 wt % of one or more of: Ti, V, Zr, W, Mo, Hf, Nb. In some embodiments, the alloy can further comprise, under scheil and equilibrium solidification, a mole fraction of borides or borocarbides with one or more of the formulas: $M_{23}(C,B)_6$, $M_7(C,B)_3$, and $M_3(C,B)$ at the solidus of ≤15%.

In some embodiments, the alloy can comprise Fe and the following in wt %, B: 1.95-5.5, C: 0-2.08, Cr: 1.52-24, Mo: 2.9-22, Ti: 0-7.21, W: 0-19.2, Nb: 0-6, and Zr: 0-3.2. In some embodiments, Mo+W can be greater than or equal to 8 (or about 8).

Also disclosed herein are embodiments of a wear resistant layer formed from the alloys disclosed herein. In some embodiments, the alloy can be used in comminution, wear packages, SAG mills, AG mills, all crushing and grinding processes, on downhole tools for oil drilling, crusher teeth, ground engaging tools, wear plate, shaker screens, slurry pipe, agricultural tools, and any other process where wear and/or impact are sources of material failure.

Also disclosed herein are embodiments of a ferrous alloy, the ferrous alloy configured to form a matrix comprising one or more of ferrite, austenite, martensite, pearlite, and/or bainite, wherein a mole fraction, measured at 1300K, of borides with a metallic constituent of ≥75 wt % iron plus chromium is ≥5%, wherein a mole fraction, when measured at 1300K, of one or more carbides, borides, and/or borocarbides with a metallic constituent ≥75 wt % of one or more of Nb, Ti, V, Zr, W, Mo, Hf is ≥5%, and wherein a mole fraction of borides that are hyper eutectic (form before the liquidus) and have a metallic constituent of ≥75 wt % iron plus chromium is ≤15%.

In some embodiments, a mole fraction, measured at the solidus during solidification, of carbides or borocarbides with a metallic constituent ≥75 wt % iron plus chromium can be ≤5%. In some embodiments, the alloy can comprise iron and the following composition in wt %:

B:2.62 C:1.84 Cr:20.7 Si:1.2 Ti:4.2 W:4.6;
B:1.56 C:2.01 Cr:18.8 Si:1.2 Zr:14;
B:1.91 C:2.57 Cr:21.1 Si:1.2 Ti:3.8 Zr:5.7;
B:1.2 C:1.94 Cr:16.7 Si:1.36 Zr:12;
B:3.16 C:2.15 Cr:14.9 Si:1 Ti:7.5 Zr:6.5;
B:1.3 C:2.16 Cr:18.5 Zr:10.7;
B:1.68 C:1.65 Cr:21.6 Ti:4.93; or
B:1.1 C:1.46 Cr:19.4 Ti:4.57.

In some embodiments, the alloy can comprise Fe and the following in wt %, B: 1.1-2.62, C: 1.46-2.57, Cr: 14.9-21.6, Si: 0-1.36, Ti: 0-7.5, W: 0-4.6, Zr: 0-14, and Nb: 0-10.

DETAILED DESCRIPTION

Figure 1:
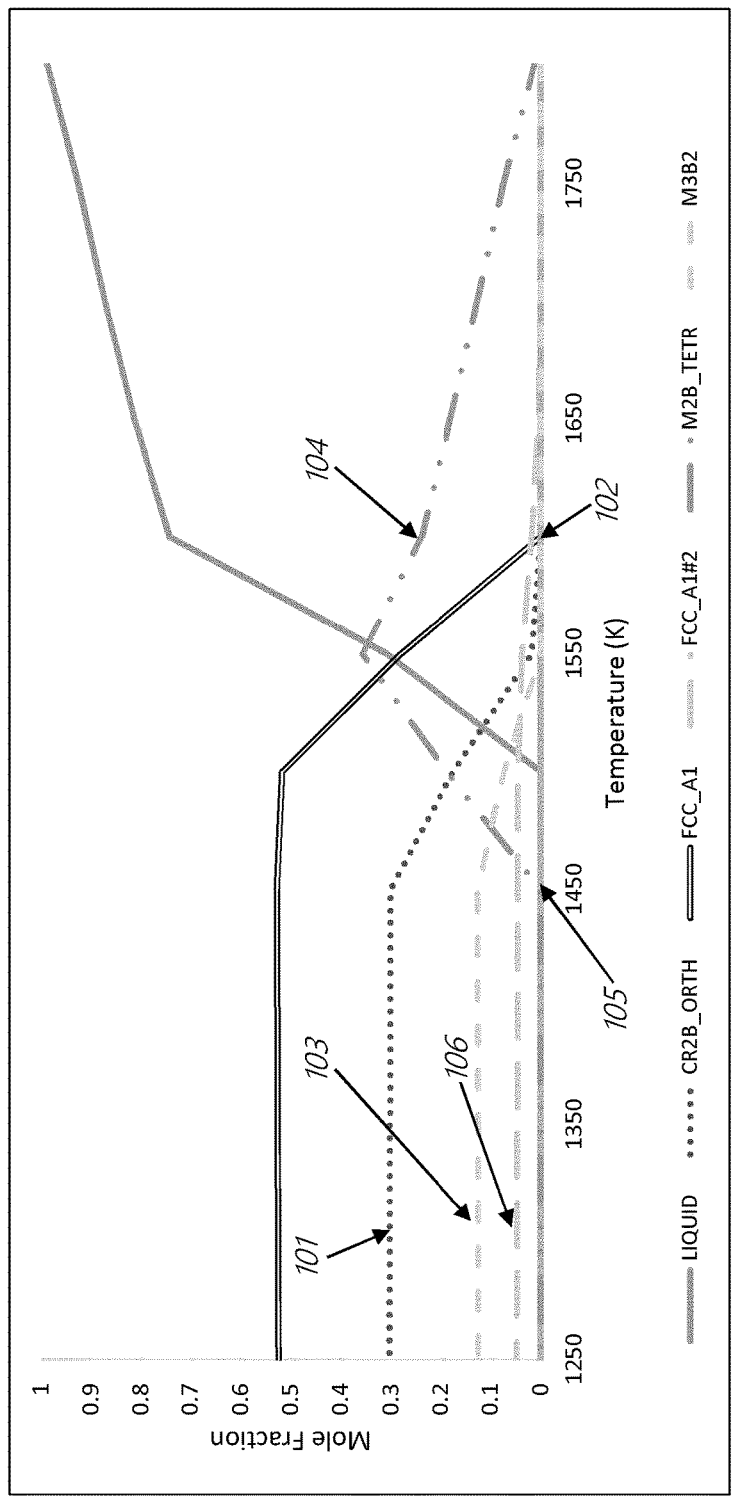
FIG. 1 shows an equilibrium solidification diagram of an embodiment of the disclosure (X47) containing, in wt. %: B:3.2 C:0.8 Cr:10.75 Mo:5 Ti:2 W:8 Fe:bal.

Disclosed herein are a number of embodiments of alloys which can be both tough and wear resistant. Specifically, some embodiments of the disclosure describe alloys containing near spherical borides and/or borocarbides (for example having a near spherical phase) without large embrittling rod like phases, which alloys for the alloys to have both high toughness and high wear resistance, allowing them to be advantageous as coating type materials. Thus, alloys in these embodiments can comprise near spherical and hypereutectic boride and/or borocarbide phases without forming a rod like morphology. This structure can be defined by microstructure, thermodynamic, and performance properties. These alloys are unique in that their characteristics allow for both excellent toughness and wear resistance. Further, embodiments of the disclosure describes ferrous alloys with iron chromium borides ((Fe,Cr)Boride) and one or more other hardphases that are free from primary Fe and/or Cr based carbides or borocarbides that form in the liquid. This allows for increased toughness and wear resistance through control of the morphology and chemistry of each phase. This disclosure describes an alloy space that without computational metallurgical methods, would result in the formation of numerous undesirable phases. By eliminating these phases and controlling the phases that do form, novel compositions have been designed.

In some embodiments, computational metallurgy can be used to explore alloy compositional ranges where the morphology, phase fraction, and composition of phases can be controlled to achieve a specific microstructure and performance. For example, a four dimensional Fe—Cr—B—C system is sufficiently complex that controlling the fraction, type, composition, and morphology of phases is not obvious even to one skilled in the art, though we are not so limited to this system in the disclosure. With the addition of one or more of the following elements: V, Ti, Zr, Hf, W, Mo, Si, Mn, Ni this becomes even more challenging. With computational metallurgy, the thermodynamic characteristics and, as a result, the microstructure and physical properties of alloys containing these elements, can be closely controlled.

Hardfacing and wear resistant alloys typically are based on the Fe—Cr—C system with recent efforts by some to include other carbide forming elements to improve wear resistance. One example is U.S. Pat. No. 6,669,790, hereby incorporated by reference in its entirety, which describes alloys containing both complex iron-chrome carbides and carbides from vanadium, niobium, and/or titanium. In contrast to the '790 patent, embodiments of this disclosure describes a family of alloys that fall within specific thermodynamic and microstructural criteria that can have reduced, or can be devoid of, iron chromium carbides which can allow for more precise microstructural control.

There have also been efforts within the Fe—Cr—C—B system with the addition of other hardphase forming elements such as U.S. Pat. No. 8,704,134, hereby incorporated by reference in its entirety. This patent describes a compositional space whereby a particular wear performance and hardness using borocarbides in an austenitic or ferritic ferrous matrix. U.S. Pat. No. 8,704,134 also teaches a welding method whereby glass compositions containing precipitates form on a substrate which, as demonstrated in the disclosure of U.S. Pat. No. 8,704,134, tend towards forming long needle-shaped borocarbide structures. While these structures provide excellent wear resistance, they can lower the toughness of the weld overlay. In contrast to the '134 patent, embodiments of this disclosure describes criteria that allow for precise control over the performance, microstructural, and thermodynamic criteria. Specifically, this can be done by controlling the chemistry to reduce, or completely exclude, carbides and borocarbides that have detrimental performance impacts. This exclusion can allow for control of toughness, wear resistance, and hardness not described in the referenced art.

U.S. Pat. No. 4,365,994, hereby incorporated by reference in its entirety, describes boride containing alloys. However, it does not describe the thermodynamic criteria, phases, and morphology described in this disclosure. Additionally, it does not describe alloy spaces that specifically incorporate iron chromium borides and another phase of carbides or borides not predominantly consisting of iron or chromium. Further, fine scale borides in the microstructure are achieved via process control, specifically powder and/or strip processing, as opposed to alloy control.

U.S. Pat. No. 7,935,198, hereby incorporated by reference in its entirety, describes niobium containing glass forming alloys with critical cooling rates small enough to form a nanoscale or amorphous microstructure. In contrast, embodiments of this disclosure describe a compositional space free of niobium that does not rely on low critical cooling rates to develop a designed microstructure. Instead thermodynamic and microstructural criteria of crystalline alloys are described. Furthermore, U.S. Pat. No. 7,935,198 utilizes chromium rich borocarbides to attain elevated wear resistance. As will be shown in the below disclosure, chromium rich borocarbides tend to form long needle-shaped structures which lower the toughness of the material.

U.S. Pat. No. 7,553,382, hereby incorporated by reference in its entirety, describes niobium containing and iron based glass alloys. Specifically these alloys are described as containing non glass elements and $M_{23}(C,B)_6$ and/or $M_7(C,B)_3$. This disclosure describes alloys designed to be free of both $M_{23}(C,B)_6$ and $M_7(C,B)_3$ and does not rely on glass formation to develop the final properties of the material. As demonstrated below, the formation of $M_{23}(C,B)_6$ and $M_7(C,B)_3$ phases tends to form long need-shaped structures, which can lower the toughness of the alloy. Embodiments of this disclosure also specifically excludes niobium in some embodiments from the composition due to its prohibitive cost to performance ratio.

As disclosed herein, the term alloy can refer to the chemical composition of powder used to form a desired component, the powder itself (such as feedstock), the composition of a metal component formed, for example, by the heating and/or deposition of the powder, and the metal component itself.

Composition

In some embodiments, the alloys can be fully described by particular chemical compositional ranges.

For example, in some embodiments the composition can include Fe and, in weight %:
- B: 1.7 to 4.2 (or about 1.7 to about 4.2)
- C: 0 to 2.4 (or about 0 to about 2.4)
- Cr: 0 to 25 (or about 0 to about 25)
- Mo: 0 to 16 (or about 0 to about 16)
- Mn: 0 to 0.5 (or about 0 to about 0.5)
- Ti: 0 to 6 (or about 0 to about 6)
- V: 0 to 12 (or about 0 to about 12)
- W: 0 to 20 (or about 0 to about 20)

In some embodiments the composition can include Fe and, in weight %:
- B: 1.95-5.5 (or about 1.95 to about 5.5)
- C: 0-2.08 (or about 0 to about 2.08)
- Cr: 1.52-24 (or about 1.52 to about 24)
- Mo: 2.9-22 (or about 2.9 to about 22)
- Ti: 0-7.21 (or about 0 to about 7.21)
- W: 0-19.2 (or about 0 to about 19.2)
- Nb: 0-6 (or about 0 to about 6)
- Zr: 0-3.2 (or about 0 to about 3.2)

In some embodiments, the alloys can be described by chemical compositions which utilize Nb and/or V instead of Ti. In some embodiments it can be advantageous to avoid the use of Ti for specific welding processes, such as submerged arc welding. Both these features are discussed below in the Examples.

In some embodiments the composition can include Fe and, in weight %:
- B: 1.7 to 4.4 (or about 1.7 to about 4.4)
- C: 0 to 2.4 (or about 0 to about 2.4)
- Cr: 0 to 25 (or about 0 to about 25)
- Mo: 0 to 16 (or about 0 to about 16)
- Nb: 0 to 6 (or about 0 to about 6)
- V: 0 to 12 (or about 0 to about 12)
- W: 0 to 20 (or about 0 to about 20)

In some embodiments, the alloys can be described by chemical compositions which eliminate or reduce the use of W in order to reduce alloy cost.

In some embodiments the composition can include Fe and, in weight %:
- B: about 1.7 to about 4.4 (or about 1.7 to about 4.4)
- C: 0 to about 2.4 (or about 0 to about 2.4)
- Cr: 0 to about 25 (or about 0 to about 25)
- Mo: 0 to about 16 (or about 0 to about 16)
- Nb: 0 to about 6 (or about 0 to about 6)
- V: 0 to about 12 (or about 0 to about 12)

In some embodiments of the alloy ranges disclosed above, Mo+W can be greater than or equal to 8 (or about 8).

In some embodiments the composition can include Fe and, in weight %:
- X16—B:2.62 C:1.84 Cr:20.7 Si:1.2 Ti:4.2 W:4.6
- X36—B:1.56 C:2.01 Cr:18.8 Si:1.2 Zr:14
- X37—B:1.91 C:2.57 Cr:21.1 Si:1.2 Ti:3.8 Zr:5.7
- X38—B:1.2 C:1.94 Cr:16.7 Si:1.36 Zr:12
- X39—B:3.16 C:2.15 Cr:14.9 Si:1 Ti:7.5 Zr:6.5
- X40—B:1.3 C:2.16 Cr:18.5 Zr:10.7
- X42—B:1.68 C:1.65 Cr:21.6 Ti:4.93
- X42-MW—B:1.1 C:1.46 Cr:19.4 Ti:4.57
- X26—B:3.68 C:1.76 Cr:17.8 Mo:4.49 Nb:2.79 Ti:2.45 W:6.84
- X30—B:3.33 C:1.81 Cr:18.2 Mo:6.26 Si:3 W:9.5
- X31A—B4.1 C:1.67 Cr:18.9 Mo:10.9 Si:0.97 W:8.84 Zr:3.19
- X35—B:4.6 C:1.51 Cr:19.4 Mo:6.77 Ni:3.47 Si:0.33 W:6.65 Zr:3.2
- X41—B:3.31 C:1.49 Cr:16.5 Mo:5.76 Ti:5.34 W:7.69
- X47—B:3.34 C:0.763 Cr:12 Mo:6.42 Ti:2.24 W:8.79
- X47A B:3.76 C:0.992 Cr:10.3 Mo:5.53 Ti:2.57 W:8.86
- X48—B:2.99 C:0.8 Cr:17 Mo:6.47 Ti:7.21 W:8
- X48A B:3.83 C:0.851 Cr:16.9 Mo:5.82 Ti:6.92 W:10.6
- W-X47A: B:3.15 C:0.86 Cr:12.8 Mo: 5.97 Ti:1.92 W:8.75
- W-X47B: B:2.76 C:0.8 Cr:12.1 Mo:5.79 Ti:1.86 W:8.9
- W-X47C: B:4.41 C:1.14 Cr:15.9 Mo:8.1 Ti:2.8 W:10.9
- W-X47D: B:4 C:1.1 Cr:12 Mo:5.6 Ti:1.9 W:7.75
- MW-X47A-4: B:1.95 C:0.57 Cr:8.66 Mo:4.04 Ti:1.78 W:6.17
- MW-X47B: B:1.73 C:0.5 Cr:7.94 Mo:3.99 Ti:1.76 W:5.97
- MW-X47C-1: B:2.57 C:0.94 Cr:11.5 Mo:5.56 Ti:2.16 W:7.73
- MW-X47C-3: B:2.94 C:0.87 Cr: 12.6 Mo:5.88 Ti:2.21 W:8.52
- MW-X47C-4: B:2.52 C:0.79 Cr: 11.9 Mo:5.32 Ti:1.92 W:7.97
- MW-X47C-6: B:2.51 C:0.76 Cr: 10.9 Mo:5.14 Ti:2 W:7.55
- MW-X47D-1: B:2.43 C:0.8 Cr:8.04 Mo:3.81 Ti:1.66 W:6.1
- X50: B:3.97 C:0.96 Cr:8.97 Mo:3.91 Ti:2.5 W:12.9
- X51: B:4.27 C:1.2 Cr:15 Mo:7.21 Ti:3.07 W:14.8
- X52: B:5.02 C:0.36 Cr:14.3 Mo:4.57 Ti:2.37 W:19
- X53: B:4.34 C:1 Cr:11.9 Mo:4.45 Ti:2.76 W:14
- X53.1: B:3.98 C:0.95 Cr:8.59 Mo:4.22 Ti:2.47 W:11
- X54: B:4.95 C:0.98 Cr:7.88 Mo:3.02 Ti:2.24 W:11.7
- X55: B:4.04 C:1.01 Cr:1.52 Mo:9.61 Ti:2.26 W:17.5
- X55.1: B:3.89 C:1.46 Cr:1.95 Mo:10 Ti:2.8 W:19
- X58: B:2.66 C:0.84 Cr:11.1 Mo:5.24 Ti:1.68 W:10.5
- X71: B:2.96 C:2.08 Cr:12.3 Mo:4.56 Ti:4.78 W:7.42
- X72: B:2.53 C:2 Cr:14.1 Mo:6.12 Ti:5.79 W:7.95
- X73: B:3.91 C:1.88 Cr:22 Mo:8.18 Ti:5.32 W:19.2
- X74: B:2.54 C:0.83 Cr:24 Mo:8.95 Ti:4.13 W:19.1
- X47A 14: B:3.25 C:1.08 Cr:16.3 Mo:6.32 Ti:2.2 W:9.95
- W-X47A-D: B:2 C:0.6 Cr:8.1 Mo:4.22 Ti:1.53 W:6.24
- W-X47C-D: B:2.57 C:0.766 Cr:10.7 Mo:4.87 Ti:1.8 W:7.6
- W-X47D-D: B:2.39 C:0.70 Cr:8.0 Mo:3.95 Ti:1.62 W:6.81
- X56: B:3 C:0.6 Cr:4 Mo:14 W:16
- X57: B:3.08 C:0.4 Mo:7.56 W:8.61
- X59: B:3.43 Mo:10.4 W:10.6
- X60: B:4.48 Cr:7.62 Mo:4.6 W:9.48
- X61: B:3.73 C:0.14 Cr:5.47 Mo:3.94 W:7.58
- X62: B:4.16 C:0.04 Cr:6.59 Mo:4.51 W:8.22
- X76: B:3 C:0.29 Cr: 11.7 Mo:5.35 W:7.87
- P42-X85: B3.5 C0.85 Cr8 Mo5 Ti3.2 W10.5
- P42-X86: B3.5 C0.85 Cr8 Ti3.2 W15
- P42-X87: B3.8 C1.1 Cr8 Ti4.25 W17
- P42-X88: B4.0 C1.15 Cr8 Ti4 W17

P42-X89: B3.9 C1.15 Cr8 Ti3.5 W18.5
P42-X90: B3.8 C1.1 Cr8 Mo13.5 Ti3.6 W3
P42-X91: B4 C1.15 Cr8 Mo16.5 Ti3.7 W3
P42-X92: B4.1 C1.15 Cr8 Mo16.5 Ti3 W3
P42-X93: B4.4 C1.2 Cr8 Mo16.5 Ti3 W3
P42-X93B: B4.1 C1.09 Cr7.5 Mn0.7 Mo12.05 Si0.35 Ti3.5
P42-X47F: B3 C0.8 Cr11.25 Mo10.15 Ti2
P42-X47G: B3 C0.8 Cr7.5 Mo10.15 Ti2
P42-X47H: B3 C0.8 Cr7.5 Mo10.15 Ti2.6
P42-X97: B4 C0.55 Cr7.5 Mo12.5
P42-X98: B4 C1.15 Cr7.5 Mo12.5 Nb6
P42-X99: B4.4 C1.2 Cr7.5 Mo13 Nb4
P42-X99 MOD: B4.4 C1.2 Cr7.5 Mo13 Nb6
P42-X47I: B3.25 C0.88 Cr7.5 Mo10.15 Ti2
P42-X47J: B3.5 C0.95 Cr7.5 Mo10.15 Ti2
P42-X93D: B4.1 C1.1 Cr7.5 Mo13 Ti2

In some embodiments the composition can include Fe and, in weight %:
B: 1.1-2.62 (or about 1.1 to about 2.62)
C: 1.46-2.57 (or about 1.46 to about 2.57)
Cr: 14.9-21.6 (or about 14.9 to about 21.6)
Si: 0-1.36 (or about 0 to about 1.36)
Ti: 0-7.5 (or about 0 to about 7.5)
W: 0-4.6 (or about 0 to about 4.6)
Zr: 0-14 (or about 0 to about 14)

In some embodiments the composition can include Fe and, in weight %:
B: 1.95-5.02 (or about 1.95 to about 5.02)
C: 0.5-2.08 (or about 0.5 to about 2.08)
Cr: 1.52-24 (or about 1.52 to about 24)
Mo: 2.9-10 (or about 2.9 to about 10)
Ti: 0-7.21 (or about 0 to about 7.21)
W: 3.19-19.2 (or about 3.19 to about 19.2)
Nb: 0-1.86 (or about 0 to about 1.86)
Zr: 0-3.2 (or about 0 to about 3.2)

In some embodiments the composition can include Fe and, in weight %:
B: 3-4.48 (or about 3 to about 4.48)
C: 0-0.6 (or about 0 to about 0.6)
Cr: 0-11.7 (or about 0 to about 11.7)
Mo: 3.94-14 (or about 3.94 to about 14)
W: 7.58-16 (or about 7.58 to about 16)

In some embodiments, for the elements listed above that are listed from 0-X, the alloy may contain a non-zero amount of that element.

The disclosed alloys can incorporate the above elemental constituents to a total of 100 wt. %. In some embodiments, the alloy may include, may be limited to, or may consist essentially of the above named elements. In some embodiments, the alloy may include 2% or less of impurities. Impurities may be understood as elements or compositions that may be included in the alloys due to inclusion in the feedstock components, through introduction in the manufacturing process.

Further, the Fe content identified in all of the compositions described in the above paragraphs may be the balance of the composition as indicated above, or alternatively, the balance (or remainder) of the composition may comprise Fe and other elements. In some embodiments, the balance may consist essentially of Fe and may include incidental impurities.

Thermodynamic Criteria

In some embodiments, the alloy can be described fully by equilibrium thermodynamic models.

Three particular thermodynamic criteria were used to describe the boride containing wear resistant ferrous alloys described herein: 1) The total mole fraction of borides formed during cooling from a liquid state; 2) The mole fraction of hypereutectic borides, borocarbides, and carbides that form a rod like morphology; and 3) The mole fraction of borides that form a near spherical morphology such as $M_2B$ and $M_3B_2$ that form as a hypereutectic phase before the liquidus.

In some embodiments, two other thermodynamic criteria may be used as well: 1) The mole fraction of $M_{23}(C,B)_6$, $M_7(C,B)_3$, and $M_3(C,B)$ with a metallic constituent comprising primarily of Fe and/or Cr that forms before the solidus under a Scheil solidification model or equilibrium conditions; and 2) The mole fraction of carbides comprising primarily of one or more of the following elements: V, Ti, Zr, Hf, W, Mo. An example solidification diagram is shown in FIG. 1 where it demonstrates all the equilibrium thermodynamic criteria described in this disclosure.

In some embodiments, alloys can possess thermodynamic characteristics including a high spherical boride concentration and a low hypereutectic rod-like boride mole fraction. Alloys which possess both these traits simultaneously can possess a certain microstructure, and in turn can possess advantageous performance traits as outlined in this disclosure. Alloys of this type exist within a narrow compositional band that can only be found effectively using advanced computational metallurgy techniques. For example, as boron is increased in an alloy, the tendency to form hypereutectic rod-like borides can increase. Thus, existing high boron alloys can contain hypereutectic rod-like borides. Accordingly, only through careful alloy control can hypereutectic rod-like borides be eliminated, while simultaneously producing a high fraction of spherical borides.

The first thermodynamic criteria is the total mole fraction of borides formed during cooling from a liquid state. This criteria can indicate the wear performance of an alloy with increasing fraction of borides leading to improved wear performance.

This criteria is measured as the sum of all boride phases present at 1300K (or about 1300K) in an equilibrium solidification diagram. This criteria will be abbreviated as: total boride fraction. In FIG. 1 the total boride fraction is 42%, which is equal to the concentration of $Cr_2B$ [101], about 30% and $M_3B_2$ [106], about 12%. Due to the low solubility of boron in all solidified ferrous phases there may be very little change in the phase fraction of boride between the solidus temperature of a given alloy and 1300K.

In some embodiments, the total boride fraction can be ≥10% (or ≥ about 10%). In some embodiments, the total boride fraction can be ≥15% (or ≥ about 15%). In some embodiments, the total boride fraction can be ≥20% (or ≥ about 20%). In some embodiments, the total boride fraction can be ≥30% (or ≥ about 30%).

The second thermodynamic criteria is the mole fraction of hypereutectic phases that form a rod like morphology. These phases can include $(Fe,Cr)_2B$, $M_7(C,B)_3$, $M_3(C,B)$, and $M_{23}(C,B)_6$ where M represents a metallic species. This criteria can be used as an indicator of the toughness of the material with increasing fraction reducing toughness.

This criteria is measured as the mole fraction of these phases at the liquidus temperature. The liquidus is defined as one temperature step above the first formation temperature of the matrix phase in this case FCC or BCC iron [102]. This criteria will be knows as: embrittling hypereutectic phase.

In some embodiments, the mole fraction of embrittling hypereutectic phase can be ≤5% (or ≤ about 5%). In some embodiments, the mole fraction of embrittling hypereutectic phase can be ≤2% (or ≤ about 2%). In some embodiments, the mole fraction of embrittling hypereutectic phase can be 0% (or about 0%).

The calculation of the embrittling hypereutectic phase can be demonstrated by the example in FIG. 1. As shown in FIG. 1, one phase exists at a temperature above the formation temperature, 1600K of the FCC austenite phase [102]. This one phase is $(Mo,W)_2B$, which is known not to form a rod like morphology and therefore does not contribute to the embrittling hypereutectic phase fraction. Therefore, in the FIG. 1 example, the embrittling hypereutectic is 0% mole fraction. These examples highlight a chemistry which meets the thermodynamic criteria defined in this disclosure.

Figure 5:
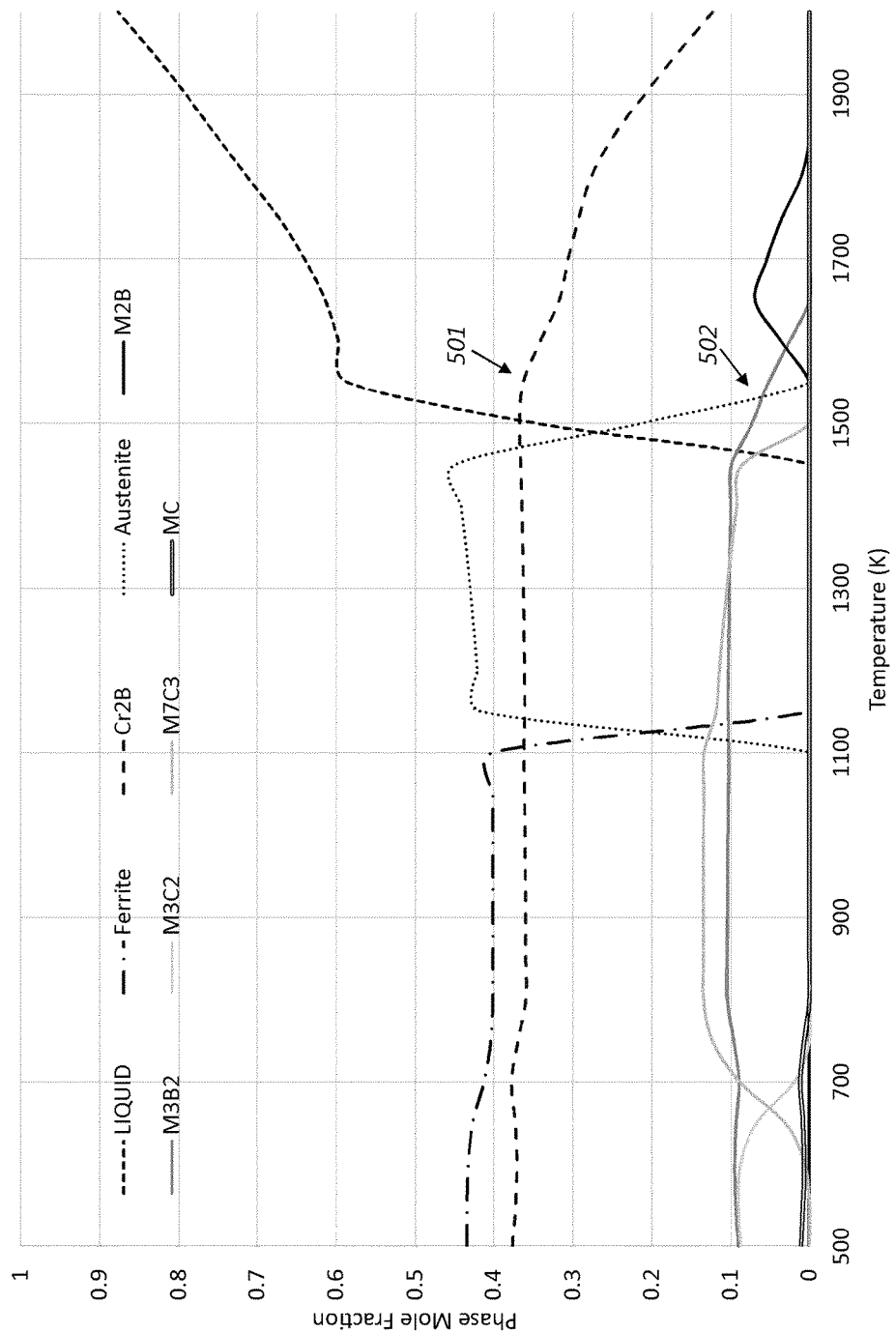
FIG. 5 shows an equilibrium solidification diagram of reference alloy R1 containing, in wt. %: B:3.6 C:1 Cr20.3 Mn:2.3 Mo:4.9 Si:1.4 W:6.4 Fe:bal.

In order to demonstrate the calculation of the embrittling hypereutectic, a reference alloy R1 is calculated and shown in FIG. 5. The composition of R1 is provided in Table 5 below, as well as in the U.S. Pat. No. 7,935,198 B2 disclosure, hereby incorporated by reference in its entirety. The embrittling phase is calculated as the phase fraction of $Cr_2B$ [501] which exists at a one temperature step above which any matrix phase is present, either austenite or ferrite. In this case, the matrix phase is austenite [502] and it begins to form at 1500K, i.e. it is still 0% mole fraction at 1550K. Therefore, the embrittling hypereutectic is calculated as the phase mole fraction of $Cr_2B$ [501] at 1600K and is equivalent to about 38%.

The third thermodynamic criteria is the mole fraction of hypereutectic borides that form a near spherical morphology. These borides can include $M_2B$ and $M_3B_2$ where M comprises Fe, Cr, Mo, and/or W where Mo+W is ≥15 wt % (or ≥ about 15 wt %). This criteria can be used as an indicator of wear resistance of the material with increasing fraction increasing hardness and wear resistance without substantially lowering toughness.

This criteria is measured as the mole fraction of near spherical forming boride phases at the liquidus temperature of the alloy [102] shown in FIG. 1. This criterion will be abbreviated as: spherical boride.

In FIG. 1, the phase which is known to form spherical borides comprise $(Mo,W)_2B$ [104] and $(Mo,W)_3B_2$ [103]. The fraction of spherical borides is thus the sum of these phases at one temperature step above that of the liquidus temperature [102]. In FIG. 1, $(Mo,W)_2B$ is the only known spherical boride phase which forms above the liquidus temperature. It is present at about 25% mole fraction at the liquidus temperature, and thus the spherical boride concentration is about 25%.

In some embodiments, mole fraction of spherical boride can be ≥2% (or ≥ about 2%). In some embodiments, mole fraction of spherical boride can be ≥5% (or ≥ about 5%). In some embodiments, mole fraction of spherical boride can be ≥10% (or ≥ about 10%).

In some embodiments, another thermodynamic criteria, measured with a Scheil solidification model or under equilibrium conditions, is the mole fraction of carbides or borocarbides that form an embrittling phase from the liquid. The fraction of this phase predicts hot tearing and toughness with increasing fraction resulting in reduced toughness. These phases include: $M_{23}(C,B)_6$, $M_7(C,B)_3$, and $M_3(C,B)$ where M is ≥75 wt % (or ≥ about 75 wt %) of Fe and/or Cr. This criteria will be abbreviated as: embrittling eutectic.

This criteria is measured as the sum of these phases at the solidus temperature [105].

In some embodiments, the mole fraction of embrittling eutectic can be ≤10% (or ≤ about 10%). In some embodiments, the mole fraction of embrittling eutectic can be ≤5% (or ≤ about 5%). In some embodiments, the mole fraction of embrittling eutectic can be 0% (or about 0%).

In some embodiments, another thermodynamic criteria can be used as well. The mole fraction of borides, borocarbides, and/or carbides with a metallic constituent of ≥90 wt % (or ≥ about 90 wt %) of one or more of the following elements: V, Ti, Zr, Hf, W, Mo, can give an indication as to the wear resistance of the material. This criteria will be abbreviated as: isolated carbide fraction. Increasing amounts of isolated carbide fraction can be correlated with increasing wear resistance without reducing toughness.

The isolated carbide fraction can be measured at 1300K (or about 1300K) [106] as the low solubility of the described elements in solid ferrous phases results in very little change between the phase fraction at 1300K and those observed in alloys at room temperature. In FIG. 1, the phase known to form an isolated carbide is the NbC phase [106]. The NbC phase fraction is about 5% at 1300K in the example of FIG. 1.

In some embodiments, the isolated hardphase fraction can be between 0% and 25% (or between about 0% and about 25%). In some embodiments, the isolated hardphase fraction can be between 1% and 25% (or between about 1% and about 25%). In some embodiments, the isolated hardphase fraction can be between 2% and 15% (or between about 2% and about 15%). In some embodiments, the isolated hardphase fraction can be between 2% and 10% (or between about 2% and about 10%). In some embodiments, the isolated hardphase fraction can be between 4% and 10% (or between about 4% and about 10%). In some embodiments, the isolated hardphase fraction can be between 5% and 15% (or between about 5% and about 15%). In some embodiments, the isolated hardphase fraction can be ≥1% (or ≥ about 1%). In some embodiments, the isolated hardphase fraction can be ≥4% (or ≥ about 4%).

Table 1 provides the calculated thermodynamic criteria for embodiments of alloys disclosed herein. The thermodynamic criteria as shown in Table 1 were computed based on the measured chemistries after manufacture. Chemistries were measured via glow discharge spectroscopy. Table 1 includes the total boride phase mole fraction (Total Boride), summed mole fraction of phases known to form rod-like phases at the liquidus temperature (Rod-Like), and summed mole fraction of phases known to form spherical phases at the liquidus temperature (Spherical). Alloy names given in the W(X##) format were created by remelting a single welding wire. Alloy names given in this format MW(X##) are mig weld deposits. Otherwise alloys are experimental ingots made from a collection of raw materials.

TABLE 1

Thermodynamic Criteria of Experimental Alloys

| ALLOY | Total Boride | Rod-Like | Spherical |
|---|---|---|---|
| X47 | 30% | 2% | 11% |
| X48 | 27% | 2% | 6% |
| X48A | 37% | 13% | 8% |
| X55 | 58% | 0% | 29% |
| X55.1 | 46% | 0% | 30% |
| X56 | 40% | 0% | 28% |
| X57 | 68% | 0% | 14% |
| X59 | 47% | 0% | 20% |
| X62 | 57% | 0% | 36% |
| X67 | 25% | 0% | 15% |
| X72 | 33% | 4% | 15% |
| X73 | 52% | 8% | 42% |
| X74 | 59% | 4% | 47% |

TABLE 1-continued

Thermodynamic Criteria of Experimental Alloys

| ALLOY | Total Boride | Rod-Like | Spherical |
|---|---|---|---|
| X76 | 41% | 1% | 25% |
| X77 | 26% | 0% | 12% |
| X80 | 29% | 0% | 10% |
| X81 | 30% | 0% | 13% |
| X82 | 26% | 0% | 8% |
| X83 | 35% | 0% | 13% |
| X84 | 34% | 0% | 13% |
| W(X47A) | 43% | 2% | 24% |
| W(X47B) | 39% | 0% | 22% |
| MW(X47C)-1 | 35% | 5% | 13% |
| MW(X47C)-2 | 37% | 5% | 14% |
| MW(X47C)-3 | 39% | 1% | 22% |
| MW(X47C)-4 | 34% | 0% | 17% |
| MW(X47C)-6.1 | 43% | 9% | 16% |
| MW(X47C)-6 | 34% | 0% | 15% |
| MW(X47C)-7 | 34% | 0% | 19% |
| MW(X47C)-8 | 30% | 0% | 16% |
| P42-X47C-0.1C | 40% | 2% | 25% |
| P42-X47C-0.2C | 40% | 4% | 22% |
| P42-X47C + .5Ti | 33% | 0% | 16% |
| P42-X47C + 1Ti | 34% | 0% | 19% |
| MW(P42-X47C1)-1 | 36% | 0% | 23% |
| MW(P42-X47C2)-1 | 36% | 0% | 22% |
| MW(P42-X47C3)-1 | 34% | 0% | 21% |
| MW(P42-X47C4)-1 | 34% | 0% | 20% |
| X47C 2.25B | 27% | 0% | 12% |
| X47C 2.4B | 28% | 0% | 13% |
| X47C 6.5Mo | 30% | 0% | 17% |
| X47A Wire 14Cr | 43% | 8% | 24% |
| P42-X47A Diluted | 28% | 0% | 4% |
| P42-X47C Diluted | 35% | 0% | 16% |
| P42-X47D Diluted | 33% | 0% | 9% |
| MW(P42-X47D)-1 | 33% | 0% | '8% |
| MW(P42-X47D)-2 | 31% | 0% | 5% |
| MW(P42-X47A)-4 | 27% | 0% | 4% |
| MW(P42-X47B) | 24% | 0% | 0% |
| X90 | 27% | 0% | 9% |
| X91 | 36% | 3% | 18% |
| X92 | 38% | 8% | 17% |
| X93 | 42% | 12% | 20% |
| X93T | 51% | 14% | 19% |

Table 2 lists a number of different compositions that can meet thermodynamic criteria disclosed herein. Table 2 includes the total boride phase mole fraction (Total), summed mole fraction of phases known to form rod-like phases at the liquidus temperature (Rod), and summed mole fraction of phases known to form spherical phases at the liquidus temperature (Sphere).

TABLE 2

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.4 | 1 | 8 | 0 | 0 | 0 | 0 | 0 | 0 | 12 | 0 | 24 | 0 | 40% | 0.0% | 22.6% |
| 3.4 | 0.8 | 8 | 0 | 0 | 0 | 0 | 0 | 0 | 10 | 0 | 24 | 0 | 41% | 0.0% | 24.6% |
| 3.4 | 0.8 | 8 | 0 | 0 | 0 | 0 | 0 | 0 | 6 | 0 | 24 | 0 | 45% | 0.0% | 29.7% |
| 2.8 | 1.5 | 16 | 0 | 0 | 7.5 | 0 | 0 | 0 | 4.5 | 0 | 20 | 0 | 38% | 0.0% | 22.4% |
| 4.1 | 0.94 | 7.4 | 0 | 0 | 4.7 | 0 | 0 | 0 | 0.1 | 0 | 18 | 0 | 52% | 0.0% | 44.2% |
| 2.6 | 0.2 | 12 | 0 | 0 | 12 | 0 | 0 | 0 | 0 | 0 | 16 | 0 | 36% | 0.0% | 27.1% |
| 2.8 | 1.75 | 24 | 0 | 0 | 10 | 0 | 0 | 0 | 3 | 0 | 15 | 0 | 37% | 0.6% | 33.7% |
| 5 | 1 | 4 | 0 | 0 | 10 | 0 | 0 | 0 | 2 | 0 | 14 | 0 | 63% | 0.0% | 48.6% |
| 4.4 | 0.6 | 6 | 0 | 0 | 6 | 0 | 0 | 0 | 2 | 0 | 12 | 0 | 59% | 0.0% | 38.9% |
| 3 | 0.8 | 12 | 0 | 0 | 6 | 0 | 0 | 0 | 2 | 0 | 10 | 0 | 40% | 0.0% | 25.3% |
| 3.6 | 1 | 8 | 0 | 0 | 4 | 0 | 0 | 0 | 2 | 0 | 8 | 0 | 48% | 0.0% | 29.4% |
| 3.6 | 0.6 | 2 | 0 | 0 | 8 | 0 | 0 | 0 | 2 | 0 | 8 | 0 | 48% | 0.0% | 13.8% |
| 3.6 | 0.8 | 8 | 0 | 0 | 4 | 0 | 0 | 0 | 2 | 0 | 8 | 0 | 48% | 0.0% | 29.4% |
| 3.6 | 0.8 | 4 | 0 | 0 | 4 | 0 | 0 | 0 | 2 | 0 | 8 | 0 | 49% | 0.0% | 19.7% |
| 3.8 | 1 | 8 | 0 | 0 | 10 | 0 | 0 | 0 | 2 | 0 | 8 | 0 | 49% | 0.0% | 33.3% |
| 3.8 | 1 | 10 | 0 | 0 | 6 | 0 | 0 | 0 | 2 | 0 | 8 | 0 | 50% | 0.0% | 35.7% |
| 3.8 | 0.6 | 10 | 0 | 0 | 10 | 0 | 0 | 0 | 2 | 0 | 8 | 0 | 50% | 0.0% | 32.3% |
| 3.8 | 0.6 | 10 | 0 | 0 | 8 | 0 | 0 | 0 | 2 | 0 | 8 | 0 | 50% | 0.0% | 31.8% |
| 3.8 | 0.6 | 12 | 0 | 0 | 6 | 0 | 0 | 0 | 2 | 0 | 8 | 0 | 50% | 2.9% | 30.7% |
| 3.8 | 0.6 | 8 | 0 | 0 | 8 | 0 | 0 | 0 | 2 | 0 | 8 | 0 | 50% | 0.0% | 28.0% |
| 3.8 | 0.8 | 2 | 0 | 0 | 8 | 0 | 0 | 0 | 2 | 0 | 8 | 0 | 51% | 0.0% | 20.5% |
| 3.8 | 0.6 | 8 | 0 | 0 | 6 | 0 | 0 | 0 | 2 | 0 | 8 | 0 | 51% | 0.0% | 27.4% |
| 3.8 | 0.6 | 6 | 0 | 0 | 8 | 0 | 0 | 0 | 2 | 0 | 8 | 0 | 51% | 0.0% | 28.4% |
| 3.8 | 0.6 | 2 | 0 | 0 | 6 | 0 | 0 | 0 | 2 | 0 | 8 | 0 | 51% | 0.0% | 19.0% |
| 3.8 | 0.6 | 4 | 0 | 0 | 4 | 0 | 0 | 0 | 2 | 0 | 8 | 0 | 52% | 0.0% | 21.3% |
| 4 | 1 | 4 | 0 | 0 | 8 | 0 | 0 | 0 | 2 | 0 | 8 | 0 | 52% | 0.0% | 25.6% |
| 4 | 0.8 | 10 | 0 | 0 | 8 | 0 | 0 | 0 | 2 | 0 | 8 | 0 | 52% | 0.0% | 34.8% |
| 4 | 0.8 | 12 | 0 | 0 | 6 | 0 | 0 | 0 | 2 | 0 | 8 | 0 | 52% | 3.0% | 33.5% |
| 4 | 0.6 | 8 | 0 | 0 | 10 | 0 | 0 | 0 | 2 | 0 | 8 | 0 | 52% | 0.0% | 31.2% |
| 4 | 0.6 | 10 | 0 | 0 | 6 | 0 | 0 | 0 | 2 | 0 | 8 | 0 | 53% | 0.0% | 33.6% |
| 4 | 1 | 6 | 0 | 0 | 6 | 0 | 0 | 0 | 2 | 0 | 8 | 0 | 53% | 0.0% | 30.9% |
| 4 | 0.6 | 6 | 0 | 0 | 10 | 0 | 0 | 0 | 2 | 0 | 8 | 0 | 53% | 0.0% | 31.5% |
| 4 | 1 | 8 | 0 | 0 | 4 | 0 | 0 | 0 | 2 | 0 | 8 | 0 | 53% | 0.0% | 34.2% |
| 4 | 0.6 | 2 | 0 | 0 | 8 | 0 | 0 | 0 | 2 | 0 | 8 | 0 | 53% | 0.0% | 22.1% |
| 4 | 0.8 | 6 | 0 | 0 | 4 | 0 | 0 | 0 | 2 | 0 | 8 | 0 | 54% | 0.0% | 30.5% |
| 4.2 | 1 | 10 | 0 | 0 | 10 | 0 | 0 | 0 | 2 | 0 | 8 | 0 | 54% | 4.8% | 35.8% |
| 4.2 | 1 | 4 | 0 | 0 | 4 | 0 | 0 | 0 | 2 | 0 | 8 | 0 | 54% | 0.0% | 32.5% |
| 4.2 | 0.8 | 12 | 0 | 0 | 8 | 0 | 0 | 0 | 2 | 0 | 8 | 0 | 54% | 0.0% | 40.4% |
| 4.2 | 1 | 6 | 0 | 0 | 10 | 0 | 0 | 0 | 2 | 0 | 8 | 0 | 55% | 0.0% | 34.4% |
| 4.2 | 0.6 | 10 | 0 | 0 | 8 | 0 | 0 | 0 | 2 | 0 | 8 | 0 | 55% | 0.0% | 36.9% |
| 4.2 | 1 | 6 | 0 | 0 | 4 | 0 | 0 | 0 | 2 | 0 | 8 | 0 | 55% | 0.0% | 33.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.2 | 0.6 | 10 | 0 | 0 | 6 | 0 | 0 | 0 | 2 | 0 | 8 | 0 | 55% | 0.0% | 36.1% |
| 4.2 | 0.8 | 10 | 0 | 0 | 4 | 0 | 0 | 0 | 2 | 0 | 8 | 0 | 56% | 0.0% | 39.5% |
| 4.4 | 1 | 4 | 0 | 0 | 8 | 0 | 0 | 0 | 2 | 0 | 8 | 0 | 56% | 0.0% | 35.6% |
| 4.2 | 0.6 | 4 | 0 | 0 | 8 | 0 | 0 | 0 | 2 | 0 | 8 | 0 | 56% | 0.0% | 27.1% |
| 4.2 | 0.8 | 4 | 0 | 0 | 4 | 0 | 0 | 0 | 2 | 0 | 8 | 0 | 56% | 0.0% | 32.4% |
| 4.2 | 0.6 | 2 | 0 | 0 | 6 | 0 | 0 | 0 | 2 | 0 | 8 | 0 | 56% | 0.0% | 23.9% |
| 4.2 | 0.6 | 2 | 0 | 0 | 4 | 0 | 0 | 0 | 2 | 0 | 8 | 0 | 56% | 0.0% | 23.8% |
| 4.4 | 1 | 10 | 0 | 0 | 8 | 0 | 0 | 0 | 2 | 0 | 8 | 0 | 57% | 0.0% | 43.6% |
| 4.4 | 0.6 | 12 | 0 | 0 | 10 | 0 | 0 | 0 | 2 | 0 | 8 | 0 | 57% | 2.7% | 40.1% |
| 4.4 | 1 | 10 | 0 | 0 | 6 | 0 | 0 | 0 | 2 | 0 | 8 | 0 | 57% | 0.0% | 43.3% |
| 4.6 | 1 | 4 | 0 | 0 | 10 | 0 | 0 | 0 | 2 | 0 | 8 | 0 | 58% | 0.0% | 38.7% |
| 4.4 | 0.8 | 8 | 0 | 0 | 8 | 0 | 0 | 0 | 2 | 0 | 8 | 0 | 58% | 0.0% | 40.6% |
| 4.4 | 0.8 | 6 | 0 | 0 | 8 | 0 | 0 | 0 | 2 | 0 | 8 | 0 | 58% | 0.0% | 36.3% |
| 4.4 | 0.8 | 10 | 0 | 0 | 4 | 0 | 0 | 0 | 2 | 0 | 8 | 0 | 58% | 0.0% | 42.0% |
| 4.4 | 0.6 | 6 | 0 | 0 | 8 | 0 | 0 | 0 | 2 | 0 | 8 | 0 | 58% | 0.0% | 35.7% |
| 4.4 | 0.8 | 8 | 0 | 0 | 4 | 0 | 0 | 0 | 2 | 0 | 8 | 0 | 58% | 0.0% | 39.2% |
| 4.6 | 1 | 10 | 0 | 0 | 10 | 0 | 0 | 0 | 2 | 0 | 8 | 0 | 59% | 0.0% | 46.4% |
| 4.4 | 0.6 | 8 | 0 | 0 | 4 | 0 | 0 | 0 | 2 | 0 | 8 | 0 | 59% | 0.0% | 38.6% |
| 4.4 | 0.8 | 2 | 0 | 0 | 4 | 0 | 0 | 0 | 2 | 0 | 8 | 0 | 59% | 0.0% | 27.7% |
| 4.6 | 0.6 | 12 | 0 | 0 | 8 | 0 | 0 | 0 | 2 | 0 | 8 | 0 | 59% | 0.0% | 45.4% |
| 4.6 | 0.6 | 10 | 0 | 0 | 10 | 0 | 0 | 0 | 2 | 0 | 8 | 0 | 60% | 0.0% | 42.7% |
| 4.6 | 0.8 | 8 | 0 | 0 | 10 | 0 | 0 | 0 | 2 | 0 | 8 | 0 | 60% | 0.0% | 43.6% |
| 4.6 | 0.8 | 6 | 0 | 0 | 10 | 0 | 0 | 0 | 2 | 0 | 8 | 0 | 60% | 0.0% | 39.5% |
| 4.6 | 0.8 | 4 | 0 | 0 | 8 | 0 | 0 | 0 | 2 | 0 | 8 | 0 | 60% | 0.0% | 38.3% |
| 4.6 | 0.8 | 6 | 0 | 0 | 6 | 0 | 0 | 0 | 2 | 0 | 8 | 0 | 60% | 0.0% | 38.5% |
| 4.6 | 0.6 | 6 | 0 | 0 | 8 | 0 | 0 | 0 | 2 | 0 | 8 | 0 | 61% | 0.0% | 38.3% |
| 4.6 | 0.8 | 6 | 0 | 0 | 4 | 0 | 0 | 0 | 2 | 0 | 8 | 0 | 61% | 0.0% | 37.9% |
| 4.6 | 0.6 | 6 | 0 | 0 | 6 | 0 | 0 | 0 | 2 | 0 | 8 | 0 | 61% | 0.0% | 37.8% |
| 4.8 | 1 | 12 | 0 | 0 | 6 | 0 | 0 | 0 | 2 | 0 | 8 | 0 | 61% | 1.1% | 49.2% |
| 4.8 | 1 | 8 | 0 | 0 | 10 | 0 | 0 | 0 | 2 | 0 | 8 | 0 | 61% | 0.0% | 46.0% |
| 4.8 | 0.6 | 12 | 0 | 0 | 10 | 0 | 0 | 0 | 2 | 0 | 8 | 0 | 62% | 0.0% | 48.5% |
| 4.8 | 1 | 8 | 0 | 0 | 4 | 0 | 0 | 0 | 2 | 0 | 8 | 0 | 62% | 0.0% | 48.0% |
| 4.8 | 0.8 | 10 | 0 | 0 | 8 | 0 | 0 | 0 | 2 | 0 | 8 | 0 | 62% | 0.0% | 49.0% |
| 4.8 | 0.6 | 10 | 0 | 0 | 8 | 0 | 0 | 0 | 2 | 0 | 8 | 0 | 62% | 0.0% | 48.8% |
| 4.8 | 0.8 | 8 | 0 | 0 | 8 | 0 | 0 | 0 | 2 | 0 | 8 | 0 | 63% | 0.0% | 45.8% |
| 4.8 | 0.6 | 2 | 0 | 0 | 10 | 0 | 0 | 0 | 2 | 0 | 8 | 0 | 63% | 0.0% | 33.2% |
| 5 | 1 | 6 | 0 | 0 | 4 | 0 | 0 | 0 | 2 | 0 | 8 | 0 | 63% | 0.0% | 47.9% |
| 4.4 | 1 | 2 | 0 | 0 | 8 | 0 | 0 | 0 | 2 | 0 | 8 | 0 | 63% | 0.0% | 28.2% |
| 4.8 | 0.6 | 8 | 0 | 0 | 6 | 0 | 0 | 0 | 2 | 0 | 8 | 0 | 63% | 0.0% | 45.0% |
| 5 | 1 | 8 | 0 | 0 | 10 | 0 | 0 | 0 | 2 | 0 | 8 | 0 | 63% | 0.0% | 48.6% |
| 4.8 | 0.6 | 6 | 0 | 0 | 4 | 0 | 0 | 0 | 2 | 0 | 8 | 0 | 63% | 0.0% | 39.8% |
| 5 | 1 | 10 | 0 | 0 | 6 | 0 | 0 | 0 | 2 | 0 | 8 | 0 | 64% | 0.0% | 50.9% |
| 5 | 0.8 | 10 | 0 | 0 | 10 | 0 | 0 | 0 | 2 | 0 | 8 | 0 | 64% | 0.0% | 52.0% |
| 5.2 | 1 | 6 | 0 | 0 | 8 | 0 | 0 | 0 | 2 | 0 | 8 | 0 | 64% | 0.0% | 51.0% |
| 5 | 0.6 | 12 | 0 | 0 | 6 | 0 | 0 | 0 | 2 | 0 | 8 | 0 | 65% | 0.3% | 52.7% |
| 5.2 | 1 | 6 | 0 | 0 | 4 | 0 | 0 | 0 | 2 | 0 | 8 | 0 | 65% | 0.0% | 50.6% |
| 5.2 | 1 | 12 | 0 | 0 | 8 | 0 | 0 | 0 | 2 | 0 | 8 | 0 | 65% | 0.0% | 56.3% |
| 5 | 0.8 | 6 | 0 | 0 | 6 | 0 | 0 | 0 | 2 | 0 | 8 | 0 | 65% | 0.0% | 48.3% |
| 5.4 | 1 | 4 | 0 | 0 | 8 | 0 | 0 | 0 | 2 | 0 | 8 | 0 | 65% | 0.0% | 53.7% |
| 5 | 0.8 | 8 | 0 | 0 | 4 | 0 | 0 | 0 | 2 | 0 | 8 | 0 | 65% | 0.0% | 46.8% |
| 5 | 0.6 | 8 | 0 | 0 | 6 | 0 | 0 | 0 | 2 | 0 | 8 | 0 | 65% | 0.0% | 47.7% |
| 5 | 0.8 | 4 | 0 | 0 | 4 | 0 | 0 | 0 | 2 | 0 | 8 | 0 | 66% | 0.0% | 44.0% |
| 5.2 | 1 | 12 | 0 | 0 | 4 | 0 | 0 | 0 | 2 | 0 | 8 | 0 | 66% | 2.7% | 51.3% |
| 5.2 | 0.6 | 12 | 0 | 0 | 10 | 0 | 0 | 0 | 2 | 0 | 8 | 0 | 66% | 0.0% | 53.8% |
| 5.2 | 0.8 | 12 | 0 | 0 | 6 | 0 | 0 | 0 | 2 | 0 | 8 | 0 | 67% | 0.0% | 55.8% |
| 5.2 | 0.8 | 6 | 0 | 0 | 10 | 0 | 0 | 0 | 2 | 0 | 8 | 0 | 67% | 0.0% | 51.6% |
| 5 | 0.8 | 2 | 0 | 0 | 6 | 0 | 0 | 0 | 2 | 0 | 8 | 0 | 67% | 0.0% | 37.0% |
| 5.2 | 0.6 | 6 | 0 | 0 | 10 | 0 | 0 | 0 | 2 | 0 | 8 | 0 | 67% | 0.0% | 46.9% |
| 5.2 | 0.6 | 6 | 0 | 0 | 8 | 0 | 0 | 0 | 2 | 0 | 8 | 0 | 67% | 0.0% | 46.4% |
| 5.2 | 0.6 | 2 | 0 | 0 | 8 | 0 | 0 | 0 | 2 | 0 | 8 | 0 | 68% | 0.0% | 39.3% |
| 5.2 | 0.6 | 8 | 0 | 0 | 4 | 0 | 0 | 0 | 2 | 0 | 8 | 0 | 68% | 0.0% | 49.0% |
| 5.2 | 0.8 | 4 | 0 | 0 | 6 | 0 | 0 | 0 | 2 | 0 | 8 | 0 | 68% | 0.0% | 46.9% |
| 5.4 | 0.8 | 12 | 0 | 0 | 8 | 0 | 0 | 0 | 2 | 0 | 8 | 0 | 69% | 0.0% | 59.4% |
| 5.4 | 0.8 | 6 | 0 | 0 | 10 | 0 | 0 | 0 | 2 | 0 | 8 | 0 | 69% | 0.0% | 54.4% |
| 5.4 | 0.8 | 8 | 0 | 0 | 8 | 0 | 0 | 0 | 2 | 0 | 8 | 0 | 69% | 0.0% | 54.0% |
| 5.4 | 0.8 | 8 | 0 | 0 | 6 | 0 | 0 | 0 | 2 | 0 | 8 | 0 | 69% | 0.0% | 53.8% |
| 5.4 | 0.6 | 4 | 0 | 0 | 10 | 0 | 0 | 0 | 2 | 0 | 8 | 0 | 70% | 0.0% | 49.7% |
| 5.4 | 0.6 | 12 | 0 | 0 | 4 | 0 | 0 | 0 | 2 | 0 | 8 | 0 | 70% | 1.8% | 54.9% |
| 5.4 | 0.6 | 6 | 0 | 0 | 6 | 0 | 0 | 0 | 2 | 0 | 8 | 0 | 70% | 0.0% | 49.0% |
| 5.4 | 0.6 | 6 | 0 | 0 | 4 | 0 | 0 | 0 | 2 | 0 | 8 | 0 | 70% | 0.0% | 53.2% |
| 5 | 1 | 2 | 0 | 0 | 10 | 0 | 0 | 0 | 2 | 0 | 8 | 0 | 71% | 0.0% | 43.0% |
| 5.4 | 0.8 | 2 | 0 | 0 | 6 | 0 | 0 | 0 | 2 | 0 | 8 | 0 | 73% | 0.0% | 50.3% |
| 5.4 | 1 | 4 | 0 | 0 | 4 | 0 | 0 | 0 | 2 | 0 | 8 | 0 | 75% | 0.0% | 54.1% |
| 2.1 | 0.19 | 23.4 | 0 | 0 | 12.2 | 0 | 0 | 0 | 1.6 | 0 | 8 | 0 | 32% | 0.0% | 17.5% |
| 2.9 | 0.19 | 23.4 | 0 | 0 | 12.2 | 0 | 0 | 0 | 1.6 | 0 | 8 | 0 | 41% | 0.0% | 28.9% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.1 | 0.69 | 11.4 | 0 | 0 | 7.2 | 0 | 0 | 0 | 1.6 | 0 | 8 | 0 | 54% | 0.0% | 38.0% |
| 4.5 | 0.94 | 11.4 | 0 | 0 | 7.2 | 0 | 0 | 0 | 1.6 | 0 | 8 | 0 | 57% | 0.0% | 46.4% |
| 4.5 | 0.69 | 7.4 | 0 | 0 | 12.2 | 0 | 0 | 0 | 1.6 | 0 | 8 | 0 | 59% | 0.0% | 41.8% |
| 2.9 | 0.69 | 23.4 | 0 | 0 | 12.2 | 0 | 0 | 0 | 0.1 | 0 | 8 | 0 | 39% | 2.5% | 30.2% |
| 2.9 | 0.19 | 19.4 | 0 | 0 | 9.7 | 0 | 0 | 0 | 0.1 | 0 | 8 | 0 | 40% | 0.5% | 27.3% |
| 4.5 | 0.69 | 7.4 | 0 | 0 | 12.2 | 0 | 0 | 0 | 0.1 | 0 | 8 | 0 | 56% | 0.0% | 42.7% |
| 2.2 | 1.2 | 0 | 0 | 0 | 8 | 0 | 0 | 0 | 0 | 4 | 8 | 0 | 31% | 0.0% | 10.2% |
| 2.4 | 1.6 | 8 | 0 | 0 | 12 | 0 | 0 | 0 | 0 | 10 | 8 | 0 | 31% | 0.0% | 17.1% |
| 2.2 | 0 | 8 | 0 | 0 | 6 | 0 | 0 | 0 | 0 | 0 | 8 | 0 | 31% | 0.0% | 10.1% |
| 2.4 | 1.4 | 4 | 0 | 0 | 12 | 0 | 0 | 0 | 0 | 6 | 8 | 0 | 31% | 0.0% | 15.6% |
| 2.4 | 2.2 | 8 | 0 | 0 | 8 | 0 | 0 | 0 | 0 | 6 | 8 | 0 | 31% | 2.8% | 13.2% |
| 2.4 | 1.8 | 8 | 0 | 0 | 10 | 0 | 0 | 0 | 0 | 8 | 8 | 0 | 31% | 0.0% | 15.0% |
| 2.4 | 1.6 | 4 | 0 | 0 | 10 | 0 | 0 | 0 | 0 | 4 | 8 | 0 | 31% | 0.0% | 14.9% |
| 2.4 | 1.8 | 4 | 0 | 0 | 8 | 0 | 0 | 0 | 0 | 8 | 8 | 0 | 31% | 0.0% | 12.2% |
| 2.4 | 1.2 | 4 | 0 | 0 | 12 | 0 | 0 | 0 | 0 | 8 | 8 | 0 | 31% | 0.0% | 15.6% |
| 2.2 | 0.2 | 12 | 0 | 0 | 4 | 0 | 0 | 0 | 0 | 0 | 8 | 0 | 31% | 0.0% | 11.8% |
| 2.4 | 0.8 | 4 | 0 | 0 | 14 | 0 | 0 | 0 | 0 | 0 | 8 | 0 | 31% | 0.0% | 17.7% |
| 2.4 | 2 | 8 | 0 | 0 | 8 | 0 | 0 | 0 | 0 | 6 | 8 | 0 | 31% | 0.0% | 12.5% |
| 2.4 | 1.6 | 0 | 0 | 0 | 8 | 0 | 0 | 0 | 0 | 8 | 8 | 0 | 31% | 0.0% | 11.9% |
| 2.2 | 0.1 | 12 | 0 | 0 | 4 | 0 | 0 | 0 | 0 | 0 | 8 | 0 | 31% | 0.0% | 12.2% |
| 2.4 | 1.4 | 4 | 0 | 0 | 10 | 0 | 0 | 0 | 0 | 4 | 8 | 0 | 31% | 0.0% | 13.4% |
| 2.4 | 1.2 | 8 | 0 | 0 | 12 | 0 | 0 | 0 | 0 | 10 | 8 | 0 | 31% | 0.0% | 17.0% |
| 2.4 | 2 | 0 | 0 | 0 | 10 | 0 | 0 | 0 | 0 | 8 | 8 | 0 | 31% | 0.0% | 14.2% |
| 2.6 | 0.6 | 4 | 0 | 0 | 8 | 0 | 0 | 0 | 0 | 10 | 8 | 0 | 31% | 0.0% | 11.2% |
| 2.4 | 1.4 | 8 | 0 | 0 | 10 | 0 | 0 | 0 | 0 | 10 | 8 | 0 | 31% | 0.0% | 14.8% |
| 2.4 | 1.6 | 12 | 0 | 0 | 10 | 0 | 0 | 0 | 0 | 10 | 8 | 0 | 31% | 0.0% | 14.9% |
| 2.6 | 1.8 | 4 | 0 | 0 | 10 | 0 | 0 | 0 | 0 | 4 | 8 | 0 | 31% | 0.0% | 15.3% |
| 2.4 | 1 | 4 | 0 | 0 | 10 | 0 | 0 | 0 | 0 | 8 | 8 | 0 | 31% | 0.0% | 13.3% |
| 2.4 | 1.8 | 12 | 0 | 0 | 8 | 0 | 0 | 0 | 0 | 8 | 8 | 0 | 31% | 3.7% | 11.8% |
| 2.4 | 1.4 | 12 | 0 | 0 | 10 | 0 | 0 | 0 | 0 | 4 | 8 | 0 | 31% | 4.2% | 14.0% |
| 2.4 | 0.8 | 4 | 0 | 0 | 10 | 0 | 0 | 0 | 0 | 0 | 8 | 0 | 31% | 0.0% | 13.1% |
| 2.4 | 1.4 | 12 | 0 | 0 | 10 | 0 | 0 | 0 | 0 | 10 | 8 | 0 | 31% | 0.0% | 14.8% |
| 2.4 | 1.4 | 12 | 0 | 0 | 10 | 0 | 0 | 0 | 0 | 6 | 8 | 0 | 31% | 2.8% | 14.3% |
| 2.4 | 1 | 8 | 0 | 0 | 12 | 0 | 0 | 0 | 0 | 4 | 8 | 0 | 31% | 0.0% | 16.2% |
| 2.4 | 1.2 | 8 | 0 | 0 | 10 | 0 | 0 | 0 | 0 | 8 | 8 | 0 | 31% | 0.0% | 15.0% |
| 2.4 | 0.8 | 8 | 0 | 0 | 12 | 0 | 0 | 0 | 0 | 10 | 8 | 0 | 31% | 0.0% | 15.0% |
| 2.4 | 0.6 | 8 | 0 | 0 | 14 | 0 | 0 | 0 | 0 | 0 | 8 | 0 | 31% | 0.0% | 18.0% |
| 2.4 | 0.8 | 0 | 0 | 0 | 10 | 0 | 0 | 0 | 0 | 4 | 8 | 0 | 31% | 0.0% | 12.1% |
| 2.4 | 1.4 | 0 | 0 | 0 | 8 | 0 | 0 | 0 | 0 | 6 | 8 | 0 | 31% | 0.0% | 10.5% |
| 2.4 | 0.6 | 4 | 0 | 0 | 12 | 0 | 0 | 0 | 0 | 6 | 8 | 0 | 31% | 0.0% | 14.3% |
| 2.4 | 1.4 | 12 | 0 | 0 | 8 | 0 | 0 | 0 | 0 | 10 | 8 | 0 | 31% | 2.5% | 11.8% |
| 2.4 | 1 | 12 | 0 | 0 | 12 | 0 | 0 | 0 | 0 | 10 | 8 | 0 | 31% | 0.0% | 16.6% |
| 2.4 | 1.2 | 12 | 0 | 0 | 10 | 0 | 0 | 0 | 0 | 6 | 8 | 0 | 32% | 2.8% | 14.4% |
| 2.4 | 1 | 4 | 0 | 0 | 8 | 0 | 0 | 0 | 0 | 6 | 8 | 0 | 32% | 0.0% | 11.1% |
| 2.4 | 1.2 | 8 | 0 | 0 | 8 | 0 | 0 | 0 | 0 | 8 | 8 | 0 | 32% | 0.0% | 12.5% |
| 2.4 | 0.8 | 12 | 0 | 0 | 12 | 0 | 0 | 0 | 0 | 8 | 8 | 0 | 32% | 0.0% | 15.1% |
| 2.4 | 1.6 | 12 | 0 | 0 | 5 | 0 | 0 | 1 | 0 | 0 | 8 | 2.5 | 32% | 4.5% | 17.1% |
| 2.4 | 1.2 | 12 | 0 | 0 | 8 | 0 | 0 | 0 | 0 | 10 | 8 | 0 | 32% | 2.3% | 11.7% |
| 2.4 | 0.8 | 8 | 0 | 0 | 10 | 0 | 0 | 0 | 0 | 8 | 8 | 0 | 32% | 0.0% | 13.2% |
| 2.4 | 0.5 | 12 | 0 | 0 | 14 | 0 | 0 | 0 | 0 | 0 | 8 | 0 | 32% | 0.0% | 18.3% |
| 2.4 | 0.2 | 4 | 0 | 0 | 14 | 0 | 0 | 0 | 0 | 0 | 8 | 0 | 32% | 0.0% | 17.5% |
| 2.2 | 0.6 | 0 | 0 | 0 | 12 | 0 | 0 | 0 | 0 | 0 | 8 | 0 | 32% | 0.0% | 13.1% |
| 2.4 | 0.3 | 0 | 0 | 0 | 12 | 0 | 0 | 0 | 0 | 0 | 8 | 0 | 32% | 0.0% | 14.8% |
| 2.4 | 0.4 | 12 | 0 | 0 | 14 | 0 | 0 | 0 | 0 | 0 | 8 | 0 | 32% | 0.0% | 18.7% |
| 2.4 | 0.8 | 12 | 0 | 0 | 10 | 0 | 0 | 0 | 0 | 10 | 8 | 0 | 32% | 0.0% | 12.5% |
| 2.4 | 0.6 | 12 | 0 | 0 | 12 | 0 | 0 | 0 | 0 | 6 | 8 | 0 | 32% | 0.0% | 15.6% |
| 2.2 | 0.4 | 0 | 0 | 0 | 10 | 0 | 0 | 0 | 0 | 0 | 8 | 0 | 32% | 0.0% | 11.2% |
| 2.6 | 2.2 | 8 | 0 | 0 | 10 | 0 | 0 | 0 | 0 | 4 | 8 | 0 | 32% | 2.6% | 16.3% |
| 2.4 | 0.6 | 12 | 0 | 0 | 12 | 0 | 0 | 0 | 0 | 4 | 8 | 0 | 32% | 0.0% | 14.2% |
| 2.4 | 0.6 | 8 | 0 | 0 | 10 | 0 | 0 | 0 | 0 | 6 | 8 | 0 | 32% | 0.0% | 11.7% |
| 2.4 | 1.4 | 4 | 0 | 0 | 6 | 0 | 0 | 0 | 0 | 4 | 8 | 0 | 32% | 0.0% | 10.0% |
| 2.4 | 1.4 | 8 | 0 | 0 | 4 | 0 | 0 | 0 | 0 | 4 | 8 | 0 | 32% | 0.8% | 12.4% |
| 2.4 | 1 | 12 | 0 | 0 | 8 | 0 | 0 | 0 | 0 | 6 | 8 | 0 | 32% | 1.3% | 12.4% |
| 2.4 | 1.2 | 12 | 0 | 0 | 5 | 0 | 0 | 1 | 0 | 0 | 8 | 2.5 | 32% | 1.0% | 19.3% |
| 2.4 | 1 | 8 | 0 | 0 | 6 | 0 | 0 | 0 | 0 | 4 | 8 | 0 | 32% | 0.0% | 10.9% |
| 2.4 | 0 | 0 | 0 | 0 | 12 | 0 | 0 | 0 | 0 | 0 | 8 | 0 | 32% | 0.0% | 13.5% |
| 2.4 | 0.6 | 12 | 0 | 0 | 10 | 0 | 0 | 0 | 0 | 0 | 8 | 0 | 32% | 0.0% | 18.0% |
| 2.6 | 1.4 | 4 | 0 | 0 | 8 | 0 | 0 | 0 | 0 | 10 | 8 | 0 | 32% | 0.0% | 12.8% |
| 2.4 | 0.6 | 4 | 0 | 0 | 8 | 0 | 0 | 0 | 0 | 0 | 8 | 0 | 32% | 0.0% | 10.9% |
| 2.4 | 0.4 | 8 | 0 | 0 | 10 | 0 | 0 | 0 | 0 | 0 | 8 | 0 | 32% | 0.0% | 14.3% |
| 2.6 | 1 | 0 | 0 | 0 | 10 | 0 | 0 | 0 | 0 | 6 | 8 | 0 | 32% | 0.0% | 14.0% |
| 2.4 | 1 | 12 | 0 | 0 | 5 | 0 | 0 | 1 | 0 | 0 | 8 | 2.5 | 32% | 0.9% | 20.0% |
| 2.6 | 0.6 | 0 | 0 | 0 | 12 | 0 | 0 | 0 | 0 | 4 | 8 | 0 | 32% | 0.0% | 15.6% |
| 2.4 | 0.6 | 12 | 0 | 0 | 8 | 0 | 0 | 0 | 0 | 8 | 8 | 0 | 32% | 0.0% | 11.9% |
| 2.6 | 1.4 | 4 | 0 | 0 | 6 | 0 | 0 | 0 | 0 | 10 | 8 | 0 | 32% | 0.0% | 10.1% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 2.4 | 0.4 | 4 | 0 | 0 | 8 | 0 | 0 | 0 | 0 | 0 | 8 | 0 | 32% | 0.0% | 11.4% |
| 2.6 | 0.6 | 4 | 0 | 0 | 10 | 0 | 0 | 0 | 0 | 8 | 8 | 0 | 32% | 0.0% | 14.2% |
| 2.4 | 0.2 | 8 | 0 | 0 | 10 | 0 | 0 | 0 | 0 | 0 | 8 | 0 | 32% | 0.0% | 12.4% |
| 2.6 | 2 | 0 | 0 | 0 | 10 | 0 | 0 | 0 | 0 | 10 | 8 | 0 | 33% | 0.0% | 14.8% |
| 2.4 | 1 | 12 | 0 | 0 | 4 | 0 | 0 | 0 | 0 | 4 | 8 | 0 | 33% | 2.1% | 13.1% |
| 2.4 | 0.8 | 8 | 0 | 0 | 4 | 0 | 0 | 0 | 0 | 0 | 8 | 0 | 33% | 0.0% | 12.5% |
| 2.6 | 1.8 | 4 | 0 | 0 | 12 | 0 | 0 | 0 | 0 | 10 | 8 | 0 | 33% | 0.0% | 17.8% |
| 2.6 | 2 | 8 | 0 | 0 | 12 | 0 | 0 | 0 | 0 | 10 | 8 | 0 | 33% | 0.0% | 18.1% |
| 2.6 | 1 | 4 | 0 | 0 | 8 | 0 | 0 | 0 | 0 | 8 | 8 | 0 | 33% | 0.0% | 13.0% |
| 2.4 | 0 | 12 | 0 | 0 | 12 | 0 | 0 | 0 | 0 | 0 | 8 | 0 | 33% | 0.0% | 18.0% |
| 2.6 | 2.2 | 8 | 0 | 0 | 10 | 0 | 0 | 0 | 0 | 10 | 8 | 0 | 33% | 0.0% | 15.7% |
| 2.4 | 0.2 | 8 | 0 | 0 | 8 | 0 | 0 | 0 | 0 | 0 | 8 | 0 | 33% | 0.0% | 11.9% |
| 2 | 2 | 0 | 0 | 0 | 8 | 0 | 0 | 0 | 0 | 6 | 8 | 0 | 33% | 0.0% | 10.4% |
| 2.4 | 0.5 | 12 | 0 | 0 | 6 | 0 | 0 | 0 | 0 | 0 | 8 | 0 | 33% | 0.0% | 18.0% |
| 2.4 | 0.8 | 15 | 0 | 0 | 5 | 0 | 0 | 1 | 0 | 0 | 8 | 5 | 33% | 3.8% | 17.8% |
| 2.4 | 0.6 | 8 | 0 | 0 | 4 | 0 | 0 | 0 | 0 | 0 | 8 | 0 | 33% | 0.0% | 13.3% |
| 2.6 | 1.8 | 8 | 0 | 0 | 12 | 0 | 0 | 0 | 0 | 10 | 8 | 0 | 33% | 0.0% | 18.1% |
| 2.4 | 0.3 | 8 | 0 | 0 | 6 | 0 | 0 | 0 | 0 | 0 | 8 | 0 | 33% | 0.0% | 14.6% |
| 2.6 | 2.2 | 8 | 0 | 0 | 8 | 0 | 0 | 0 | 0 | 10 | 8 | 0 | 33% | 0.8% | 13.0% |
| 2.6 | 1.6 | 4 | 0 | 0 | 12 | 0 | 0 | 0 | 0 | 4 | 8 | 0 | 33% | 0.0% | 18.0% |
| 2.4 | 0.5 | 8 | 0 | 0 | 4 | 0 | 0 | 0 | 0 | 0 | 8 | 0 | 33% | 0.0% | 13.6% |
| 2.6 | 1.6 | 0 | 0 | 0 | 10 | 0 | 0 | 0 | 0 | 8 | 8 | 0 | 33% | 0.0% | 14.9% |
| 2.6 | 1.8 | 12 | 0 | 0 | 12 | 0 | 0 | 0 | 0 | 8 | 8 | 0 | 33% | 1.0% | 18.0% |
| 2.4 | 0.5 | 12 | 0 | 0 | 4 | 0 | 0 | 0 | 0 | 0 | 8 | 0 | 33% | 2.0% | 15.0% |
| 2.4 | 0 | 0 | 0 | 0 | 8 | 0 | 0 | 0 | 0 | 0 | 8 | 0 | 33% | 0.0% | 10.2% |
| 3.2 | 2.2 | 4 | 0 | 0 | 4 | 0 | 0 | 0 | 0 | 4 | 8 | 0 | 33% | 0.0% | 21.0% |
| 2.6 | 0.6 | 4 | 0 | 0 | 8 | 0 | 0 | 0 | 0 | 6 | 8 | 0 | 33% | 0.0% | 12.0% |
| 2.4 | 0.4 | 12 | 0 | 0 | 4 | 0 | 0 | 0 | 0 | 0 | 8 | 0 | 33% | 1.8% | 15.5% |
| 2.4 | 0.3 | 8 | 0 | 0 | 4 | 0 | 0 | 0 | 0 | 0 | 8 | 0 | 33% | 0.0% | 14.4% |
| 2.6 | 2 | 8 | 0 | 0 | 8 | 0 | 0 | 0 | 0 | 8 | 8 | 0 | 33% | 0.4% | 13.1% |
| 2.6 | 1.8 | 12 | 0 | 0 | 10 | 0 | 0 | 0 | 0 | 6 | 8 | 0 | 33% | 4.7% | 14.8% |
| 2.6 | 1.2 | 4 | 0 | 0 | 12 | 0 | 0 | 0 | 0 | 8 | 8 | 0 | 33% | 0.0% | 16.5% |
| 2.6 | 2 | 4 | 0 | 0 | 8 | 0 | 0 | 0 | 0 | 8 | 8 | 0 | 33% | 0.0% | 12.7% |
| 2.4 | 0 | 12 | 0 | 0 | 6 | 0 | 0 | 0 | 0 | 0 | 8 | 0 | 33% | 0.0% | 16.7% |
| 2.6 | 1.4 | 8 | 0 | 0 | 12 | 0 | 0 | 0 | 0 | 6 | 8 | 0 | 33% | 0.0% | 18.4% |
| 2.6 | 1.2 | 4 | 0 | 0 | 8 | 0 | 0 | 0 | 0 | 8 | 8 | 0 | 33% | 0.0% | 13.0% |
| 2.6 | 1.4 | 12 | 0 | 0 | 12 | 0 | 0 | 0 | 0 | 10 | 8 | 0 | 34% | 0.0% | 18.0% |
| 2.6 | 1.4 | 12 | 0 | 0 | 12 | 0 | 0 | 0 | 0 | 6 | 8 | 0 | 34% | 2.5% | 17.6% |
| 2.6 | 1.4 | 4 | 0 | 0 | 10 | 0 | 0 | 0 | 0 | 4 | 8 | 0 | 34% | 0.0% | 15.7% |
| 2.6 | 1.2 | 0 | 0 | 0 | 10 | 0 | 0 | 0 | 0 | 6 | 8 | 0 | 34% | 0.0% | 13.8% |
| 2.6 | 1.4 | 8 | 0 | 0 | 10 | 0 | 0 | 0 | 0 | 8 | 8 | 0 | 34% | 0.0% | 15.8% |
| 3 | 2.4 | 4 | 0 | 0 | 4 | 0 | 0 | 0 | 0 | 6 | 8 | 0 | 34% | 0.0% | 13.9% |
| 3 | 2.4 | 4 | 0 | 0 | 6 | 0 | 0 | 0 | 0 | 6 | 8 | 0 | 34% | 0.0% | 14.4% |
| 2.4 | 0 | 12 | 0 | 0 | 4 | 0 | 0 | 0 | 0 | 0 | 8 | 0 | 34% | 0.0% | 15.3% |
| 2.6 | 1.8 | 8 | 0 | 0 | 6 | 0 | 0 | 0 | 0 | 8 | 8 | 0 | 34% | 2.6% | 10.1% |
| 2.6 | 1.4 | 12 | 0 | 0 | 10 | 0 | 0 | 0 | 0 | 10 | 8 | 0 | 34% | 2.2% | 15.2% |
| 2.6 | 1.6 | 12 | 0 | 0 | 8 | 0 | 0 | 0 | 0 | 10 | 8 | 0 | 34% | 4.6% | 12.3% |
| 2.6 | 1.6 | 8 | 0 | 0 | 6 | 0 | 0 | 0 | 0 | 10 | 8 | 0 | 34% | 1.5% | 10.2% |
| 2.6 | 1.4 | 12 | 0 | 0 | 10 | 0 | 0 | 0 | 0 | 8 | 8 | 0 | 34% | 3.6% | 15.0% |
| 2.6 | 1.6 | 8 | 0 | 0 | 6 | 0 | 0 | 0 | 0 | 8 | 8 | 0 | 34% | 2.8% | 10.1% |
| 2.6 | 0.8 | 4 | 0 | 0 | 10 | 0 | 0 | 0 | 0 | 6 | 8 | 0 | 34% | 0.0% | 14.5% |
| 2.6 | 1.2 | 8 | 0 | 0 | 10 | 0 | 0 | 0 | 0 | 4 | 8 | 0 | 34% | 0.0% | 14.6% |
| 2.6 | 1.8 | 4 | 0 | 0 | 6 | 0 | 0 | 0 | 0 | 10 | 8 | 0 | 34% | 0.0% | 10.1% |
| 2.6 | 1 | 12 | 0 | 0 | 12 | 0 | 0 | 0 | 0 | 4 | 8 | 0 | 34% | 2.0% | 16.5% |
| 2.6 | 1.4 | 8 | 0 | 0 | 6 | 0 | 0 | 0 | 0 | 10 | 8 | 0 | 34% | 1.6% | 10.1% |
| 2.6 | 1.2 | 8 | 0 | 0 | 8 | 0 | 0 | 0 | 0 | 8 | 8 | 0 | 34% | 1.1% | 13.1% |
| 2.6 | 0.8 | 8 | 0 | 0 | 12 | 0 | 0 | 0 | 0 | 6 | 8 | 0 | 34% | 0.0% | 17.0% |
| 2.6 | 1 | 0 | 0 | 0 | 10 | 0 | 0 | 0 | 0 | 4 | 8 | 0 | 34% | 0.0% | 14.2% |
| 2.6 | 1.4 | 4 | 0 | 0 | 8 | 0 | 0 | 0 | 0 | 4 | 8 | 0 | 34% | 0.0% | 13.1% |
| 2.6 | 0.8 | 8 | 0 | 0 | 10 | 0 | 0 | 0 | 0 | 10 | 8 | 0 | 34% | 0.0% | 13.8% |
| 2.6 | 0.6 | 4 | 0 | 0 | 12 | 0 | 0 | 0 | 0 | 0 | 8 | 0 | 34% | 0.0% | 16.9% |
| 2.6 | 1.2 | 8 | 0 | 0 | 6 | 0 | 0 | 0 | 0 | 10 | 8 | 0 | 34% | 1.6% | 10.1% |
| 2.6 | 0.8 | 12 | 0 | 0 | 12 | 0 | 0 | 0 | 0 | 6 | 8 | 0 | 34% | 0.2% | 16.7% |
| 2.6 | 0.8 | 12 | 0 | 0 | 12 | 0 | 0 | 0 | 0 | 10 | 8 | 0 | 34% | 0.0% | 15.9% |
| 2.6 | 0.5 | 4 | 0 | 0 | 12 | 0 | 0 | 0 | 0 | 0 | 8 | 0 | 34% | 0.0% | 17.2% |
| 2.6 | 0.6 | 8 | 0 | 0 | 12 | 0 | 0 | 0 | 0 | 4 | 8 | 0 | 34% | 0.0% | 15.7% |
| 2.6 | 0.1 | 0 | 0 | 0 | 14 | 0 | 0 | 0 | 0 | 0 | 8 | 0 | 34% | 0.0% | 16.6% |
| 2.6 | 0.2 | 4 | 0 | 0 | 14 | 0 | 0 | 0 | 0 | 0 | 8 | 0 | 34% | 0.0% | 18.6% |
| 2.6 | 0.6 | 4 | 0 | 0 | 10 | 0 | 0 | 0 | 0 | 0 | 8 | 0 | 35% | 0.0% | 14.3% |
| 2.6 | 1.4 | 8 | 0 | 0 | 4 | 0 | 0 | 0 | 0 | 4 | 8 | 0 | 35% | 0.4% | 15.3% |
| 2.6 | 0.6 | 12 | 0 | 0 | 12 | 0 | 0 | 0 | 0 | 10 | 8 | 0 | 35% | 0.0% | 15.7% |
| 2.6 | 1 | 0 | 0 | 0 | 8 | 0 | 0 | 0 | 0 | 4 | 8 | 0 | 35% | 0.0% | 11.5% |
| 2.6 | 0.8 | 8 | 0 | 0 | 8 | 0 | 0 | 0 | 0 | 4 | 8 | 0 | 35% | 1.7% | 12.1% |
| 2.6 | 0.4 | 8 | 0 | 0 | 12 | 0 | 0 | 0 | 0 | 0 | 8 | 0 | 35% | 0.0% | 17.5% |
| 2.6 | 1 | 8 | 0 | 0 | 6 | 0 | 0 | 0 | 0 | 4 | 8 | 0 | 35% | 0.0% | 13.4% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 2.6 | 1.4 | 12 | 0 | 0 | 5 | 0 | 0 | 1 | 0 | 0 | 8 | 5 | 35% | 2.4% | 21.8% |
| 3 | 0.8 | 4 | 0 | 0 | 6 | 0 | 0 | 0 | 0 | 10 | 8 | 0 | 35% | 0.0% | 10.9% |
| 2.6 | 0.3 | 8 | 0 | 0 | 12 | 0 | 0 | 0 | 0 | 0 | 8 | 0 | 35% | 0.0% | 17.8% |
| 2.4 | 0.4 | 0 | 0 | 0 | 12 | 0 | 0 | 0 | 0 | 0 | 8 | 0 | 35% | 0.0% | 14.5% |
| 2.2 | 0.6 | 0 | 0 | 0 | 10 | 0 | 0 | 0 | 0 | 0 | 8 | 0 | 35% | 0.0% | 10.6% |
| 2.6 | 0.6 | 8 | 0 | 0 | 8 | 0 | 0 | 0 | 0 | 4 | 8 | 0 | 35% | 1.6% | 12.3% |
| 2.6 | 0 | 8 | 0 | 0 | 14 | 0 | 0 | 0 | 0 | 0 | 8 | 0 | 35% | 0.0% | 19.1% |
| 2 | 2.2 | 0 | 0 | 0 | 8 | 0 | 0 | 0 | 0 | 6 | 8 | 0 | 35% | 0.0% | 10.3% |
| 2.6 | 0.8 | 12 | 0 | 0 | 6 | 0 | 0 | 0 | 0 | 8 | 8 | 0 | 35% | 1.6% | 12.8% |
| 2.6 | 0.2 | 12 | 0 | 0 | 12 | 0 | 0 | 0 | 0 | 0 | 8 | 0 | 35% | 0.0% | 19.9% |
| 2.6 | 0.4 | 12 | 0 | 0 | 10 | 0 | 0 | 0 | 0 | 0 | 8 | 0 | 35% | 0.0% | 21.5% |
| 2.6 | 1 | 12 | 0 | 0 | 4 | 0 | 0 | 0 | 0 | 4 | 8 | 0 | 35% | 3.4% | 14.4% |
| 2.6 | 0.1 | 4 | 0 | 0 | 10 | 0 | 0 | 0 | 0 | 0 | 8 | 0 | 35% | 0.0% | 13.6% |
| 2.6 | 0.3 | 12 | 0 | 0 | 10 | 0 | 0 | 0 | 0 | 0 | 8 | 0 | 35% | 0.0% | 19.4% |
| 2.6 | 0.6 | 12 | 0 | 0 | 6 | 0 | 0 | 0 | 0 | 8 | 8 | 0 | 35% | 0.4% | 13.9% |
| 2.6 | 0.5 | 4 | 0 | 0 | 8 | 0 | 0 | 0 | 0 | 0 | 8 | 0 | 35% | 0.0% | 11.8% |
| 2.6 | 0.8 | 12 | 0 | 0 | 4 | 0 | 0 | 0 | 0 | 6 | 8 | 0 | 35% | 2.2% | 13.8% |
| 2.6 | 0.6 | 12 | 0 | 0 | 6 | 0 | 0 | 0 | 0 | 0 | 8 | 0 | 35% | 0.0% | 20.3% |
| 2.6 | 0.1 | 12 | 0 | 0 | 10 | 0 | 0 | 0 | 0 | 0 | 8 | 0 | 35% | 0.0% | 20.2% |
| 2.6 | 0.6 | 12 | 0 | 0 | 4 | 0 | 0 | 0 | 0 | 8 | 8 | 0 | 35% | 0.9% | 13.0% |
| 2.6 | 0.3 | 4 | 0 | 0 | 8 | 0 | 0 | 0 | 0 | 0 | 8 | 0 | 35% | 0.0% | 12.2% |
| 2.6 | 0 | 0 | 0 | 0 | 10 | 0 | 0 | 0 | 0 | 0 | 8 | 0 | 36% | 0.0% | 13.5% |
| 2.6 | 0.6 | 12 | 0 | 0 | 4 | 0 | 0 | 0 | 0 | 4 | 8 | 0 | 36% | 3.2% | 14.9% |
| 2.6 | 0.3 | 8 | 0 | 0 | 6 | 0 | 0 | 0 | 0 | 0 | 8 | 0 | 36% | 0.0% | 17.2% |
| 2.6 | 0.1 | 4 | 0 | 0 | 8 | 0 | 0 | 0 | 0 | 0 | 8 | 0 | 36% | 0.0% | 10.8% |
| 2.6 | 0.4 | 8 | 0 | 0 | 4 | 0 | 0 | 0 | 0 | 0 | 8 | 0 | 36% | 0.0% | 16.4% |
| 2.6 | 0.1 | 0 | 0 | 0 | 8 | 0 | 0 | 0 | 0 | 0 | 8 | 0 | 36% | 0.0% | 10.3% |
| 2.6 | 0.1 | 12 | 0 | 0 | 6 | 0 | 0 | 0 | 0 | 0 | 8 | 0 | 36% | 0.0% | 19.0% |
| 3 | 2.2 | 4 | 0 | 0 | 4 | 0 | 0 | 0 | 0 | 6 | 8 | 0 | 36% | 0.0% | 14.0% |
| 2.6 | 0.2 | 12 | 0 | 0 | 4 | 0 | 0 | 0 | 0 | 0 | 8 | 0 | 36% | 0.7% | 16.6% |
| 2.6 | 0 | 8 | 0 | 0 | 4 | 0 | 0 | 0 | 0 | 0 | 8 | 0 | 36% | 0.0% | 14.3% |
| 2.8 | 0.6 | 4 | 0 | 0 | 14 | 0 | 0 | 0 | 0 | 0 | 8 | 0 | 37% | 0.0% | 20.2% |
| 2.8 | 0.6 | 8 | 0 | 0 | 14 | 0 | 0 | 0 | 0 | 0 | 8 | 0 | 37% | 0.0% | 20.3% |
| 2.8 | 0.4 | 4 | 0 | 0 | 14 | 0 | 0 | 0 | 0 | 0 | 8 | 0 | 37% | 0.0% | 18.9% |
| 2.2 | 0.8 | 0 | 0 | 0 | 10 | 0 | 0 | 0 | 0 | 0 | 8 | 0 | 37% | 0.0% | 12.2% |
| 2.8 | 0.4 | 8 | 0 | 0 | 14 | 0 | 0 | 0 | 0 | 0 | 8 | 0 | 37% | 0.0% | 20.9% |
| 2.8 | 0.2 | 0 | 0 | 0 | 14 | 0 | 0 | 0 | 0 | 0 | 8 | 0 | 37% | 0.0% | 19.1% |
| 2.8 | 0.4 | 12 | 0 | 0 | 14 | 0 | 0 | 0 | 0 | 0 | 8 | 0 | 37% | 0.0% | 24.4% |
| 2.8 | 0.6 | 8 | 0 | 0 | 10 | 0 | 0 | 0 | 0 | 0 | 8 | 0 | 37% | 0.0% | 19.0% |
| 3.4 | 2 | 4 | 0 | 0 | 4 | 0 | 0 | 0 | 0 | 4 | 8 | 0 | 37% | 0.0% | 23.7% |
| 2.2 | 2 | 0 | 0 | 0 | 8 | 0 | 0 | 0 | 0 | 6 | 8 | 0 | 37% | 0.0% | 11.1% |
| 2.8 | 0 | 0 | 0 | 0 | 14 | 0 | 0 | 0 | 0 | 0 | 8 | 0 | 37% | 0.0% | 17.6% |
| 2.8 | 0.3 | 8 | 0 | 0 | 12 | 0 | 0 | 0 | 0 | 0 | 8 | 0 | 37% | 0.0% | 20.4% |
| 2.8 | 1.2 | 12 | 0 | 0 | 5 | 0 | 0 | 1 | 0 | 0 | 8 | 5 | 38% | 3.2% | 24.3% |
| 2.8 | 0.1 | 12 | 0 | 0 | 14 | 0 | 0 | 0 | 0 | 0 | 8 | 0 | 38% | 0.0% | 23.4% |
| 2.8 | 0 | 8 | 0 | 0 | 14 | 0 | 0 | 0 | 0 | 0 | 8 | 0 | 38% | 0.0% | 20.2% |
| 2.8 | 0.2 | 12 | 0 | 0 | 12 | 0 | 0 | 0 | 0 | 0 | 8 | 0 | 38% | 0.0% | 22.7% |
| 2.8 | 0.3 | 8 | 0 | 0 | 10 | 0 | 0 | 0 | 0 | 0 | 8 | 0 | 38% | 0.0% | 20.1% |
| 2.8 | 0.3 | 12 | 0 | 0 | 10 | 0 | 0 | 0 | 0 | 0 | 8 | 0 | 38% | 0.0% | 24.7% |
| 3.2 | 2.2 | 4 | 0 | 0 | 8 | 0 | 0 | 0 | 0 | 6 | 8 | 0 | 38% | 0.0% | 17.6% |
| 2.8 | 0.6 | 12 | 0 | 0 | 6 | 0 | 0 | 0 | 0 | 0 | 8 | 0 | 38% | 0.0% | 23.0% |
| 2.8 | 0.2 | 12 | 0 | 0 | 10 | 0 | 0 | 0 | 0 | 0 | 8 | 0 | 38% | 0.0% | 22.6% |
| 2.8 | 0.1 | 8 | 0 | 0 | 10 | 0 | 0 | 0 | 0 | 0 | 8 | 0 | 38% | 0.0% | 17.9% |
| 2.8 | 0.3 | 12 | 0 | 0 | 8 | 0 | 0 | 0 | 0 | 0 | 8 | 0 | 38% | 0.0% | 24.7% |
| 2.8 | 0.3 | 0 | 0 | 0 | 10 | 0 | 0 | 0 | 0 | 0 | 8 | 0 | 38% | 0.0% | 13.1% |
| 2.8 | 0.5 | 4 | 0 | 0 | 8 | 0 | 0 | 0 | 0 | 0 | 8 | 0 | 38% | 0.0% | 12.3% |
| 3 | 1.6 | 4 | 0 | 0 | 6 | 0 | 0 | 0 | 0 | 10 | 8 | 0 | 38% | 0.7% | 12.0% |
| 3 | 2.4 | 4 | 0 | 0 | 8 | 0 | 0 | 0 | 0 | 8 | 8 | 0 | 38% | 0.0% | 15.9% |
| 2.8 | 0.1 | 8 | 0 | 0 | 8 | 0 | 0 | 0 | 0 | 0 | 8 | 0 | 38% | 0.0% | 17.6% |
| 3 | 1.8 | 8 | 0 | 0 | 8 | 0 | 0 | 0 | 0 | 10 | 8 | 0 | 38% | 3.9% | 13.6% |
| 2.8 | 0 | 0 | 0 | 0 | 10 | 0 | 0 | 0 | 0 | 0 | 8 | 0 | 38% | 0.0% | 13.9% |
| 2.6 | 0.4 | 0 | 0 | 0 | 10 | 0 | 0 | 0 | 0 | 0 | 8 | 0 | 38% | 0.0% | 12.4% |
| 2.8 | 0.6 | 4 | 0 | 0 | 6 | 0 | 0 | 0 | 0 | 0 | 8 | 0 | 38% | 0.0% | 10.3% |
| 3 | 1.6 | 4 | 0 | 0 | 4 | 0 | 0 | 0 | 0 | 4 | 8 | 0 | 38% | 0.0% | 15.7% |
| 3 | 2.4 | 4 | 0 | 0 | 6 | 0 | 0 | 0 | 0 | 10 | 8 | 0 | 39% | 0.0% | 15.4% |
| 2.8 | 0.3 | 12 | 0 | 0 | 4 | 0 | 0 | 0 | 0 | 0 | 8 | 0 | 39% | 4.0% | 19.1% |
| 3 | 1.6 | 8 | 0 | 0 | 8 | 0 | 0 | 0 | 0 | 8 | 8 | 0 | 39% | 4.4% | 13.6% |
| 2.6 | 0.4 | 0 | 0 | 0 | 8 | 0 | 0 | 0 | 0 | 0 | 8 | 0 | 39% | 0.0% | 11.5% |
| 3 | 2.2 | 4 | 0 | 0 | 6 | 0 | 0 | 0 | 0 | 10 | 8 | 0 | 39% | 0.0% | 15.0% |
| 2.8 | 0 | 0 | 0 | 0 | 8 | 0 | 0 | 0 | 0 | 0 | 8 | 0 | 39% | 0.0% | 10.9% |
| 3 | 1.4 | 8 | 0 | 0 | 8 | 0 | 0 | 0 | 0 | 8 | 8 | 0 | 39% | 4.6% | 13.6% |
| 2.4 | 1.8 | 0 | 0 | 0 | 8 | 0 | 0 | 0 | 0 | 6 | 8 | 0 | 39% | 0.0% | 11.7% |
| 3 | 1.8 | 4 | 0 | 0 | 8 | 0 | 0 | 0 | 0 | 6 | 8 | 0 | 39% | 0.0% | 15.0% |
| 2.4 | 0.8 | 0 | 0 | 0 | 12 | 0 | 0 | 0 | 0 | 0 | 8 | 0 | 39% | 0.0% | 15.4% |
| 2.8 | 0.1 | 4 | 0 | 0 | 6 | 0 | 0 | 0 | 0 | 0 | 8 | 0 | 39% | 0.0% | 12.1% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3 | 0.8 | 8 | 0 | 0 | 10 | 0 | 0 | 0 | 0 | 0 | 8 | 0 | 39% | 0.0% | 20.8% |
| 2.8 | 0 | 4 | 0 | 0 | 6 | 0 | 0 | 0 | 0 | 0 | 8 | 0 | 39% | 0.0% | 12.4% |
| 3 | 1.4 | 4 | 0 | 0 | 6 | 0 | 0 | 0 | 0 | 8 | 8 | 0 | 39% | 0.2% | 12.6% |
| 3 | 0.5 | 4 | 0 | 0 | 14 | 0 | 0 | 0 | 0 | 0 | 8 | 0 | 39% | 0.0% | 21.3% |
| 3 | 1.4 | 8 | 0 | 0 | 4 | 0 | 0 | 0 | 0 | 6 | 8 | 0 | 39% | 2.2% | 16.2% |
| 3.2 | 1.2 | 4 | 0 | 0 | 4 | 0 | 0 | 0 | 0 | 10 | 8 | 0 | 40% | 0.0% | 12.3% |
| 3 | 0.5 | 8 | 0 | 0 | 14 | 0 | 0 | 0 | 0 | 0 | 8 | 0 | 40% | 0.0% | 22.6% |
| 3 | 1.4 | 4 | 0 | 0 | 4 | 0 | 0 | 0 | 0 | 8 | 8 | 0 | 40% | 0.0% | 12.2% |
| 3 | 0.3 | 4 | 0 | 0 | 14 | 0 | 0 | 0 | 0 | 0 | 8 | 0 | 40% | 0.0% | 20.0% |
| 3 | 0.4 | 8 | 0 | 0 | 14 | 0 | 0 | 0 | 0 | 0 | 8 | 0 | 40% | 0.0% | 23.0% |
| 3.4 | 1.8 | 4 | 0 | 0 | 6 | 0 | 0 | 0 | 0 | 4 | 8 | 0 | 40% | 0.0% | 19.9% |
| 3 | 1.2 | 8 | 0 | 0 | 4 | 0 | 0 | 0 | 0 | 4 | 8 | 0 | 40% | 0.0% | 20.9% |
| 3.4 | 1 | 10 | 0 | 0 | 5 | 14 | 0 | 0 | 0 | 10 | 8 | 0 | 40% | 0.0% | 10.2% |
| 3 | 1 | 8 | 0 | 0 | 4 | 0 | 0 | 0 | 0 | 6 | 8 | 0 | 40% | 3.0% | 15.7% |
| 3 | 0.8 | 8 | 0 | 0 | 6 | 0 | 0 | 0 | 0 | 6 | 8 | 0 | 40% | 0.0% | 16.3% |
| 3 | 0.3 | 12 | 0 | 0 | 14 | 0 | 0 | 0 | 0 | 0 | 8 | 0 | 40% | 0.0% | 27.7% |
| 3.2 | 0.8 | 4 | 0 | 0 | 12 | 0 | 0 | 0 | 0 | 0 | 8 | 0 | 40% | 0.0% | 20.0% |
| 3 | 1.2 | 4 | 0 | 0 | 6 | 0 | 0 | 0 | 0 | 6 | 8 | 0 | 40% | 0.0% | 11.4% |
| 3.2 | 0.8 | 4 | 0 | 0 | 4 | 0 | 0 | 0 | 0 | 8 | 8 | 0 | 40% | 0.0% | 10.9% |
| 3 | 0.1 | 8 | 0 | 0 | 14 | 0 | 0 | 0 | 0 | 0 | 8 | 0 | 40% | 0.0% | 21.4% |
| 3.2 | 1.6 | 4 | 0 | 0 | 6 | 0 | 0 | 0 | 0 | 10 | 8 | 0 | 40% | 0.0% | 15.1% |
| 3 | 0.2 | 4 | 0 | 0 | 12 | 0 | 0 | 0 | 0 | 0 | 8 | 0 | 40% | 0.0% | 19.3% |
| 3 | 0.1 | 12 | 0 | 0 | 14 | 0 | 0 | 0 | 0 | 0 | 8 | 0 | 40% | 0.0% | 26.3% |
| 3 | 0.4 | 12 | 0 | 0 | 10 | 0 | 0 | 0 | 0 | 0 | 8 | 0 | 40% | 0.0% | 27.2% |
| 3.2 | 2.4 | 4 | 0 | 0 | 4 | 0 | 0 | 0 | 0 | 8 | 8 | 0 | 40% | 0.0% | 17.0% |
| 3 | 0.1 | 4 | 0 | 0 | 12 | 0 | 0 | 0 | 0 | 0 | 8 | 0 | 40% | 0.0% | 17.8% |
| 3.2 | 2 | 4 | 0 | 0 | 4 | 0 | 0 | 0 | 0 | 6 | 8 | 0 | 40% | 0.0% | 16.3% |
| 3 | 0.6 | 12 | 0 | 0 | 6 | 0 | 0 | 0 | 0 | 0 | 8 | 0 | 40% | 0.5% | 25.2% |
| 3 | 0.4 | 12 | 0 | 0 | 8 | 0 | 0 | 0 | 0 | 0 | 8 | 0 | 41% | 0.0% | 27.1% |
| 3.2 | 1.6 | 4 | 0 | 0 | 4 | 0 | 0 | 0 | 0 | 10 | 8 | 0 | 41% | 0.0% | 14.4% |
| 3 | 0.3 | 8 | 0 | 0 | 8 | 0 | 0 | 0 | 0 | 0 | 8 | 0 | 41% | 0.0% | 22.6% |
| 3 | 1.2 | 4 | 0 | 0 | 4 | 0 | 0 | 0 | 0 | 4 | 8 | 0 | 41% | 0.0% | 13.0% |
| 3 | 0 | 0 | 0 | 0 | 12 | 0 | 0 | 0 | 0 | 0 | 8 | 0 | 41% | 0.0% | 17.3% |
| 3 | 0.2 | 8 | 0 | 0 | 8 | 0 | 0 | 0 | 0 | 0 | 8 | 0 | 41% | 0.0% | 22.9% |
| 3.2 | 1.2 | 4 | 0 | 0 | 8 | 0 | 0 | 0 | 0 | 8 | 8 | 0 | 41% | 0.7% | 15.4% |
| 3.2 | 1.4 | 8 | 0 | 0 | 8 | 0 | 0 | 0 | 0 | 10 | 8 | 0 | 41% | 4.9% | 13.9% |
| 3 | 0.3 | 0 | 0 | 0 | 12 | 0 | 0 | 0 | 0 | 0 | 8 | 0 | 41% | 0.0% | 18.2% |
| 3 | 0.2 | 8 | 0 | 0 | 6 | 0 | 0 | 0 | 0 | 0 | 8 | 0 | 41% | 0.0% | 22.8% |
| 3.4 | 1 | 4 | 0 | 0 | 4 | 0 | 0 | 0 | 0 | 10 | 8 | 0 | 41% | 0.0% | 14.1% |
| 3.4 | 1.2 | 4 | 0 | 0 | 4 | 0 | 0 | 0 | 0 | 10 | 8 | 0 | 41% | 0.0% | 14.5% |
| 3 | 0.3 | 12 | 0 | 0 | 4 | 0 | 0 | 0 | 0 | 0 | 8 | 0 | 41% | 4.9% | 20.8% |
| 3.6 | 0.8 | 8 | 0 | 0 | 5 | 10 | 0 | 0 | 0 | 10 | 8 | 0 | 41% | 0.0% | 10.8% |
| 3 | 0.5 | 4 | 0 | 0 | 6 | 0 | 0 | 0 | 0 | 0 | 8 | 0 | 41% | 0.0% | 13.1% |
| 3 | 0 | 12 | 0 | 0 | 6 | 0 | 0 | 0 | 0 | 0 | 8 | 0 | 41% | 0.0% | 24.8% |
| 3 | 0.4 | 4 | 0 | 0 | 6 | 0 | 0 | 0 | 0 | 0 | 8 | 0 | 41% | 0.0% | 13.4% |
| 3.2 | 1.8 | 4 | 0 | 0 | 8 | 0 | 0 | 0 | 0 | 8 | 8 | 0 | 41% | 0.0% | 17.4% |
| 3.2 | 0.8 | 8 | 0 | 0 | 10 | 0 | 0 | 0 | 0 | 0 | 8 | 0 | 41% | 2.4% | 23.7% |
| 3 | 0 | 0 | 0 | 0 | 8 | 0 | 0 | 0 | 0 | 0 | 8 | 0 | 42% | 0.0% | 12.9% |
| 2.6 | 0.6 | 0 | 0 | 0 | 12 | 0 | 0 | 0 | 0 | 0 | 8 | 0 | 42% | 0.0% | 16.5% |
| 3 | 0.2 | 4 | 0 | 0 | 6 | 0 | 0 | 0 | 0 | 0 | 8 | 0 | 42% | 0.0% | 14.1% |
| 2.4 | 2 | 0 | 0 | 0 | 8 | 0 | 0 | 0 | 0 | 6 | 8 | 0 | 42% | 0.0% | 11.6% |
| 3 | 0.4 | 4 | 0 | 0 | 4 | 0 | 0 | 0 | 0 | 0 | 8 | 0 | 42% | 0.0% | 13.3% |
| 3.2 | 0.6 | 4 | 0 | 0 | 14 | 0 | 0 | 0 | 0 | 0 | 8 | 0 | 42% | 0.0% | 21.7% |
| 3.2 | 2 | 4 | 0 | 0 | 4 | 0 | 0 | 0 | 0 | 8 | 8 | 0 | 42% | 0.0% | 16.5% |
| 3.2 | 1 | 8 | 0 | 0 | 8 | 0 | 0 | 0 | 0 | 4 | 8 | 0 | 42% | 4.1% | 16.4% |
| 3.2 | 1 | 4 | 0 | 0 | 8 | 0 | 0 | 0 | 0 | 6 | 8 | 0 | 42% | 0.0% | 14.6% |
| 2.6 | 0.5 | 0 | 0 | 0 | 8 | 0 | 0 | 0 | 0 | 0 | 8 | 0 | 42% | 0.0% | 11.3% |
| 3.4 | 2 | 4 | 0 | 0 | 8 | 0 | 0 | 0 | 0 | 6 | 8 | 0 | 42% | 0.0% | 20.0% |
| 3.4 | 1 | 4 | 0 | 0 | 6 | 0 | 0 | 0 | 0 | 8 | 8 | 0 | 42% | 0.0% | 17.0% |
| 3.4 | 1.6 | 4 | 0 | 0 | 8 | 0 | 0 | 0 | 0 | 4 | 8 | 0 | 42% | 0.0% | 21.0% |
| 3.2 | 0.5 | 12 | 0 | 0 | 14 | 0 | 0 | 0 | 0 | 0 | 8 | 0 | 42% | 0.8% | 28.9% |
| 3.2 | 1.2 | 8 | 0 | 0 | 4 | 0 | 0 | 0 | 0 | 6 | 8 | 0 | 42% | 0.9% | 20.2% |
| 3.2 | 0.5 | 8 | 0 | 0 | 12 | 0 | 0 | 0 | 0 | 0 | 8 | 0 | 42% | 0.0% | 25.0% |
| 3.2 | 0.5 | 12 | 0 | 0 | 12 | 0 | 0 | 0 | 0 | 0 | 8 | 0 | 42% | 0.8% | 28.7% |
| 3.4 | 0.8 | 4 | 0 | 0 | 10 | 0 | 0 | 0 | 0 | 0 | 8 | 0 | 42% | 0.0% | 21.4% |
| 3.2 | 1.6 | 4 | 0 | 0 | 4 | 0 | 0 | 0 | 0 | 6 | 8 | 0 | 43% | 0.0% | 16.0% |
| 3.8 | 1 | 8 | 0 | 0 | 5 | 14 | 0 | 0 | 0 | 10 | 8 | 0 | 43% | 0.0% | 10.0% |
| 2.8 | 0.5 | 0 | 0 | 0 | 14 | 0 | 0 | 0 | 0 | 0 | 8 | 0 | 43% | 0.0% | 18.2% |
| 3.8 | 0.8 | 8 | 0 | 0 | 5 | 12 | 0 | 0 | 0 | 10 | 8 | 0 | 43% | 0.0% | 10.0% |
| 3.2 | 0.3 | 8 | 0 | 0 | 12 | 0 | 0 | 0 | 0 | 0 | 8 | 0 | 43% | 0.0% | 25.8% |
| 3.2 | 0.4 | 8 | 0 | 0 | 10 | 0 | 0 | 0 | 0 | 0 | 8 | 0 | 43% | 0.0% | 25.1% |
| 3.2 | 0.4 | 12 | 0 | 0 | 10 | 0 | 0 | 0 | 0 | 0 | 8 | 0 | 43% | 0.0% | 29.9% |
| 3.2 | 0.1 | 12 | 0 | 0 | 14 | 0 | 0 | 0 | 0 | 0 | 8 | 0 | 43% | 0.0% | 29.1% |
| 3.2 | 0.8 | 4 | 0 | 0 | 8 | 0 | 0 | 0 | 0 | 4 | 8 | 0 | 43% | 0.0% | 16.8% |
| 3.2 | 0.6 | 12 | 0 | 0 | 6 | 0 | 0 | 0 | 0 | 0 | 8 | 0 | 43% | 1.2% | 27.2% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.2 | 1 | 4 | 0 | 0 | 6 | 0 | 0 | 0 | 0 | 4 | 8 | 0 | 43% | 0.0% | 16.0% |
| 3.2 | 0.2 | 8 | 0 | 0 | 10 | 0 | 0 | 0 | 0 | 0 | 8 | 0 | 43% | 0.0% | 25.9% |
| 3.2 | 0.5 | 12 | 0 | 0 | 6 | 0 | 0 | 0 | 0 | 0 | 8 | 0 | 43% | 1.1% | 27.7% |
| 3.2 | 0 | 12 | 0 | 0 | 14 | 0 | 0 | 0 | 0 | 0 | 8 | 0 | 43% | 0.0% | 29.6% |
| 3.4 | 1.8 | 4 | 0 | 0 | 8 | 0 | 0 | 0 | 0 | 10 | 8 | 0 | 43% | 0.0% | 19.1% |
| 3.2 | 0.4 | 4 | 0 | 0 | 10 | 0 | 0 | 0 | 0 | 0 | 8 | 0 | 43% | 0.0% | 16.9% |
| 3.2 | 0.2 | 12 | 0 | 0 | 8 | 0 | 0 | 0 | 0 | 0 | 8 | 0 | 43% | 0.0% | 28.0% |
| 3.2 | 0.1 | 8 | 0 | 0 | 8 | 0 | 0 | 0 | 0 | 0 | 8 | 0 | 43% | 0.0% | 22.8% |
| 3.4 | 1.8 | 4 | 0 | 0 | 6 | 0 | 0 | 0 | 0 | 10 | 8 | 0 | 43% | 0.0% | 18.3% |
| 3.4 | 0.8 | 8 | 0 | 0 | 10 | 0 | 0 | 0 | 0 | 0 | 8 | 0 | 44% | 0.0% | 29.0% |
| 3.4 | 2 | 4 | 0 | 0 | 8 | 0 | 0 | 0 | 0 | 8 | 8 | 0 | 44% | 0.0% | 20.2% |
| 3.2 | 0.8 | 4 | 0 | 0 | 4 | 0 | 0 | 0 | 0 | 4 | 8 | 0 | 44% | 0.0% | 15.8% |
| 3.2 | 0.4 | 8 | 0 | 0 | 4 | 0 | 0 | 0 | 0 | 0 | 8 | 0 | 44% | 0.0% | 23.8% |
| 3.4 | 1.4 | 4 | 0 | 0 | 8 | 0 | 0 | 0 | 0 | 8 | 8 | 0 | 44% | 0.0% | 18.4% |
| 3.2 | 0.3 | 8 | 0 | 0 | 4 | 0 | 0 | 0 | 0 | 0 | 8 | 0 | 44% | 0.0% | 24.2% |
| 3.2 | 0.2 | 4 | 0 | 0 | 8 | 0 | 0 | 0 | 0 | 0 | 8 | 0 | 44% | 0.0% | 17.0% |
| 3.4 | 1.8 | 4 | 0 | 0 | 8 | 0 | 0 | 0 | 0 | 6 | 8 | 0 | 44% | 0.0% | 19.8% |
| 3.2 | 0 | 12 | 0 | 0 | 4 | 0 | 0 | 0 | 0 | 0 | 8 | 0 | 44% | 3.3% | 23.0% |
| 3.2 | 0.1 | 8 | 0 | 0 | 4 | 0 | 0 | 0 | 0 | 0 | 8 | 0 | 44% | 0.0% | 24.9% |
| 3.2 | 0.5 | 4 | 0 | 0 | 4 | 0 | 0 | 0 | 0 | 0 | 8 | 0 | 44% | 0.0% | 18.9% |
| 3.4 | 1 | 8 | 0 | 0 | 5 | 14 | 0 | 0 | 0 | 0 | 8 | 0 | 44% | 0.0% | 31.7% |
| 3.4 | 1.8 | 4 | 0 | 0 | 6 | 0 | 0 | 0 | 0 | 6 | 8 | 0 | 44% | 0.0% | 19.1% |
| 3.4 | 1.4 | 4 | 0 | 0 | 4 | 0 | 0 | 0 | 0 | 8 | 8 | 0 | 44% | 0.0% | 16.8% |
| 3.4 | 1.6 | 4 | 0 | 0 | 6 | 0 | 0 | 0 | 0 | 8 | 8 | 0 | 45% | 0.0% | 18.3% |
| 4 | 0.8 | 8 | 0 | 0 | 5 | 12 | 0 | 0 | 0 | 10 | 8 | 0 | 45% | 0.0% | 11.2% |
| 3.4 | 1.6 | 4 | 0 | 0 | 6 | 0 | 0 | 0 | 0 | 6 | 8 | 0 | 45% | 0.0% | 18.8% |
| 3.6 | 0.8 | 4 | 0 | 0 | 4 | 0 | 0 | 0 | 0 | 0 | 8 | 0 | 45% | 0.0% | 22.7% |
| 3.4 | 1 | 4 | 0 | 0 | 6 | 0 | 0 | 0 | 0 | 6 | 8 | 0 | 45% | 0.0% | 15.9% |
| 3.4 | 1.2 | 4 | 0 | 0 | 8 | 0 | 0 | 0 | 0 | 6 | 8 | 0 | 45% | 0.0% | 19.8% |
| 3.4 | 1.6 | 4 | 0 | 0 | 4 | 0 | 0 | 0 | 0 | 8 | 8 | 0 | 45% | 0.0% | 17.7% |
| 3.4 | 0.5 | 8 | 0 | 0 | 12 | 0 | 0 | 0 | 0 | 0 | 8 | 0 | 45% | 0.0% | 27.7% |
| 3.4 | 1.2 | 8 | 0 | 0 | 5 | 14 | 0 | 0 | 0 | 0 | 8 | 0 | 45% | 0.0% | 35.0% |
| 3.4 | 1.2 | 8 | 0 | 0 | 4 | 0 | 0 | 0 | 0 | 6 | 8 | 0 | 45% | 0.0% | 23.6% |
| 3.4 | 1 | 8 | 0 | 0 | 5 | 12 | 0 | 0 | 0 | 0 | 8 | 0 | 45% | 0.0% | 34.6% |
| 3.4 | 0.5 | 8 | 0 | 0 | 10 | 0 | 0 | 0 | 0 | 0 | 8 | 0 | 45% | 0.0% | 27.4% |
| 3.4 | 0.6 | 8 | 0 | 0 | 8 | 0 | 0 | 0 | 0 | 0 | 8 | 0 | 45% | 0.0% | 26.6% |
| 3.4 | 1.4 | 10 | 0 | 0 | 5 | 6 | 0 | 0 | 0 | 0 | 8 | 0 | 45% | 0.0% | 33.5% |
| 3.4 | 1 | 8 | 0 | 0 | 4 | 0 | 0 | 0 | 0 | 6 | 8 | 0 | 45% | 0.0% | 23.8% |
| 3.4 | 0.4 | 12 | 0 | 0 | 10 | 0 | 0 | 0 | 0 | 0 | 8 | 0 | 45% | 0.0% | 32.7% |
| 3.4 | 1 | 8 | 0 | 0 | 4 | 0 | 0 | 0 | 0 | 4 | 8 | 0 | 45% | 0.0% | 26.0% |
| 3.4 | 0.6 | 4 | 0 | 0 | 4 | 0 | 0 | 0 | 0 | 0 | 8 | 0 | 45% | 0.0% | 21.0% |
| 4 | 1 | 10 | 0 | 0 | 5 | 14 | 0 | 0 | 0 | 10 | 8 | 0 | 46% | 0.0% | 13.8% |
| 3.4 | 0.4 | 12 | 0 | 0 | 8 | 0 | 0 | 0 | 0 | 0 | 8 | 0 | 46% | 0.0% | 32.6% |
| 3.4 | 0.2 | 8 | 0 | 0 | 10 | 0 | 0 | 0 | 0 | 0 | 8 | 0 | 46% | 0.0% | 28.5% |
| 3.4 | 0.3 | 8 | 0 | 0 | 8 | 0 | 0 | 0 | 0 | 0 | 8 | 0 | 46% | 0.0% | 27.8% |
| 3.4 | 0.3 | 12 | 0 | 0 | 8 | 0 | 0 | 0 | 0 | 0 | 8 | 0 | 46% | 0.0% | 33.0% |
| 3.4 | 0.1 | 8 | 0 | 0 | 10 | 0 | 0 | 0 | 0 | 0 | 8 | 0 | 46% | 0.0% | 25.9% |
| 3.4 | 0.8 | 4 | 0 | 0 | 6 | 0 | 0 | 0 | 0 | 4 | 8 | 0 | 46% | 0.0% | 18.4% |
| 3.4 | 0.4 | 8 | 0 | 0 | 6 | 0 | 0 | 0 | 0 | 0 | 8 | 0 | 46% | 0.0% | 27.2% |
| 4 | 1 | 10 | 0 | 0 | 5 | 12 | 0 | 0 | 0 | 10 | 8 | 0 | 46% | 0.9% | 15.3% |
| 3.4 | 0.1 | 12 | 0 | 0 | 8 | 0 | 0 | 0 | 0 | 0 | 8 | 0 | 46% | 0.0% | 31.2% |
| 3.4 | 0.3 | 4 | 0 | 0 | 10 | 0 | 0 | 0 | 0 | 0 | 8 | 0 | 46% | 0.0% | 19.7% |
| 3.4 | 0 | 0 | 0 | 0 | 12 | 0 | 0 | 0 | 0 | 0 | 8 | 0 | 46% | 0.0% | 19.5% |
| 3.4 | 0.1 | 12 | 0 | 0 | 6 | 0 | 0 | 0 | 0 | 0 | 8 | 0 | 46% | 0.0% | 29.8% |
| 3.6 | 0.8 | 8 | 0 | 0 | 4 | 0 | 0 | 0 | 0 | 0 | 8 | 0 | 46% | 0.0% | 30.7% |
| 3.4 | 1 | 10 | 0 | 0 | 5 | 10 | 0 | 0 | 0 | 0 | 8 | 0 | 46% | 0.0% | 35.2% |
| 3.4 | 0.1 | 4 | 0 | 0 | 10 | 0 | 0 | 0 | 0 | 0 | 8 | 0 | 46% | 0.0% | 20.4% |
| 3.4 | 0 | 8 | 0 | 0 | 6 | 0 | 0 | 0 | 0 | 0 | 8 | 0 | 46% | 0.0% | 25.6% |
| 3.4 | 1.2 | 8 | 0 | 0 | 5 | 10 | 0 | 0 | 0 | 0 | 8 | 0 | 47% | 0.0% | 32.6% |
| 3.4 | 1.4 | 8 | 0 | 0 | 5 | 12 | 0 | 0 | 0 | 0 | 8 | 0 | 47% | 0.0% | 33.5% |
| 3.4 | 1 | 10 | 0 | 0 | 5 | 12 | 0 | 0 | 0 | 0 | 8 | 0 | 47% | 0.0% | 36.7% |
| 3.4 | 0.3 | 4 | 0 | 0 | 6 | 0 | 0 | 0 | 0 | 0 | 8 | 0 | 47% | 0.0% | 18.5% |
| 3.4 | 0.1 | 8 | 0 | 0 | 4 | 0 | 0 | 0 | 0 | 0 | 8 | 0 | 47% | 0.0% | 27.4% |
| 3.4 | 0.4 | 4 | 0 | 0 | 4 | 0 | 0 | 0 | 0 | 0 | 8 | 0 | 47% | 0.0% | 21.7% |
| 2.6 | 1.8 | 0 | 0 | 0 | 10 | 0 | 0 | 0 | 0 | 4 | 8 | 0 | 47% | 0.0% | 14.7% |
| 3.4 | 0.3 | 4 | 0 | 0 | 4 | 0 | 0 | 0 | 0 | 0 | 8 | 0 | 47% | 0.0% | 18.4% |
| 3.4 | 0 | 0 | 0 | 0 | 6 | 0 | 0 | 0 | 0 | 0 | 8 | 0 | 47% | 0.0% | 11.6% |
| 3.4 | 0.3 | 0 | 0 | 0 | 10 | 0 | 0 | 0 | 0 | 0 | 8 | 0 | 47% | 0.0% | 17.2% |
| 3.6 | 0.6 | 12 | 0 | 0 | 10 | 0 | 0 | 0 | 0 | 0 | 8 | 0 | 48% | 2.5% | 31.9% |
| 2.4 | 2 | 0 | 0 | 0 | 8 | 0 | 0 | 0 | 0 | 4 | 8 | 0 | 48% | 0.0% | 12.8% |
| 3.6 | 0.6 | 12 | 0 | 0 | 8 | 0 | 0 | 0 | 0 | 0 | 8 | 0 | 48% | 0.0% | 34.5% |
| 3 | 0.5 | 0 | 0 | 0 | 12 | 0 | 0 | 0 | 0 | 0 | 8 | 0 | 48% | 0.0% | 17.7% |
| 3.4 | 0.3 | 0 | 0 | 0 | 6 | 0 | 0 | 0 | 0 | 0 | 8 | 0 | 48% | 0.0% | 11.2% |
| 3.6 | 0.1 | 8 | 0 | 0 | 14 | 0 | 0 | 0 | 0 | 0 | 8 | 0 | 48% | 0.0% | 29.5% |
| 3.6 | 0.3 | 12 | 0 | 0 | 10 | 0 | 0 | 0 | 0 | 0 | 8 | 0 | 48% | 0.0% | 35.8% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|----|----|----|----|----|----|----|----|----|----|----|-------|-----|--------|
| 3.6 | 0.2 | 8 | 0 | 0 | 10 | 0 | 0 | 0 | 0 | 0 | 8 | 0 | 48% | 0.0% | 31.2% |
| 3.6 | 0.2 | 4 | 0 | 0 | 14 | 0 | 0 | 0 | 0 | 0 | 8 | 0 | 48% | 0.0% | 24.1% |
| 3.6 | 0.4 | 12 | 0 | 0 | 6 | 0 | 0 | 0 | 0 | 0 | 8 | 0 | 48% | 1.7% | 32.7% |
| 3.6 | 0 | 8 | 0 | 0 | 12 | 0 | 0 | 0 | 0 | 0 | 8 | 0 | 48% | 0.0% | 29.4% |
| 3.6 | 0 | 12 | 0 | 0 | 12 | 0 | 0 | 0 | 0 | 0 | 8 | 0 | 48% | 0.0% | 34.9% |
| 3.6 | 0.6 | 8 | 0 | 0 | 4 | 0 | 0 | 0 | 0 | 0 | 8 | 0 | 48% | 0.0% | 31.4% |
| 3.6 | 0.4 | 4 | 0 | 0 | 10 | 0 | 0 | 0 | 0 | 0 | 8 | 0 | 48% | 0.0% | 25.3% |
| 4 | 0.8 | 4 | 0 | 0 | 6 | 0 | 0 | 0 | 0 | 0 | 8 | 0 | 49% | 0.0% | 31.3% |
| 3.6 | 0.5 | 4 | 0 | 0 | 8 | 0 | 0 | 0 | 0 | 0 | 8 | 0 | 49% | 0.0% | 24.4% |
| 3.6 | 0.1 | 4 | 0 | 0 | 12 | 0 | 0 | 0 | 0 | 0 | 8 | 0 | 49% | 0.0% | 23.6% |
| 3.6 | 0.5 | 4 | 0 | 0 | 6 | 0 | 0 | 0 | 0 | 0 | 8 | 0 | 49% | 0.0% | 24.0% |
| 3.6 | 0 | 4 | 0 | 0 | 12 | 0 | 0 | 0 | 0 | 0 | 8 | 0 | 49% | 0.0% | 23.9% |
| 3.6 | 0.1 | 4 | 0 | 0 | 10 | 0 | 0 | 0 | 0 | 0 | 8 | 0 | 49% | 0.0% | 22.8% |
| 3.8 | 0.6 | 4 | 0 | 0 | 12 | 0 | 0 | 0 | 0 | 0 | 8 | 0 | 49% | 0.0% | 27.7% |
| 3.6 | 0 | 0 | 0 | 0 | 10 | 0 | 0 | 0 | 0 | 0 | 8 | 0 | 49% | 0.0% | 16.7% |
| 2.6 | 1.8 | 0 | 0 | 0 | 8 | 0 | 0 | 0 | 0 | 4 | 8 | 0 | 49% | 0.0% | 12.1% |
| 3.8 | 0.6 | 4 | 0 | 0 | 6 | 0 | 0 | 0 | 0 | 0 | 8 | 0 | 49% | 0.0% | 26.1% |
| 3.6 | 0.4 | 4 | 0 | 0 | 4 | 0 | 0 | 0 | 0 | 0 | 8 | 0 | 50% | 0.0% | 24.2% |
| 3.6 | 0.3 | 4 | 0 | 0 | 4 | 0 | 0 | 0 | 0 | 0 | 8 | 0 | 50% | 0.0% | 24.5% |
| 4 | 0.8 | 8 | 0 | 0 | 8 | 0 | 0 | 0 | 0 | 0 | 8 | 0 | 50% | 0.0% | 36.4% |
| 3.6 | 0 | 0 | 0 | 0 | 6 | 0 | 0 | 0 | 0 | 0 | 8 | 0 | 50% | 0.0% | 11.7% |
| 3.8 | 0.3 | 8 | 0 | 0 | 14 | 0 | 0 | 0 | 0 | 0 | 8 | 0 | 50% | 0.0% | 34.2% |
| 3.4 | 0.4 | 0 | 0 | 0 | 14 | 0 | 0 | 0 | 0 | 0 | 8 | 0 | 50% | 0.0% | 21.6% |
| 3.8 | 0.6 | 12 | 0 | 0 | 6 | 0 | 0 | 0 | 0 | 0 | 8 | 0 | 50% | 2.0% | 34.2% |
| 4.2 | 0.8 | 4 | 0 | 0 | 10 | 0 | 0 | 0 | 0 | 0 | 8 | 0 | 50% | 0.0% | 34.5% |
| 3.8 | 0.3 | 8 | 0 | 0 | 10 | 0 | 0 | 0 | 0 | 0 | 8 | 0 | 50% | 0.0% | 33.4% |
| 4.2 | 0.8 | 4 | 0 | 0 | 14 | 0 | 0 | 0 | 0 | 0 | 8 | 0 | 50% | 0.0% | 35.6% |
| 4.2 | 0.8 | 4 | 0 | 0 | 4 | 0 | 0 | 0 | 0 | 0 | 8 | 0 | 51% | 0.0% | 33.9% |
| 3.8 | 0.3 | 12 | 0 | 0 | 8 | 0 | 0 | 0 | 0 | 0 | 8 | 0 | 51% | 0.0% | 38.4% |
| 3.8 | 0 | 12 | 0 | 0 | 14 | 0 | 0 | 0 | 0 | 0 | 8 | 0 | 51% | 0.0% | 38.0% |
| 3.8 | 0.1 | 8 | 0 | 0 | 10 | 0 | 0 | 0 | 0 | 0 | 8 | 0 | 51% | 0.0% | 34.2% |
| 3.8 | 0.1 | 12 | 0 | 0 | 10 | 0 | 0 | 0 | 0 | 0 | 8 | 0 | 51% | 0.0% | 37.0% |
| 3.8 | 0.3 | 8 | 0 | 0 | 8 | 0 | 0 | 0 | 0 | 0 | 8 | 0 | 51% | 0.0% | 33.1% |
| 3.8 | 0.2 | 12 | 0 | 0 | 6 | 0 | 0 | 0 | 0 | 0 | 8 | 0 | 51% | 1.4% | 36.3% |
| 3.8 | 0.2 | 8 | 0 | 0 | 8 | 0 | 0 | 0 | 0 | 0 | 8 | 0 | 51% | 0.0% | 33.5% |
| 3.8 | 0 | 0 | 0 | 0 | 14 | 0 | 0 | 0 | 0 | 0 | 8 | 0 | 51% | 0.0% | 23.1% |
| 4.2 | 0.8 | 8 | 0 | 0 | 12 | 0 | 0 | 0 | 0 | 0 | 8 | 0 | 51% | 0.0% | 39.5% |
| 3.8 | 0.1 | 0 | 0 | 0 | 12 | 0 | 0 | 0 | 0 | 0 | 8 | 0 | 51% | 0.0% | 21.0% |
| 2.6 | 1.8 | 0 | 0 | 0 | 6 | 0 | 0 | 0 | 0 | 4 | 8 | 0 | 51% | 0.0% | 10.7% |
| 3.2 | 0.5 | 0 | 0 | 0 | 6 | 0 | 0 | 0 | 0 | 0 | 8 | 0 | 51% | 0.0% | 10.7% |
| 3.8 | 0 | 12 | 0 | 0 | 4 | 0 | 0 | 0 | 0 | 0 | 8 | 0 | 51% | 4.7% | 29.4% |
| 3.8 | 0.5 | 8 | 0 | 0 | 4 | 0 | 0 | 0 | 0 | 0 | 8 | 0 | 52% | 0.0% | 30.8% |
| 3.8 | 0.2 | 4 | 0 | 0 | 8 | 0 | 0 | 0 | 0 | 0 | 8 | 0 | 52% | 0.0% | 24.3% |
| 3.8 | 0.3 | 4 | 0 | 0 | 6 | 0 | 0 | 0 | 0 | 0 | 8 | 0 | 52% | 0.0% | 27.2% |
| 3.8 | 0.4 | 4 | 0 | 0 | 4 | 0 | 0 | 0 | 0 | 0 | 8 | 0 | 52% | 0.0% | 26.8% |
| 3.8 | 0 | 0 | 0 | 0 | 8 | 0 | 0 | 0 | 0 | 0 | 8 | 0 | 52% | 0.0% | 15.0% |
| 3.8 | 0.1 | 0 | 0 | 0 | 6 | 0 | 0 | 0 | 0 | 0 | 8 | 0 | 52% | 0.0% | 12.8% |
| 3.8 | 0.2 | 4 | 0 | 0 | 4 | 0 | 0 | 0 | 0 | 0 | 8 | 0 | 52% | 0.0% | 27.4% |
| 4 | 0.5 | 4 | 0 | 0 | 14 | 0 | 0 | 0 | 0 | 0 | 8 | 0 | 52% | 0.0% | 31.2% |
| 4.4 | 0.8 | 4 | 0 | 0 | 4 | 0 | 0 | 0 | 0 | 0 | 8 | 0 | 53% | 0.0% | 36.6% |
| 2.4 | 2.2 | 0 | 0 | 0 | 6 | 0 | 0 | 0 | 0 | 4 | 8 | 0 | 53% | 0.0% | 10.1% |
| 4 | 0.4 | 12 | 0 | 0 | 10 | 0 | 0 | 0 | 0 | 0 | 8 | 0 | 53% | 0.6% | 40.2% |
| 3.8 | 0.3 | 0 | 0 | 0 | 14 | 0 | 0 | 0 | 0 | 0 | 8 | 0 | 53% | 0.0% | 23.7% |
| 4 | 0.4 | 8 | 0 | 0 | 10 | 0 | 0 | 0 | 0 | 0 | 8 | 0 | 53% | 0.0% | 35.6% |
| 4 | 0.3 | 12 | 0 | 0 | 8 | 0 | 0 | 0 | 0 | 0 | 8 | 0 | 53% | 0.0% | 41.1% |
| 4 | 0 | 8 | 0 | 0 | 14 | 0 | 0 | 0 | 0 | 0 | 8 | 0 | 53% | 0.0% | 35.3% |
| 4 | 0.3 | 4 | 0 | 0 | 14 | 0 | 0 | 0 | 0 | 0 | 8 | 0 | 53% | 0.0% | 28.5% |
| 4.2 | 0.6 | 4 | 0 | 0 | 10 | 0 | 0 | 0 | 0 | 0 | 8 | 0 | 53% | 0.0% | 32.0% |
| 4 | 0 | 12 | 0 | 0 | 12 | 0 | 0 | 0 | 0 | 0 | 8 | 0 | 53% | 0.0% | 40.5% |
| 4 | 0.4 | 8 | 0 | 0 | 8 | 0 | 0 | 0 | 0 | 0 | 8 | 0 | 53% | 0.0% | 35.3% |
| 4 | 0.3 | 4 | 0 | 0 | 12 | 0 | 0 | 0 | 0 | 0 | 8 | 0 | 53% | 0.0% | 31.2% |
| 4.2 | 0.6 | 8 | 0 | 0 | 12 | 0 | 0 | 0 | 0 | 0 | 8 | 0 | 54% | 0.0% | 40.4% |
| 4 | 0 | 8 | 0 | 0 | 10 | 0 | 0 | 0 | 0 | 0 | 8 | 0 | 54% | 0.0% | 34.2% |
| 4 | 0 | 12 | 0 | 0 | 6 | 0 | 0 | 0 | 0 | 0 | 8 | 0 | 54% | 0.0% | 38.3% |
| 4 | 0.1 | 4 | 0 | 0 | 12 | 0 | 0 | 0 | 0 | 0 | 8 | 0 | 54% | 0.0% | 28.5% |
| 3.6 | 0.4 | 0 | 0 | 0 | 8 | 0 | 0 | 0 | 0 | 0 | 8 | 0 | 54% | 0.0% | 14.2% |
| 4.2 | 0.6 | 8 | 0 | 0 | 10 | 0 | 0 | 0 | 0 | 0 | 8 | 0 | 54% | 0.0% | 40.1% |
| 3.4 | 0.5 | 0 | 0 | 0 | 10 | 0 | 0 | 0 | 0 | 0 | 8 | 0 | 54% | 0.0% | 16.8% |
| 4 | 0.5 | 8 | 0 | 0 | 4 | 0 | 0 | 0 | 0 | 0 | 8 | 0 | 54% | 0.0% | 36.7% |
| 4 | 0 | 4 | 0 | 0 | 10 | 0 | 0 | 0 | 0 | 0 | 8 | 0 | 54% | 0.0% | 28.1% |
| 4.2 | 0.6 | 12 | 0 | 0 | 6 | 0 | 0 | 0 | 0 | 0 | 8 | 0 | 54% | 2.8% | 41.2% |
| 4 | 0.4 | 4 | 0 | 0 | 4 | 0 | 0 | 0 | 0 | 0 | 8 | 0 | 54% | 0.0% | 29.4% |
| 4 | 0 | 8 | 0 | 0 | 6 | 0 | 0 | 0 | 0 | 0 | 8 | 0 | 55% | 0.0% | 36.6% |
| 3.2 | 0.6 | 0 | 0 | 0 | 6 | 0 | 0 | 0 | 0 | 0 | 8 | 0 | 55% | 0.0% | 10.5% |
| 2.6 | 2.2 | 0 | 0 | 0 | 8 | 0 | 0 | 0 | 0 | 4 | 8 | 0 | 55% | 0.0% | 13.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4 | 0.1 | 8 | 0 | 0 | 4 | 0 | 0 | 0 | 0 | 0 | 8 | 0 | 55% | 0.0% | 34.9% |
| 4.2 | 0.3 | 8 | 0 | 0 | 14 | 0 | 0 | 0 | 0 | 0 | 8 | 0 | 55% | 0.0% | 39.5% |
| 4 | 0 | 8 | 0 | 0 | 4 | 0 | 0 | 0 | 0 | 0 | 8 | 0 | 55% | 0.0% | 35.3% |
| 4.4 | 0.8 | 8 | 0 | 0 | 4 | 0 | 0 | 0 | 0 | 0 | 8 | 0 | 55% | 0.0% | 43.5% |
| 4 | 0 | 4 | 0 | 0 | 4 | 0 | 0 | 0 | 0 | 0 | 8 | 0 | 55% | 0.0% | 27.1% |
| 4.2 | 0.1 | 8 | 0 | 0 | 14 | 0 | 0 | 0 | 0 | 0 | 8 | 0 | 55% | 0.0% | 40.3% |
| 4.2 | 0.1 | 12 | 0 | 0 | 14 | 0 | 0 | 0 | 0 | 0 | 8 | 0 | 55% | 0.0% | 43.1% |
| 4.2 | 0.3 | 12 | 0 | 0 | 6 | 0 | 0 | 0 | 0 | 0 | 8 | 0 | 56% | 1.2% | 41.4% |
| 4.2 | 0 | 12 | 0 | 0 | 14 | 0 | 0 | 0 | 0 | 0 | 8 | 0 | 56% | 0.0% | 43.5% |
| 4.2 | 0 | 12 | 0 | 0 | 12 | 0 | 0 | 0 | 0 | 0 | 8 | 0 | 56% | 0.0% | 43.2% |
| 4.4 | 0.6 | 8 | 0 | 0 | 12 | 0 | 0 | 0 | 0 | 0 | 8 | 0 | 56% | 0.0% | 43.0% |
| 4.2 | 0.4 | 8 | 0 | 0 | 8 | 0 | 0 | 0 | 0 | 0 | 8 | 0 | 56% | 0.0% | 37.9% |
| 4.2 | 0 | 12 | 0 | 0 | 6 | 0 | 0 | 0 | 0 | 0 | 8 | 0 | 56% | 0.0% | 40.9% |
| 4.2 | 0.2 | 0 | 0 | 0 | 12 | 0 | 0 | 0 | 0 | 0 | 8 | 0 | 56% | 0.0% | 22.3% |
| 4.4 | 0.6 | 8 | 0 | 0 | 10 | 0 | 0 | 0 | 0 | 0 | 8 | 0 | 56% | 0.0% | 42.7% |
| 4.2 | 0.1 | 0 | 0 | 0 | 12 | 0 | 0 | 0 | 0 | 0 | 8 | 0 | 56% | 0.0% | 21.5% |
| 4.2 | 0.3 | 4 | 0 | 0 | 8 | 0 | 0 | 0 | 0 | 0 | 8 | 0 | 57% | 0.0% | 32.7% |
| 4.2 | 0 | 0 | 0 | 0 | 12 | 0 | 0 | 0 | 0 | 0 | 8 | 0 | 57% | 0.0% | 21.6% |
| 4.2 | 0.1 | 0 | 0 | 0 | 10 | 0 | 0 | 0 | 0 | 0 | 8 | 0 | 57% | 0.0% | 19.4% |
| 4.2 | 0.3 | 4 | 0 | 0 | 6 | 0 | 0 | 0 | 0 | 0 | 8 | 0 | 57% | 0.0% | 32.4% |
| 3 | 0.8 | 0 | 0 | 0 | 8 | 0 | 0 | 0 | 0 | 0 | 8 | 0 | 57% | 0.0% | 12.9% |
| 4.2 | 0.2 | 4 | 0 | 0 | 6 | 0 | 0 | 0 | 0 | 0 | 8 | 0 | 57% | 0.0% | 32.8% |
| 4.2 | 0 | 4 | 0 | 0 | 8 | 0 | 0 | 0 | 0 | 0 | 8 | 0 | 57% | 0.0% | 30.2% |
| 4.2 | 0 | 8 | 0 | 0 | 6 | 0 | 0 | 0 | 0 | 0 | 8 | 0 | 57% | 0.0% | 39.2% |
| 4.2 | 0.2 | 8 | 0 | 0 | 4 | 0 | 0 | 0 | 0 | 0 | 8 | 0 | 57% | 0.0% | 37.1% |
| 4.4 | 0.4 | 12 | 0 | 0 | 10 | 0 | 0 | 0 | 0 | 0 | 8 | 0 | 57% | 0.0% | 46.2% |
| 3.4 | 0.6 | 0 | 0 | 0 | 6 | 0 | 0 | 0 | 0 | 0 | 8 | 0 | 58% | 0.0% | 11.9% |
| 4.2 | 0 | 0 | 0 | 0 | 4 | 0 | 0 | 0 | 0 | 0 | 8 | 0 | 58% | 0.0% | 18.9% |
| 4.4 | 0.4 | 4 | 0 | 0 | 8 | 0 | 0 | 0 | 0 | 0 | 8 | 0 | 58% | 0.0% | 35.0% |
| 3.2 | 0.8 | 0 | 0 | 0 | 10 | 0 | 0 | 0 | 0 | 0 | 8 | 0 | 59% | 0.0% | 16.0% |
| 4.2 | 0.3 | 0 | 0 | 0 | 8 | 0 | 0 | 0 | 0 | 0 | 8 | 0 | 59% | 0.0% | 16.0% |
| 4 | 0.4 | 0 | 0 | 0 | 8 | 0 | 0 | 0 | 0 | 0 | 8 | 0 | 60% | 0.0% | 15.7% |
| 3.6 | 0.6 | 0 | 0 | 0 | 14 | 0 | 0 | 0 | 0 | 0 | 8 | 0 | 60% | 0.0% | 22.8% |
| 3.6 | 0.6 | 0 | 0 | 0 | 6 | 0 | 0 | 0 | 0 | 0 | 8 | 0 | 60% | 0.0% | 12.1% |
| 4.2 | 0.4 | 0 | 0 | 0 | 10 | 0 | 0 | 0 | 0 | 0 | 8 | 0 | 62% | 0.0% | 20.4% |
| 4 | 0.5 | 0 | 0 | 0 | 10 | 0 | 0 | 0 | 0 | 0 | 8 | 0 | 63% | 0.0% | 18.6% |
| 3.8 | 0.6 | 0 | 0 | 0 | 12 | 0 | 0 | 0 | 0 | 0 | 8 | 0 | 63% | 0.0% | 21.2% |
| 3.4 | 0.8 | 0 | 0 | 0 | 6 | 0 | 0 | 0 | 0 | 0 | 8 | 0 | 64% | 0.0% | 11.7% |
| 4.4 | 0.4 | 0 | 0 | 0 | 8 | 0 | 0 | 0 | 0 | 0 | 8 | 0 | 65% | 0.0% | 25.9% |
| 4.2 | 0.5 | 0 | 0 | 0 | 8 | 0 | 0 | 0 | 0 | 0 | 8 | 0 | 66% | 0.0% | 21.0% |
| 4 | 0.6 | 0 | 0 | 0 | 4 | 0 | 0 | 0 | 0 | 0 | 8 | 0 | 66% | 0.0% | 19.0% |
| 3.8 | 0.8 | 0 | 0 | 0 | 14 | 0 | 0 | 0 | 0 | 0 | 8 | 0 | 67% | 0.0% | 23.8% |
| 4.2 | 0.6 | 0 | 0 | 0 | 8 | 0 | 0 | 0 | 0 | 0 | 8 | 0 | 69% | 0.0% | 20.6% |
| 4 | 0.8 | 0 | 0 | 0 | 14 | 0 | 0 | 0 | 0 | 0 | 8 | 0 | 71% | 0.0% | 24.1% |
| 4.4 | 0.6 | 0 | 0 | 0 | 8 | 0 | 0 | 0 | 0 | 0 | 8 | 0 | 71% | 0.0% | 25.0% |
| 4.2 | 0.8 | 0 | 0 | 0 | 14 | 0 | 0 | 0 | 0 | 0 | 8 | 0 | 74% | 0.0% | 25.3% |
| 4.4 | 0.8 | 0 | 0 | 0 | 4 | 0 | 0 | 0 | 0 | 0 | 8 | 0 | 77% | 0.0% | 26.4% |
| 2.53 | 2 | 14.1 | 0 | 0 | 6.12 | 0 | 0 | 0 | 5.79 | 0 | 7.95 | 0 | 33% | 4.5% | 15.1% |
| 2.3 | 0.7 | 12 | 0 | 0 | 7 | 0 | 0 | 0 | 2 | 0 | 7 | 0 | 31% | 0.0% | 13.9% |
| 2.3 | 0.5 | 12 | 0 | 0 | 7 | 0 | 0 | 0 | 2 | 0 | 7 | 0 | 31% | 0.0% | 13.4% |
| 2.3 | 0.5 | 12 | 0 | 0 | 5 | 0 | 0 | 0 | 2 | 0 | 7 | 0 | 31% | 0.0% | 12.1% |
| 2.4 | 0.7 | 12 | 0 | 0 | 7 | 0 | 0 | 0 | 2 | 0 | 7 | 0 | 32% | 0.0% | 15.3% |
| 2.4 | 0.5 | 12 | 0 | 0 | 7 | 0 | 0 | 0 | 2 | 0 | 7 | 0 | 33% | 0.0% | 14.8% |
| 2.4 | 0.8 | 12 | 0 | 0 | 4 | 0 | 0 | 0 | 2 | 0 | 7 | 0 | 33% | 3.6% | 10.2% |
| 2.5 | 1 | 12 | 0 | 0 | 7 | 0 | 0 | 0 | 2 | 0 | 7 | 0 | 33% | 0.0% | 16.7% |
| 2.5 | 0.7 | 12 | 0 | 0 | 7 | 0 | 0 | 0 | 2 | 0 | 7 | 0 | 34% | 0.0% | 16.6% |
| 2.5 | 0.5 | 12 | 0 | 0 | 7 | 0 | 0 | 0 | 2 | 0 | 7 | 0 | 34% | 0.0% | 16.1% |
| 2.5 | 0.8 | 12 | 0 | 0 | 4 | 0 | 0 | 0 | 2 | 0 | 7 | 0 | 34% | 4.3% | 10.8% |
| 2.6 | 1 | 12 | 0 | 0 | 7 | 0 | 0 | 0 | 2 | 0 | 7 | 0 | 35% | 0.0% | 18.0% |
| 2.6 | 0.7 | 12 | 0 | 0 | 7 | 0 | 0 | 0 | 2 | 0 | 7 | 0 | 35% | 0.0% | 18.0% |
| 2.6 | 0.5 | 12 | 0 | 0 | 7 | 0 | 0 | 0 | 2 | 0 | 7 | 0 | 35% | 0.0% | 17.4% |
| 2.6 | 0.5 | 12 | 0 | 0 | 5 | 0 | 0 | 0 | 2 | 0 | 7 | 0 | 35% | 1.9% | 14.3% |
| 2.7 | 0.8 | 12 | 0 | 0 | 7 | 0 | 0 | 0 | 2 | 0 | 7 | 0 | 36% | 0.0% | 19.4% |
| 2.7 | 0.6 | 12 | 0 | 0 | 7 | 0 | 0 | 0 | 2 | 0 | 7 | 0 | 36% | 0.0% | 19.1% |
| 2.7 | 0.5 | 12 | 0 | 0 | 6 | 0 | 0 | 0 | 2 | 0 | 7 | 0 | 37% | 0.2% | 17.8% |
| 2.8 | 1 | 12 | 0 | 0 | 6 | 0 | 0 | 0 | 2 | 0 | 7 | 0 | 37% | 2.0% | 18.0% |
| 2.8 | 0.9 | 12 | 0 | 0 | 5 | 0 | 0 | 0 | 2 | 0 | 7 | 0 | 38% | 4.1% | 15.4% |
| 2.8 | 0.7 | 12 | 0 | 0 | 5 | 0 | 0 | 0 | 2 | 0 | 7 | 0 | 38% | 3.7% | 15.7% |
| 2.9 | 1 | 12 | 0 | 0 | 6 | 0 | 0 | 0 | 2 | 0 | 7 | 0 | 39% | 2.5% | 18.9% |
| 2.9 | 0.9 | 12 | 0 | 0 | 5 | 0 | 0 | 0 | 2 | 0 | 7 | 0 | 39% | 4.7% | 16.2% |
| 2.9 | 0.7 | 12 | 0 | 0 | 5 | 0 | 0 | 0 | 2 | 0 | 7 | 0 | 39% | 4.2% | 16.5% |
| 3 | 0.9 | 12 | 0 | 0 | 7 | 0 | 0 | 0 | 2 | 0 | 7 | 0 | 40% | 0.4% | 22.9% |
| 3 | 0.7 | 12 | 0 | 0 | 6 | 0 | 0 | 0 | 2 | 0 | 7 | 0 | 40% | 2.4% | 20.2% |
| 3 | 0.6 | 12 | 0 | 0 | 5 | 0 | 0 | 0 | 2 | 0 | 7 | 0 | 40% | 4.5% | 17.3% |
| 3.1 | 0.8 | 12 | 0 | 0 | 7 | 0 | 0 | 0 | 2 | 0 | 7 | 0 | 41% | 0.7% | 24.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.1 | 0.6 | 12 | 0 | 0 | 6 | 0 | 0 | 0 | 2 | 0 | 7 | 0 | 42% | 2.6% | 21.0% |
| 3.2 | 0.9 | 12 | 0 | 0 | 6 | 0 | 0 | 0 | 2 | 0 | 7 | 0 | 42% | 3.6% | 21.8% |
| 3.2 | 0.6 | 12 | 0 | 0 | 6 | 0 | 0 | 0 | 2 | 0 | 7 | 0 | 43% | 3.1% | 21.9% |
| 2.8 | 0.75 | 10 | 0 | 0 | 9.5 | 0 | 0 | 0 | 1.5 | 0 | 7 | 0 | 37% | 0.0% | 18.4% |
| 2.8 | 0.75 | 11 | 0 | 0 | 8.5 | 0 | 0 | 0 | 1.5 | 0 | 7 | 0 | 37% | 0.0% | 19.6% |
| 2.8 | 0.75 | 12 | 0 | 0 | 7.5 | 0 | 0 | 0 | 1.5 | 0 | 7 | 0 | 37% | 0.0% | 20.7% |
| 2.8 | 0.8 | 10 | 0 | 0 | 9.5 | 0 | 0 | 0 | 1 | 0 | 7 | 0 | 37% | 0.0% | 18.2% |
| 2.8 | 0.8 | 11 | 0 | 0 | 8.5 | 0 | 0 | 0 | 1 | 0 | 7 | 0 | 37% | 0.0% | 19.4% |
| 2.8 | 0.8 | 12 | 0 | 0 | 7.5 | 0 | 0 | 0 | 1 | 0 | 7 | 0 | 37% | 0.0% | 20.5% |
| 2.8 | 0.75 | 11 | 0 | 0 | 6.5 | 0 | 0 | 0 | 1 | 0 | 7 | 0 | 38% | 0.0% | 19.2% |
| 2.8 | 0.75 | 12 | 0 | 0 | 9.5 | 0 | 0 | 0 | 0.5 | 0 | 7 | 0 | 37% | 0.4% | 20.9% |
| 2.8 | 0.8 | 10 | 0 | 0 | 7.5 | 0 | 0 | 0 | 0.5 | 0 | 7 | 0 | 37% | 0.0% | 18.9% |
| 2.8 | 0.8 | 11 | 0 | 0 | 6.5 | 0 | 0 | 0 | 0.5 | 0 | 7 | 0 | 37% | 0.0% | 20.1% |
| 2.4 | 2.2 | 12 | 0 | 0 | 8 | 0 | 0 | 0 | 6 | 0 | 6 | 0 | 31% | 3.8% | 11.2% |
| 2.4 | 1.6 | 12 | 0 | 0 | 8 | 0 | 0 | 0 | 6 | 0 | 6 | 0 | 31% | 0.0% | 15.6% |
| 2.4 | 1.6 | 12 | 0 | 0 | 6 | 0 | 0 | 0 | 6 | 0 | 6 | 0 | 31% | 2.1% | 12.8% |
| 2.4 | 1.2 | 12 | 0 | 0 | 6 | 0 | 0 | 0 | 6 | 0 | 6 | 0 | 32% | 0.6% | 12.9% |
| 2.6 | 1 | 12 | 0 | 0 | 8 | 0 | 0 | 0 | 6 | 0 | 6 | 0 | 33% | 0.0% | 15.5% |
| 2.6 | 1.6 | 12 | 0 | 0 | 6 | 0 | 0 | 0 | 6 | 0 | 6 | 0 | 34% | 3.4% | 14.2% |
| 2.6 | 1.2 | 12 | 0 | 0 | 6 | 0 | 0 | 0 | 6 | 0 | 6 | 0 | 34% | 2.0% | 14.1% |
| 2.8 | 1.6 | 12 | 0 | 0 | 8 | 0 | 0 | 0 | 6 | 0 | 6 | 0 | 36% | 4.2% | 16.5% |
| 2.8 | 1.2 | 12 | 0 | 0 | 6 | 0 | 0 | 0 | 6 | 0 | 6 | 0 | 37% | 3.2% | 15.4% |
| 3 | 1.2 | 12 | 0 | 0 | 6 | 0 | 0 | 0 | 6 | 0 | 6 | 0 | 39% | 4.3% | 16.8% |
| 2.4 | 1.6 | 12 | 0 | 0 | 8 | 0 | 0 | 0 | 4 | 0 | 6 | 0 | 31% | 1.5% | 13.4% |
| 2.4 | 1.4 | 12 | 0 | 0 | 6 | 0 | 0 | 0 | 4 | 0 | 6 | 0 | 32% | 2.3% | 12.3% |
| 2.4 | 1 | 12 | 0 | 0 | 6 | 0 | 0 | 0 | 4 | 0 | 6 | 0 | 32% | 0.9% | 13.1% |
| 2.6 | 1.2 | 12 | 0 | 0 | 8 | 0 | 0 | 0 | 4 | 0 | 6 | 0 | 34% | 1.1% | 16.6% |
| 2.6 | 1 | 12 | 0 | 0 | 6 | 0 | 0 | 0 | 4 | 0 | 6 | 0 | 35% | 2.3% | 14.4% |
| 2.8 | 1.4 | 12 | 0 | 0 | 6 | 0 | 0 | 0 | 4 | 0 | 6 | 0 | 37% | 4.5% | 15.3% |
| 2.8 | 0.8 | 12 | 0 | 0 | 6 | 0 | 0 | 0 | 4 | 0 | 6 | 0 | 37% | 2.8% | 15.5% |
| 2.3 | 1 | 12 | 0 | 0 | 7 | 0 | 0 | 0 | 2 | 0 | 6 | 0 | 31% | 0.0% | 13.1% |
| 2.3 | 0.8 | 12 | 0 | 0 | 6 | 0 | 0 | 0 | 2 | 0 | 6 | 0 | 31% | 0.4% | 12.2% |
| 2.4 | 1.2 | 12 | 0 | 0 | 8 | 0 | 0 | 0 | 2 | 0 | 6 | 0 | 32% | 0.5% | 13.7% |
| 2.4 | 0.9 | 12 | 0 | 0 | 7 | 0 | 0 | 0 | 2 | 0 | 6 | 0 | 32% | 0.0% | 14.5% |
| 2.4 | 0.8 | 12 | 0 | 0 | 6 | 0 | 0 | 0 | 2 | 0 | 6 | 0 | 32% | 1.1% | 12.9% |
| 2.4 | 0.7 | 12 | 0 | 0 | 5 | 0 | 0 | 0 | 2 | 0 | 6 | 0 | 33% | 3.0% | 10.3% |
| 2.5 | 1 | 12 | 0 | 0 | 6 | 0 | 0 | 0 | 2 | 0 | 6 | 0 | 33% | 2.2% | 13.1% |
| 2.5 | 0.9 | 12 | 0 | 0 | 5 | 0 | 0 | 0 | 2 | 0 | 6 | 0 | 34% | 4.3% | 10.6% |
| 2.5 | 0.7 | 12 | 0 | 0 | 5 | 0 | 0 | 0 | 2 | 0 | 6 | 0 | 34% | 3.7% | 10.9% |
| 2.6 | 1.2 | 12 | 0 | 0 | 6 | 0 | 0 | 0 | 2 | 0 | 6 | 0 | 34% | 3.2% | 13.2% |
| 2.6 | 0.8 | 12 | 0 | 0 | 7 | 0 | 0 | 0 | 2 | 0 | 6 | 0 | 35% | 0.0% | 17.2% |
| 2.6 | 0.7 | 12 | 0 | 0 | 6 | 0 | 0 | 0 | 2 | 0 | 6 | 0 | 35% | 2.1% | 14.4% |
| 2.6 | 0.6 | 12 | 0 | 0 | 5 | 0 | 0 | 0 | 2 | 0 | 6 | 0 | 35% | 4.1% | 11.6% |
| 2.7 | 0.9 | 12 | 0 | 0 | 6 | 0 | 0 | 0 | 2 | 0 | 6 | 0 | 36% | 3.2% | 14.8% |
| 2.7 | 0.6 | 12 | 0 | 0 | 6 | 0 | 0 | 0 | 2 | 0 | 6 | 0 | 36% | 2.4% | 15.2% |
| 2.8 | 1 | 12 | 0 | 0 | 7 | 0 | 0 | 0 | 2 | 0 | 6 | 0 | 37% | 2.6% | 17.1% |
| 2.8 | 0.7 | 12 | 0 | 0 | 7 | 0 | 0 | 0 | 2 | 0 | 6 | 0 | 37% | 1.0% | 18.7% |
| 2.8 | 0.5 | 12 | 0 | 0 | 6 | 0 | 0 | 0 | 2 | 0 | 6 | 0 | 38% | 2.7% | 15.8% |
| 2.9 | 0.7 | 12 | 0 | 0 | 7 | 0 | 0 | 0 | 2 | 0 | 6 | 0 | 39% | 2.0% | 19.0% |
| 2.9 | 0.5 | 12 | 0 | 0 | 6 | 0 | 0 | 0 | 2 | 0 | 6 | 0 | 39% | 3.3% | 16.6% |
| 3 | 0.7 | 12 | 0 | 0 | 7 | 0 | 0 | 0 | 2 | 0 | 6 | 0 | 40% | 2.8% | 19.4% |
| 3 | 0.5 | 12 | 0 | 0 | 6 | 0 | 0 | 0 | 2 | 0 | 6 | 0 | 40% | 3.8% | 17.3% |
| 3.1 | 0.7 | 12 | 0 | 0 | 6 | 0 | 0 | 0 | 2 | 0 | 6 | 0 | 41% | 4.7% | 18.3% |
| 3.2 | 0.7 | 12 | 0 | 0 | 7 | 0 | 0 | 0 | 2 | 0 | 6 | 0 | 42% | 4.3% | 20.5% |
| 2.8 | 0.8 | 11 | 0 | 0 | 9.5 | 0 | 0 | 0 | 1.5 | 0 | 6 | 0 | 37% | 3.9% | 14.7% |
| 2.8 | 0.8 | 12 | 0 | 0 | 8.5 | 0 | 0 | 0 | 1.5 | 0 | 6 | 0 | 37% | 3.8% | 15.8% |
| 2.8 | 0.75 | 11 | 0 | 0 | 7.5 | 0 | 0 | 0 | 1.5 | 0 | 6 | 0 | 37% | 0.5% | 18.0% |
| 2.8 | 0.75 | 12 | 0 | 0 | 6.5 | 0 | 0 | 0 | 1.5 | 0 | 6 | 0 | 37% | 2.3% | 17.2% |
| 2.8 | 0.8 | 11 | 0 | 0 | 8.5 | 0 | 0 | 0 | 1 | 0 | 6 | 0 | 37% | 2.8% | 15.5% |
| 2.8 | 0.8 | 12 | 0 | 0 | 7.5 | 0 | 0 | 0 | 1 | 0 | 6 | 0 | 37% | 2.9% | 16.5% |
| 2.8 | 0.75 | 11 | 0 | 0 | 6.5 | 0 | 0 | 0 | 1 | 0 | 6 | 0 | 37% | 0.0% | 18.3% |
| 2.8 | 0.8 | 11 | 0 | 0 | 8.5 | 0 | 0 | 0 | 0.5 | 0 | 6 | 0 | 37% | 3.2% | 15.9% |
| 2.8 | 0.8 | 12 | 0 | 0 | 7.5 | 0 | 0 | 0 | 0.5 | 0 | 6 | 0 | 37% | 3.3% | 16.9% |
| 2.8 | 0.75 | 11 | 0 | 0 | 6.5 | 0 | 0 | 0 | 0.5 | 0 | 6 | 0 | 37% | 0.0% | 19.4% |
| 2.4 | 2.2 | 12 | 0 | 0 | 8 | 0 | 0 | 0 | 0 | 10 | 6 | 0 | 31% | 4.0% | 10.5% |
| 2.4 | 2.2 | 12 | 0 | 0 | 8 | 0 | 0 | 0 | 0 | 8 | 6 | 0 | 31% | 4.2% | 10.5% |
| 2.6 | 1.8 | 0 | 0 | 0 | 12 | 0 | 0 | 0 | 0 | 10 | 6 | 0 | 31% | 0.0% | 15.9% |
| 2.2 | 2.2 | 0 | 0 | 0 | 12 | 0 | 0 | 0 | 0 | 8 | 6 | 0 | 31% | 0.0% | 14.3% |
| 2.4 | 1.6 | 12 | 0 | 0 | 12 | 0 | 0 | 0 | 0 | 8 | 6 | 0 | 31% | 0.0% | 16.0% |
| 2.4 | 1.8 | 12 | 0 | 0 | 10 | 0 | 0 | 0 | 0 | 8 | 6 | 0 | 31% | 2.3% | 13.2% |
| 2.4 | 1.8 | 4 | 0 | 0 | 8 | 0 | 0 | 0 | 0 | 8 | 6 | 0 | 31% | 0.0% | 10.8% |
| 2.4 | 1.4 | 12 | 0 | 0 | 12 | 0 | 0 | 0 | 0 | 10 | 6 | 0 | 31% | 0.0% | 15.8% |
| 2.4 | 1.8 | 8 | 0 | 0 | 8 | 0 | 0 | 0 | 0 | 8 | 6 | 0 | 31% | 0.0% | 11.1% |
| 2.6 | 1.2 | 0 | 0 | 0 | 8 | 0 | 0 | 0 | 0 | 8 | 6 | 0 | 31% | 0.0% | 11.0% |
| 2.4 | 1 | 4 | 0 | 0 | 12 | 0 | 0 | 0 | 0 | 6 | 6 | 0 | 31% | 0.0% | 14.6% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 2.4 | 1.2 | 4 | 0 | 0 | 10 | 0 | 0 | 0 | 0 | 8 | 6 | 0 | 31% | 0.0% | 11.9% |
| 2.4 | 1.6 | 4 | 0 | 0 | 8 | 0 | 0 | 0 | 0 | 8 | 6 | 0 | 31% | 0.0% | 10.8% |
| 2.4 | 1.6 | 8 | 0 | 0 | 8 | 0 | 0 | 0 | 0 | 10 | 6 | 0 | 31% | 0.0% | 11.1% |
| 2.4 | 2 | 0 | 0 | 0 | 10 | 0 | 0 | 0 | 0 | 8 | 6 | 0 | 31% | 0.0% | 12.7% |
| 3 | 2.2 | 4 | 0 | 0 | 4 | 0 | 0 | 0 | 0 | 4 | 6 | 0 | 31% | 0.0% | 17.6% |
| 2.4 | 1.2 | 8 | 0 | 0 | 10 | 0 | 0 | 0 | 0 | 10 | 6 | 0 | 31% | 0.0% | 13.5% |
| 2.6 | 1.8 | 4 | 0 | 0 | 10 | 0 | 0 | 0 | 0 | 4 | 6 | 0 | 31% | 0.0% | 13.8% |
| 2.4 | 1.4 | 12 | 0 | 0 | 10 | 0 | 0 | 0 | 0 | 6 | 6 | 0 | 31% | 3.8% | 12.8% |
| 2.4 | 1.4 | 8 | 0 | 0 | 8 | 0 | 0 | 0 | 0 | 10 | 6 | 0 | 31% | 0.0% | 11.0% |
| 2.4 | 1.2 | 8 | 0 | 0 | 10 | 0 | 0 | 0 | 0 | 6 | 6 | 0 | 31% | 0.0% | 12.2% |
| 2.4 | 1 | 4 | 0 | 0 | 10 | 0 | 0 | 0 | 0 | 4 | 6 | 0 | 31% | 0.0% | 12.4% |
| 2.4 | 1.2 | 12 | 0 | 0 | 10 | 0 | 0 | 0 | 0 | 10 | 6 | 0 | 31% | 0.8% | 13.2% |
| 2.4 | 1 | 8 | 0 | 0 | 10 | 0 | 0 | 0 | 0 | 10 | 6 | 0 | 31% | 0.0% | 11.7% |
| 2.4 | 0.8 | 0 | 0 | 0 | 10 | 0 | 0 | 0 | 0 | 4 | 6 | 0 | 31% | 0.0% | 10.6% |
| 2.4 | 1.2 | 12 | 0 | 0 | 10 | 0 | 0 | 0 | 0 | 8 | 6 | 0 | 31% | 2.3% | 13.1% |
| 2.4 | 1 | 12 | 0 | 0 | 12 | 0 | 0 | 0 | 0 | 6 | 6 | 0 | 31% | 0.0% | 14.5% |
| 2.4 | 0.8 | 4 | 0 | 0 | 10 | 0 | 0 | 0 | 0 | 6 | 6 | 0 | 31% | 0.0% | 12.3% |
| 2.4 | 0.8 | 4 | 0 | 0 | 10 | 0 | 0 | 0 | 0 | 4 | 6 | 0 | 31% | 0.0% | 10.8% |
| 2.4 | 1.2 | 8 | 0 | 0 | 8 | 0 | 0 | 0 | 0 | 6 | 6 | 0 | 31% | 1.4% | 11.1% |
| 2.6 | 0.6 | 4 | 0 | 0 | 8 | 0 | 0 | 0 | 0 | 8 | 6 | 0 | 31% | 0.0% | 10.1% |
| 2.4 | 0.8 | 12 | 0 | 0 | 12 | 0 | 0 | 0 | 0 | 4 | 6 | 0 | 31% | 0.7% | 14.7% |
| 2.4 | 0.6 | 8 | 0 | 0 | 12 | 0 | 0 | 0 | 0 | 6 | 6 | 0 | 32% | 0.0% | 12.8% |
| 3 | 1.6 | 8 | 0 | 0 | 5 | 0 | 0 | 0 | 0 | 0 | 6 | 0 | 32% | 0.0% | 22.2% |
| 2.6 | 0.8 | 4 | 0 | 0 | 12 | 0 | 0 | 0 | 0 | 10 | 6 | 0 | 32% | 0.0% | 14.9% |
| 2.4 | 0.6 | 4 | 0 | 0 | 10 | 0 | 0 | 0 | 0 | 4 | 6 | 0 | 32% | 0.0% | 11.0% |
| 2.4 | 0.6 | 8 | 0 | 0 | 10 | 0 | 0 | 0 | 0 | 10 | 6 | 0 | 32% | 0.0% | 11.6% |
| 2.4 | 0.8 | 12 | 0 | 0 | 10 | 0 | 0 | 0 | 0 | 8 | 6 | 0 | 32% | 0.0% | 11.9% |
| 2.4 | 0.6 | 12 | 0 | 0 | 12 | 0 | 0 | 0 | 0 | 0 | 6 | 0 | 32% | 0.0% | 16.6% |
| 2 | 1.6 | 0 | 0 | 0 | 10 | 0 | 0 | 0 | 0 | 4 | 6 | 0 | 32% | 0.0% | 10.0% |
| 2.4 | 0.6 | 12 | 0 | 0 | 12 | 0 | 0 | 0 | 0 | 10 | 6 | 0 | 32% | 0.0% | 13.5% |
| 2.6 | 2.2 | 4 | 0 | 0 | 8 | 0 | 0 | 0 | 0 | 6 | 6 | 0 | 32% | 0.0% | 12.4% |
| 2.4 | 0 | 4 | 0 | 0 | 14 | 0 | 0 | 0 | 0 | 0 | 6 | 0 | 32% | 0.0% | 14.4% |
| 2.4 | 1 | 12 | 0 | 0 | 5 | 0 | 0 | 1 | 0 | 0 | 6 | 0 | 32% | 4.5% | 13.4% |
| 2.4 | 0.6 | 12 | 0 | 0 | 10 | 0 | 0 | 0 | 0 | 8 | 6 | 0 | 32% | 0.0% | 11.8% |
| 2.4 | 1.2 | 12 | 0 | 0 | 5 | 0 | 0 | 1 | 0 | 0 | 6 | 2.5 | 32% | 4.8% | 14.2% |
| 2.4 | 0.1 | 4 | 0 | 0 | 12 | 0 | 0 | 0 | 0 | 0 | 6 | 0 | 32% | 0.0% | 14.0% |
| 2.4 | 0.6 | 12 | 0 | 0 | 10 | 0 | 0 | 0 | 0 | 4 | 6 | 0 | 32% | 0.0% | 11.9% |
| 2.4 | 0.6 | 8 | 0 | 0 | 8 | 0 | 0 | 0 | 0 | 4 | 6 | 0 | 32% | 0.5% | 10.3% |
| 2.6 | 2.2 | 0 | 0 | 0 | 12 | 0 | 0 | 0 | 0 | 10 | 6 | 0 | 32% | 0.0% | 15.7% |
| 2.4 | 0.2 | 4 | 0 | 0 | 10 | 0 | 0 | 0 | 0 | 0 | 6 | 0 | 32% | 0.0% | 11.0% |
| 2.4 | 0.3 | 8 | 0 | 0 | 10 | 0 | 0 | 0 | 0 | 0 | 6 | 0 | 32% | 0.0% | 13.2% |
| 2.4 | 0.6 | 12 | 0 | 0 | 8 | 0 | 0 | 0 | 0 | 0 | 6 | 0 | 32% | 0.0% | 16.6% |
| 2.4 | 0.5 | 8 | 0 | 0 | 8 | 0 | 0 | 0 | 0 | 0 | 6 | 0 | 32% | 0.0% | 12.4% |
| 2.6 | 0.6 | 4 | 0 | 0 | 12 | 0 | 0 | 0 | 0 | 8 | 6 | 0 | 32% | 0.0% | 13.5% |
| 2.4 | 0.8 | 12 | 0 | 0 | 5 | 0 | 0 | 1 | 0 | 0 | 6 | 2.5 | 32% | 4.4% | 15.9% |
| 2.4 | 0.8 | 12 | 0 | 0 | 5 | 0 | 0 | 0 | 0 | 0 | 6 | 0 | 32% | 4.0% | 11.1% |
| 2.4 | 0.1 | 0 | 0 | 0 | 10 | 0 | 0 | 0 | 0 | 0 | 6 | 0 | 32% | 0.0% | 11.0% |
| 2.4 | 0.4 | 12 | 0 | 0 | 8 | 0 | 0 | 0 | 0 | 0 | 6 | 0 | 32% | 0.0% | 17.3% |
| 2.4 | 0 | 12 | 0 | 0 | 12 | 0 | 0 | 0 | 0 | 0 | 6 | 0 | 33% | 0.0% | 16.2% |
| 2.6 | 2 | 8 | 0 | 0 | 12 | 0 | 0 | 0 | 0 | 4 | 6 | 0 | 33% | 0.0% | 16.6% |
| 2.6 | 2.2 | 0 | 0 | 0 | 10 | 0 | 0 | 0 | 0 | 10 | 6 | 0 | 33% | 0.0% | 13.2% |
| 2.6 | 0.8 | 4 | 0 | 0 | 12 | 0 | 0 | 0 | 0 | 8 | 6 | 0 | 33% | 0.0% | 15.2% |
| 2.6 | 2 | 8 | 0 | 0 | 10 | 0 | 0 | 0 | 0 | 4 | 6 | 0 | 33% | 1.6% | 13.8% |
| 2.6 | 2 | 12 | 0 | 0 | 12 | 0 | 0 | 0 | 0 | 8 | 6 | 0 | 33% | 1.8% | 16.5% |
| 2.4 | 0.1 | 8 | 0 | 0 | 8 | 0 | 0 | 0 | 0 | 0 | 6 | 0 | 33% | 0.0% | 10.4% |
| 2.6 | 1.8 | 8 | 0 | 0 | 12 | 0 | 0 | 0 | 0 | 8 | 6 | 0 | 33% | 0.0% | 16.8% |
| 2.6 | 1.6 | 4 | 0 | 0 | 12 | 0 | 0 | 0 | 0 | 4 | 6 | 0 | 33% | 0.0% | 16.5% |
| 2.4 | 0 | 8 | 0 | 0 | 8 | 0 | 0 | 0 | 0 | 0 | 6 | 0 | 33% | 0.0% | 10.8% |
| 2.6 | 2 | 0 | 0 | 0 | 8 | 0 | 0 | 0 | 0 | 10 | 6 | 0 | 33% | 0.0% | 10.7% |
| 2.6 | 1.6 | 8 | 0 | 0 | 12 | 0 | 0 | 0 | 0 | 10 | 6 | 0 | 33% | 0.0% | 16.7% |
| 2.6 | 1.4 | 4 | 0 | 0 | 10 | 0 | 0 | 0 | 0 | 8 | 6 | 0 | 33% | 0.0% | 14.0% |
| 2.4 | 1.2 | 0 | 0 | 0 | 12 | 0 | 0 | 0 | 0 | 4 | 6 | 0 | 33% | 0.0% | 14.3% |
| 2.6 | 1.4 | 4 | 0 | 0 | 12 | 0 | 0 | 0 | 0 | 6 | 6 | 0 | 33% | 0.0% | 16.6% |
| 2.4 | 0.1 | 8 | 0 | 0 | 6 | 0 | 0 | 0 | 0 | 0 | 6 | 0 | 33% | 0.0% | 10.3% |
| 2.2 | 0.6 | 0 | 0 | 0 | 12 | 0 | 0 | 0 | 0 | 0 | 6 | 0 | 33% | 0.0% | 11.5% |
| 2.6 | 1.8 | 4 | 0 | 0 | 8 | 0 | 0 | 0 | 0 | 10 | 6 | 0 | 33% | 0.0% | 11.3% |
| 2.6 | 1.6 | 12 | 0 | 0 | 12 | 0 | 0 | 0 | 0 | 10 | 6 | 0 | 33% | 0.7% | 16.7% |
| 2.6 | 1.6 | 8 | 0 | 0 | 10 | 0 | 0 | 0 | 0 | 10 | 6 | 0 | 33% | 0.0% | 14.3% |
| 2.6 | 1.8 | 12 | 0 | 0 | 10 | 0 | 0 | 0 | 0 | 8 | 6 | 0 | 33% | 4.4% | 13.6% |
| 3 | 1.4 | 8 | 0 | 0 | 5 | 0 | 0 | 0 | 0 | 0 | 6 | 0 | 33% | 0.0% | 23.0% |
| 3 | 2.4 | 4 | 0 | 0 | 4 | 0 | 0 | 0 | 0 | 6 | 6 | 0 | 33% | 0.0% | 12.5% |
| 2.6 | 1.6 | 8 | 0 | 0 | 10 | 0 | 0 | 0 | 0 | 6 | 6 | 0 | 33% | 1.0% | 14.2% |
| 2.6 | 1.6 | 12 | 0 | 0 | 10 | 0 | 0 | 0 | 0 | 10 | 6 | 0 | 33% | 3.2% | 13.7% |
| 2.6 | 1.6 | 12 | 0 | 0 | 10 | 0 | 0 | 0 | 0 | 8 | 6 | 0 | 33% | 4.5% | 13.5% |
| 3 | 2 | 4 | 0 | 0 | 8 | 0 | 0 | 0 | 0 | 4 | 6 | 0 | 33% | 0.0% | 14.6% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 2.6 | 1.2 | 8 | 0 | 0 | 12 | 0 | 0 | 0 | 0 | 6 | 6 | 0 | 33% | 0.0% | 17.1% |
| 2.8 | 1.4 | 10 | 0 | 0 | 5 | 0 | 0 | 0 | 0 | 0 | 6 | 0 | 33% | 2.5% | 17.3% |
| 2.6 | 1.8 | 0 | 0 | 0 | 8 | 0 | 0 | 0 | 0 | 8 | 6 | 0 | 34% | 0.0% | 10.7% |
| 2.6 | 1.4 | 0 | 0 | 0 | 10 | 0 | 0 | 0 | 0 | 6 | 6 | 0 | 34% | 0.0% | 13.5% |
| 2.6 | 1.2 | 4 | 0 | 0 | 10 | 0 | 0 | 0 | 0 | 6 | 6 | 0 | 34% | 0.0% | 12.7% |
| 2.6 | 1 | 8 | 0 | 0 | 12 | 0 | 0 | 0 | 0 | 8 | 6 | 0 | 34% | 0.0% | 15.3% |
| 2.6 | 1.8 | 4 | 0 | 0 | 8 | 0 | 0 | 0 | 0 | 6 | 6 | 0 | 34% | 0.0% | 12.6% |
| 2.6 | 1.2 | 8 | 0 | 0 | 10 | 0 | 0 | 0 | 0 | 6 | 6 | 0 | 34% | 1.3% | 14.3% |
| 2.6 | 1.2 | 12 | 0 | 0 | 10 | 0 | 0 | 0 | 0 | 10 | 6 | 0 | 34% | 3.0% | 13.6% |
| 2.6 | 1 | 8 | 0 | 0 | 10 | 0 | 0 | 0 | 0 | 10 | 6 | 0 | 34% | 0.0% | 14.2% |
| 2.6 | 1.2 | 12 | 0 | 0 | 10 | 0 | 0 | 0 | 0 | 8 | 6 | 0 | 34% | 4.5% | 13.4% |
| 2.6 | 1 | 12 | 0 | 0 | 10 | 0 | 0 | 0 | 0 | 6 | 6 | 0 | 34% | 1.3% | 15.2% |
| 2.6 | 0.8 | 8 | 0 | 0 | 12 | 0 | 0 | 0 | 0 | 6 | 6 | 0 | 34% | 0.0% | 15.7% |
| 2.6 | 0.6 | 4 | 0 | 0 | 12 | 0 | 0 | 0 | 0 | 4 | 6 | 0 | 34% | 0.0% | 14.3% |
| 2.6 | 1.4 | 0 | 0 | 0 | 8 | 0 | 0 | 0 | 0 | 6 | 6 | 0 | 34% | 0.0% | 10.9% |
| 2.6 | 1 | 12 | 0 | 0 | 10 | 0 | 0 | 0 | 0 | 8 | 6 | 0 | 34% | 2.1% | 12.4% |
| 2.6 | 0.3 | 0 | 0 | 0 | 14 | 0 | 0 | 0 | 0 | 0 | 6 | 0 | 34% | 0.0% | 16.5% |
| 2.6 | 1.4 | 4 | 0 | 0 | 8 | 0 | 0 | 0 | 0 | 4 | 6 | 0 | 34% | 0.0% | 11.6% |
| 2.6 | 0.8 | 12 | 0 | 0 | 10 | 0 | 0 | 0 | 0 | 10 | 6 | 0 | 34% | 2.5% | 13.5% |
| 2.6 | 0.8 | 8 | 0 | 0 | 10 | 0 | 0 | 0 | 0 | 4 | 6 | 0 | 34% | 0.5% | 13.5% |
| 2.6 | 2 | 0 | 0 | 0 | 8 | 0 | 0 | 0 | 0 | 8 | 6 | 0 | 34% | 0.0% | 10.6% |
| 2.6 | 1.2 | 4 | 0 | 0 | 8 | 0 | 0 | 0 | 0 | 4 | 6 | 0 | 34% | 0.0% | 10.3% |
| 2.6 | 0.8 | 12 | 0 | 0 | 10 | 0 | 0 | 0 | 0 | 6 | 6 | 0 | 34% | 3.7% | 12.3% |
| 2.6 | 0.6 | 12 | 0 | 0 | 10 | 0 | 0 | 0 | 0 | 10 | 6 | 0 | 34% | 0.0% | 12.3% |
| 2.6 | 0.3 | 12 | 0 | 0 | 14 | 0 | 0 | 0 | 0 | 0 | 6 | 0 | 34% | 0.0% | 20.6% |
| 2.6 | 0.6 | 12 | 0 | 0 | 10 | 0 | 0 | 0 | 0 | 8 | 6 | 0 | 34% | 1.6% | 12.4% |
| 3 | 0.8 | 4 | 0 | 0 | 8 | 0 | 0 | 0 | 0 | 10 | 6 | 0 | 35% | 0.0% | 12.2% |
| 2.6 | 0 | 4 | 0 | 0 | 14 | 0 | 0 | 0 | 0 | 0 | 6 | 0 | 35% | 0.0% | 17.7% |
| 2.2 | 1.4 | 0 | 0 | 0 | 10 | 0 | 0 | 0 | 0 | 4 | 6 | 0 | 35% | 0.0% | 11.0% |
| 2.6 | 0.1 | 12 | 0 | 0 | 14 | 0 | 0 | 0 | 0 | 0 | 6 | 0 | 35% | 0.0% | 18.9% |
| 2.6 | 0.8 | 8 | 0 | 0 | 5 | 0 | 0 | 0 | 0 | 0 | 6 | 0 | 35% | 0.0% | 13.8% |
| 2.6 | 0.1 | 0 | 0 | 0 | 12 | 0 | 0 | 0 | 0 | 0 | 6 | 0 | 35% | 0.0% | 14.3% |
| 2.8 | 1.2 | 10 | 0 | 0 | 5 | 0 | 0 | 0 | 0 | 0 | 6 | 0 | 35% | 2.3% | 18.3% |
| 2.6 | 0.5 | 8 | 0 | 0 | 8 | 0 | 0 | 0 | 0 | 0 | 6 | 0 | 35% | 0.0% | 15.1% |
| 2.6 | 0.3 | 12 | 0 | 0 | 10 | 0 | 0 | 0 | 0 | 0 | 6 | 0 | 35% | 0.4% | 20.0% |
| 2.6 | 0.3 | 0 | 0 | 0 | 10 | 0 | 0 | 0 | 0 | 0 | 6 | 0 | 35% | 0.0% | 11.0% |
| 2.6 | 0.6 | 8 | 0 | 0 | 6 | 0 | 0 | 0 | 0 | 0 | 6 | 0 | 35% | 0.0% | 14.5% |
| 2.4 | 2.2 | 0 | 0 | 0 | 12 | 0 | 0 | 0 | 0 | 8 | 6 | 0 | 35% | 0.0% | 15.0% |
| 2.6 | 0.3 | 8 | 0 | 0 | 8 | 0 | 0 | 0 | 0 | 0 | 6 | 0 | 35% | 0.0% | 15.7% |
| 3.2 | 2.4 | 4 | 0 | 0 | 8 | 0 | 0 | 0 | 0 | 6 | 6 | 0 | 35% | 0.0% | 16.1% |
| 2.6 | 0.5 | 12 | 0 | 0 | 6 | 0 | 0 | 0 | 0 | 0 | 6 | 0 | 35% | 2.2% | 17.1% |
| 2.6 | 0.4 | 4 | 0 | 0 | 8 | 0 | 0 | 0 | 0 | 0 | 6 | 0 | 35% | 0.0% | 10.3% |
| 2.6 | 0.1 | 8 | 0 | 0 | 8 | 0 | 0 | 0 | 0 | 0 | 6 | 0 | 35% | 0.0% | 13.1% |
| 2.6 | 0.1 | 12 | 0 | 0 | 8 | 0 | 0 | 0 | 0 | 0 | 6 | 0 | 35% | 0.0% | 18.3% |
| 2.6 | 0.4 | 8 | 0 | 0 | 4 | 0 | 0 | 0 | 0 | 0 | 6 | 0 | 36% | 0.0% | 14.6% |
| 3 | 2.2 | 4 | 0 | 0 | 4 | 0 | 0 | 0 | 0 | 6 | 6 | 0 | 36% | 0.0% | 12.6% |
| 2.2 | 2 | 0 | 0 | 0 | 10 | 0 | 0 | 0 | 0 | 6 | 6 | 0 | 36% | 0.0% | 12.0% |
| 2.6 | 0.2 | 12 | 0 | 0 | 4 | 0 | 0 | 0 | 0 | 0 | 6 | 0 | 36% | 4.7% | 11.1% |
| 2.6 | 0 | 12 | 0 | 0 | 4 | 0 | 0 | 0 | 0 | 0 | 6 | 0 | 36% | 4.1% | 12.5% |
| 2.4 | 1.4 | 0 | 0 | 0 | 12 | 0 | 0 | 0 | 0 | 4 | 6 | 0 | 37% | 0.0% | 14.0% |
| 2.8 | 0.6 | 12 | 0 | 0 | 14 | 0 | 0 | 0 | 0 | 0 | 6 | 0 | 37% | 4.6% | 17.4% |
| 2.8 | 0.3 | 4 | 0 | 0 | 14 | 0 | 0 | 0 | 0 | 0 | 6 | 0 | 37% | 0.0% | 17.6% |
| 2.4 | 0.5 | 0 | 0 | 0 | 12 | 0 | 0 | 0 | 0 | 0 | 6 | 0 | 37% | 0.0% | 12.6% |
| 3 | 0.8 | 4 | 0 | 0 | 14 | 0 | 0 | 0 | 0 | 0 | 6 | 0 | 37% | 0.0% | 18.8% |
| 2.8 | 0.1 | 4 | 0 | 0 | 14 | 0 | 0 | 0 | 0 | 0 | 6 | 0 | 37% | 0.0% | 18.2% |
| 3 | 1.6 | 4 | 0 | 0 | 8 | 0 | 0 | 0 | 0 | 10 | 6 | 0 | 37% | 0.0% | 13.4% |
| 2.8 | 0 | 4 | 0 | 0 | 14 | 0 | 0 | 0 | 0 | 0 | 6 | 0 | 37% | 0.0% | 18.5% |
| 2.8 | 0.8 | 10 | 0 | 0 | 5 | 0 | 0 | 0 | 0 | 0 | 6 | 0 | 37% | 0.6% | 17.9% |
| 2.8 | 0.6 | 8 | 0 | 0 | 8 | 0 | 0 | 0 | 0 | 0 | 6 | 0 | 37% | 0.0% | 17.3% |
| 2.4 | 2.2 | 0 | 0 | 0 | 10 | 0 | 0 | 0 | 0 | 8 | 6 | 0 | 37% | 0.0% | 12.6% |
| 2.8 | 0.2 | 12 | 0 | 0 | 12 | 0 | 0 | 0 | 0 | 0 | 6 | 0 | 37% | 0.0% | 21.1% |
| 2.8 | 0.3 | 8 | 0 | 0 | 10 | 0 | 0 | 0 | 0 | 0 | 6 | 0 | 38% | 0.0% | 18.7% |
| 2.6 | 0.4 | 0 | 0 | 0 | 14 | 0 | 0 | 0 | 0 | 0 | 6 | 0 | 38% | 0.0% | 16.1% |
| 2.8 | 0.1 | 12 | 0 | 0 | 12 | 0 | 0 | 0 | 0 | 0 | 6 | 0 | 38% | 0.0% | 21.5% |
| 2.8 | 0 | 8 | 0 | 0 | 12 | 0 | 0 | 0 | 0 | 0 | 6 | 0 | 38% | 0.0% | 16.9% |
| 2.8 | 0.4 | 12 | 0 | 0 | 8 | 0 | 0 | 0 | 0 | 0 | 6 | 0 | 38% | 2.3% | 20.5% |
| 2.8 | 0.1 | 8 | 0 | 0 | 10 | 0 | 0 | 0 | 0 | 0 | 6 | 0 | 38% | 0.0% | 16.1% |
| 2.8 | 0.3 | 12 | 0 | 0 | 8 | 0 | 0 | 0 | 0 | 0 | 6 | 0 | 38% | 1.6% | 21.5% |
| 2.8 | 0.4 | 8 | 0 | 0 | 6 | 0 | 0 | 0 | 0 | 0 | 6 | 0 | 38% | 0.0% | 17.9% |
| 2.4 | 0.6 | 0 | 0 | 0 | 12 | 0 | 0 | 0 | 0 | 0 | 6 | 0 | 38% | 0.0% | 12.3% |
| 3 | 2.4 | 4 | 0 | 0 | 8 | 0 | 0 | 0 | 0 | 10 | 6 | 0 | 38% | 1.3% | 13.3% |
| 2.8 | 0 | 12 | 0 | 0 | 10 | 0 | 0 | 0 | 0 | 0 | 6 | 0 | 38% | 0.0% | 21.7% |
| 2.8 | 0.5 | 8 | 0 | 0 | 4 | 0 | 0 | 0 | 0 | 0 | 6 | 0 | 38% | 0.0% | 16.7% |
| 2.8 | 0 | 4 | 0 | 0 | 10 | 0 | 0 | 0 | 0 | 0 | 6 | 0 | 38% | 0.0% | 12.9% |
| 2.8 | 0.4 | 4 | 0 | 0 | 8 | 0 | 0 | 0 | 0 | 0 | 6 | 0 | 38% | 0.0% | 10.8% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3 | 1.8 | 8 | 0 | 0 | 8 | 0 | 0 | 0 | 0 | 8 | 6 | 0 | 38% | 4.8% | 12.0% |
| 2.8 | 0.2 | 12 | 0 | 0 | 6 | 0 | 0 | 0 | 0 | 0 | 6 | 0 | 38% | 0.8% | 18.8% |
| 2.8 | 0.3 | 4 | 0 | 0 | 8 | 0 | 0 | 0 | 0 | 0 | 6 | 0 | 38% | 0.0% | 11.0% |
| 3 | 2.4 | 4 | 0 | 0 | 6 | 0 | 0 | 0 | 0 | 10 | 6 | 0 | 38% | 0.0% | 14.1% |
| 3.2 | 1.2 | 4 | 0 | 0 | 4 | 0 | 0 | 0 | 0 | 10 | 6 | 0 | 38% | 0.0% | 11.1% |
| 2.8 | 0 | 12 | 0 | 0 | 6 | 0 | 0 | 0 | 0 | 0 | 6 | 0 | 38% | 0.1% | 20.2% |
| 2.8 | 0.1 | 4 | 0 | 0 | 8 | 0 | 0 | 0 | 0 | 0 | 6 | 0 | 39% | 0.0% | 11.5% |
| 3 | 2.2 | 4 | 0 | 0 | 6 | 0 | 0 | 0 | 0 | 8 | 6 | 0 | 39% | 0.0% | 13.7% |
| 3 | 1.4 | 4 | 0 | 0 | 8 | 0 | 0 | 0 | 0 | 8 | 6 | 0 | 39% | 0.0% | 13.4% |
| 3 | 1.8 | 4 | 0 | 0 | 4 | 0 | 0 | 0 | 0 | 10 | 6 | 0 | 39% | 0.0% | 11.6% |
| 3 | 1.6 | 4 | 0 | 0 | 8 | 0 | 0 | 0 | 0 | 8 | 6 | 0 | 39% | 0.2% | 13.4% |
| 2.4 | 1.4 | 0 | 0 | 0 | 10 | 0 | 0 | 0 | 0 | 4 | 6 | 0 | 39% | 0.0% | 11.6% |
| 3 | 0.6 | 4 | 0 | 0 | 14 | 0 | 0 | 0 | 0 | 0 | 6 | 0 | 39% | 0.0% | 19.4% |
| 3 | 1.8 | 4 | 0 | 0 | 6 | 0 | 0 | 0 | 0 | 6 | 6 | 0 | 39% | 0.0% | 13.0% |
| 3 | 0.4 | 4 | 0 | 0 | 14 | 0 | 0 | 0 | 0 | 0 | 6 | 0 | 39% | 0.0% | 19.9% |
| 2.8 | 0.1 | 4 | 0 | 0 | 4 | 0 | 0 | 0 | 0 | 0 | 6 | 0 | 39% | 0.0% | 10.0% |
| 3.2 | 0.8 | 4 | 0 | 0 | 14 | 0 | 0 | 0 | 0 | 0 | 6 | 0 | 39% | 0.0% | 21.1% |
| 3 | 0.4 | 8 | 0 | 0 | 14 | 0 | 0 | 0 | 0 | 0 | 6 | 0 | 39% | 1.8% | 19.9% |
| 3 | 1 | 8 | 0 | 0 | 6 | 0 | 0 | 0 | 0 | 4 | 6 | 0 | 40% | 3.0% | 13.6% |
| 3 | 1 | 4 | 0 | 0 | 6 | 0 | 0 | 0 | 0 | 6 | 6 | 0 | 40% | 0.0% | 10.3% |
| 3 | 1.4 | 4 | 0 | 0 | 6 | 0 | 0 | 0 | 0 | 6 | 6 | 0 | 40% | 0.0% | 13.6% |
| 3 | 1.4 | 4 | 0 | 0 | 6 | 0 | 0 | 0 | 0 | 4 | 6 | 0 | 40% | 0.0% | 11.8% |
| 3 | 0.5 | 8 | 0 | 0 | 10 | 0 | 0 | 0 | 0 | 0 | 6 | 0 | 40% | 0.0% | 20.6% |
| 3 | 1 | 4 | 0 | 0 | 8 | 0 | 0 | 0 | 0 | 4 | 6 | 0 | 40% | 0.0% | 13.2% |
| 3 | 1.2 | 4 | 0 | 0 | 6 | 0 | 0 | 0 | 0 | 6 | 6 | 0 | 40% | 0.0% | 10.1% |
| 2.4 | 2.2 | 0 | 0 | 0 | 12 | 0 | 0 | 0 | 0 | 6 | 6 | 0 | 40% | 0.0% | 14.8% |
| 3.2 | 1.6 | 4 | 0 | 0 | 8 | 0 | 0 | 0 | 0 | 4 | 6 | 0 | 40% | 0.0% | 17.8% |
| 3.2 | 1.6 | 4 | 0 | 0 | 6 | 0 | 0 | 0 | 0 | 4 | 6 | 0 | 40% | 0.0% | 17.2% |
| 3.2 | 2 | 4 | 0 | 0 | 4 | 0 | 0 | 0 | 0 | 6 | 6 | 0 | 40% | 0.0% | 14.9% |
| 3 | 0.5 | 12 | 0 | 0 | 8 | 0 | 0 | 0 | 0 | 0 | 6 | 0 | 40% | 4.6% | 20.3% |
| 3 | 0.8 | 8 | 0 | 0 | 4 | 0 | 0 | 0 | 0 | 4 | 6 | 0 | 40% | 0.0% | 17.1% |
| 3 | 0.4 | 8 | 0 | 0 | 8 | 0 | 0 | 0 | 0 | 0 | 6 | 0 | 40% | 0.0% | 20.7% |
| 3 | 0.2 | 8 | 0 | 0 | 10 | 0 | 0 | 0 | 0 | 0 | 6 | 0 | 40% | 0.0% | 21.7% |
| 3 | 0 | 8 | 0 | 0 | 12 | 0 | 0 | 0 | 0 | 0 | 6 | 0 | 40% | 0.0% | 19.6% |
| 2.6 | 2.2 | 0 | 0 | 0 | 10 | 0 | 0 | 0 | 0 | 8 | 6 | 0 | 40% | 0.0% | 13.1% |
| 3.4 | 1.2 | 4 | 0 | 0 | 6 | 0 | 0 | 0 | 0 | 10 | 6 | 0 | 40% | 1.3% | 12.3% |
| 3.2 | 2.4 | 4 | 0 | 0 | 8 | 0 | 0 | 0 | 0 | 10 | 6 | 0 | 40% | 0.0% | 17.2% |
| 3 | 0.4 | 12 | 0 | 0 | 6 | 0 | 0 | 0 | 0 | 0 | 6 | 0 | 40% | 3.9% | 21.1% |
| 3 | 0.2 | 12 | 0 | 0 | 8 | 0 | 0 | 0 | 0 | 0 | 6 | 0 | 41% | 0.0% | 23.5% |
| 3 | 0.1 | 8 | 0 | 0 | 8 | 0 | 0 | 0 | 0 | 0 | 6 | 0 | 41% | 0.0% | 18.4% |
| 3 | 0.2 | 4 | 0 | 0 | 10 | 0 | 0 | 0 | 0 | 0 | 6 | 0 | 41% | 0.0% | 14.7% |
| 3 | 0.5 | 8 | 0 | 0 | 4 | 0 | 0 | 0 | 0 | 0 | 6 | 0 | 41% | 0.0% | 19.1% |
| 3.2 | 2.4 | 4 | 0 | 0 | 6 | 0 | 0 | 0 | 0 | 10 | 6 | 0 | 41% | 0.0% | 16.5% |
| 3 | 0 | 12 | 0 | 0 | 8 | 0 | 0 | 0 | 0 | 0 | 6 | 0 | 41% | 0.0% | 24.3% |
| 3 | 0.8 | 4 | 0 | 0 | 4 | 0 | 0 | 0 | 0 | 4 | 6 | 0 | 41% | 0.0% | 12.2% |
| 3.4 | 0.8 | 4 | 0 | 0 | 6 | 0 | 0 | 0 | 0 | 8 | 6 | 0 | 41% | 0.0% | 15.7% |
| 3 | 0 | 8 | 0 | 0 | 6 | 0 | 0 | 0 | 0 | 0 | 6 | 0 | 41% | 0.0% | 18.4% |
| 2.4 | 1.6 | 0 | 0 | 0 | 10 | 0 | 0 | 0 | 0 | 4 | 6 | 0 | 41% | 0.0% | 12.9% |
| 3 | 0.2 | 8 | 0 | 0 | 4 | 0 | 0 | 0 | 0 | 0 | 6 | 0 | 41% | 0.0% | 20.2% |
| 3.2 | 1.8 | 4 | 0 | 0 | 8 | 0 | 0 | 0 | 0 | 8 | 6 | 0 | 41% | 0.0% | 16.0% |
| 3.4 | 0.8 | 4 | 0 | 0 | 4 | 0 | 0 | 0 | 0 | 8 | 6 | 0 | 41% | 0.0% | 15.0% |
| 2.8 | 0.4 | 0 | 0 | 0 | 10 | 0 | 0 | 0 | 0 | 0 | 6 | 0 | 41% | 0.0% | 13.0% |
| 3.2 | 1.4 | 4 | 0 | 0 | 6 | 0 | 0 | 0 | 0 | 8 | 6 | 0 | 41% | 0.0% | 13.8% |
| 3.2 | 1.8 | 4 | 0 | 0 | 6 | 0 | 0 | 0 | 0 | 8 | 6 | 0 | 42% | 0.0% | 15.2% |
| 2.6 | 1.8 | 0 | 0 | 0 | 10 | 0 | 0 | 0 | 0 | 6 | 6 | 0 | 42% | 0.0% | 13.2% |
| 3.2 | 2 | 4 | 0 | 0 | 4 | 0 | 0 | 0 | 0 | 8 | 6 | 0 | 42% | 0.0% | 15.1% |
| 3.2 | 0.6 | 4 | 0 | 0 | 14 | 0 | 0 | 0 | 0 | 0 | 6 | 0 | 42% | 0.0% | 20.0% |
| 3.4 | 2 | 4 | 0 | 0 | 6 | 0 | 0 | 0 | 0 | 6 | 6 | 0 | 42% | 0.0% | 17.9% |
| 3.4 | 1.6 | 4 | 0 | 0 | 8 | 0 | 0 | 0 | 0 | 10 | 6 | 0 | 42% | 2.5% | 13.7% |
| 3 | 0.1 | 4 | 0 | 0 | 4 | 0 | 0 | 0 | 0 | 0 | 6 | 0 | 42% | 0.0% | 12.3% |
| 3.2 | 0.4 | 4 | 0 | 0 | 14 | 0 | 0 | 0 | 0 | 0 | 6 | 0 | 42% | 0.0% | 20.5% |
| 3 | 0 | 4 | 0 | 0 | 4 | 0 | 0 | 0 | 0 | 0 | 6 | 0 | 42% | 0.0% | 12.6% |
| 3.2 | 0.3 | 8 | 0 | 0 | 14 | 0 | 0 | 0 | 0 | 0 | 6 | 0 | 42% | 3.9% | 20.5% |
| 3.2 | 0.4 | 8 | 0 | 0 | 12 | 0 | 0 | 0 | 0 | 0 | 6 | 0 | 42% | 0.0% | 24.0% |
| 3.4 | 0.8 | 4 | 0 | 0 | 4 | 0 | 0 | 0 | 0 | 0 | 6 | 0 | 42% | 0.0% | 18.6% |
| 3.2 | 1.2 | 4 | 0 | 0 | 6 | 0 | 0 | 0 | 0 | 6 | 6 | 0 | 42% | 0.0% | 15.9% |
| 3.2 | 0.4 | 8 | 0 | 0 | 10 | 0 | 0 | 0 | 0 | 0 | 6 | 0 | 42% | 0.0% | 23.7% |
| 3.4 | 1.2 | 4 | 0 | 0 | 8 | 0 | 0 | 0 | 0 | 8 | 6 | 0 | 43% | 2.3% | 13.8% |
| 3.2 | 0.1 | 12 | 0 | 0 | 14 | 0 | 0 | 0 | 0 | 0 | 6 | 0 | 43% | 0.0% | 27.4% |
| 3.2 | 0 | 8 | 0 | 0 | 14 | 0 | 0 | 0 | 0 | 0 | 6 | 0 | 43% | 0.0% | 22.8% |
| 3.2 | 0 | 4 | 0 | 0 | 14 | 0 | 0 | 0 | 0 | 0 | 6 | 0 | 43% | 0.0% | 19.9% |
| 3.2 | 1 | 4 | 0 | 0 | 6 | 0 | 0 | 0 | 0 | 4 | 6 | 0 | 43% | 0.0% | 14.7% |
| 3.2 | 0 | 0 | 0 | 0 | 14 | 0 | 0 | 0 | 0 | 0 | 6 | 0 | 43% | 0.0% | 18.8% |
| 3.2 | 0 | 8 | 0 | 0 | 12 | 0 | 0 | 0 | 0 | 0 | 6 | 0 | 43% | 0.0% | 22.3% |
| 3.2 | 0.2 | 0 | 0 | 0 | 12 | 0 | 0 | 0 | 0 | 0 | 6 | 0 | 43% | 0.0% | 17.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.2 | 0.1 | 12 | 0 | 0 | 10 | 0 | 0 | 0 | 0 | 0 | 6 | 0 | 43% | 0.0% | 26.9% |
| 3.2 | 0.2 | 12 | 0 | 0 | 8 | 0 | 0 | 0 | 0 | 0 | 6 | 0 | 43% | 4.0% | 24.8% |
| 3.2 | 0.3 | 12 | 0 | 0 | 6 | 0 | 0 | 0 | 0 | 0 | 6 | 0 | 43% | 4.3% | 23.7% |
| 3.2 | 1 | 4 | 0 | 0 | 4 | 0 | 0 | 0 | 0 | 4 | 6 | 0 | 43% | 0.0% | 14.2% |
| 3.2 | 0 | 0 | 0 | 0 | 12 | 0 | 0 | 0 | 0 | 0 | 6 | 0 | 43% | 0.0% | 15.8% |
| 3.2 | 0.6 | 8 | 0 | 0 | 4 | 0 | 0 | 0 | 0 | 0 | 6 | 0 | 43% | 0.0% | 21.2% |
| 2.4 | 1.8 | 0 | 0 | 0 | 10 | 0 | 0 | 0 | 0 | 4 | 6 | 0 | 43% | 0.0% | 12.7% |
| 3.4 | 0.8 | 4 | 0 | 0 | 6 | 0 | 0 | 0 | 0 | 6 | 6 | 0 | 43% | 0.0% | 14.6% |
| 3.4 | 1.8 | 4 | 0 | 0 | 4 | 0 | 0 | 0 | 0 | 10 | 6 | 0 | 44% | 0.0% | 16.2% |
| 3.2 | 0 | 0 | 0 | 0 | 10 | 0 | 0 | 0 | 0 | 0 | 6 | 0 | 44% | 0.0% | 14.4% |
| 3.2 | 0.2 | 0 | 0 | 0 | 8 | 0 | 0 | 0 | 0 | 0 | 6 | 0 | 44% | 0.0% | 11.0% |
| 3.4 | 0.8 | 4 | 0 | 0 | 4 | 0 | 0 | 0 | 0 | 6 | 6 | 0 | 44% | 0.0% | 14.0% |
| 3.2 | 0.3 | 4 | 0 | 0 | 6 | 0 | 0 | 0 | 0 | 0 | 6 | 0 | 44% | 0.0% | 14.3% |
| 3.4 | 1.8 | 4 | 0 | 0 | 6 | 0 | 0 | 0 | 0 | 8 | 6 | 0 | 44% | 0.0% | 17.6% |
| 3.4 | 1.4 | 4 | 0 | 0 | 4 | 0 | 0 | 0 | 0 | 8 | 6 | 0 | 44% | 0.0% | 15.3% |
| 3.6 | 0.8 | 4 | 0 | 0 | 10 | 0 | 0 | 0 | 0 | 0 | 6 | 0 | 44% | 0.0% | 22.3% |
| 3.4 | 1.6 | 4 | 0 | 0 | 6 | 0 | 0 | 0 | 0 | 8 | 6 | 0 | 44% | 0.0% | 16.9% |
| 3.4 | 1.6 | 4 | 0 | 0 | 6 | 0 | 0 | 0 | 0 | 6 | 6 | 0 | 44% | 0.0% | 17.5% |
| 3 | 0.4 | 0 | 0 | 0 | 10 | 0 | 0 | 0 | 0 | 0 | 6 | 0 | 44% | 0.0% | 13.3% |
| 2.8 | 0.5 | 0 | 0 | 0 | 12 | 0 | 0 | 0 | 0 | 0 | 6 | 0 | 45% | 0.0% | 15.6% |
| 3.4 | 0.5 | 8 | 0 | 0 | 12 | 0 | 0 | 0 | 0 | 0 | 6 | 0 | 45% | 0.0% | 26.3% |
| 3 | 0.4 | 0 | 0 | 0 | 8 | 0 | 0 | 0 | 0 | 0 | 6 | 0 | 45% | 0.0% | 10.4% |
| 3.4 | 1.4 | 8 | 0 | 0 | 4 | 0 | 0 | 0 | 0 | 4 | 6 | 0 | 45% | 0.0% | 24.1% |
| 3.4 | 0.5 | 8 | 0 | 0 | 10 | 0 | 0 | 0 | 0 | 0 | 6 | 0 | 45% | 0.0% | 25.9% |
| 3.6 | 0.8 | 8 | 0 | 0 | 8 | 0 | 0 | 0 | 0 | 0 | 6 | 0 | 45% | 0.0% | 30.1% |
| 3.4 | 0.2 | 12 | 0 | 0 | 14 | 0 | 0 | 0 | 0 | 0 | 6 | 0 | 45% | 0.0% | 29.8% |
| 3.4 | 0.5 | 8 | 0 | 0 | 8 | 0 | 0 | 0 | 0 | 0 | 6 | 0 | 45% | 0.0% | 25.5% |
| 3.4 | 0.3 | 8 | 0 | 0 | 10 | 0 | 0 | 0 | 0 | 0 | 6 | 0 | 45% | 0.0% | 26.7% |
| 3.4 | 0.8 | 4 | 0 | 0 | 8 | 0 | 0 | 0 | 0 | 4 | 6 | 0 | 45% | 0.0% | 17.8% |
| 3.4 | 0.4 | 4 | 0 | 0 | 12 | 0 | 0 | 0 | 0 | 0 | 6 | 0 | 45% | 0.0% | 18.4% |
| 3.4 | 0.1 | 4 | 0 | 0 | 14 | 0 | 0 | 0 | 0 | 0 | 6 | 0 | 45% | 0.0% | 21.8% |
| 3.4 | 0.3 | 4 | 0 | 0 | 12 | 0 | 0 | 0 | 0 | 0 | 6 | 0 | 45% | 0.0% | 18.8% |
| 3.4 | 0.2 | 8 | 0 | 0 | 8 | 0 | 0 | 0 | 0 | 0 | 6 | 0 | 46% | 0.0% | 26.6% |
| 3.4 | 0.5 | 8 | 0 | 0 | 6 | 0 | 0 | 0 | 0 | 0 | 6 | 0 | 46% | 0.0% | 25.2% |
| 3.4 | 0.1 | 8 | 0 | 0 | 8 | 0 | 0 | 0 | 0 | 0 | 6 | 0 | 46% | 0.0% | 27.0% |
| 3.4 | 0.1 | 0 | 0 | 0 | 12 | 0 | 0 | 0 | 0 | 0 | 6 | 0 | 46% | 0.0% | 17.5% |
| 3.4 | 0.3 | 8 | 0 | 0 | 6 | 0 | 0 | 0 | 0 | 0 | 6 | 0 | 46% | 0.0% | 26.0% |
| 3.4 | 0 | 4 | 0 | 0 | 12 | 0 | 0 | 0 | 0 | 0 | 6 | 0 | 46% | 0.0% | 19.8% |
| 3.6 | 0.8 | 8 | 0 | 0 | 4 | 0 | 0 | 0 | 0 | 0 | 6 | 0 | 46% | 0.0% | 29.0% |
| 3.4 | 0.3 | 4 | 0 | 0 | 8 | 0 | 0 | 0 | 0 | 0 | 6 | 0 | 46% | 0.0% | 17.3% |
| 3.8 | 0.8 | 4 | 0 | 0 | 6 | 0 | 0 | 0 | 0 | 0 | 6 | 0 | 46% | 0.0% | 27.4% |
| 3.4 | 0.2 | 0 | 0 | 0 | 8 | 0 | 0 | 0 | 0 | 0 | 6 | 0 | 46% | 0.0% | 12.6% |
| 3.4 | 0.1 | 0 | 0 | 0 | 8 | 0 | 0 | 0 | 0 | 0 | 6 | 0 | 46% | 0.0% | 12.7% |
| 3.4 | 0 | 4 | 0 | 0 | 8 | 0 | 0 | 0 | 0 | 0 | 6 | 0 | 47% | 0.0% | 18.2% |
| 2.6 | 2.2 | 0 | 0 | 0 | 10 | 0 | 0 | 0 | 0 | 6 | 6 | 0 | 47% | 0.0% | 14.2% |
| 3.4 | 0.1 | 4 | 0 | 0 | 6 | 0 | 0 | 0 | 0 | 0 | 6 | 0 | 47% | 0.0% | 17.4% |
| 3.6 | 0.5 | 8 | 0 | 0 | 14 | 0 | 0 | 0 | 0 | 0 | 6 | 0 | 47% | 4.0% | 24.8% |
| 3.6 | 0.4 | 8 | 0 | 0 | 14 | 0 | 0 | 0 | 0 | 0 | 6 | 0 | 47% | 3.4% | 25.9% |
| 2.4 | 2.4 | 0 | 0 | 0 | 8 | 0 | 0 | 0 | 0 | 6 | 6 | 0 | 47% | 0.0% | 11.1% |
| 3.4 | 0.3 | 0 | 0 | 0 | 8 | 0 | 0 | 0 | 0 | 0 | 6 | 0 | 47% | 0.0% | 12.4% |
| 3.2 | 0.4 | 0 | 0 | 0 | 10 | 0 | 0 | 0 | 0 | 0 | 6 | 0 | 47% | 0.0% | 13.6% |
| 3.6 | 0.2 | 8 | 0 | 0 | 12 | 0 | 0 | 0 | 0 | 0 | 6 | 0 | 48% | 0.0% | 30.1% |
| 3.6 | 0.3 | 4 | 0 | 0 | 14 | 0 | 0 | 0 | 0 | 0 | 6 | 0 | 48% | 0.0% | 22.1% |
| 3.8 | 0.8 | 8 | 0 | 0 | 6 | 0 | 0 | 0 | 0 | 0 | 6 | 0 | 48% | 0.0% | 32.3% |
| 3.6 | 0.4 | 8 | 0 | 0 | 8 | 0 | 0 | 0 | 0 | 0 | 6 | 0 | 48% | 0.0% | 28.5% |
| 3.6 | 0.5 | 4 | 0 | 0 | 10 | 0 | 0 | 0 | 0 | 0 | 6 | 0 | 48% | 0.0% | 23.5% |
| 4 | 0.8 | 4 | 0 | 0 | 10 | 0 | 0 | 0 | 0 | 0 | 6 | 0 | 48% | 0.0% | 30.7% |
| 4 | 0.8 | 4 | 0 | 0 | 14 | 0 | 0 | 0 | 0 | 0 | 6 | 0 | 48% | 0.0% | 28.5% |
| 3.6 | 0 | 0 | 0 | 0 | 14 | 0 | 0 | 0 | 0 | 0 | 6 | 0 | 48% | 0.0% | 20.9% |
| 3.6 | 0 | 4 | 0 | 0 | 14 | 0 | 0 | 0 | 0 | 0 | 6 | 0 | 48% | 0.0% | 23.1% |
| 3.6 | 0.1 | 8 | 0 | 0 | 8 | 0 | 0 | 0 | 0 | 0 | 6 | 0 | 48% | 0.0% | 29.6% |
| 3.8 | 0.8 | 8 | 0 | 0 | 4 | 0 | 0 | 0 | 0 | 0 | 6 | 0 | 48% | 0.0% | 31.4% |
| 3.6 | 0.2 | 4 | 0 | 0 | 10 | 0 | 0 | 0 | 0 | 0 | 6 | 0 | 49% | 0.0% | 20.7% |
| 3.6 | 0.2 | 8 | 0 | 0 | 6 | 0 | 0 | 0 | 0 | 0 | 6 | 0 | 49% | 0.0% | 28.9% |
| 3.8 | 0.6 | 4 | 0 | 0 | 12 | 0 | 0 | 0 | 0 | 0 | 6 | 0 | 49% | 0.0% | 26.2% |
| 3.6 | 0.2 | 4 | 0 | 0 | 8 | 0 | 0 | 0 | 0 | 0 | 6 | 0 | 49% | 0.0% | 20.0% |
| 3.6 | 0 | 8 | 0 | 0 | 6 | 0 | 0 | 0 | 0 | 0 | 6 | 0 | 49% | 0.0% | 29.6% |
| 3.8 | 0.6 | 8 | 0 | 0 | 10 | 0 | 0 | 0 | 0 | 0 | 6 | 0 | 49% | 0.0% | 33.7% |
| 3.6 | 0.2 | 8 | 0 | 0 | 4 | 0 | 0 | 0 | 0 | 0 | 6 | 0 | 49% | 0.0% | 27.6% |
| 3.6 | 0.1 | 8 | 0 | 0 | 4 | 0 | 0 | 0 | 0 | 0 | 6 | 0 | 49% | 0.0% | 28.0% |
| 3.8 | 0.5 | 8 | 0 | 0 | 12 | 0 | 0 | 0 | 0 | 0 | 6 | 0 | 50% | 0.0% | 31.5% |
| 3.8 | 0.4 | 8 | 0 | 0 | 12 | 0 | 0 | 0 | 0 | 0 | 6 | 0 | 50% | 0.0% | 31.9% |
| 3.8 | 0.5 | 8 | 0 | 0 | 10 | 0 | 0 | 0 | 0 | 0 | 6 | 0 | 50% | 0.0% | 31.1% |
| 4.2 | 0.8 | 4 | 0 | 0 | 12 | 0 | 0 | 0 | 0 | 0 | 6 | 0 | 50% | 0.0% | 33.7% |
| 4.2 | 0.8 | 4 | 0 | 0 | 6 | 0 | 0 | 0 | 0 | 0 | 6 | 0 | 50% | 0.0% | 32.5% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.8 | 0.1 | 12 | 0 | 0 | 14 | 0 | 0 | 0 | 0 | 0 | 6 | 0 | 50% | 0.6% | 35.3% |
| 3.8 | 0 | 8 | 0 | 0 | 14 | 0 | 0 | 0 | 0 | 0 | 6 | 0 | 50% | 0.0% | 30.9% |
| 3.8 | 0.5 | 8 | 0 | 0 | 8 | 0 | 0 | 0 | 0 | 0 | 6 | 0 | 50% | 0.0% | 30.7% |
| 3.8 | 0.4 | 4 | 0 | 0 | 12 | 0 | 0 | 0 | 0 | 0 | 6 | 0 | 50% | 0.0% | 27.0% |
| 3.8 | 0.2 | 4 | 0 | 0 | 14 | 0 | 0 | 0 | 0 | 0 | 6 | 0 | 50% | 0.0% | 24.9% |
| 3.2 | 0.5 | 0 | 0 | 0 | 12 | 0 | 0 | 0 | 0 | 0 | 6 | 0 | 51% | 0.0% | 16.3% |
| 3.4 | 0.4 | 0 | 0 | 0 | 8 | 0 | 0 | 0 | 0 | 0 | 6 | 0 | 51% | 0.0% | 12.3% |
| 4 | 0.6 | 4 | 0 | 0 | 14 | 0 | 0 | 0 | 0 | 0 | 6 | 0 | 51% | 0.0% | 29.4% |
| 3.8 | 0 | 12 | 0 | 0 | 8 | 0 | 0 | 0 | 0 | 0 | 6 | 0 | 51% | 0.0% | 35.3% |
| 4 | 0.6 | 4 | 0 | 0 | 10 | 0 | 0 | 0 | 0 | 0 | 6 | 0 | 51% | 0.0% | 28.0% |
| 3.8 | 0.1 | 0 | 0 | 0 | 12 | 0 | 0 | 0 | 0 | 0 | 6 | 0 | 51% | 0.0% | 19.2% |
| 4 | 0.6 | 8 | 0 | 0 | 12 | 0 | 0 | 0 | 0 | 0 | 6 | 0 | 51% | 0.1% | 36.4% |
| 3.8 | 0 | 0 | 0 | 0 | 12 | 0 | 0 | 0 | 0 | 0 | 6 | 0 | 51% | 0.0% | 19.3% |
| 4 | 0.6 | 4 | 0 | 0 | 4 | 0 | 0 | 0 | 0 | 0 | 6 | 0 | 51% | 0.0% | 26.9% |
| 3.8 | 0.2 | 4 | 0 | 0 | 8 | 0 | 0 | 0 | 0 | 0 | 6 | 0 | 51% | 0.0% | 22.5% |
| 3.8 | 0 | 0 | 0 | 0 | 10 | 0 | 0 | 0 | 0 | 0 | 6 | 0 | 51% | 0.0% | 16.3% |
| 3.8 | 0 | 8 | 0 | 0 | 6 | 0 | 0 | 0 | 0 | 0 | 6 | 0 | 52% | 0.0% | 32.2% |
| 3.8 | 0 | 0 | 0 | 0 | 8 | 0 | 0 | 0 | 0 | 0 | 6 | 0 | 52% | 0.0% | 13.2% |
| 4 | 0.6 | 8 | 0 | 0 | 8 | 0 | 0 | 0 | 0 | 0 | 6 | 0 | 52% | 0.0% | 35.9% |
| 4 | 0.4 | 8 | 0 | 0 | 14 | 0 | 0 | 0 | 0 | 0 | 6 | 0 | 52% | 0.0% | 35.0% |
| 4 | 0.5 | 4 | 0 | 0 | 14 | 0 | 0 | 0 | 0 | 0 | 6 | 0 | 52% | 0.0% | 29.8% |
| 4 | 0.5 | 4 | 0 | 0 | 12 | 0 | 0 | 0 | 0 | 0 | 6 | 0 | 52% | 0.0% | 29.0% |
| 3.8 | 0 | 4 | 0 | 0 | 4 | 0 | 0 | 0 | 0 | 0 | 6 | 0 | 52% | 0.0% | 22.4% |
| 3.8 | 0.3 | 0 | 0 | 0 | 14 | 0 | 0 | 0 | 0 | 0 | 6 | 0 | 52% | 0.0% | 21.8% |
| 4 | 0.5 | 4 | 0 | 0 | 6 | 0 | 0 | 0 | 0 | 0 | 6 | 0 | 53% | 0.0% | 27.4% |
| 4 | 0.1 | 12 | 0 | 0 | 12 | 0 | 0 | 0 | 0 | 0 | 6 | 0 | 53% | 0.0% | 38.3% |
| 4 | 0.5 | 4 | 0 | 0 | 4 | 0 | 0 | 0 | 0 | 0 | 6 | 0 | 53% | 0.0% | 27.3% |
| 4.4 | 0.8 | 8 | 0 | 0 | 14 | 0 | 0 | 0 | 0 | 0 | 6 | 0 | 53% | 0.0% | 41.2% |
| 4 | 0.5 | 8 | 0 | 0 | 8 | 0 | 0 | 0 | 0 | 0 | 6 | 0 | 53% | 0.0% | 36.3% |
| 4 | 0.2 | 8 | 0 | 0 | 10 | 0 | 0 | 0 | 0 | 0 | 6 | 0 | 53% | 0.0% | 34.9% |
| 4 | 0.3 | 4 | 0 | 0 | 12 | 0 | 0 | 0 | 0 | 0 | 6 | 0 | 53% | 0.0% | 29.7% |
| 4 | 0.1 | 8 | 0 | 0 | 10 | 0 | 0 | 0 | 0 | 0 | 6 | 0 | 53% | 0.0% | 35.2% |
| 4 | 0.3 | 8 | 0 | 0 | 8 | 0 | 0 | 0 | 0 | 0 | 6 | 0 | 53% | 0.0% | 34.1% |
| 3.4 | 0.5 | 0 | 0 | 0 | 14 | 0 | 0 | 0 | 0 | 0 | 6 | 0 | 53% | 0.0% | 19.5% |
| 4 | 0 | 4 | 0 | 0 | 14 | 0 | 0 | 0 | 0 | 0 | 6 | 0 | 53% | 0.0% | 28.0% |
| 4 | 0.1 | 0 | 0 | 0 | 12 | 0 | 0 | 0 | 0 | 0 | 6 | 0 | 54% | 0.0% | 19.4% |
| 4 | 0.1 | 8 | 0 | 0 | 8 | 0 | 0 | 0 | 0 | 0 | 6 | 0 | 54% | 0.0% | 34.8% |
| 3.6 | 0.4 | 0 | 0 | 0 | 6 | 0 | 0 | 0 | 0 | 0 | 6 | 0 | 54% | 0.0% | 10.6% |
| 4 | 0.1 | 0 | 0 | 0 | 10 | 0 | 0 | 0 | 0 | 0 | 6 | 0 | 54% | 0.0% | 17.3% |
| 4 | 0 | 4 | 0 | 0 | 10 | 0 | 0 | 0 | 0 | 0 | 6 | 0 | 54% | 0.0% | 26.3% |
| 3.4 | 0.5 | 0 | 0 | 0 | 6 | 0 | 0 | 0 | 0 | 0 | 6 | 0 | 54% | 0.0% | 10.3% |
| 4 | 0.2 | 4 | 0 | 0 | 6 | 0 | 0 | 0 | 0 | 0 | 6 | 0 | 54% | 0.0% | 28.5% |
| 4.2 | 0.5 | 4 | 0 | 0 | 12 | 0 | 0 | 0 | 0 | 0 | 6 | 0 | 54% | 0.0% | 31.5% |
| 4 | 0.1 | 4 | 0 | 0 | 6 | 0 | 0 | 0 | 0 | 0 | 6 | 0 | 54% | 0.0% | 28.8% |
| 4 | 0.2 | 4 | 0 | 0 | 4 | 0 | 0 | 0 | 0 | 0 | 6 | 0 | 54% | 0.0% | 28.3% |
| 4.2 | 0.5 | 4 | 0 | 0 | 6 | 0 | 0 | 0 | 0 | 0 | 6 | 0 | 55% | 0.0% | 30.0% |
| 4.4 | 0.8 | 8 | 0 | 0 | 4 | 0 | 0 | 0 | 0 | 0 | 6 | 0 | 55% | 0.0% | 41.9% |
| 4.2 | 0.2 | 8 | 0 | 0 | 14 | 0 | 0 | 0 | 0 | 0 | 6 | 0 | 55% | 0.0% | 38.4% |
| 4.4 | 0.6 | 4 | 0 | 0 | 8 | 0 | 0 | 0 | 0 | 0 | 6 | 0 | 55% | 0.0% | 36.2% |
| 4.2 | 0.3 | 12 | 0 | 0 | 8 | 0 | 0 | 0 | 0 | 0 | 6 | 0 | 55% | 0.0% | 42.2% |
| 4.2 | 0.3 | 12 | 0 | 0 | 6 | 0 | 0 | 0 | 0 | 0 | 6 | 0 | 55% | 4.6% | 36.3% |
| 2.6 | 2.2 | 0 | 0 | 0 | 8 | 0 | 0 | 0 | 0 | 4 | 6 | 0 | 55% | 0.0% | 11.5% |
| 4.2 | 0.5 | 8 | 0 | 0 | 8 | 0 | 0 | 0 | 0 | 0 | 6 | 0 | 55% | 0.0% | 38.8% |
| 4.2 | 0.3 | 8 | 0 | 0 | 10 | 0 | 0 | 0 | 0 | 0 | 6 | 0 | 55% | 0.0% | 37.1% |
| 4.2 | 0 | 8 | 0 | 0 | 12 | 0 | 0 | 0 | 0 | 0 | 6 | 0 | 56% | 0.0% | 38.7% |
| 4.2 | 0.4 | 4 | 0 | 0 | 10 | 0 | 0 | 0 | 0 | 0 | 6 | 0 | 56% | 0.0% | 31.3% |
| 4.2 | 0.1 | 8 | 0 | 0 | 10 | 0 | 0 | 0 | 0 | 0 | 6 | 0 | 56% | 0.0% | 37.9% |
| 3.8 | 0.4 | 0 | 0 | 0 | 14 | 0 | 0 | 0 | 0 | 0 | 6 | 0 | 56% | 0.0% | 21.6% |
| 4.2 | 0.2 | 8 | 0 | 0 | 8 | 0 | 0 | 0 | 0 | 0 | 6 | 0 | 56% | 0.0% | 37.1% |
| 4.2 | 0.4 | 8 | 0 | 0 | 6 | 0 | 0 | 0 | 0 | 0 | 6 | 0 | 56% | 0.0% | 38.9% |
| 4.2 | 0.1 | 8 | 0 | 0 | 8 | 0 | 0 | 0 | 0 | 0 | 6 | 0 | 56% | 0.0% | 37.5% |
| 3.6 | 0.5 | 0 | 0 | 0 | 14 | 0 | 0 | 0 | 0 | 0 | 6 | 0 | 56% | 0.0% | 21.2% |
| 4.2 | 0.2 | 0 | 0 | 0 | 8 | 0 | 0 | 0 | 0 | 0 | 6 | 0 | 56% | 0.0% | 14.3% |
| 4.2 | 0.4 | 8 | 0 | 0 | 4 | 0 | 0 | 0 | 0 | 0 | 6 | 0 | 56% | 0.0% | 37.8% |
| 4.2 | 0.1 | 0 | 0 | 0 | 8 | 0 | 0 | 0 | 0 | 0 | 6 | 0 | 57% | 0.0% | 14.5% |
| 4.2 | 0.2 | 0 | 0 | 0 | 6 | 0 | 0 | 0 | 0 | 0 | 6 | 0 | 57% | 0.0% | 14.3% |
| 4.4 | 0.6 | 8 | 0 | 0 | 6 | 0 | 0 | 0 | 0 | 0 | 6 | 0 | 57% | 0.0% | 40.7% |
| 4.2 | 0 | 4 | 0 | 0 | 6 | 0 | 0 | 0 | 0 | 0 | 6 | 0 | 57% | 0.0% | 27.8% |
| 3.4 | 0.6 | 0 | 0 | 0 | 10 | 0 | 0 | 0 | 0 | 0 | 6 | 0 | 57% | 0.0% | 14.9% |
| 4.2 | 0 | 8 | 0 | 0 | 4 | 0 | 0 | 0 | 0 | 0 | 6 | 0 | 57% | 0.0% | 35.8% |
| 3.2 | 0.8 | 0 | 0 | 0 | 12 | 0 | 0 | 0 | 0 | 0 | 6 | 0 | 57% | 0.0% | 17.1% |
| 4.4 | 0.4 | 8 | 0 | 0 | 8 | 0 | 0 | 0 | 0 | 0 | 6 | 0 | 58% | 0.0% | 41.8% |
| 4.2 | 0.3 | 0 | 0 | 0 | 10 | 0 | 0 | 0 | 0 | 0 | 6 | 0 | 59% | 0.0% | 17.3% |
| 4 | 0.4 | 0 | 0 | 0 | 10 | 0 | 0 | 0 | 0 | 0 | 6 | 0 | 59% | 0.0% | 16.9% |
| 4 | 0.4 | 0 | 0 | 0 | 6 | 0 | 0 | 0 | 0 | 0 | 6 | 0 | 59% | 0.0% | 10.9% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.8 | 0.5 | 0 | 0 | 0 | 6 | 0 | 0 | 0 | 0 | 0 | 6 | 0 | 60% | 0.0% | 12.1% |
| 3.4 | 0.8 | 0 | 0 | 0 | 12 | 0 | 0 | 0 | 0 | 0 | 6 | 0 | 61% | 0.0% | 17.4% |
| 4.2 | 0.4 | 0 | 0 | 0 | 6 | 0 | 0 | 0 | 0 | 0 | 6 | 0 | 62% | 0.0% | 13.4% |
| 4 | 0.5 | 0 | 0 | 0 | 6 | 0 | 0 | 0 | 0 | 0 | 6 | 0 | 63% | 0.0% | 16.5% |
| 3.8 | 0.6 | 0 | 0 | 0 | 6 | 0 | 0 | 0 | 0 | 0 | 6 | 0 | 63% | 0.0% | 11.7% |
| 4.4 | 0.4 | 0 | 0 | 0 | 10 | 0 | 0 | 0 | 0 | 0 | 6 | 0 | 65% | 0.0% | 23.7% |
| 4.2 | 0.5 | 0 | 0 | 0 | 10 | 0 | 0 | 0 | 0 | 0 | 6 | 0 | 65% | 0.0% | 18.8% |
| 4 | 0.6 | 0 | 0 | 0 | 12 | 0 | 0 | 0 | 0 | 0 | 6 | 0 | 65% | 0.0% | 19.6% |
| 3.6 | 0.8 | 0 | 0 | 0 | 10 | 0 | 0 | 0 | 0 | 0 | 6 | 0 | 66% | 0.0% | 16.0% |
| 4.2 | 0.6 | 0 | 0 | 0 | 4 | 0 | 0 | 0 | 0 | 0 | 6 | 0 | 68% | 0.0% | 21.9% |
| 3.8 | 0.8 | 0 | 0 | 0 | 8 | 0 | 0 | 0 | 0 | 0 | 6 | 0 | 69% | 0.0% | 14.2% |
| 4.4 | 0.6 | 0 | 0 | 0 | 10 | 0 | 0 | 0 | 0 | 0 | 6 | 0 | 71% | 0.0% | 22.8% |
| 4 | 0.8 | 0 | 0 | 0 | 12 | 0 | 0 | 0 | 0 | 0 | 6 | 0 | 72% | 0.0% | 20.3% |
| 4.2 | 0.8 | 0 | 0 | 0 | 10 | 0 | 0 | 0 | 0 | 0 | 6 | 0 | 75% | 0.0% | 17.6% |
| 4.4 | 0.8 | 0 | 0 | 0 | 12 | 0 | 0 | 0 | 0 | 0 | 6 | 0 | 77% | 0.0% | 20.9% |
| 2.8 | 0.25 | 4 | 0 | 0 | 12.5 | 0 | 0 | 0 | 4.5 | 0 | 5 | 0 | 32% | 0.0% | 12.5% |
| 2.8 | 0.25 | 8 | 0 | 0 | 12.5 | 0 | 0 | 0 | 4.5 | 0 | 5 | 0 | 33% | 0.0% | 12.8% |
| 2.8 | 0.25 | 16 | 0 | 0 | 12.5 | 0 | 0 | 0 | 4.5 | 0 | 5 | 0 | 34% | 0.0% | 21.3% |
| 2.8 | 0.75 | 0 | 0 | 0 | 12.5 | 0 | 0 | 0 | 4.5 | 0 | 5 | 0 | 34% | 0.0% | 13.3% |
| 2.8 | 0.25 | 16 | 0 | 0 | 7.5 | 0 | 0 | 0 | 4.5 | 0 | 5 | 0 | 35% | 4.9% | 11.4% |
| 2.8 | 0.75 | 8 | 0 | 0 | 12.5 | 0 | 0 | 0 | 4.5 | 0 | 5 | 0 | 35% | 0.0% | 14.6% |
| 2.8 | 0.5 | 16 | 0 | 0 | 10 | 0 | 0 | 0 | 4.5 | 0 | 5 | 0 | 36% | 1.5% | 18.1% |
| 2.8 | 1.25 | 0 | 0 | 0 | 12.5 | 0 | 0 | 0 | 4.5 | 0 | 5 | 0 | 36% | 0.0% | 13.7% |
| 2.8 | 1 | 8 | 0 | 0 | 12.5 | 0 | 0 | 0 | 4.5 | 0 | 5 | 0 | 36% | 0.0% | 15.1% |
| 2.8 | 1.25 | 20 | 0 | 0 | 12.5 | 0 | 0 | 0 | 4.5 | 0 | 5 | 0 | 36% | 3.9% | 21.9% |
| 2.8 | 1.25 | 0 | 0 | 0 | 10 | 0 | 0 | 0 | 4.5 | 0 | 5 | 0 | 36% | 0.0% | 10.3% |
| 2.8 | 1 | 4 | 0 | 0 | 10 | 0 | 0 | 0 | 4.5 | 0 | 5 | 0 | 36% | 0.0% | 11.1% |
| 2.8 | 0.75 | 16 | 0 | 0 | 10 | 0 | 0 | 0 | 4.5 | 0 | 5 | 0 | 37% | 3.4% | 18.1% |
| 3.2 | 0.25 | 4 | 0 | 0 | 10 | 0 | 0 | 0 | 4.5 | 0 | 5 | 0 | 37% | 0.0% | 12.7% |
| 4.4 | 2 | 8 | 0 | 0 | 12.5 | 0 | 0 | 0 | 4.5 | 0 | 5 | 0 | 38% | 0.8% | 14.6% |
| 3.2 | 2 | 12 | 0 | 0 | 12.5 | 0 | 0 | 0 | 4.5 | 0 | 5 | 0 | 40% | 0.0% | 11.3% |
| 3.2 | 1.75 | 24 | 0 | 0 | 10 | 0 | 0 | 0 | 4.5 | 0 | 5 | 0 | 41% | 2.2% | 10.0% |
| 4.4 | 1.25 | 8 | 0 | 0 | 10 | 0 | 0 | 0 | 4.5 | 0 | 5 | 0 | 42% | 2.8% | 11.0% |
| 4.4 | 0 | 16 | 0 | 0 | 10 | 0 | 0 | 0 | 4.5 | 0 | 5 | 0 | 44% | 0.0% | 18.7% |
| 4.4 | 0.25 | 12 | 0 | 0 | 7.5 | 0 | 0 | 0 | 4.5 | 0 | 5 | 0 | 45% | 2.7% | 14.5% |
| 4.4 | 0.75 | 8 | 0 | 0 | 12.5 | 0 | 0 | 0 | 4.5 | 0 | 5 | 0 | 46% | 0.0% | 13.8% |
| 4.4 | 0.5 | 12 | 0 | 0 | 7.5 | 0 | 0 | 0 | 4.5 | 0 | 5 | 0 | 46% | 4.2% | 12.2% |
| 4.4 | 0.5 | 12 | 0 | 0 | 12.5 | 0 | 0 | 0 | 4.5 | 0 | 5 | 0 | 47% | 2.1% | 14.7% |
| 4.8 | 0 | 12 | 0 | 0 | 12.5 | 0 | 0 | 0 | 4.5 | 0 | 5 | 0 | 48% | 0.0% | 21.5% |
| 4.8 | 0 | 12 | 0 | 0 | 7.5 | 0 | 0 | 0 | 4.5 | 0 | 5 | 0 | 48% | 0.0% | 20.9% |
| 4.4 | 0.5 | 20 | 0 | 0 | 12.5 | 0 | 0 | 0 | 4.5 | 0 | 5 | 0 | 49% | 0.0% | 21.3% |
| 4 | 1.5 | 16 | 0 | 0 | 12.5 | 0 | 0 | 0 | 4.5 | 0 | 5 | 0 | 50% | 3.5% | 10.6% |
| 4 | 1.25 | 20 | 0 | 0 | 12.5 | 0 | 0 | 0 | 4.5 | 0 | 5 | 0 | 50% | 1.0% | 15.5% |
| 4.8 | 0.25 | 24 | 0 | 0 | 12.5 | 0 | 0 | 0 | 4.5 | 0 | 5 | 0 | 51% | 2.7% | 25.8% |
| 4.8 | 0.5 | 24 | 0 | 0 | 12.5 | 0 | 0 | 0 | 4.5 | 0 | 5 | 0 | 54% | 4.6% | 23.4% |
| 4.8 | 1.75 | 8 | 0 | 0 | 10 | 0 | 0 | 0 | 4.5 | 0 | 5 | 0 | 58% | 0.0% | 46.7% |
| 5.2 | 2 | 12 | 0 | 0 | 5 | 0 | 0 | 0 | 4.5 | 0 | 5 | 0 | 60% | 4.5% | 51.0% |
| 5.2 | 0.25 | 8 | 0 | 0 | 12.5 | 0 | 0 | 0 | 4.5 | 0 | 5 | 0 | 61% | 4.6% | 32.1% |
| 5.6 | 2 | 8 | 0 | 0 | 12.5 | 0 | 0 | 0 | 4.5 | 0 | 5 | 0 | 62% | 0.0% | 58.2% |
| 5.6 | 2 | 12 | 0 | 0 | 5 | 0 | 0 | 0 | 4.5 | 0 | 5 | 0 | 64% | 0.0% | 60.4% |
| 5.2 | 1.25 | 12 | 0 | 0 | 7.5 | 0 | 0 | 0 | 4.5 | 0 | 5 | 0 | 65% | 0.0% | 54.3% |
| 5.2 | 1.25 | 8 | 0 | 0 | 10 | 0 | 0 | 0 | 4.5 | 0 | 5 | 0 | 65% | 0.0% | 49.3% |
| 5.6 | 1.75 | 12 | 0 | 0 | 7.5 | 0 | 0 | 0 | 4.5 | 0 | 5 | 0 | 66% | 0.0% | 60.6% |
| 5.6 | 0.5 | 8 | 0 | 0 | 12.5 | 0 | 0 | 0 | 4.5 | 0 | 5 | 0 | 67% | 0.0% | 47.2% |
| 5.6 | 0.75 | 12 | 0 | 0 | 7.5 | 0 | 0 | 0 | 4.5 | 0 | 5 | 0 | 68% | 0.0% | 55.8% |
| 5.6 | 1.25 | 12 | 0 | 0 | 7.5 | 0 | 0 | 0 | 4.5 | 0 | 5 | 0 | 69% | 0.0% | 59.5% |
| 5.6 | 1 | 12 | 0 | 0 | 7.5 | 0 | 0 | 0 | 4.5 | 0 | 5 | 0 | 69% | 0.0% | 58.5% |
| 3.2 | 2 | 8 | 0 | 0 | 10 | 0 | 0 | 0 | 3 | 0 | 5 | 0 | 31% | 0.0% | 10.1% |
| 2.8 | 0 | 4 | 0 | 0 | 10 | 0 | 0 | 0 | 3 | 0 | 5 | 0 | 33% | 0.0% | 10.9% |
| 2.8 | 0 | 8 | 0 | 0 | 10 | 0 | 0 | 0 | 3 | 0 | 5 | 0 | 34% | 0.0% | 11.2% |
| 2.8 | 0 | 20 | 0 | 0 | 12.5 | 0 | 0 | 0 | 3 | 0 | 5 | 0 | 35% | 0.0% | 22.0% |
| 2.8 | 0 | 20 | 0 | 0 | 10 | 0 | 0 | 0 | 3 | 0 | 5 | 0 | 35% | 2.7% | 18.8% |
| 2.8 | 1.25 | 4 | 0 | 0 | 12.5 | 0 | 0 | 0 | 3 | 0 | 5 | 0 | 36% | 0.0% | 14.4% |
| 2.8 | 1.5 | 24 | 0 | 0 | 12.5 | 0 | 0 | 0 | 3 | 0 | 5 | 0 | 36% | 0.0% | 14.0% |
| 2.8 | 1.25 | 8 | 0 | 0 | 10 | 0 | 0 | 0 | 3 | 0 | 5 | 0 | 36% | 3.0% | 11.0% |
| 3.2 | 0.25 | 20 | 0 | 0 | 12.5 | 0 | 0 | 0 | 3 | 0 | 5 | 0 | 36% | 0.0% | 12.5% |
| 2.8 | 0.5 | 8 | 0 | 0 | 7.5 | 0 | 0 | 0 | 3 | 0 | 5 | 0 | 36% | 0.0% | 11.1% |
| 2.8 | 1 | 0 | 0 | 0 | 10 | 0 | 0 | 0 | 3 | 0 | 5 | 0 | 37% | 0.0% | 10.3% |
| 2.8 | 1.25 | 8 | 0 | 0 | 5 | 0 | 0 | 0 | 3 | 0 | 5 | 0 | 37% | 0.0% | 17.8% |
| 2.8 | 0.75 | 8 | 0 | 0 | 7.5 | 0 | 0 | 0 | 3 | 0 | 5 | 0 | 37% | 0.0% | 12.6% |
| 2.8 | 0.5 | 12 | 0 | 0 | 7.5 | 0 | 0 | 0 | 3 | 0 | 5 | 0 | 37% | 4.4% | 12.6% |
| 3.2 | 0.75 | 8 | 0 | 0 | 12.5 | 0 | 0 | 0 | 3 | 0 | 5 | 0 | 38% | 0.0% | 11.0% |
| 2.8 | 0.5 | 24 | 0 | 0 | 12.5 | 0 | 0 | 0 | 3 | 0 | 5 | 0 | 38% | 1.1% | 25.0% |
| 3.2 | 0 | 8 | 0 | 0 | 12.5 | 0 | 0 | 0 | 3 | 0 | 5 | 0 | 39% | 0.4% | 15.9% |
| 3.2 | 0.25 | 4 | 0 | 0 | 12.5 | 0 | 0 | 0 | 3 | 0 | 5 | 0 | 39% | 0.0% | 15.1% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 3.2 | 0.5 | 20 | 0 | 0 | 10 | 0 | 0 | 0 | 3 | 0 | 5 | 0 | 40% | 0.0% | 14.0% |
| 3.2 | 2 | 12 | 0 | 0 | 12.5 | 0 | 0 | 0 | 3 | 0 | 5 | 0 | 40% | 0.0% | 12.5% |
| 3.2 | 1.75 | 20 | 0 | 0 | 12.5 | 0 | 0 | 0 | 3 | 0 | 5 | 0 | 40% | 2.1% | 11.8% |
| 3.2 | 1.25 | 12 | 0 | 0 | 12.5 | 0 | 0 | 0 | 3 | 0 | 5 | 0 | 41% | 0.0% | 11.7% |
| 3.2 | 0.75 | 16 | 0 | 0 | 10 | 0 | 0 | 0 | 3 | 0 | 5 | 0 | 41% | 0.0% | 11.8% |
| 3.2 | 1 | 20 | 0 | 0 | 12.5 | 0 | 0 | 0 | 3 | 0 | 5 | 0 | 41% | 0.0% | 15.3% |
| 3.2 | 0.75 | 24 | 0 | 0 | 12.5 | 0 | 0 | 0 | 3 | 0 | 5 | 0 | 42% | 0.0% | 15.1% |
| 2.8 | 1.5 | 0 | 0 | 0 | 12.5 | 0 | 0 | 0 | 3 | 0 | 5 | 0 | 48% | 0.0% | 15.2% |
| 2.8 | 1.5 | 0 | 0 | 0 | 10 | 0 | 0 | 0 | 3 | 0 | 5 | 0 | 50% | 0.0% | 11.8% |
| 4.8 | 0 | 12 | 0 | 0 | 10 | 0 | 0 | 0 | 3 | 0 | 5 | 0 | 53% | 1.7% | 28.1% |
| 5.2 | 1.75 | 8 | 0 | 0 | 12.5 | 0 | 0 | 0 | 3 | 0 | 5 | 0 | 58% | 0.0% | 53.0% |
| 5.2 | 1.5 | 12 | 0 | 0 | 7.5 | 0 | 0 | 0 | 3 | 0 | 5 | 0 | 61% | 3.3% | 51.6% |
| 5.2 | 0.25 | 8 | 0 | 0 | 12.5 | 0 | 0 | 0 | 3 | 0 | 5 | 0 | 64% | 0.0% | 43.6% |
| 5.2 | 1 | 12 | 0 | 0 | 7.5 | 0 | 0 | 0 | 3 | 0 | 5 | 0 | 65% | 0.0% | 54.3% |
| 5.6 | 0 | 8 | 0 | 0 | 12.5 | 0 | 0 | 0 | 3 | 0 | 5 | 0 | 67% | 0.0% | 46.0% |
| 5.6 | 0.25 | 8 | 0 | 0 | 12.5 | 0 | 0 | 0 | 3 | 0 | 5 | 0 | 69% | 0.0% | 48.5% |
| 5.6 | 1 | 8 | 0 | 0 | 12.5 | 0 | 0 | 0 | 3 | 0 | 5 | 0 | 70% | 0.0% | 55.3% |
| 3.2 | 1.5 | 8 | 0 | 0 | 2.5 | 0 | 0 | 0 | 1.5 | 0 | 5 | 0 | 31% | 4.4% | 11.2% |
| 2.8 | 1.75 | 8 | 0 | 0 | 12.5 | 0 | 0 | 0 | 1.5 | 0 | 5 | 0 | 33% | 0.0% | 14.4% |
| 3.2 | 1 | 4 | 0 | 0 | 12.5 | 0 | 0 | 0 | 1.5 | 0 | 5 | 0 | 34% | 0.0% | 15.6% |
| 2.8 | 1.75 | 12 | 0 | 0 | 12.5 | 0 | 0 | 0 | 1.5 | 0 | 5 | 0 | 35% | 2.9% | 13.4% |
| 2.8 | 0 | 8 | 0 | 0 | 10 | 0 | 0 | 0 | 1.5 | 0 | 5 | 0 | 36% | 0.5% | 13.6% |
| 2.8 | 1 | 4 | 0 | 0 | 12.5 | 0 | 0 | 0 | 1.5 | 0 | 5 | 0 | 36% | 0.0% | 14.3% |
| 2.8 | 0.25 | 0 | 0 | 0 | 12.5 | 0 | 0 | 0 | 1.5 | 0 | 5 | 0 | 36% | 0.0% | 12.6% |
| 2.8 | 0.75 | 16 | 0 | 0 | 12.5 | 0 | 0 | 0 | 1.5 | 0 | 5 | 0 | 37% | 4.8% | 18.3% |
| 2.8 | 0.5 | 0 | 0 | 0 | 12.5 | 0 | 0 | 0 | 1.5 | 0 | 5 | 0 | 37% | 0.0% | 14.1% |
| 2.8 | 0.75 | 24 | 0 | 0 | 12.5 | 0 | 0 | 0 | 1.5 | 0 | 5 | 0 | 37% | 4.5% | 22.4% |
| 2.8 | 0.25 | 8 | 0 | 0 | 10 | 0 | 0 | 0 | 1.5 | 0 | 5 | 0 | 37% | 1.8% | 11.9% |
| 2.8 | 0.8 | 10 | 0 | 0 | 6.5 | 0 | 0 | 0 | 1.5 | 0 | 5 | 0 | 37% | 1.1% | 14.9% |
| 2.8 | 0 | 20 | 0 | 0 | 10 | 0 | 0 | 0 | 1.5 | 0 | 5 | 0 | 37% | 4.0% | 21.0% |
| 2.8 | 0.25 | 20 | 0 | 0 | 12.5 | 0 | 0 | 0 | 1.5 | 0 | 5 | 0 | 37% | 1.2% | 23.6% |
| 3.2 | 0.75 | 8 | 0 | 0 | 5 | 0 | 0 | 0 | 1.5 | 0 | 5 | 0 | 38% | 0.0% | 12.7% |
| 3.2 | 0.5 | 8 | 0 | 0 | 10 | 0 | 0 | 0 | 1.5 | 0 | 5 | 0 | 38% | 1.8% | 12.1% |
| 2.8 | 0.75 | 0 | 0 | 0 | 12.5 | 0 | 0 | 0 | 1.5 | 0 | 5 | 0 | 40% | 0.0% | 13.8% |
| 3.2 | 0 | 4 | 0 | 0 | 10 | 0 | 0 | 0 | 1.5 | 0 | 5 | 0 | 41% | 0.0% | 13.3% |
| 3.2 | 0.75 | 12 | 0 | 0 | 12.5 | 0 | 0 | 0 | 1.5 | 0 | 5 | 0 | 42% | 4.5% | 13.4% |
| 3.2 | 0.25 | 4 | 0 | 0 | 12.5 | 0 | 0 | 0 | 1.5 | 0 | 5 | 0 | 42% | 0.0% | 16.4% |
| 3.2 | 0.25 | 8 | 0 | 0 | 7.5 | 0 | 0 | 0 | 1.5 | 0 | 5 | 0 | 42% | 0.0% | 18.3% |
| 3.2 | 0.5 | 0 | 0 | 0 | 12.5 | 0 | 0 | 0 | 1.5 | 0 | 5 | 0 | 43% | 0.0% | 12.8% |
| 2.8 | 1 | 0 | 0 | 0 | 12.5 | 0 | 0 | 0 | 1.5 | 0 | 5 | 0 | 46% | 0.0% | 13.5% |
| 4.4 | 0 | 12 | 0 | 0 | 12.5 | 0 | 0 | 0 | 1.5 | 0 | 5 | 0 | 53% | 4.8% | 28.8% |
| 4.8 | 1.25 | 8 | 0 | 0 | 12.5 | 0 | 0 | 0 | 1.5 | 0 | 5 | 0 | 56% | 0.0% | 46.4% |
| 5.2 | 1.25 | 8 | 0 | 0 | 12.5 | 0 | 0 | 0 | 1.5 | 0 | 5 | 0 | 60% | 0.0% | 53.8% |
| 5.2 | 0.75 | 8 | 0 | 0 | 12.5 | 0 | 0 | 0 | 1.5 | 0 | 5 | 0 | 66% | 0.0% | 49.6% |
| 5.6 | 0.25 | 12 | 0 | 0 | 10 | 0 | 0 | 0 | 1.5 | 0 | 5 | 0 | 70% | 1.0% | 57.1% |
| 2.8 | 0.8 | 11 | 0 | 0 | 6.5 | 0 | 0 | 0 | 1 | 0 | 5 | 0 | 37% | 4.0% | 13.1% |
| 2.8 | 1.25 | 4 | 0 | 0 | 7.5 | 0 | 0 | 0 | 0 | 0 | 5 | 0 | 31% | 0.0% | 13.7% |
| 2.8 | 1.5 | 8 | 0 | 0 | 12.5 | 0 | 0 | 0 | 0 | 0 | 5 | 0 | 32% | 2.6% | 15.5% |
| 2.8 | 1 | 4 | 0 | 0 | 5 | 0 | 0 | 0 | 0 | 0 | 5 | 0 | 34% | 0.0% | 10.2% |
| 3.2 | 1.25 | 4 | 0 | 0 | 7.5 | 0 | 0 | 0 | 0 | 0 | 5 | 0 | 35% | 0.0% | 18.2% |
| 2.8 | 0.75 | 4 | 0 | 0 | 12.5 | 0 | 0 | 0 | 0 | 0 | 5 | 0 | 35% | 0.0% | 15.5% |
| 2.8 | 0.5 | 4 | 0 | 0 | 12.5 | 0 | 0 | 0 | 0 | 0 | 5 | 0 | 37% | 0.0% | 16.1% |
| 2.8 | 0.75 | 8 | 0 | 0 | 5 | 0 | 0 | 0 | 0 | 0 | 5 | 0 | 37% | 0.0% | 15.5% |
| 2.8 | 0.5 | 24 | 0 | 0 | 12.5 | 0 | 0 | 0 | 0 | 0 | 5 | 0 | 37% | 4.9% | 23.2% |
| 3.2 | 1 | 4 | 0 | 0 | 12.5 | 0 | 0 | 0 | 0 | 0 | 5 | 0 | 37% | 0.0% | 17.8% |
| 3.2 | 1 | 4 | 0 | 0 | 10 | 0 | 0 | 0 | 0 | 0 | 5 | 0 | 38% | 0.0% | 16.2% |
| 2.8 | 0.25 | 8 | 0 | 0 | 7.5 | 0 | 0 | 0 | 0 | 0 | 5 | 0 | 38% | 0.0% | 17.7% |
| 2.8 | 0 | 24 | 0 | 0 | 12.5 | 0 | 0 | 0 | 0 | 0 | 5 | 0 | 38% | 0.0% | 27.5% |
| 2.8 | 0 | 12 | 0 | 0 | 5 | 0 | 0 | 0 | 0 | 0 | 5 | 0 | 38% | 4.9% | 14.2% |
| 3.2 | 1 | 8 | 0 | 0 | 2.5 | 0 | 0 | 0 | 0 | 0 | 5 | 0 | 40% | 2.5% | 18.9% |
| 3.2 | 0.75 | 8 | 0 | 0 | 5 | 0 | 0 | 0 | 0 | 0 | 5 | 0 | 41% | 0.0% | 24.2% |
| 3.2 | 0.25 | 0 | 0 | 0 | 12.5 | 0 | 0 | 0 | 0 | 0 | 5 | 0 | 43% | 0.0% | 16.7% |
| 3.2 | 0 | 16 | 0 | 0 | 12.5 | 0 | 0 | 0 | 0 | 0 | 5 | 0 | 43% | 2.0% | 28.1% |
| 3.2 | 0.5 | 8 | 0 | 0 | 5 | 0 | 0 | 0 | 0 | 0 | 5 | 0 | 43% | 0.0% | 21.4% |
| 3.2 | 0 | 12 | 0 | 0 | 7.5 | 0 | 0 | 0 | 0 | 0 | 5 | 0 | 43% | 0.0% | 26.0% |
| 3.2 | 0 | 8 | 0 | 0 | 5 | 0 | 0 | 0 | 0 | 0 | 5 | 0 | 44% | 0.0% | 19.2% |
| 2.8 | 0.5 | 0 | 0 | 0 | 12.5 | 0 | 0 | 0 | 0 | 0 | 5 | 0 | 44% | 0.0% | 15.4% |
| 3.6 | 0 | 0 | 0 | 0 | 7.5 | 0 | 0 | 0 | 0 | 0 | 5 | 0 | 49% | 0.0% | 11.4% |
| 2.8 | 1.25 | 0 | 0 | 0 | 12.5 | 0 | 0 | 0 | 0 | 0 | 5 | 0 | 55% | 0.0% | 15.3% |
| 5.6 | 2 | 8 | 0 | 0 | 12.5 | 0 | 0 | 0 | 0 | 0 | 5 | 0 | 60% | 0.0% | 59.6% |
| 3.2 | 1 | 0 | 0 | 0 | 7.5 | 0 | 0 | 0 | 0 | 0 | 5 | 0 | 64% | 0.0% | 10.8% |
| 2.8 | 1.75 | 0 | 0 | 0 | 7.5 | 0 | 0 | 0 | 0 | 0 | 5 | 0 | 68% | 0.0% | 10.5% |
| 3.2 | 1.75 | 0 | 0 | 0 | 12.5 | 0 | 0 | 0 | 0 | 0 | 5 | 0 | 71% | 0.0% | 17.8% |
| 2.79 | 1.1 | 13.2 | 0 | 0 | 15.6 | 0 | 0 | 0 | 3.42 | 0 | 4.47 | 0 | 36% | 3.4% | 17.7% |
| 2.8 | 0 | 8 | 0 | 0 | 12.5 | 0 | 0 | 0 | 4.5 | 0 | 0 | 0 | 31% | 0.0% | 10.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 2.8 | 0.5 | 8 | 0 | 0 | 12.5 | 0 | 0 | 0 | 4.5 | 0 | 0 | 0 | 33% | 0.0% | 10.8% |
| 2.8 | 0.75 | 8 | 0 | 0 | 12.5 | 0 | 0 | 0 | 4.5 | 0 | 0 | 0 | 35% | 0.0% | 11.4% |
| 2.8 | 1.25 | 4 | 0 | 0 | 12.5 | 0 | 0 | 0 | 4.5 | 0 | 0 | 0 | 35% | 0.0% | 10.8% |
| 2.8 | 1 | 4 | 0 | 0 | 12.5 | 0 | 0 | 0 | 4.5 | 0 | 0 | 0 | 36% | 0.0% | 10.7% |
| 4.4 | 0 | 12 | 0 | 0 | 12.5 | 0 | 0 | 0 | 4.5 | 0 | 0 | 0 | 43% | 2.9% | 11.0% |
| 2.8 | 0 | 8 | 0 | 0 | 12.5 | 0 | 0 | 0 | 3 | 0 | 0 | 0 | 33% | 0.0% | 11.4% |
| 2.8 | 0.25 | 8 | 0 | 0 | 12.5 | 0 | 0 | 0 | 3 | 0 | 0 | 0 | 34% | 0.0% | 11.1% |
| 2.8 | 1.25 | 8 | 0 | 0 | 12.5 | 0 | 0 | 0 | 3 | 0 | 0 | 0 | 35% | 1.7% | 11.3% |
| 2.8 | 1 | 8 | 0 | 0 | 12.5 | 0 | 0 | 0 | 3 | 0 | 0 | 0 | 36% | 1.4% | 11.5% |
| 2.8 | 0.75 | 4 | 0 | 0 | 12.5 | 0 | 0 | 0 | 3 | 0 | 0 | 0 | 36% | 0.0% | 10.7% |
| 3.2 | 0 | 8 | 0 | 0 | 12.5 | 0 | 0 | 0 | 3 | 0 | 0 | 0 | 38% | 1.5% | 12.4% |
| 3.2 | 0.25 | 8 | 0 | 0 | 12.5 | 0 | 0 | 0 | 3 | 0 | 0 | 0 | 39% | 2.0% | 12.0% |
| 2.8 | 1.5 | 8 | 0 | 0 | 12.5 | 0 | 0 | 0 | 1.5 | 0 | 0 | 0 | 31% | 0.0% | 10.4% |
| 2.8 | 2 | 12 | 0 | 0 | 12.5 | 0 | 0 | 0 | 1.5 | 0 | 0 | 0 | 33% | 4.8% | 10.0% |
| 2.8 | 0 | 4 | 0 | 0 | 12.5 | 0 | 0 | 0 | 1.5 | 0 | 0 | 0 | 34% | 0.0% | 10.2% |
| 3.2 | 0.75 | 4 | 0 | 0 | 12.5 | 0 | 0 | 0 | 1.5 | 0 | 0 | 0 | 35% | 0.0% | 11.0% |
| 2.8 | 1 | 4 | 0 | 0 | 12.5 | 0 | 0 | 0 | 1.5 | 0 | 0 | 0 | 36% | 0.0% | 12.6% |
| 2.8 | 0.75 | 4 | 0 | 0 | 12.5 | 0 | 0 | 0 | 1.5 | 0 | 0 | 0 | 36% | 0.0% | 10.7% |
| 3.2 | 1 | 8 | 0 | 0 | 12.5 | 0 | 0 | 0 | 1.5 | 0 | 0 | 0 | 36% | 3.1% | 12.1% |
| 3.2 | 0.5 | 8 | 0 | 0 | 12.5 | 0 | 0 | 0 | 1.5 | 0 | 0 | 0 | 37% | 1.0% | 12.1% |
| 3.2 | 0.25 | 8 | 0 | 0 | 12.5 | 0 | 0 | 0 | 1.5 | 0 | 0 | 0 | 41% | 4.2% | 12.8% |
| 3.2 | 0.25 | 4 | 0 | 0 | 10 | 0 | 0 | 0 | 1.5 | 0 | 0 | 0 | 42% | 0.0% | 10.5% |
| 3.2 | 0.75 | 0 | 0 | 0 | 12.5 | 0 | 0 | 0 | 1.5 | 0 | 0 | 0 | 48% | 0.0% | 10.1% |
| 3.2 | 1.25 | 0 | 0 | 0 | 12.5 | 0 | 0 | 0 | 1.5 | 0 | 0 | 0 | 54% | 0.0% | 10.7% |
| 2.8 | 1.5 | 8 | 0 | 0 | 12.5 | 0 | 0 | 0 | 0 | 0 | 0 | 0 | 31% | 4.1% | 11.9% |
| 3.2 | 1.25 | 4 | 0 | 0 | 7.5 | 0 | 0 | 0 | 0 | 0 | 0 | 0 | 34% | 0.0% | 14.7% |
| 2.8 | 0.5 | 8 | 0 | 0 | 12.5 | 0 | 0 | 0 | 0 | 0 | 0 | 0 | 36% | 3.0% | 12.6% |
| 3.2 | 1 | 4 | 0 | 0 | 12.5 | 0 | 0 | 0 | 0 | 0 | 0 | 0 | 37% | 0.0% | 13.8% |
| 2.8 | 0 | 0 | 0 | 0 | 12.5 | 0 | 0 | 0 | 0 | 0 | 0 | 0 | 37% | 0.0% | 10.6% |
| 3.2 | 0.75 | 4 | 0 | 0 | 5 | 0 | 0 | 0 | 0 | 0 | 0 | 0 | 40% | 0.0% | 11.0% |
| 3.2 | 0.25 | 0 | 0 | 0 | 12.5 | 0 | 0 | 0 | 0 | 0 | 0 | 0 | 42% | 0.0% | 12.3% |
| 3.2 | 0 | 0 | 0 | 0 | 12.5 | 0 | 0 | 0 | 0 | 0 | 0 | 0 | 42% | 0.0% | 12.8% |
| 3.2 | 0.5 | 4 | 0 | 0 | 5 | 0 | 0 | 0 | 0 | 0 | 0 | 0 | 43% | 0.0% | 11.7% |
| 3.6 | 0 | 4 | 0 | 0 | 0 | 0 | 0 | 0 | 0 | 0 | 0 | 0 | 48% | 0.0% | 12.7% |
| 4 | 1.35 | 6 | 0 | 0 | 16 | 5.5 | 0 | 0 | 0 | 0 | 0 | 0 | 49% | 3.7% | 27.5% |
| 3.9 | 1.35 | 6 | 0 | 0 | 15 | 6.5 | 0 | 0 | 0 | 0 | 0 | 0 | 50% | 3.4% | 27.2% |
| 4 | 1.3 | 6 | 0 | 0 | 16 | 5.5 | 0 | 0 | 0 | 0 | 0 | 0 | 50% | 3.7% | 27.7% |
| 3.9 | 1.35 | 6 | 0 | 0 | 15 | 7 | 0 | 0 | 0 | 0 | 0 | 0 | 50% | 3.4% | 27.7% |
| 3.2 | 0.5 | 0 | 0 | 0 | 12.5 | 0 | 0 | 0 | 0 | 0 | 0 | 0 | 50% | 0.0% | 13.2% |
| 4 | 1.35 | 6 | 0 | 0 | 15.5 | 6 | 0 | 0 | 0 | 0 | 0 | 0 | 50% | 1.8% | 30.1% |
| 3.9 | 1.3 | 6 | 0 | 0 | 14.5 | 7 | 0 | 0 | 0 | 0 | 0 | 0 | 50% | 1.6% | 29.8% |
| 4 | 1.4 | 6 | 0 | 0 | 15.5 | 6.5 | 0 | 0 | 0 | 0 | 0 | 0 | 50% | 1.7% | 30.5% |
| 4 | 1.4 | 6 | 0 | 0 | 15 | 6.5 | 0 | 0 | 0 | 0 | 0 | 0 | 50% | 0.0% | 32.4% |
| 3.9 | 1.1 | 6 | 0 | 0 | 15 | 7 | 0 | 0 | 0 | 0 | 0 | 0 | 50% | 3.6% | 28.1% |
| 3.9 | 1 | 6 | 0 | 0 | 15.5 | 7 | 0 | 0 | 0 | 0 | 0 | 0 | 50% | 3.1% | 25.8% |
| 3.9 | 1 | 6 | 0 | 0 | 15 | 7 | 0 | 0 | 0 | 0 | 0 | 0 | 50% | 1.1% | 28.1% |
| 4 | 1.3 | 6 | 0 | 0 | 16 | 6 | 0 | 0 | 0 | 0 | 0 | 0 | 50% | 3.6% | 28.2% |
| 4 | 1.3 | 6 | 0 | 0 | 15.5 | 6 | 0 | 0 | 0 | 0 | 0 | 0 | 51% | 1.8% | 30.2% |
| 4 | 1.35 | 6 | 0 | 0 | 15.5 | 6.5 | 0 | 0 | 0 | 0 | 0 | 0 | 51% | 1.7% | 30.6% |
| 4 | 1.35 | 6.5 | 0 | 0 | 14.5 | 6.5 | 0 | 0 | 0 | 0 | 0 | 0 | 51% | 4.4% | 28.0% |
| 4.2 | 1.4 | 6.5 | 0 | 0 | 15.5 | 5.5 | 0 | 0 | 0 | 0 | 0 | 0 | 51% | 1.3% | 33.4% |
| 4.1 | 1.3 | 6 | 0 | 0 | 16 | 5.5 | 0 | 0 | 0 | 0 | 0 | 0 | 51% | 0.3% | 33.1% |
| 4 | 1.4 | 6 | 0 | 0 | 15 | 7 | 0 | 0 | 0 | 0 | 0 | 0 | 51% | 0.0% | 32.8% |
| 4 | 1.35 | 6 | 0 | 0 | 16 | 7 | 0 | 0 | 0 | 0 | 0 | 0 | 51% | 3.5% | 29.0% |
| 4.1 | 1.35 | 6.5 | 0 | 0 | 15.5 | 6 | 0 | 0 | 0 | 0 | 0 | 0 | 51% | 4.6% | 28.8% |
| 4 | 1.25 | 6 | 0 | 0 | 16 | 6.5 | 0 | 0 | 0 | 0 | 0 | 0 | 51% | 3.6% | 28.8% |
| 4 | 1.3 | 6 | 0 | 0 | 15.5 | 6.5 | 0 | 0 | 0 | 0 | 0 | 0 | 51% | 1.8% | 30.7% |
| 4 | 1.2 | 6 | 0 | 0 | 16 | 6.5 | 0 | 0 | 0 | 0 | 0 | 0 | 51% | 3.7% | 28.9% |
| 4 | 1.2 | 6 | 0 | 0 | 15.5 | 6 | 0 | 0 | 0 | 0 | 0 | 0 | 51% | 1.9% | 30.5% |
| 4 | 1.25 | 6 | 0 | 0 | 15.5 | 6.5 | 0 | 0 | 0 | 0 | 0 | 0 | 51% | 1.8% | 30.9% |
| 4 | 1.3 | 6 | 0 | 0 | 15 | 6.5 | 0 | 0 | 0 | 0 | 0 | 0 | 51% | 0.0% | 32.7% |
| 4.3 | 1.4 | 6.5 | 0 | 0 | 16 | 5 | 0 | 0 | 0 | 0 | 0 | 0 | 51% | 2.5% | 35.9% |
| 4 | 1.15 | 6 | 0 | 0 | 16 | 6.5 | 0 | 0 | 0 | 0 | 0 | 0 | 51% | 3.7% | 29.0% |
| 4 | 1.2 | 6 | 0 | 0 | 16 | 7 | 0 | 0 | 0 | 0 | 0 | 0 | 51% | 3.6% | 29.4% |
| 4 | 1.25 | 6 | 0 | 0 | 15 | 6.5 | 0 | 0 | 0 | 0 | 0 | 0 | 51% | 0.0% | 32.9% |
| 4 | 1.35 | 6.5 | 0 | 0 | 14 | 7 | 0 | 0 | 0 | 0 | 0 | 0 | 51% | 2.6% | 30.5% |
| 4.1 | 1.4 | 6.5 | 0 | 0 | 15 | 6.5 | 0 | 0 | 0 | 0 | 0 | 0 | 51% | 2.8% | 31.2% |
| 4 | 1.2 | 6.5 | 0 | 0 | 14.5 | 6.5 | 0 | 0 | 0 | 0 | 0 | 0 | 51% | 4.6% | 28.3% |
| 4 | 1.3 | 6.5 | 0 | 0 | 14 | 7 | 0 | 0 | 0 | 0 | 0 | 0 | 51% | 2.6% | 30.6% |
| 4 | 1.25 | 6 | 0 | 0 | 15 | 7 | 0 | 0 | 0 | 0 | 0 | 0 | 51% | 0.0% | 33.3% |
| 4 | 1 | 6 | 0 | 0 | 16 | 6 | 0 | 0 | 0 | 0 | 0 | 0 | 51% | 3.9% | 28.9% |
| 4 | 1.2 | 6.5 | 0 | 0 | 14.5 | 7 | 0 | 0 | 0 | 0 | 0 | 0 | 51% | 4.5% | 28.8% |
| 4.1 | 1.4 | 6 | 0 | 0 | 15 | 6.5 | 0 | 0 | 0 | 0 | 0 | 0 | 51% | 0.0% | 33.6% |
| 4 | 1.15 | 6 | 0 | 0 | 15.5 | 7 | 0 | 0 | 0 | 0 | 0 | 0 | 51% | 1.8% | 31.5% |
| 4 | 1 | 6 | 0 | 0 | 16 | 6.5 | 0 | 0 | 0 | 0 | 0 | 0 | 51% | 1.2% | 29.2% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4 | 1.05 | 6 | 0 | 0 | 15.5 | 6.5 | 0 | 0 | 0 | 0 | 0 | 0 | 51% | 2.0% | 31.3% |
| 4.2 | 1.35 | 6.5 | 0 | 0 | 15.5 | 5.5 | 0 | 0 | 0 | 0 | 0 | 0 | 51% | 1.3% | 33.6% |
| 4.2 | 1.4 | 6.5 | 0 | 0 | 16 | 6 | 0 | 0 | 0 | 0 | 0 | 0 | 51% | 3.0% | 32.0% |
| 4 | 1.05 | 6.5 | 0 | 0 | 15 | 7 | 0 | 0 | 0 | 0 | 0 | 0 | 51% | 3.9% | 26.9% |
| 4 | 1.1 | 6.5 | 0 | 0 | 14.5 | 7 | 0 | 0 | 0 | 0 | 0 | 0 | 51% | 4.6% | 29.0% |
| 4 | 1.05 | 6 | 0 | 0 | 15.5 | 7 | 0 | 0 | 0 | 0 | 0 | 0 | 51% | 0.0% | 30.8% |
| 4.4 | 1.4 | 7 | 0 | 0 | 15.5 | 4.5 | 0 | 0 | 0 | 0 | 0 | 0 | 51% | 3.8% | 35.9% |
| 4 | 1 | 6.5 | 0 | 0 | 15 | 7 | 0 | 0 | 0 | 0 | 0 | 0 | 52% | 4.0% | 26.9% |
| 4.1 | 1.3 | 6.5 | 0 | 0 | 15.5 | 6 | 0 | 0 | 0 | 0 | 0 | 0 | 52% | 4.7% | 29.0% |
| 4.2 | 1.4 | 7 | 0 | 0 | 14.5 | 6 | 0 | 0 | 0 | 0 | 0 | 0 | 52% | 3.9% | 31.4% |
| 4 | 1 | 6.5 | 0 | 0 | 14.5 | 7 | 0 | 0 | 0 | 0 | 0 | 0 | 52% | 2.0% | 29.2% |
| 4.1 | 1.3 | 6 | 0 | 0 | 15.5 | 6 | 0 | 0 | 0 | 0 | 0 | 0 | 52% | 0.0% | 33.7% |
| 4.3 | 1.35 | 6.5 | 0 | 0 | 16 | 5 | 0 | 0 | 0 | 0 | 0 | 0 | 52% | 0.0% | 36.1% |
| 4.1 | 1.35 | 6.5 | 0 | 0 | 15 | 6.5 | 0 | 0 | 0 | 0 | 0 | 0 | 52% | 2.8% | 31.4% |
| 4.5 | 1.4 | 7 | 0 | 0 | 16 | 4 | 0 | 0 | 0 | 0 | 0 | 0 | 52% | 2.4% | 38.4% |
| 4.1 | 1.4 | 6 | 0 | 0 | 16 | 7 | 0 | 0 | 0 | 0 | 0 | 0 | 52% | 0.0% | 34.3% |
| 4.2 | 1.3 | 6.5 | 0 | 0 | 16 | 5.5 | 0 | 0 | 0 | 0 | 0 | 0 | 52% | 3.1% | 31.8% |
| 4.3 | 1.4 | 6.5 | 0 | 0 | 15.5 | 5.5 | 0 | 0 | 0 | 0 | 0 | 0 | 52% | 0.0% | 36.3% |
| 4.2 | 1.3 | 6.5 | 0 | 0 | 15.5 | 5.5 | 0 | 0 | 0 | 0 | 0 | 0 | 52% | 1.3% | 33.8% |
| 4.1 | 1.4 | 6.5 | 0 | 0 | 14.5 | 7 | 0 | 0 | 0 | 0 | 0 | 0 | 52% | 0.9% | 33.8% |
| 4.1 | 1.2 | 6 | 0 | 0 | 16 | 5.5 | 0 | 0 | 0 | 0 | 0 | 0 | 52% | 0.3% | 33.4% |
| 4.2 | 1.35 | 6.5 | 0 | 0 | 15.5 | 6 | 0 | 0 | 0 | 0 | 0 | 0 | 52% | 1.2% | 34.2% |
| 4.1 | 1.4 | 6 | 0 | 0 | 14.5 | 7 | 0 | 0 | 0 | 0 | 0 | 0 | 52% | 0.0% | 33.9% |
| 4.1 | 1.3 | 6.5 | 0 | 0 | 15.5 | 6.5 | 0 | 0 | 0 | 0 | 0 | 0 | 52% | 4.6% | 29.5% |
| 4.1 | 1.25 | 6 | 0 | 0 | 16 | 6 | 0 | 0 | 0 | 0 | 0 | 0 | 52% | 0.2% | 33.8% |
| 4.2 | 1.35 | 7 | 0 | 0 | 14.5 | 6 | 0 | 0 | 0 | 0 | 0 | 0 | 52% | 3.9% | 31.6% |
| 4.2 | 1.35 | 6.5 | 0 | 0 | 15 | 6 | 0 | 0 | 0 | 0 | 0 | 0 | 52% | 0.0% | 35.5% |
| 4.1 | 1.3 | 6.5 | 0 | 0 | 15.5 | 7 | 0 | 0 | 0 | 0 | 0 | 0 | 52% | 4.6% | 30.0% |
| 4.4 | 1.4 | 7 | 0 | 0 | 15.5 | 5 | 0 | 0 | 0 | 0 | 0 | 0 | 52% | 3.7% | 36.4% |
| 4.1 | 1.2 | 6 | 0 | 0 | 16 | 6 | 0 | 0 | 0 | 0 | 0 | 0 | 52% | 0.2% | 33.9% |
| 4.1 | 1.35 | 6.5 | 0 | 0 | 15 | 7 | 0 | 0 | 0 | 0 | 0 | 0 | 52% | 2.7% | 31.9% |
| 4.1 | 1.3 | 6 | 0 | 0 | 16 | 7 | 0 | 0 | 0 | 0 | 0 | 0 | 52% | 0.0% | 34.7% |
| 4.1 | 1.1 | 6.5 | 0 | 0 | 15.5 | 5.5 | 0 | 0 | 0 | 0 | 0 | 0 | 52% | 4.9% | 29.0% |
| 4.1 | 1.2 | 6.5 | 0 | 0 | 15.5 | 6.5 | 0 | 0 | 0 | 0 | 0 | 0 | 52% | 4.7% | 29.7% |
| 4.1 | 1.2 | 6.5 | 0 | 0 | 15 | 6 | 0 | 0 | 0 | 0 | 0 | 0 | 52% | 2.9% | 31.3% |
| 4.2 | 1.4 | 7 | 0 | 0 | 14.5 | 6.5 | 0 | 0 | 0 | 0 | 0 | 0 | 52% | 3.8% | 31.9% |
| 4.1 | 1.15 | 6 | 0 | 0 | 16 | 6 | 0 | 0 | 0 | 0 | 0 | 0 | 52% | 0.2% | 34.1% |
| 4.1 | 1.25 | 6 | 0 | 0 | 16 | 7 | 0 | 0 | 0 | 0 | 0 | 0 | 52% | 0.1% | 34.8% |
| 4.1 | 1.35 | 6.5 | 0 | 0 | 14.5 | 7 | 0 | 0 | 0 | 0 | 0 | 0 | 52% | 0.9% | 33.9% |
| 4.2 | 1.4 | 6 | 0 | 0 | 15.5 | 6.5 | 0 | 0 | 0 | 0 | 0 | 0 | 52% | 0.0% | 35.0% |
| 4.1 | 1.3 | 6 | 0 | 0 | 15.5 | 7 | 0 | 0 | 0 | 0 | 0 | 0 | 52% | 0.0% | 34.5% |
| 4.1 | 1.1 | 6.5 | 0 | 0 | 15.5 | 6 | 0 | 0 | 0 | 0 | 0 | 0 | 52% | 4.8% | 29.5% |
| 4.1 | 1.2 | 6.5 | 0 | 0 | 15.5 | 7 | 0 | 0 | 0 | 0 | 0 | 0 | 52% | 4.6% | 30.2% |
| 4.1 | 1.25 | 6.5 | 0 | 0 | 15 | 7 | 0 | 0 | 0 | 0 | 0 | 0 | 52% | 2.8% | 32.1% |
| 4.1 | 1.3 | 6.5 | 0 | 0 | 14.5 | 7 | 0 | 0 | 0 | 0 | 0 | 0 | 52% | 0.9% | 34.1% |
| 4.1 | 1.15 | 6 | 0 | 0 | 16 | 6.5 | 0 | 0 | 0 | 0 | 0 | 0 | 52% | 0.2% | 34.6% |
| 4.1 | 1.25 | 6 | 0 | 0 | 15.5 | 7 | 0 | 0 | 0 | 0 | 0 | 0 | 52% | 0.0% | 34.7% |
| 4.1 | 1.35 | 6.5 | 0 | 0 | 14 | 7 | 0 | 0 | 0 | 0 | 0 | 0 | 52% | 0.0% | 34.9% |
| 4.1 | 1.25 | 6 | 0 | 0 | 15 | 6.5 | 0 | 0 | 0 | 0 | 0 | 0 | 52% | 0.0% | 34.2% |
| 4.1 | 1.35 | 6 | 0 | 0 | 14.5 | 7 | 0 | 0 | 0 | 0 | 0 | 0 | 52% | 0.0% | 34.1% |
| 4.1 | 1.3 | 7 | 0 | 0 | 13.5 | 7 | 0 | 0 | 0 | 0 | 0 | 0 | 52% | 3.6% | 31.4% |
| 4.1 | 1.15 | 6.5 | 0 | 0 | 15 | 6.5 | 0 | 0 | 0 | 0 | 0 | 0 | 52% | 2.9% | 31.9% |
| 4.2 | 1.25 | 6.5 | 0 | 0 | 16 | 5.5 | 0 | 0 | 0 | 0 | 0 | 0 | 52% | 3.1% | 32.0% |
| 4.1 | 1.1 | 6 | 0 | 0 | 15.5 | 6 | 0 | 0 | 0 | 0 | 0 | 0 | 52% | 0.0% | 34.4% |
| 4.1 | 1.15 | 6 | 0 | 0 | 16 | 7 | 0 | 0 | 0 | 0 | 0 | 0 | 52% | 0.1% | 35.0% |
| 4.1 | 1.2 | 6 | 0 | 0 | 15.5 | 7 | 0 | 0 | 0 | 0 | 0 | 0 | 52% | 0.0% | 34.9% |
| 4.1 | 1.2 | 6 | 0 | 0 | 15 | 6.5 | 0 | 0 | 0 | 0 | 0 | 0 | 52% | 0.0% | 34.3% |
| 4.1 | 1 | 6.5 | 0 | 0 | 16 | 6 | 0 | 0 | 0 | 0 | 0 | 0 | 52% | 4.1% | 28.0% |
| 4.1 | 1.05 | 6.5 | 0 | 0 | 16 | 7 | 0 | 0 | 0 | 0 | 0 | 0 | 52% | 4.0% | 28.4% |
| 4.3 | 1.4 | 7 | 0 | 0 | 15.5 | 6 | 0 | 0 | 0 | 0 | 0 | 0 | 52% | 4.1% | 32.7% |
| 4.3 | 1.4 | 6.5 | 0 | 0 | 16 | 6 | 0 | 0 | 0 | 0 | 0 | 0 | 53% | 0.0% | 36.8% |
| 4.1 | 1.2 | 6.5 | 0 | 0 | 14.5 | 7 | 0 | 0 | 0 | 0 | 0 | 0 | 53% | 1.0% | 34.3% |
| 4.1 | 1.05 | 6 | 0 | 0 | 16 | 6.5 | 0 | 0 | 0 | 0 | 0 | 0 | 53% | 0.2% | 34.8% |
| 4.1 | 1.15 | 6 | 0 | 0 | 15 | 6.5 | 0 | 0 | 0 | 0 | 0 | 0 | 53% | 0.0% | 34.5% |
| 4.2 | 1.25 | 6 | 0 | 0 | 16 | 5.5 | 0 | 0 | 0 | 0 | 0 | 0 | 53% | 0.0% | 34.8% |
| 4.5 | 1.4 | 7 | 0 | 0 | 15.5 | 4.5 | 0 | 0 | 0 | 0 | 0 | 0 | 53% | 0.8% | 40.7% |
| 4.5 | 1.4 | 6.5 | 0 | 0 | 16 | 4.5 | 0 | 0 | 0 | 0 | 0 | 0 | 53% | 0.0% | 40.9% |
| 4.1 | 1.2 | 7 | 0 | 0 | 13.5 | 7 | 0 | 0 | 0 | 0 | 0 | 0 | 53% | 3.7% | 31.7% |
| 4.3 | 1.4 | 6.5 | 0 | 0 | 15.5 | 6 | 0 | 0 | 0 | 0 | 0 | 0 | 53% | 0.0% | 36.7% |
| 4.3 | 1.4 | 6 | 0 | 0 | 16 | 6 | 0 | 0 | 0 | 0 | 0 | 0 | 53% | 0.0% | 36.0% |
| 4.1 | 1 | 6 | 0 | 0 | 16 | 6.5 | 0 | 0 | 0 | 0 | 0 | 0 | 53% | 0.0% | 31.9% |
| 4.1 | 1.2 | 6.5 | 0 | 0 | 14 | 7 | 0 | 0 | 0 | 0 | 0 | 0 | 53% | 0.0% | 35.4% |
| 4.1 | 1.2 | 6 | 0 | 0 | 14.5 | 7 | 0 | 0 | 0 | 0 | 0 | 0 | 53% | 0.0% | 34.6% |
| 4.1 | 1.05 | 7 | 0 | 0 | 14.5 | 7 | 0 | 0 | 0 | 0 | 0 | 0 | 53% | 4.8% | 27.9% |
| 4.1 | 1.15 | 7 | 0 | 0 | 13.5 | 7 | 0 | 0 | 0 | 0 | 0 | 0 | 53% | 3.7% | 31.8% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.3 | 1.4 | 6.5 | 0 | 0 | 15 | 6 | 0 | 0 | 0 | 0 | 0 | 0 | 53% | 0.0% | 36.6% |
| 4.1 | 1.05 | 6.5 | 0 | 0 | 15 | 7 | 0 | 0 | 0 | 0 | 0 | 0 | 53% | 0.0% | 32.9% |
| 4.2 | 1.35 | 6.5 | 0 | 0 | 16 | 6.5 | 0 | 0 | 0 | 0 | 0 | 0 | 53% | 2.9% | 32.7% |
| 4.1 | 1.15 | 6.5 | 0 | 0 | 14 | 7 | 0 | 0 | 0 | 0 | 0 | 0 | 53% | 0.0% | 35.5% |
| 4.1 | 1.1 | 6 | 0 | 0 | 15 | 7 | 0 | 0 | 0 | 0 | 0 | 0 | 53% | 0.0% | 35.0% |
| 4.1 | 1.05 | 7 | 0 | 0 | 14 | 7 | 0 | 0 | 0 | 0 | 0 | 0 | 53% | 2.8% | 30.2% |
| 4.1 | 1 | 6.5 | 0 | 0 | 15 | 7 | 0 | 0 | 0 | 0 | 0 | 0 | 53% | 0.1% | 33.0% |
| 4.1 | 1.05 | 6.5 | 0 | 0 | 14.5 | 7 | 0 | 0 | 0 | 0 | 0 | 0 | 53% | 0.0% | 32.8% |
| 4.2 | 1.35 | 6.5 | 0 | 0 | 15.5 | 6.5 | 0 | 0 | 0 | 0 | 0 | 0 | 53% | 1.1% | 34.7% |
| 4.1 | 1.05 | 6 | 0 | 0 | 15 | 7 | 0 | 0 | 0 | 0 | 0 | 0 | 53% | 0.0% | 35.2% |
| 4.1 | 1 | 7 | 0 | 0 | 14 | 7 | 0 | 0 | 0 | 0 | 0 | 0 | 53% | 2.8% | 30.3% |
| 4.3 | 1.25 | 6.5 | 0 | 0 | 16 | 5 | 0 | 0 | 0 | 0 | 0 | 0 | 53% | 0.0% | 36.5% |
| 4.6 | 1.4 | 7.5 | 0 | 0 | 15.5 | 4 | 0 | 0 | 0 | 0 | 0 | 0 | 53% | 3.6% | 38.8% |
| 4.1 | 1 | 6.5 | 0 | 0 | 14.5 | 7 | 0 | 0 | 0 | 0 | 0 | 0 | 53% | 0.0% | 32.9% |
| 4.6 | 1.4 | 7 | 0 | 0 | 16 | 4 | 0 | 0 | 0 | 0 | 0 | 0 | 53% | 0.0% | 42.4% |
| 4.2 | 1.35 | 6 | 0 | 0 | 15.5 | 6.5 | 0 | 0 | 0 | 0 | 0 | 0 | 53% | 0.0% | 35.2% |
| 4.2 | 1.4 | 6.5 | 0 | 0 | 15.5 | 7 | 0 | 0 | 0 | 0 | 0 | 0 | 53% | 1.0% | 35.1% |
| 4.3 | 1.3 | 7 | 0 | 0 | 15.5 | 5.5 | 0 | 0 | 0 | 0 | 0 | 0 | 53% | 4.2% | 32.5% |
| 4.2 | 1.35 | 6.5 | 0 | 0 | 14.5 | 6.5 | 0 | 0 | 0 | 0 | 0 | 0 | 53% | 0.0% | 35.8% |
| 4.4 | 1.4 | 7 | 0 | 0 | 15 | 5.5 | 0 | 0 | 0 | 0 | 0 | 0 | 53% | 0.0% | 38.2% |
| 4.4 | 1.4 | 6.5 | 0 | 0 | 15.5 | 5.5 | 0 | 0 | 0 | 0 | 0 | 0 | 53% | 0.0% | 40.4% |
| 4.2 | 1.4 | 6 | 0 | 0 | 15.5 | 7 | 0 | 0 | 0 | 0 | 0 | 0 | 53% | 0.0% | 35.5% |
| 4.4 | 1.4 | 7.5 | 0 | 0 | 14 | 5.5 | 0 | 0 | 0 | 0 | 0 | 0 | 53% | 1.8% | 36.7% |
| 4.3 | 1.3 | 6 | 0 | 0 | 16 | 5.5 | 0 | 0 | 0 | 0 | 0 | 0 | 53% | 0.0% | 35.9% |
| 4.3 | 1.35 | 7 | 0 | 0 | 15.5 | 6 | 0 | 0 | 0 | 0 | 0 | 0 | 53% | 4.1% | 32.9% |
| 4.3 | 1.35 | 6.5 | 0 | 0 | 16 | 6 | 0 | 0 | 0 | 0 | 0 | 0 | 53% | 0.0% | 37.0% |
| 4.4 | 1.25 | 7 | 0 | 0 | 16 | 4.5 | 0 | 0 | 0 | 0 | 0 | 0 | 53% | 2.8% | 34.9% |
| 4.2 | 1.4 | 7.5 | 0 | 0 | 13 | 7 | 0 | 0 | 0 | 0 | 0 | 0 | 53% | 4.6% | 31.9% |
| 4.2 | 1.4 | 6 | 0 | 0 | 14.5 | 7 | 0 | 0 | 0 | 0 | 0 | 0 | 53% | 0.0% | 35.2% |
| 4.2 | 1.4 | 6.5 | 0 | 0 | 14 | 7 | 0 | 0 | 0 | 0 | 0 | 0 | 53% | 0.0% | 36.0% |
| 4.3 | 1.4 | 7 | 0 | 0 | 15.5 | 6.5 | 0 | 0 | 0 | 0 | 0 | 0 | 53% | 4.0% | 33.3% |
| 4.3 | 1.4 | 6.5 | 0 | 0 | 16 | 6.5 | 0 | 0 | 0 | 0 | 0 | 0 | 53% | 0.0% | 37.3% |
| 4.2 | 1.25 | 6.5 | 0 | 0 | 15.5 | 6 | 0 | 0 | 0 | 0 | 0 | 0 | 53% | 1.3% | 34.5% |
| 4.3 | 1.35 | 6.5 | 0 | 0 | 15 | 6 | 0 | 0 | 0 | 0 | 0 | 0 | 53% | 0.0% | 36.8% |
| 4.3 | 1.35 | 6 | 0 | 0 | 15.5 | 6 | 0 | 0 | 0 | 0 | 0 | 0 | 53% | 0.0% | 36.0% |
| 4.3 | 1.4 | 7 | 0 | 0 | 15 | 6.5 | 0 | 0 | 0 | 0 | 0 | 0 | 53% | 2.2% | 35.3% |
| 4.2 | 1.15 | 6.5 | 0 | 0 | 16 | 5.5 | 0 | 0 | 0 | 0 | 0 | 0 | 53% | 3.2% | 32.3% |
| 4.2 | 1.2 | 6.5 | 0 | 0 | 16 | 6 | 0 | 0 | 0 | 0 | 0 | 0 | 53% | 3.1% | 32.6% |
| 4.2 | 1.3 | 6.5 | 0 | 0 | 15.5 | 6.5 | 0 | 0 | 0 | 0 | 0 | 0 | 53% | 1.2% | 34.9% |
| 4.5 | 1.4 | 7.5 | 0 | 0 | 14.5 | 5 | 0 | 0 | 0 | 0 | 0 | 0 | 53% | 3.3% | 38.6% |
| 4.5 | 1.4 | 7 | 0 | 0 | 15 | 5 | 0 | 0 | 0 | 0 | 0 | 0 | 53% | 0.0% | 41.9% |
| 4.3 | 1.4 | 7.5 | 0 | 0 | 14 | 6.5 | 0 | 0 | 0 | 0 | 0 | 0 | 53% | 4.9% | 32.7% |
| 4.5 | 1.4 | 6.5 | 0 | 0 | 15.5 | 5 | 0 | 0 | 0 | 0 | 0 | 0 | 53% | 0.0% | 41.2% |
| 4.2 | 1.05 | 6.5 | 0 | 0 | 16 | 5 | 0 | 0 | 0 | 0 | 0 | 0 | 53% | 3.3% | 32.1% |
| 4.2 | 1.35 | 7 | 0 | 0 | 14.5 | 7 | 0 | 0 | 0 | 0 | 0 | 0 | 53% | 3.7% | 32.6% |
| 4.2 | 1.2 | 6.5 | 0 | 0 | 15.5 | 6 | 0 | 0 | 0 | 0 | 0 | 0 | 53% | 1.3% | 34.7% |
| 4.2 | 1.2 | 6.5 | 0 | 0 | 16 | 6.5 | 0 | 0 | 0 | 0 | 0 | 0 | 53% | 3.0% | 33.1% |
| 4.2 | 1.25 | 6.5 | 0 | 0 | 15.5 | 6.5 | 0 | 0 | 0 | 0 | 0 | 0 | 53% | 1.2% | 35.0% |
| 4.2 | 1.15 | 6 | 0 | 0 | 16 | 5.5 | 0 | 0 | 0 | 0 | 0 | 0 | 53% | 0.0% | 35.2% |
| 4.2 | 1.35 | 6.5 | 0 | 0 | 15 | 7 | 0 | 0 | 0 | 0 | 0 | 0 | 53% | 0.0% | 36.4% |
| 4.6 | 1.35 | 7 | 0 | 0 | 16 | 4 | 0 | 0 | 0 | 0 | 0 | 0 | 53% | 0.0% | 42.6% |
| 4.2 | 1.3 | 6 | 0 | 0 | 16 | 7 | 0 | 0 | 0 | 0 | 0 | 0 | 53% | 0.0% | 36.0% |
| 4.3 | 1.4 | 7 | 0 | 0 | 14 | 6.5 | 0 | 0 | 0 | 0 | 0 | 0 | 53% | 0.0% | 37.6% |
| 4.2 | 1.3 | 7 | 0 | 0 | 14.5 | 7 | 0 | 0 | 0 | 0 | 0 | 0 | 53% | 3.8% | 32.8% |
| 4.3 | 1.4 | 6.5 | 0 | 0 | 14.5 | 6.5 | 0 | 0 | 0 | 0 | 0 | 0 | 53% | 0.0% | 36.9% |
| 4.2 | 1.1 | 6.5 | 0 | 0 | 16 | 6 | 0 | 0 | 0 | 0 | 0 | 0 | 53% | 3.1% | 32.9% |
| 4.2 | 1.2 | 6.5 | 0 | 0 | 16 | 7 | 0 | 0 | 0 | 0 | 0 | 0 | 53% | 2.9% | 33.6% |
| 4.2 | 1.3 | 6.5 | 0 | 0 | 14.5 | 6.5 | 0 | 0 | 0 | 0 | 0 | 0 | 53% | 0.0% | 36.0% |
| 4.2 | 1.1 | 6 | 0 | 0 | 16 | 5.5 | 0 | 0 | 0 | 0 | 0 | 0 | 54% | 0.0% | 35.4% |
| 4.2 | 1.3 | 6.5 | 0 | 0 | 15 | 7 | 0 | 0 | 0 | 0 | 0 | 0 | 54% | 0.0% | 36.6% |
| 4.2 | 1.2 | 6 | 0 | 0 | 15.5 | 6 | 0 | 0 | 0 | 0 | 0 | 0 | 54% | 0.0% | 35.3% |
| 4.2 | 1.25 | 6 | 0 | 0 | 16 | 7 | 0 | 0 | 0 | 0 | 0 | 0 | 54% | 0.0% | 36.1% |
| 4.2 | 1.3 | 6 | 0 | 0 | 15 | 6.5 | 0 | 0 | 0 | 0 | 0 | 0 | 54% | 0.0% | 35.3% |
| 4.2 | 1.15 | 7 | 0 | 0 | 14.5 | 6 | 0 | 0 | 0 | 0 | 0 | 0 | 54% | 4.0% | 32.2% |
| 4.2 | 1.35 | 6 | 0 | 0 | 15 | 7 | 0 | 0 | 0 | 0 | 0 | 0 | 54% | 0.0% | 35.5% |
| 4.4 | 1.35 | 6.5 | 0 | 0 | 15.5 | 5.5 | 0 | 0 | 0 | 0 | 0 | 0 | 54% | 0.0% | 37.7% |
| 4.2 | 1.35 | 7.5 | 0 | 0 | 13 | 7 | 0 | 0 | 0 | 0 | 0 | 0 | 54% | 4.6% | 32.0% |
| 4.2 | 1.25 | 7 | 0 | 0 | 14.5 | 7 | 0 | 0 | 0 | 0 | 0 | 0 | 54% | 3.8% | 32.9% |
| 4.2 | 1.05 | 6.5 | 0 | 0 | 15.5 | 5.5 | 0 | 0 | 0 | 0 | 0 | 0 | 54% | 1.4% | 34.6% |
| 4.2 | 1.15 | 6.5 | 0 | 0 | 16 | 7 | 0 | 0 | 0 | 0 | 0 | 0 | 54% | 3.0% | 33.8% |
| 4.2 | 1.15 | 6.5 | 0 | 0 | 15 | 6 | 0 | 0 | 0 | 0 | 0 | 0 | 54% | 0.0% | 36.2% |
| 4.2 | 1.2 | 6.5 | 0 | 0 | 15.5 | 7 | 0 | 0 | 0 | 0 | 0 | 0 | 54% | 1.1% | 35.7% |
| 4.2 | 1.3 | 6.5 | 0 | 0 | 14.5 | 7 | 0 | 0 | 0 | 0 | 0 | 0 | 54% | 0.0% | 36.4% |
| 4.2 | 1.35 | 6 | 0 | 0 | 14.5 | 7 | 0 | 0 | 0 | 0 | 0 | 0 | 54% | 0.0% | 35.4% |
| 4.2 | 1.2 | 6 | 0 | 0 | 15.5 | 6.5 | 0 | 0 | 0 | 0 | 0 | 0 | 54% | 0.0% | 35.7% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.2 | 1.35 | 6.5 | 0 | 0 | 14 | 7 | 0 | 0 | 0 | 0 | 0 | 0 | 54% | 0.0% | 36.1% |
| 4.2 | 1.25 | 6 | 0 | 0 | 15.5 | 7 | 0 | 0 | 0 | 0 | 0 | 0 | 54% | 0.0% | 36.0% |
| 4.2 | 1.3 | 6 | 0 | 0 | 15 | 7 | 0 | 0 | 0 | 0 | 0 | 0 | 54% | 0.0% | 35.7% |
| 4.2 | 1.1 | 7 | 0 | 0 | 14.5 | 6 | 0 | 0 | 0 | 0 | 0 | 0 | 54% | 4.0% | 32.3% |
| 4.3 | 1.25 | 6.5 | 0 | 0 | 15.5 | 5.5 | 0 | 0 | 0 | 0 | 0 | 0 | 54% | 0.0% | 36.8% |
| 4.2 | 1.25 | 7 | 0 | 0 | 14 | 7 | 0 | 0 | 0 | 0 | 0 | 0 | 54% | 2.0% | 35.0% |
| 4.6 | 1.4 | 7 | 0 | 0 | 15.5 | 4.5 | 0 | 0 | 0 | 0 | 0 | 0 | 54% | 0.0% | 42.8% |
| 4.2 | 1.05 | 6.5 | 0 | 0 | 15.5 | 6 | 0 | 0 | 0 | 0 | 0 | 0 | 54% | 1.3% | 35.1% |
| 4.2 | 1.3 | 7 | 0 | 0 | 13.5 | 7 | 0 | 0 | 0 | 0 | 0 | 0 | 54% | 0.2% | 36.8% |
| 4.2 | 1.1 | 6.5 | 0 | 0 | 16 | 7 | 0 | 0 | 0 | 0 | 0 | 0 | 54% | 3.0% | 33.9% |
| 4.2 | 1.1 | 6.5 | 0 | 0 | 15 | 6 | 0 | 0 | 0 | 0 | 0 | 0 | 54% | 0.0% | 36.4% |
| 4.4 | 1.4 | 6 | 0 | 0 | 16 | 6 | 0 | 0 | 0 | 0 | 0 | 0 | 54% | 0.0% | 37.2% |
| 4.2 | 1.2 | 6.5 | 0 | 0 | 15 | 7 | 0 | 0 | 0 | 0 | 0 | 0 | 54% | 0.0% | 36.9% |
| 4.2 | 1.1 | 6 | 0 | 0 | 15.5 | 6 | 0 | 0 | 0 | 0 | 0 | 0 | 54% | 0.0% | 35.7% |
| 4.2 | 1.1 | 6 | 0 | 0 | 16 | 6.5 | 0 | 0 | 0 | 0 | 0 | 0 | 54% | 0.0% | 36.2% |
| 4.2 | 1.05 | 6 | 0 | 0 | 16 | 6 | 0 | 0 | 0 | 0 | 0 | 0 | 54% | 0.0% | 35.9% |
| 4.2 | 1.05 | 7 | 0 | 0 | 14.5 | 6 | 0 | 0 | 0 | 0 | 0 | 0 | 54% | 4.0% | 32.5% |
| 4.2 | 1.2 | 6 | 0 | 0 | 15.5 | 7 | 0 | 0 | 0 | 0 | 0 | 0 | 54% | 0.0% | 36.1% |
| 4.2 | 1.25 | 7.5 | 0 | 0 | 13 | 7 | 0 | 0 | 0 | 0 | 0 | 0 | 54% | 4.7% | 32.3% |
| 4.2 | 1.15 | 7 | 0 | 0 | 14 | 6.5 | 0 | 0 | 0 | 0 | 0 | 0 | 54% | 2.1% | 34.7% |
| 4.2 | 1.2 | 7 | 0 | 0 | 14 | 7 | 0 | 0 | 0 | 0 | 0 | 0 | 54% | 2.0% | 35.1% |
| 4.2 | 1.05 | 6.5 | 0 | 0 | 15 | 6 | 0 | 0 | 0 | 0 | 0 | 0 | 54% | 0.0% | 36.6% |
| 4.3 | 1.3 | 7 | 0 | 0 | 15 | 6 | 0 | 0 | 0 | 0 | 0 | 0 | 54% | 2.3% | 35.1% |
| 4.2 | 1.2 | 6.5 | 0 | 0 | 14.5 | 7 | 0 | 0 | 0 | 0 | 0 | 0 | 54% | 0.0% | 36.8% |
| 4.4 | 1.4 | 7.5 | 0 | 0 | 14 | 6 | 0 | 0 | 0 | 0 | 0 | 0 | 54% | 1.6% | 37.3% |
| 4.2 | 1.25 | 6.5 | 0 | 0 | 14 | 7 | 0 | 0 | 0 | 0 | 0 | 0 | 54% | 0.0% | 36.5% |
| 4.2 | 1 | 6 | 0 | 0 | 16 | 6 | 0 | 0 | 0 | 0 | 0 | 0 | 54% | 0.0% | 36.1% |
| 4.2 | 1.1 | 6 | 0 | 0 | 15.5 | 6.5 | 0 | 0 | 0 | 0 | 0 | 0 | 54% | 0.0% | 36.1% |
| 4.2 | 1.15 | 6 | 0 | 0 | 15.5 | 7 | 0 | 0 | 0 | 0 | 0 | 0 | 54% | 0.0% | 36.3% |
| 4.2 | 1.05 | 6 | 0 | 0 | 15.5 | 6 | 0 | 0 | 0 | 0 | 0 | 0 | 54% | 0.0% | 35.8% |
| 4.2 | 1.1 | 6 | 0 | 0 | 16 | 7 | 0 | 0 | 0 | 0 | 0 | 0 | 54% | 0.0% | 36.6% |
| 4.5 | 1.35 | 6 | 0 | 0 | 16 | 5 | 0 | 0 | 0 | 0 | 0 | 0 | 54% | 0.0% | 40.7% |
| 4.2 | 1.1 | 7 | 0 | 0 | 14.5 | 7 | 0 | 0 | 0 | 0 | 0 | 0 | 54% | 3.9% | 33.3% |
| 4.2 | 1.2 | 7 | 0 | 0 | 13.5 | 7 | 0 | 0 | 0 | 0 | 0 | 0 | 54% | 0.2% | 37.1% |
| 4.2 | 1 | 6.5 | 0 | 0 | 15.5 | 6.5 | 0 | 0 | 0 | 0 | 0 | 0 | 54% | 0.0% | 34.1% |
| 4.4 | 1.25 | 7 | 0 | 0 | 16 | 5 | 0 | 0 | 0 | 0 | 0 | 0 | 54% | 2.7% | 35.5% |
| 4.5 | 1.35 | 7.5 | 0 | 0 | 15 | 5 | 0 | 0 | 0 | 0 | 0 | 0 | 54% | 4.9% | 37.0% |
| 4.2 | 1.2 | 6.5 | 0 | 0 | 14 | 7 | 0 | 0 | 0 | 0 | 0 | 0 | 54% | 0.0% | 36.6% |
| 4.4 | 1.4 | 7 | 0 | 0 | 14 | 6 | 0 | 0 | 0 | 0 | 0 | 0 | 54% | 0.0% | 38.5% |
| 4.2 | 1.15 | 6.5 | 0 | 0 | 14.5 | 7 | 0 | 0 | 0 | 0 | 0 | 0 | 54% | 0.0% | 36.9% |
| 4.2 | 1 | 6 | 0 | 0 | 16 | 6.5 | 0 | 0 | 0 | 0 | 0 | 0 | 54% | 0.0% | 36.5% |
| 4.3 | 1.35 | 7 | 0 | 0 | 15 | 6.5 | 0 | 0 | 0 | 0 | 0 | 0 | 54% | 2.2% | 35.5% |
| 4.2 | 1.15 | 6 | 0 | 0 | 15 | 7 | 0 | 0 | 0 | 0 | 0 | 0 | 54% | 0.0% | 36.2% |
| 4.2 | 1 | 7 | 0 | 0 | 14.5 | 6.5 | 0 | 0 | 0 | 0 | 0 | 0 | 54% | 1.0% | 33.5% |
| 4.5 | 1.4 | 7 | 0 | 0 | 16 | 5.5 | 0 | 0 | 0 | 0 | 0 | 0 | 54% | 2.2% | 39.9% |
| 4.2 | 1.1 | 7 | 0 | 0 | 14 | 7 | 0 | 0 | 0 | 0 | 0 | 0 | 54% | 2.1% | 35.3% |
| 4.3 | 1.4 | 7 | 0 | 0 | 15.5 | 7 | 0 | 0 | 0 | 0 | 0 | 0 | 54% | 3.9% | 33.8% |
| 4.5 | 1.35 | 7 | 0 | 0 | 15 | 5 | 0 | 0 | 0 | 0 | 0 | 0 | 54% | 0.0% | 42.1% |
| 4.2 | 1.05 | 6.5 | 0 | 0 | 14.5 | 6.5 | 0 | 0 | 0 | 0 | 0 | 0 | 54% | 0.0% | 36.8% |
| 4.5 | 1.35 | 7.5 | 0 | 0 | 14.5 | 5 | 0 | 0 | 0 | 0 | 0 | 0 | 54% | 3.3% | 38.8% |
| 4.2 | 1.1 | 6.5 | 0 | 0 | 14.5 | 7 | 0 | 0 | 0 | 0 | 0 | 0 | 54% | 0.0% | 37.1% |
| 4.2 | 1.05 | 6 | 0 | 0 | 15 | 6.5 | 0 | 0 | 0 | 0 | 0 | 0 | 54% | 0.0% | 36.1% |
| 4.2 | 1.1 | 6 | 0 | 0 | 15 | 7 | 0 | 0 | 0 | 0 | 0 | 0 | 54% | 0.0% | 36.3% |
| 4.3 | 1.35 | 7 | 0 | 0 | 14.5 | 6.5 | 0 | 0 | 0 | 0 | 0 | 0 | 54% | 0.4% | 37.4% |
| 4.2 | 1 | 6 | 0 | 0 | 16 | 7 | 0 | 0 | 0 | 0 | 0 | 0 | 54% | 0.0% | 33.7% |
| 4.3 | 1.35 | 6 | 0 | 0 | 15.5 | 6.5 | 0 | 0 | 0 | 0 | 0 | 0 | 54% | 0.0% | 36.5% |
| 4.2 | 1 | 7 | 0 | 0 | 14.5 | 7 | 0 | 0 | 0 | 0 | 0 | 0 | 54% | 0.9% | 34.0% |
| 4.3 | 1.35 | 6 | 0 | 0 | 15 | 6.5 | 0 | 0 | 0 | 0 | 0 | 0 | 54% | 0.0% | 36.3% |
| 4.3 | 1.4 | 7 | 0 | 0 | 15 | 7 | 0 | 0 | 0 | 0 | 0 | 0 | 54% | 2.1% | 35.8% |
| 4.2 | 1.05 | 6.5 | 0 | 0 | 14.5 | 7 | 0 | 0 | 0 | 0 | 0 | 0 | 54% | 0.0% | 37.2% |
| 4.2 | 1.1 | 6.5 | 0 | 0 | 14 | 7 | 0 | 0 | 0 | 0 | 0 | 0 | 54% | 0.0% | 37.0% |
| 4.2 | 1 | 6 | 0 | 0 | 15.5 | 7 | 0 | 0 | 0 | 0 | 0 | 0 | 54% | 0.0% | 33.5% |
| 4.2 | 1 | 7.5 | 0 | 0 | 13.5 | 7 | 0 | 0 | 0 | 0 | 0 | 0 | 54% | 3.7% | 31.3% |
| 4.3 | 1.35 | 7 | 0 | 0 | 14 | 6.5 | 0 | 0 | 0 | 0 | 0 | 0 | 54% | 0.0% | 37.8% |
| 4.3 | 1.35 | 6.5 | 0 | 0 | 14.5 | 6.5 | 0 | 0 | 0 | 0 | 0 | 0 | 54% | 0.0% | 37.1% |
| 4.3 | 1.4 | 7.5 | 0 | 0 | 14 | 7 | 0 | 0 | 0 | 0 | 0 | 0 | 54% | 4.8% | 33.2% |
| 4.5 | 1.4 | 6.5 | 0 | 0 | 15.5 | 5.5 | 0 | 0 | 0 | 0 | 0 | 0 | 54% | 0.0% | 41.6% |
| 4.3 | 1.4 | 6 | 0 | 0 | 15.5 | 7 | 0 | 0 | 0 | 0 | 0 | 0 | 54% | 0.0% | 36.7% |
| 4.2 | 1 | 6.5 | 0 | 0 | 14.5 | 7 | 0 | 0 | 0 | 0 | 0 | 0 | 54% | 0.0% | 34.2% |
| 4.2 | 1.05 | 6 | 0 | 0 | 14.5 | 7 | 0 | 0 | 0 | 0 | 0 | 0 | 54% | 0.0% | 36.3% |
| 4.2 | 1 | 6 | 0 | 0 | 15 | 7 | 0 | 0 | 0 | 0 | 0 | 0 | 54% | 0.0% | 36.6% |
| 4.6 | 1.4 | 6 | 0 | 0 | 16 | 5 | 0 | 0 | 0 | 0 | 0 | 0 | 54% | 0.0% | 41.8% |
| 4.5 | 1.4 | 7 | 0 | 0 | 14.5 | 5.5 | 0 | 0 | 0 | 0 | 0 | 0 | 54% | 0.0% | 42.2% |
| 4.4 | 1.3 | 6.5 | 0 | 0 | 15.5 | 5.5 | 0 | 0 | 0 | 0 | 0 | 0 | 54% | 0.0% | 37.9% |
| 4.3 | 1.4 | 7 | 0 | 0 | 14 | 7 | 0 | 0 | 0 | 0 | 0 | 0 | 54% | 0.0% | 38.1% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.4 | 1.35 | 6.5 | 0 | 0 | 16 | 6 | 0 | 0 | 0 | 0 | 0 | 0 | 54% | 0.0% | 38.3% |
| 4.4 | 1.4 | 7 | 0 | 0 | 16 | 6.5 | 0 | 0 | 0 | 0 | 0 | 0 | 54% | 2.3% | 36.6% |
| 4.5 | 1.25 | 7 | 0 | 0 | 16 | 4.5 | 0 | 0 | 0 | 0 | 0 | 0 | 54% | 0.0% | 39.4% |
| 4.6 | 1.35 | 6.5 | 0 | 0 | 16 | 4.5 | 0 | 0 | 0 | 0 | 0 | 0 | 54% | 0.0% | 42.3% |
| 4.4 | 1.35 | 6 | 0 | 0 | 16 | 6 | 0 | 0 | 0 | 0 | 0 | 0 | 54% | 0.0% | 37.4% |
| 4.3 | 1.4 | 7 | 0 | 0 | 13.5 | 7 | 0 | 0 | 0 | 0 | 0 | 0 | 54% | 0.0% | 38.0% |
| 4.3 | 1.4 | 6.5 | 0 | 0 | 14 | 7 | 0 | 0 | 0 | 0 | 0 | 0 | 54% | 0.0% | 37.2% |
| 4.4 | 1.35 | 6.5 | 0 | 0 | 15.5 | 6 | 0 | 0 | 0 | 0 | 0 | 0 | 54% | 0.0% | 38.2% |
| 4.4 | 1.4 | 7 | 0 | 0 | 15.5 | 6.5 | 0 | 0 | 0 | 0 | 0 | 0 | 54% | 0.6% | 38.6% |
| 4.5 | 1.25 | 7 | 0 | 0 | 15.5 | 4.5 | 0 | 0 | 0 | 0 | 0 | 0 | 54% | 0.0% | 39.3% |
| 4.5 | 1.3 | 7.5 | 0 | 0 | 15.5 | 5 | 0 | 0 | 0 | 0 | 0 | 0 | 54% | 3.7% | 35.9% |
| 4.6 | 1.4 | 7.5 | 0 | 0 | 15 | 5 | 0 | 0 | 0 | 0 | 0 | 0 | 54% | 1.9% | 41.6% |
| 4.3 | 1.25 | 6.5 | 0 | 0 | 15.5 | 6 | 0 | 0 | 0 | 0 | 0 | 0 | 54% | 0.0% | 37.3% |
| 4.4 | 1.4 | 7.5 | 0 | 0 | 14.5 | 6.5 | 0 | 0 | 0 | 0 | 0 | 0 | 54% | 3.2% | 36.0% |
| 4.4 | 1.4 | 7 | 0 | 0 | 15 | 6.5 | 0 | 0 | 0 | 0 | 0 | 0 | 54% | 0.0% | 39.1% |
| 4.4 | 1.4 | 6 | 0 | 0 | 15.5 | 6.5 | 0 | 0 | 0 | 0 | 0 | 0 | 54% | 0.0% | 37.5% |
| 4.3 | 1.3 | 6.5 | 0 | 0 | 16 | 6.5 | 0 | 0 | 0 | 0 | 0 | 0 | 54% | 0.0% | 37.7% |
| 4.4 | 1.2 | 7 | 0 | 0 | 16 | 5 | 0 | 0 | 0 | 0 | 0 | 0 | 54% | 2.7% | 35.7% |
| 4.4 | 1.35 | 7 | 0 | 0 | 14 | 6 | 0 | 0 | 0 | 0 | 0 | 0 | 54% | 0.0% | 38.7% |
| 4.3 | 1.25 | 6 | 0 | 0 | 15.5 | 6 | 0 | 0 | 0 | 0 | 0 | 0 | 54% | 0.0% | 36.4% |
| 4.3 | 1.25 | 6.5 | 0 | 0 | 15 | 6 | 0 | 0 | 0 | 0 | 0 | 0 | 54% | 0.0% | 37.2% |
| 4.4 | 1.4 | 7.5 | 0 | 0 | 14 | 6.5 | 0 | 0 | 0 | 0 | 0 | 0 | 54% | 1.5% | 37.9% |
| 4.5 | 1.35 | 7.5 | 0 | 0 | 15.5 | 5.5 | 0 | 0 | 0 | 0 | 0 | 0 | 54% | 3.6% | 36.3% |
| 4.4 | 1.4 | 7 | 0 | 0 | 14.5 | 6.5 | 0 | 0 | 0 | 0 | 0 | 0 | 54% | 0.0% | 39.0% |
| 4.3 | 1.3 | 6 | 0 | 0 | 16 | 6.5 | 0 | 0 | 0 | 0 | 0 | 0 | 54% | 0.0% | 36.8% |
| 4.5 | 1.35 | 6 | 0 | 0 | 15.5 | 5.5 | 0 | 0 | 0 | 0 | 0 | 0 | 55% | 0.0% | 41.0% |
| 4.3 | 1.15 | 7 | 0 | 0 | 15.5 | 5.5 | 0 | 0 | 0 | 0 | 0 | 0 | 55% | 4.2% | 33.0% |
| 4.3 | 1.25 | 7 | 0 | 0 | 15.5 | 6.5 | 0 | 0 | 0 | 0 | 0 | 0 | 55% | 4.0% | 33.8% |
| 4.3 | 1.35 | 7 | 0 | 0 | 15 | 7 | 0 | 0 | 0 | 0 | 0 | 0 | 55% | 2.1% | 36.0% |
| 4.5 | 1.3 | 6.5 | 0 | 0 | 15.5 | 5 | 0 | 0 | 0 | 0 | 0 | 0 | 55% | 0.0% | 38.7% |
| 4.3 | 1.3 | 7 | 0 | 0 | 15.5 | 7 | 0 | 0 | 0 | 0 | 0 | 0 | 55% | 3.9% | 34.1% |
| 4.3 | 1.3 | 7 | 0 | 0 | 14.5 | 6.5 | 0 | 0 | 0 | 0 | 0 | 0 | 55% | 0.4% | 37.6% |
| 4.3 | 1.35 | 6.5 | 0 | 0 | 15.5 | 7 | 0 | 0 | 0 | 0 | 0 | 0 | 55% | 0.0% | 37.8% |
| 4.5 | 1.35 | 7 | 0 | 0 | 15.5 | 5.5 | 0 | 0 | 0 | 0 | 0 | 0 | 55% | 0.0% | 39.8% |
| 4.3 | 1.3 | 6.5 | 0 | 0 | 16 | 7 | 0 | 0 | 0 | 0 | 0 | 0 | 55% | 0.0% | 38.1% |
| 4.5 | 1.4 | 7.5 | 0 | 0 | 15.5 | 6 | 0 | 0 | 0 | 0 | 0 | 0 | 55% | 3.5% | 36.7% |
| 4.3 | 1.35 | 6 | 0 | 0 | 16 | 7 | 0 | 0 | 0 | 0 | 0 | 0 | 55% | 0.0% | 37.0% |
| 4.3 | 1.15 | 7 | 0 | 0 | 15.5 | 6 | 0 | 0 | 0 | 0 | 0 | 0 | 55% | 4.1% | 33.6% |
| 4.3 | 1.2 | 7 | 0 | 0 | 15 | 6 | 0 | 0 | 0 | 0 | 0 | 0 | 55% | 2.3% | 35.4% |
| 4.4 | 1.4 | 6.5 | 0 | 0 | 14 | 6.5 | 0 | 0 | 0 | 0 | 0 | 0 | 55% | 0.0% | 38.1% |
| 4.3 | 1.3 | 7.5 | 0 | 0 | 13.5 | 6.5 | 0 | 0 | 0 | 0 | 0 | 0 | 55% | 3.1% | 35.0% |
| 4.3 | 1.1 | 6.5 | 0 | 0 | 16 | 5.5 | 0 | 0 | 0 | 0 | 0 | 0 | 55% | 0.0% | 37.5% |
| 4.5 | 1.4 | 6 | 0 | 0 | 15 | 6 | 0 | 0 | 0 | 0 | 0 | 0 | 55% | 0.0% | 41.2% |
| 4.3 | 1.2 | 6.5 | 0 | 0 | 15.5 | 6 | 0 | 0 | 0 | 0 | 0 | 0 | 55% | 0.0% | 37.5% |
| 4.4 | 1.4 | 7.5 | 0 | 0 | 13 | 6.5 | 0 | 0 | 0 | 0 | 0 | 0 | 55% | 0.0% | 39.5% |
| 4.3 | 1.25 | 6.5 | 0 | 0 | 15.5 | 6.5 | 0 | 0 | 0 | 0 | 0 | 0 | 55% | 0.0% | 37.7% |
| 4.4 | 1.25 | 7 | 0 | 0 | 15.5 | 5.5 | 0 | 0 | 0 | 0 | 0 | 0 | 55% | 0.8% | 38.0% |
| 4.3 | 1.25 | 7.5 | 0 | 0 | 14 | 6.5 | 0 | 0 | 0 | 0 | 0 | 0 | 55% | 4.9% | 33.2% |
| 4.3 | 1.35 | 6.5 | 0 | 0 | 15 | 7 | 0 | 0 | 0 | 0 | 0 | 0 | 55% | 0.0% | 37.7% |
| 4.5 | 1.35 | 6.5 | 0 | 0 | 15.5 | 5.5 | 0 | 0 | 0 | 0 | 0 | 0 | 55% | 0.0% | 39.0% |
| 4.4 | 1.3 | 7 | 0 | 0 | 16 | 6 | 0 | 0 | 0 | 0 | 0 | 0 | 55% | 2.4% | 36.4% |
| 4.3 | 1.3 | 7.5 | 0 | 0 | 14 | 7 | 0 | 0 | 0 | 0 | 0 | 0 | 55% | 4.8% | 33.5% |
| 4.3 | 1.3 | 6 | 0 | 0 | 16 | 7 | 0 | 0 | 0 | 0 | 0 | 0 | 55% | 0.0% | 37.2% |
| 4.3 | 1.1 | 7 | 0 | 0 | 15.5 | 6 | 0 | 0 | 0 | 0 | 0 | 0 | 55% | 4.1% | 33.7% |
| 4.3 | 1.2 | 7 | 0 | 0 | 15.5 | 7 | 0 | 0 | 0 | 0 | 0 | 0 | 55% | 4.0% | 34.4% |
| 4.3 | 1.3 | 7 | 0 | 0 | 14.5 | 7 | 0 | 0 | 0 | 0 | 0 | 0 | 55% | 0.3% | 38.2% |
| 4.3 | 1.15 | 7 | 0 | 0 | 15.5 | 6.5 | 0 | 0 | 0 | 0 | 0 | 0 | 55% | 4.0% | 34.1% |
| 4.3 | 1.15 | 6.5 | 0 | 0 | 15.5 | 6 | 0 | 0 | 0 | 0 | 0 | 0 | 55% | 0.0% | 37.6% |
| 4.3 | 1.1 | 6.5 | 0 | 0 | 15.5 | 5.5 | 0 | 0 | 0 | 0 | 0 | 0 | 55% | 0.0% | 37.4% |
| 4.5 | 1.35 | 7.5 | 0 | 0 | 14 | 5.5 | 0 | 0 | 0 | 0 | 0 | 0 | 55% | 0.0% | 40.3% |
| 4.3 | 1.2 | 6.5 | 0 | 0 | 15 | 6 | 0 | 0 | 0 | 0 | 0 | 0 | 55% | 0.0% | 37.3% |
| 4.3 | 1.25 | 6.5 | 0 | 0 | 15 | 6.5 | 0 | 0 | 0 | 0 | 0 | 0 | 55% | 0.0% | 37.6% |
| 4.4 | 1.25 | 6.5 | 0 | 0 | 15.5 | 5.5 | 0 | 0 | 0 | 0 | 0 | 0 | 55% | 0.0% | 38.1% |
| 4.5 | 1.35 | 7 | 0 | 0 | 14.5 | 5.5 | 0 | 0 | 0 | 0 | 0 | 0 | 55% | 0.0% | 39.6% |
| 4.3 | 1.25 | 7.5 | 0 | 0 | 13.5 | 6.5 | 0 | 0 | 0 | 0 | 0 | 0 | 55% | 3.1% | 35.2% |
| 4.3 | 1.35 | 6.5 | 0 | 0 | 14.5 | 7 | 0 | 0 | 0 | 0 | 0 | 0 | 55% | 0.0% | 37.5% |
| 4.3 | 1.15 | 6 | 0 | 0 | 16 | 6 | 0 | 0 | 0 | 0 | 0 | 0 | 55% | 0.0% | 36.9% |
| 4.3 | 1.3 | 7.5 | 0 | 0 | 13.5 | 7 | 0 | 0 | 0 | 0 | 0 | 0 | 55% | 3.0% | 35.5% |
| 4.3 | 1.2 | 6 | 0 | 0 | 16 | 6.5 | 0 | 0 | 0 | 0 | 0 | 0 | 55% | 0.0% | 37.1% |
| 4.5 | 1.4 | 7 | 0 | 0 | 15 | 5 | 0 | 0 | 0 | 0 | 0 | 0 | 55% | 0.0% | 40.0% |
| 4.3 | 1.25 | 6 | 0 | 0 | 16 | 7 | 0 | 0 | 0 | 0 | 0 | 0 | 55% | 0.0% | 37.4% |
| 4.4 | 1.3 | 6.5 | 0 | 0 | 16 | 6 | 0 | 0 | 0 | 0 | 0 | 0 | 55% | 0.0% | 38.5% |
| 4.3 | 1.1 | 7 | 0 | 0 | 15 | 6 | 0 | 0 | 0 | 0 | 0 | 0 | 55% | 2.3% | 35.7% |
| 4.3 | 1.1 | 7 | 0 | 0 | 15.5 | 6.5 | 0 | 0 | 0 | 0 | 0 | 0 | 55% | 4.1% | 34.2% |
| 4.3 | 1.35 | 7 | 0 | 0 | 13.5 | 7 | 0 | 0 | 0 | 0 | 0 | 0 | 55% | 0.0% | 38.1% |

TABLE 2-continued

List of Alloys Compositions in wt. %, balance Fe, and calculated criteria
which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.6 | 1.3 | 7.5 | 0 | 0 | 15 | 4.5 | 0 | 0 | 0 | 0 | 0 | 0 | 55% | 2.0% | 41.5% |
| 4.3 | 1.15 | 6.5 | 0 | 0 | 15 | 6 | 0 | 0 | 0 | 0 | 0 | 0 | 55% | 0.0% | 37.5% |
| 4.3 | 1 | 6.5 | 0 | 0 | 16 | 5.5 | 0 | 0 | 0 | 0 | 0 | 0 | 55% | 0.0% | 37.9% |
| 4.3 | 1.25 | 6.5 | 0 | 0 | 14.5 | 6.5 | 0 | 0 | 0 | 0 | 0 | 0 | 55% | 0.0% | 37.5% |
| 4.3 | 1.1 | 6.5 | 0 | 0 | 16 | 6.5 | 0 | 0 | 0 | 0 | 0 | 0 | 55% | 0.0% | 38.3% |
| 4.3 | 1.3 | 6 | 0 | 0 | 15 | 7 | 0 | 0 | 0 | 0 | 0 | 0 | 55% | 0.0% | 37.0% |
| 4.3 | 1.25 | 6.5 | 0 | 0 | 15 | 7 | 0 | 0 | 0 | 0 | 0 | 0 | 55% | 0.0% | 38.0% |
| 4.6 | 1.3 | 6.5 | 0 | 0 | 16 | 4.5 | 0 | 0 | 0 | 0 | 0 | 0 | 55% | 0.0% | 42.5% |
| 4.3 | 1.15 | 6 | 0 | 0 | 15.5 | 6 | 0 | 0 | 0 | 0 | 0 | 0 | 55% | 0.0% | 36.8% |
| 4.3 | 1.35 | 6.5 | 0 | 0 | 14 | 7 | 0 | 0 | 0 | 0 | 0 | 0 | 55% | 0.0% | 37.4% |
| 4.3 | 1.15 | 7.5 | 0 | 0 | 14 | 6.5 | 0 | 0 | 0 | 0 | 0 | 0 | 55% | 4.9% | 33.5% |
| 4.4 | 1.3 | 6 | 0 | 0 | 15.5 | 6 | 0 | 0 | 0 | 0 | 0 | 0 | 55% | 0.0% | 37.5% |
| 4.5 | 1.4 | 7 | 0 | 0 | 14.5 | 6 | 0 | 0 | 0 | 0 | 0 | 0 | 55% | 0.0% | 39.8% |
| 4.3 | 1.25 | 7.5 | 0 | 0 | 13.5 | 7 | 0 | 0 | 0 | 0 | 0 | 0 | 55% | 3.0% | 35.7% |
| 4.3 | 1.15 | 6 | 0 | 0 | 16 | 6.5 | 0 | 0 | 0 | 0 | 0 | 0 | 55% | 0.0% | 37.3% |
| 4.3 | 1 | 7 | 0 | 0 | 16 | 6.5 | 0 | 0 | 0 | 0 | 0 | 0 | 55% | 3.0% | 32.8% |
| 4.3 | 1.1 | 7 | 0 | 0 | 14.5 | 6 | 0 | 0 | 0 | 0 | 0 | 0 | 55% | 0.5% | 37.8% |
| 4.3 | 1.1 | 7 | 0 | 0 | 15.5 | 7 | 0 | 0 | 0 | 0 | 0 | 0 | 55% | 4.0% | 34.7% |
| 4.3 | 1.15 | 7 | 0 | 0 | 14.5 | 6.5 | 0 | 0 | 0 | 0 | 0 | 0 | 55% | 0.4% | 38.1% |
| 4.3 | 1.2 | 7 | 0 | 0 | 14.5 | 7 | 0 | 0 | 0 | 0 | 0 | 0 | 55% | 0.3% | 38.5% |
| 4.3 | 1.05 | 7 | 0 | 0 | 16 | 7 | 0 | 0 | 0 | 0 | 0 | 0 | 55% | 2.9% | 33.2% |
| 4.4 | 1.35 | 7 | 0 | 0 | 15.5 | 6.5 | 0 | 0 | 0 | 0 | 0 | 0 | 55% | 0.6% | 38.8% |
| 4.3 | 1 | 6.5 | 0 | 0 | 15.5 | 5.5 | 0 | 0 | 0 | 0 | 0 | 0 | 55% | 0.0% | 37.7% |
| 4.3 | 1.1 | 6.5 | 0 | 0 | 15.5 | 7 | 0 | 0 | 0 | 0 | 0 | 0 | 55% | 0.0% | 38.2% |
| 4.3 | 1.05 | 6.5 | 0 | 0 | 16 | 6.5 | 0 | 0 | 0 | 0 | 0 | 0 | 55% | 0.0% | 38.5% |
| 4.4 | 1.35 | 6.5 | 0 | 0 | 16 | 6.5 | 0 | 0 | 0 | 0 | 0 | 0 | 55% | 0.0% | 38.8% |
| 4.3 | 1.25 | 6 | 0 | 0 | 15 | 7 | 0 | 0 | 0 | 0 | 0 | 0 | 55% | 0.0% | 37.1% |
| 4.3 | 1.15 | 6.5 | 0 | 0 | 15.5 | 7 | 0 | 0 | 0 | 0 | 0 | 0 | 55% | 0.0% | 38.5% |
| 4.3 | 1.05 | 6 | 0 | 0 | 16 | 6 | 0 | 0 | 0 | 0 | 0 | 0 | 55% | 0.0% | 37.2% |
| 4.3 | 1.15 | 7.5 | 0 | 0 | 14 | 7 | 0 | 0 | 0 | 0 | 0 | 0 | 55% | 4.8% | 33.9% |
| 4.4 | 1.3 | 7 | 0 | 0 | 14.5 | 6 | 0 | 0 | 0 | 0 | 0 | 0 | 55% | 0.0% | 39.0% |
| 4.3 | 1.15 | 6 | 0 | 0 | 15.5 | 6.5 | 0 | 0 | 0 | 0 | 0 | 0 | 55% | 0.0% | 37.2% |
| 4.4 | 1.4 | 7 | 0 | 0 | 16 | 7 | 0 | 0 | 0 | 0 | 0 | 0 | 55% | 2.2% | 37.2% |
| 4.5 | 1.25 | 7 | 0 | 0 | 16 | 5 | 0 | 0 | 0 | 0 | 0 | 0 | 55% | 0.0% | 39.9% |
| 4.6 | 1.35 | 7 | 0 | 0 | 15.5 | 5 | 0 | 0 | 0 | 0 | 0 | 0 | 55% | 0.0% | 43.4% |
| 4.3 | 1.05 | 7 | 0 | 0 | 15 | 6.5 | 0 | 0 | 0 | 0 | 0 | 0 | 55% | 2.3% | 36.4% |
| 4.3 | 1.1 | 7 | 0 | 0 | 14.5 | 6.5 | 0 | 0 | 0 | 0 | 0 | 0 | 55% | 0.4% | 38.3% |
| 4.6 | 1.35 | 6.5 | 0 | 0 | 16 | 5 | 0 | 0 | 0 | 0 | 0 | 0 | 55% | 0.0% | 42.8% |
| 4.3 | 1.1 | 7 | 0 | 0 | 15 | 7 | 0 | 0 | 0 | 0 | 0 | 0 | 55% | 2.2% | 36.7% |
| 4.4 | 1.35 | 7 | 0 | 0 | 15 | 6.5 | 0 | 0 | 0 | 0 | 0 | 0 | 55% | 0.0% | 39.3% |
| 4.3 | 1.25 | 7 | 0 | 0 | 13.5 | 7 | 0 | 0 | 0 | 0 | 0 | 0 | 55% | 0.0% | 38.5% |
| 4.3 | 1.25 | 6 | 0 | 0 | 14.5 | 7 | 0 | 0 | 0 | 0 | 0 | 0 | 55% | 0.0% | 37.0% |
| 4.3 | 1.05 | 6.5 | 0 | 0 | 15.5 | 6.5 | 0 | 0 | 0 | 0 | 0 | 0 | 55% | 0.0% | 38.4% |
| 4.3 | 1.1 | 6.5 | 0 | 0 | 15.5 | 7 | 0 | 0 | 0 | 0 | 0 | 0 | 55% | 0.0% | 38.6% |
| 4.4 | 1.4 | 7.5 | 0 | 0 | 15 | 7 | 0 | 0 | 0 | 0 | 0 | 0 | 55% | 4.9% | 34.5% |
| 4.4 | 1.35 | 6 | 0 | 0 | 15 | 6.5 | 0 | 0 | 0 | 0 | 0 | 0 | 55% | 0.0% | 37.6% |
| 4.3 | 1.1 | 6.5 | 0 | 0 | 15 | 6.5 | 0 | 0 | 0 | 0 | 0 | 0 | 55% | 0.0% | 38.1% |
| 4.3 | 1.1 | 7.5 | 0 | 0 | 13.5 | 6.5 | 0 | 0 | 0 | 0 | 0 | 0 | 55% | 3.1% | 35.6% |
| 4.6 | 1.35 | 6.5 | 0 | 0 | 15.5 | 5 | 0 | 0 | 0 | 0 | 0 | 0 | 55% | 0.0% | 42.7% |
| 4.3 | 1.15 | 7.5 | 0 | 0 | 13.5 | 7 | 0 | 0 | 0 | 0 | 0 | 0 | 55% | 3.0% | 36.0% |
| 4.3 | 1 | 6 | 0 | 0 | 16 | 6 | 0 | 0 | 0 | 0 | 0 | 0 | 55% | 0.0% | 37.4% |
| 4.4 | 1.4 | 7 | 0 | 0 | 15.5 | 7 | 0 | 0 | 0 | 0 | 0 | 0 | 55% | 0.5% | 39.2% |
| 4.3 | 1.15 | 6 | 0 | 0 | 15.5 | 7 | 0 | 0 | 0 | 0 | 0 | 0 | 55% | 0.0% | 37.6% |
| 4.3 | 1 | 7 | 0 | 0 | 15 | 6.5 | 0 | 0 | 0 | 0 | 0 | 0 | 55% | 0.0% | 36.2% |
| 4.4 | 1.4 | 6.5 | 0 | 0 | 16 | 7 | 0 | 0 | 0 | 0 | 0 | 0 | 55% | 0.0% | 39.0% |
| 4.5 | 1.3 | 7.5 | 0 | 0 | 15.5 | 5.5 | 0 | 0 | 0 | 0 | 0 | 0 | 55% | 3.6% | 36.5% |
| 4.3 | 1.2 | 7 | 0 | 0 | 13.5 | 7 | 0 | 0 | 0 | 0 | 0 | 0 | 55% | 0.0% | 38.6% |
| 4.6 | 1.4 | 7.5 | 0 | 0 | 15 | 5.5 | 0 | 0 | 0 | 0 | 0 | 0 | 55% | 1.8% | 42.1% |
| 4.6 | 1.4 | 7 | 0 | 0 | 15.5 | 5.5 | 0 | 0 | 0 | 0 | 0 | 0 | 55% | 0.0% | 43.6% |
| 4.4 | 1.35 | 6.5 | 0 | 0 | 15 | 6.5 | 0 | 0 | 0 | 0 | 0 | 0 | 55% | 0.0% | 38.5% |
| 4.3 | 1.2 | 6.5 | 0 | 0 | 14 | 7 | 0 | 0 | 0 | 0 | 0 | 0 | 55% | 0.0% | 37.9% |
| 4.3 | 1.1 | 6.5 | 0 | 0 | 15 | 7 | 0 | 0 | 0 | 0 | 0 | 0 | 55% | 0.0% | 38.5% |
| 4.3 | 1.1 | 6.5 | 0 | 0 | 14.5 | 6.5 | 0 | 0 | 0 | 0 | 0 | 0 | 55% | 0.0% | 38.0% |
| 4.3 | 1.15 | 6.5 | 0 | 0 | 14.5 | 7 | 0 | 0 | 0 | 0 | 0 | 0 | 55% | 0.0% | 38.2% |
| 4.3 | 1.05 | 7.5 | 0 | 0 | 13.5 | 6.5 | 0 | 0 | 0 | 0 | 0 | 0 | 55% | 3.1% | 35.8% |
| 4.3 | 1.05 | 7.5 | 0 | 0 | 14 | 7 | 0 | 0 | 0 | 0 | 0 | 0 | 55% | 1.8% | 35.0% |
| 4.6 | 1.2 | 7.5 | 0 | 0 | 16 | 4 | 0 | 0 | 0 | 0 | 0 | 0 | 55% | 2.4% | 38.3% |
| 4.3 | 1.1 | 7.5 | 0 | 0 | 13.5 | 7 | 0 | 0 | 0 | 0 | 0 | 0 | 55% | 3.1% | 36.1% |
| 4.3 | 1 | 6 | 0 | 0 | 16 | 6.5 | 0 | 0 | 0 | 0 | 0 | 0 | 55% | 0.0% | 37.8% |
| 4.3 | 1 | 7.5 | 0 | 0 | 14.5 | 7 | 0 | 0 | 0 | 0 | 0 | 0 | 55% | 3.8% | 32.8% |
| 4.4 | 1.4 | 6 | 0 | 0 | 15 | 7 | 0 | 0 | 0 | 0 | 0 | 0 | 55% | 0.0% | 37.9% |
| 4.3 | 1.05 | 6 | 0 | 0 | 16 | 7 | 0 | 0 | 0 | 0 | 0 | 0 | 55% | 0.0% | 38.0% |
| 4.4 | 1.15 | 6.5 | 0 | 0 | 16 | 5 | 0 | 0 | 0 | 0 | 0 | 0 | 55% | 0.0% | 38.2% |
| 4.4 | 1.35 | 7.5 | 0 | 0 | 13.5 | 6.5 | 0 | 0 | 0 | 0 | 0 | 0 | 55% | 0.0% | 39.8% |
| 4.3 | 1 | 7 | 0 | 0 | 14.5 | 6.5 | 0 | 0 | 0 | 0 | 0 | 0 | 55% | 0.0% | 36.0% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.3 | 1.1 | 7 | 0 | 0 | 14 | 7 | 0 | 0 | 0 | 0 | 0 | 0 | 55% | 0.0% | 39.1% |
| 4.3 | 1 | 7 | 0 | 0 | 15 | 7 | 0 | 0 | 0 | 0 | 0 | 0 | 55% | 0.0% | 36.6% |
| 4.6 | 1.4 | 7 | 0 | 0 | 15 | 5.5 | 0 | 0 | 0 | 0 | 0 | 0 | 55% | 0.0% | 43.5% |
| 4.5 | 1.35 | 7.5 | 0 | 0 | 15.5 | 6 | 0 | 0 | 0 | 0 | 0 | 0 | 55% | 3.5% | 36.9% |
| 4.4 | 1.35 | 6.5 | 0 | 0 | 14.5 | 6.5 | 0 | 0 | 0 | 0 | 0 | 0 | 55% | 0.0% | 38.4% |
| 4.3 | 1 | 6.5 | 0 | 0 | 15 | 6.5 | 0 | 0 | 0 | 0 | 0 | 0 | 55% | 0.0% | 38.4% |
| 4.3 | 1.15 | 6.5 | 0 | 0 | 14 | 7 | 0 | 0 | 0 | 0 | 0 | 0 | 55% | 0.0% | 38.1% |
| 4.3 | 1.05 | 7.5 | 0 | 0 | 13.5 | 7 | 0 | 0 | 0 | 0 | 0 | 0 | 55% | 0.0% | 36.9% |
| 4.3 | 1.05 | 6 | 0 | 0 | 15 | 6.5 | 0 | 0 | 0 | 0 | 0 | 0 | 55% | 0.0% | 37.4% |
| 4.3 | 1.1 | 6 | 0 | 0 | 15 | 7 | 0 | 0 | 0 | 0 | 0 | 0 | 55% | 0.0% | 37.6% |
| 4.4 | 1.4 | 6.5 | 0 | 0 | 15 | 7 | 0 | 0 | 0 | 0 | 0 | 0 | 55% | 0.0% | 38.8% |
| 4.3 | 1 | 6 | 0 | 0 | 16 | 7 | 0 | 0 | 0 | 0 | 0 | 0 | 55% | 0.0% | 38.2% |
| 4.5 | 1.35 | 6 | 0 | 0 | 16 | 6 | 0 | 0 | 0 | 0 | 0 | 0 | 55% | 0.0% | 38.7% |
| 4.5 | 1.3 | 7.5 | 0 | 0 | 14.5 | 5.5 | 0 | 0 | 0 | 0 | 0 | 0 | 55% | 0.1% | 40.4% |
| 4.5 | 1.35 | 6 | 0 | 0 | 15.5 | 6 | 0 | 0 | 0 | 0 | 0 | 0 | 55% | 0.0% | 38.5% |
| 4.5 | 1.3 | 7 | 0 | 0 | 15 | 5.5 | 0 | 0 | 0 | 0 | 0 | 0 | 55% | 0.0% | 39.9% |
| 4.5 | 1.35 | 6 | 0 | 0 | 15 | 6 | 0 | 0 | 0 | 0 | 0 | 0 | 55% | 0.0% | 38.4% |
| 4.4 | 1.2 | 6.5 | 0 | 0 | 16 | 5.5 | 0 | 0 | 0 | 0 | 0 | 0 | 55% | 0.0% | 38.4% |
| 4.3 | 1.1 | 6.5 | 0 | 0 | 14 | 7 | 0 | 0 | 0 | 0 | 0 | 0 | 55% | 0.0% | 38.2% |
| 4.4 | 1.4 | 7.5 | 0 | 0 | 13.5 | 7 | 0 | 0 | 0 | 0 | 0 | 0 | 55% | 0.0% | 40.0% |
| 4.4 | 1.4 | 7 | 0 | 0 | 14 | 7 | 0 | 0 | 0 | 0 | 0 | 0 | 55% | 0.0% | 39.4% |
| 4.4 | 1.25 | 7 | 0 | 0 | 16 | 6 | 0 | 0 | 0 | 0 | 0 | 0 | 55% | 2.4% | 36.6% |
| 4.4 | 1.4 | 6.5 | 0 | 0 | 14.5 | 7 | 0 | 0 | 0 | 0 | 0 | 0 | 55% | 0.0% | 38.6% |
| 4.4 | 1.2 | 6 | 0 | 0 | 16 | 5.5 | 0 | 0 | 0 | 0 | 0 | 0 | 55% | 0.0% | 37.5% |
| 4.5 | 1.4 | 7.5 | 0 | 0 | 15.5 | 6.5 | 0 | 0 | 0 | 0 | 0 | 0 | 55% | 3.4% | 37.3% |
| 4.5 | 1.3 | 7 | 0 | 0 | 14.5 | 5.5 | 0 | 0 | 0 | 0 | 0 | 0 | 55% | 0.0% | 39.8% |
| 4.6 | 1.25 | 7 | 0 | 0 | 16 | 4.5 | 0 | 0 | 0 | 0 | 0 | 0 | 55% | 0.0% | 40.7% |
| 4.6 | 1.3 | 6 | 0 | 0 | 16 | 5 | 0 | 0 | 0 | 0 | 0 | 0 | 55% | 0.0% | 42.2% |
| 4.4 | 1.4 | 6.5 | 0 | 0 | 13.5 | 7 | 0 | 0 | 0 | 0 | 0 | 0 | 55% | 0.0% | 38.4% |
| 4.3 | 1 | 6.5 | 0 | 0 | 14.5 | 7 | 0 | 0 | 0 | 0 | 0 | 0 | 55% | 0.0% | 35.5% |
| 4.5 | 1.35 | 7.5 | 0 | 0 | 14.5 | 6 | 0 | 0 | 0 | 0 | 0 | 0 | 55% | 0.0% | 40.8% |
| 4.5 | 1.4 | 6 | 0 | 0 | 15.5 | 6.5 | 0 | 0 | 0 | 0 | 0 | 0 | 55% | 0.0% | 38.8% |
| 4.3 | 1 | 7.5 | 0 | 0 | 13 | 7 | 0 | 0 | 0 | 0 | 0 | 0 | 55% | 0.0% | 37.0% |
| 4.5 | 1.35 | 6.5 | 0 | 0 | 15.5 | 6 | 0 | 0 | 0 | 0 | 0 | 0 | 55% | 0.0% | 39.4% |
| 4.5 | 1.4 | 7.5 | 0 | 0 | 15 | 6.5 | 0 | 0 | 0 | 0 | 0 | 0 | 55% | 1.7% | 39.2% |
| 4.4 | 1.3 | 7 | 0 | 0 | 16 | 6.5 | 0 | 0 | 0 | 0 | 0 | 0 | 55% | 2.3% | 37.0% |
| 4.5 | 1.4 | 7 | 0 | 0 | 15.5 | 6.5 | 0 | 0 | 0 | 0 | 0 | 0 | 55% | 0.0% | 40.5% |
| 4.6 | 1.25 | 6.5 | 0 | 0 | 16 | 4.5 | 0 | 0 | 0 | 0 | 0 | 0 | 55% | 0.0% | 42.7% |
| 4.4 | 1.25 | 6 | 0 | 0 | 16 | 6 | 0 | 0 | 0 | 0 | 0 | 0 | 55% | 0.0% | 37.8% |
| 4.5 | 1.35 | 7.5 | 0 | 0 | 14 | 6 | 0 | 0 | 0 | 0 | 0 | 0 | 55% | 0.0% | 40.7% |
| 4.6 | 1.3 | 7 | 0 | 0 | 16 | 5 | 0 | 0 | 0 | 0 | 0 | 0 | 55% | 0.0% | 40.9% |
| 4.5 | 1.35 | 6.5 | 0 | 0 | 15 | 6 | 0 | 0 | 0 | 0 | 0 | 0 | 55% | 0.0% | 39.3% |
| 4.5 | 1.4 | 7.5 | 0 | 0 | 14.5 | 6.5 | 0 | 0 | 0 | 0 | 0 | 0 | 55% | 0.0% | 41.1% |
| 4.6 | 1.35 | 7.5 | 0 | 0 | 16 | 5.5 | 0 | 0 | 0 | 0 | 0 | 0 | 55% | 2.1% | 39.5% |
| 4.4 | 1.3 | 7 | 0 | 0 | 15.5 | 6.5 | 0 | 0 | 0 | 0 | 0 | 0 | 55% | 0.6% | 39.0% |
| 4.5 | 1.2 | 7.5 | 0 | 0 | 15.5 | 5 | 0 | 0 | 0 | 0 | 0 | 0 | 56% | 3.7% | 36.3% |
| 4.4 | 1.25 | 7.5 | 0 | 0 | 14 | 6 | 0 | 0 | 0 | 0 | 0 | 0 | 56% | 1.6% | 38.0% |
| 4.4 | 1.25 | 7 | 0 | 0 | 14.5 | 6 | 0 | 0 | 0 | 0 | 0 | 0 | 56% | 0.0% | 39.2% |
| 4.6 | 1.3 | 6.5 | 0 | 0 | 16 | 5 | 0 | 0 | 0 | 0 | 0 | 0 | 56% | 0.0% | 43.0% |
| 4.4 | 1.3 | 7.5 | 0 | 0 | 14.5 | 6.5 | 0 | 0 | 0 | 0 | 0 | 0 | 56% | 3.2% | 36.3% |
| 4.4 | 1.3 | 7 | 0 | 0 | 15 | 6.5 | 0 | 0 | 0 | 0 | 0 | 0 | 56% | 0.0% | 39.5% |
| 4.5 | 1.4 | 6.5 | 0 | 0 | 15 | 6.5 | 0 | 0 | 0 | 0 | 0 | 0 | 56% | 0.0% | 39.6% |
| 4.6 | 1.3 | 6.5 | 0 | 0 | 15.5 | 5 | 0 | 0 | 0 | 0 | 0 | 0 | 56% | 0.0% | 42.8% |
| 4.6 | 1.4 | 6 | 0 | 0 | 15 | 6 | 0 | 0 | 0 | 0 | 0 | 0 | 56% | 0.0% | 42.4% |
| 4.6 | 1.3 | 7.5 | 0 | 0 | 14.5 | 5 | 0 | 0 | 0 | 0 | 0 | 0 | 56% | 0.0% | 41.4% |
| 4.5 | 1.2 | 7.5 | 0 | 0 | 15 | 5 | 0 | 0 | 0 | 0 | 0 | 0 | 56% | 2.0% | 38.3% |
| 4.4 | 1.35 | 7 | 0 | 0 | 15.5 | 7 | 0 | 0 | 0 | 0 | 0 | 0 | 56% | 0.5% | 39.3% |
| 4.4 | 1.3 | 7.5 | 0 | 0 | 14 | 6 | 0 | 0 | 0 | 0 | 0 | 0 | 56% | 1.5% | 38.3% |
| 4.6 | 1.35 | 7.5 | 0 | 0 | 15 | 5.5 | 0 | 0 | 0 | 0 | 0 | 0 | 56% | 0.0% | 41.7% |
| 4.5 | 1.4 | 7 | 0 | 0 | 14 | 6.5 | 0 | 0 | 0 | 0 | 0 | 0 | 56% | 0.0% | 40.2% |
| 4.5 | 1.25 | 7 | 0 | 0 | 16 | 5.5 | 0 | 0 | 0 | 0 | 0 | 0 | 56% | 0.0% | 40.3% |
| 4.4 | 1.2 | 7 | 0 | 0 | 16 | 6 | 0 | 0 | 0 | 0 | 0 | 0 | 56% | 2.4% | 36.8% |
| 4.6 | 1.35 | 6.5 | 0 | 0 | 16 | 5.5 | 0 | 0 | 0 | 0 | 0 | 0 | 56% | 0.0% | 43.2% |
| 4.6 | 1.15 | 7.5 | 0 | 0 | 16 | 4 | 0 | 0 | 0 | 0 | 0 | 0 | 56% | 2.4% | 38.6% |
| 4.4 | 1.1 | 7 | 0 | 0 | 15.5 | 5 | 0 | 0 | 0 | 0 | 0 | 0 | 56% | 0.9% | 38.0% |
| 4.4 | 1.35 | 7 | 0 | 0 | 15 | 7 | 0 | 0 | 0 | 0 | 0 | 0 | 56% | 0.0% | 39.8% |
| 4.4 | 1.1 | 6.5 | 0 | 0 | 16 | 5 | 0 | 0 | 0 | 0 | 0 | 0 | 56% | 0.0% | 38.4% |
| 4.5 | 1.25 | 7.5 | 0 | 0 | 15 | 5.5 | 0 | 0 | 0 | 0 | 0 | 0 | 56% | 1.8% | 38.7% |
| 4.4 | 1.35 | 6 | 0 | 0 | 15 | 7 | 0 | 0 | 0 | 0 | 0 | 0 | 56% | 0.0% | 38.1% |
| 4.4 | 1.3 | 7 | 0 | 0 | 14 | 6.5 | 0 | 0 | 0 | 0 | 0 | 0 | 56% | 0.0% | 39.3% |
| 4.4 | 1.3 | 7.5 | 0 | 0 | 15 | 7 | 0 | 0 | 0 | 0 | 0 | 0 | 56% | 4.9% | 34.9% |
| 4.4 | 1.35 | 6 | 0 | 0 | 14.5 | 7 | 0 | 0 | 0 | 0 | 0 | 0 | 56% | 0.0% | 37.9% |
| 4.4 | 1.3 | 6.5 | 0 | 0 | 14.5 | 6.5 | 0 | 0 | 0 | 0 | 0 | 0 | 56% | 0.0% | 38.6% |
| 4.4 | 1.2 | 7 | 0 | 0 | 16 | 6.5 | 0 | 0 | 0 | 0 | 0 | 0 | 56% | 2.4% | 37.3% |
| 4.4 | 1.25 | 7 | 0 | 0 | 15.5 | 6.5 | 0 | 0 | 0 | 0 | 0 | 0 | 56% | 0.6% | 39.2% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.4 | 1.25 | 7 | 0 | 0 | 16 | 7 | 0 | 0 | 0 | 0 | 0 | 0 | 56% | 2.3% | 37.7% |
| 4.6 | 1.15 | 7.5 | 0 | 0 | 15.5 | 4 | 0 | 0 | 0 | 0 | 0 | 0 | 56% | 0.6% | 40.5% |
| 4.4 | 1.15 | 6.5 | 0 | 0 | 16 | 5.5 | 0 | 0 | 0 | 0 | 0 | 0 | 56% | 0.0% | 38.6% |
| 4.4 | 1.3 | 6.5 | 0 | 0 | 16 | 7 | 0 | 0 | 0 | 0 | 0 | 0 | 56% | 0.0% | 39.4% |
| 4.5 | 1.3 | 7 | 0 | 0 | 16 | 6 | 0 | 0 | 0 | 0 | 0 | 0 | 56% | 0.0% | 40.6% |
| 4.4 | 1.25 | 7.5 | 0 | 0 | 14.5 | 6.5 | 0 | 0 | 0 | 0 | 0 | 0 | 56% | 3.2% | 36.5% |
| 4.4 | 1.35 | 6.5 | 0 | 0 | 15 | 7 | 0 | 0 | 0 | 0 | 0 | 0 | 56% | 0.0% | 39.0% |
| 4.4 | 1.25 | 7.5 | 0 | 0 | 15 | 7 | 0 | 0 | 0 | 0 | 0 | 0 | 56% | 4.9% | 35.0% |
| 4.4 | 1.05 | 7 | 0 | 0 | 15.5 | 5 | 0 | 0 | 0 | 0 | 0 | 0 | 56% | 0.9% | 38.2% |
| 4.4 | 1.15 | 7 | 0 | 0 | 15 | 5.5 | 0 | 0 | 0 | 0 | 0 | 0 | 56% | 0.0% | 39.2% |
| 4.5 | 1.3 | 6 | 0 | 0 | 15.5 | 6 | 0 | 0 | 0 | 0 | 0 | 0 | 56% | 0.0% | 38.8% |
| 4.6 | 1.4 | 6.5 | 0 | 0 | 14.5 | 6 | 0 | 0 | 0 | 0 | 0 | 0 | 56% | 0.0% | 43.1% |
| 4.4 | 1.1 | 7 | 0 | 0 | 16 | 6 | 0 | 0 | 0 | 0 | 0 | 0 | 56% | 2.5% | 37.1% |
| 4.5 | 1.25 | 6.5 | 0 | 0 | 15.5 | 5.5 | 0 | 0 | 0 | 0 | 0 | 0 | 56% | 0.0% | 39.4% |
| 4.6 | 1.4 | 7.5 | 0 | 0 | 14.5 | 6 | 0 | 0 | 0 | 0 | 0 | 0 | 56% | 0.0% | 41.9% |
| 4.5 | 1.3 | 7.5 | 0 | 0 | 15 | 6 | 0 | 0 | 0 | 0 | 0 | 0 | 56% | 1.7% | 39.1% |
| 4.4 | 1.15 | 6 | 0 | 0 | 16 | 5.5 | 0 | 0 | 0 | 0 | 0 | 0 | 56% | 0.0% | 37.7% |
| 4.4 | 1.1 | 6.5 | 0 | 0 | 16 | 5.5 | 0 | 0 | 0 | 0 | 0 | 0 | 56% | 0.0% | 38.8% |
| 4.6 | 1.4 | 7 | 0 | 0 | 15 | 6 | 0 | 0 | 0 | 0 | 0 | 0 | 56% | 0.0% | 41.2% |
| 4.4 | 1.15 | 6.5 | 0 | 0 | 16 | 6 | 0 | 0 | 0 | 0 | 0 | 0 | 56% | 0.0% | 39.0% |
| 4.4 | 1.25 | 6 | 0 | 0 | 16 | 6.5 | 0 | 0 | 0 | 0 | 0 | 0 | 56% | 0.0% | 38.2% |
| 4.4 | 1.1 | 7.5 | 0 | 0 | 14.5 | 5.5 | 0 | 0 | 0 | 0 | 0 | 0 | 56% | 3.4% | 36.0% |
| 4.4 | 1.3 | 6.5 | 0 | 0 | 15.5 | 7 | 0 | 0 | 0 | 0 | 0 | 0 | 56% | 0.0% | 39.2% |
| 4.4 | 1.2 | 7.5 | 0 | 0 | 14.5 | 6.5 | 0 | 0 | 0 | 0 | 0 | 0 | 56% | 3.2% | 36.7% |
| 4.5 | 1.35 | 7.5 | 0 | 0 | 15.5 | 6.5 | 0 | 0 | 0 | 0 | 0 | 0 | 56% | 3.4% | 37.5% |
| 4.4 | 1.25 | 7.5 | 0 | 0 | 14.5 | 7 | 0 | 0 | 0 | 0 | 0 | 0 | 56% | 3.1% | 37.0% |
| 4.4 | 1.35 | 6.5 | 0 | 0 | 14 | 7 | 0 | 0 | 0 | 0 | 0 | 0 | 56% | 0.0% | 38.7% |
| 4.6 | 1.2 | 7 | 0 | 0 | 16 | 4.5 | 0 | 0 | 0 | 0 | 0 | 0 | 56% | 0.0% | 40.9% |
| 4.4 | 1 | 7 | 0 | 0 | 16 | 5.5 | 0 | 0 | 0 | 0 | 0 | 0 | 56% | 2.6% | 36.9% |
| 4.4 | 1.15 | 7 | 0 | 0 | 15 | 6 | 0 | 0 | 0 | 0 | 0 | 0 | 56% | 0.0% | 39.6% |
| 4.4 | 1.2 | 7 | 0 | 0 | 15 | 6.5 | 0 | 0 | 0 | 0 | 0 | 0 | 56% | 0.0% | 39.9% |
| 4.4 | 1.1 | 7 | 0 | 0 | 15.5 | 6 | 0 | 0 | 0 | 0 | 0 | 0 | 56% | 0.7% | 39.1% |
| 4.4 | 1.15 | 7 | 0 | 0 | 15.5 | 6.5 | 0 | 0 | 0 | 0 | 0 | 0 | 56% | 0.6% | 39.5% |
| 4.5 | 1.3 | 7.5 | 0 | 0 | 14.5 | 6 | 0 | 0 | 0 | 0 | 0 | 0 | 56% | 0.0% | 41.0% |
| 4.4 | 1.35 | 6.5 | 0 | 0 | 13.5 | 7 | 0 | 0 | 0 | 0 | 0 | 0 | 56% | 0.0% | 38.6% |
| 4.5 | 1.35 | 6 | 0 | 0 | 16 | 6.5 | 0 | 0 | 0 | 0 | 0 | 0 | 56% | 0.0% | 39.1% |
| 4.4 | 1.35 | 7 | 0 | 0 | 13.5 | 7 | 0 | 0 | 0 | 0 | 0 | 0 | 56% | 0.0% | 39.4% |
| 4.4 | 1.3 | 6 | 0 | 0 | 15.5 | 7 | 0 | 0 | 0 | 0 | 0 | 0 | 56% | 0.0% | 38.4% |
| 4.4 | 1.1 | 6.5 | 0 | 0 | 15.5 | 5.5 | 0 | 0 | 0 | 0 | 0 | 0 | 56% | 0.0% | 38.7% |
| 4.5 | 1.35 | 6 | 0 | 0 | 15.5 | 6.5 | 0 | 0 | 0 | 0 | 0 | 0 | 56% | 0.0% | 39.0% |
| 4.4 | 1.1 | 6.5 | 0 | 0 | 16 | 6 | 0 | 0 | 0 | 0 | 0 | 0 | 56% | 0.0% | 39.2% |
| 4.4 | 1.1 | 7.5 | 0 | 0 | 14.5 | 6 | 0 | 0 | 0 | 0 | 0 | 0 | 56% | 3.3% | 36.5% |
| 4.5 | 1.35 | 6 | 0 | 0 | 15 | 6.5 | 0 | 0 | 0 | 0 | 0 | 0 | 56% | 0.0% | 38.9% |
| 4.4 | 1.2 | 6.5 | 0 | 0 | 16 | 7 | 0 | 0 | 0 | 0 | 0 | 0 | 56% | 0.0% | 39.7% |
| 4.5 | 1.1 | 7.5 | 0 | 0 | 15.5 | 4.5 | 0 | 0 | 0 | 0 | 0 | 0 | 56% | 3.8% | 36.2% |
| 4.4 | 1.25 | 6 | 0 | 0 | 16 | 7 | 0 | 0 | 0 | 0 | 0 | 0 | 56% | 0.0% | 38.7% |
| 4.4 | 1.25 | 7.5 | 0 | 0 | 14 | 7 | 0 | 0 | 0 | 0 | 0 | 0 | 56% | 1.4% | 39.1% |
| 4.4 | 1.3 | 7.5 | 0 | 0 | 13.5 | 7 | 0 | 0 | 0 | 0 | 0 | 0 | 56% | 0.0% | 40.4% |
| 4.4 | 1.15 | 7 | 0 | 0 | 14.5 | 6 | 0 | 0 | 0 | 0 | 0 | 0 | 56% | 0.0% | 39.5% |
| 4.4 | 1.05 | 7 | 0 | 0 | 15 | 5.5 | 0 | 0 | 0 | 0 | 0 | 0 | 56% | 0.0% | 39.5% |
| 4.5 | 1.35 | 6.5 | 0 | 0 | 16 | 6.5 | 0 | 0 | 0 | 0 | 0 | 0 | 56% | 0.0% | 40.0% |
| 4.4 | 1.15 | 7 | 0 | 0 | 15 | 6.5 | 0 | 0 | 0 | 0 | 0 | 0 | 56% | 0.0% | 40.0% |
| 4.4 | 1.25 | 7 | 0 | 0 | 14 | 6.5 | 0 | 0 | 0 | 0 | 0 | 0 | 56% | 0.0% | 39.5% |
| 4.4 | 1 | 7 | 0 | 0 | 16 | 6 | 0 | 0 | 0 | 0 | 0 | 0 | 56% | 2.5% | 37.4% |
| 4.4 | 1.2 | 7 | 0 | 0 | 14.5 | 6.5 | 0 | 0 | 0 | 0 | 0 | 0 | 56% | 0.0% | 39.8% |
| 4.5 | 1.3 | 7.5 | 0 | 0 | 14 | 6 | 0 | 0 | 0 | 0 | 0 | 0 | 56% | 0.0% | 40.9% |
| 4.4 | 1.05 | 7 | 0 | 0 | 16 | 6.5 | 0 | 0 | 0 | 0 | 0 | 0 | 56% | 2.4% | 37.7% |
| 4.4 | 1 | 6.5 | 0 | 0 | 16 | 5.5 | 0 | 0 | 0 | 0 | 0 | 0 | 56% | 0.0% | 39.1% |
| 4.4 | 1.15 | 7 | 0 | 0 | 15.5 | 7 | 0 | 0 | 0 | 0 | 0 | 0 | 56% | 0.5% | 40.0% |
| 4.5 | 1.4 | 7 | 0 | 0 | 16 | 7 | 0 | 0 | 0 | 0 | 0 | 0 | 56% | 0.0% | 41.1% |
| 4.4 | 1.1 | 7 | 0 | 0 | 16 | 7 | 0 | 0 | 0 | 0 | 0 | 0 | 56% | 2.3% | 38.1% |
| 4.4 | 1.25 | 6.5 | 0 | 0 | 14.5 | 6 | 0 | 0 | 0 | 0 | 0 | 0 | 56% | 0.0% | 38.7% |
| 4.4 | 1.1 | 7.5 | 0 | 0 | 14 | 6 | 0 | 0 | 0 | 0 | 0 | 0 | 56% | 1.5% | 38.5% |
| 4.4 | 1.15 | 6.5 | 0 | 0 | 15.5 | 6.5 | 0 | 0 | 0 | 0 | 0 | 0 | 56% | 0.0% | 39.3% |
| 4.4 | 1.05 | 7.5 | 0 | 0 | 14.5 | 6 | 0 | 0 | 0 | 0 | 0 | 0 | 56% | 3.3% | 36.6% |
| 4.4 | 1.3 | 6 | 0 | 0 | 14.5 | 7 | 0 | 0 | 0 | 0 | 0 | 0 | 56% | 0.0% | 38.1% |
| 4.4 | 1.1 | 6.5 | 0 | 0 | 16 | 6.5 | 0 | 0 | 0 | 0 | 0 | 0 | 56% | 0.0% | 39.6% |
| 4.4 | 1.15 | 6.5 | 0 | 0 | 16 | 7 | 0 | 0 | 0 | 0 | 0 | 0 | 56% | 0.0% | 39.9% |
| 4.5 | 1.35 | 7.5 | 0 | 0 | 14.5 | 6.5 | 0 | 0 | 0 | 0 | 0 | 0 | 56% | 0.0% | 41.3% |
| 4.4 | 1.15 | 7.5 | 0 | 0 | 14 | 6.5 | 0 | 0 | 0 | 0 | 0 | 0 | 56% | 1.5% | 38.9% |
| 4.4 | 1.25 | 7.5 | 0 | 0 | 13.5 | 7 | 0 | 0 | 0 | 0 | 0 | 0 | 56% | 0.0% | 40.6% |
| 4.4 | 1.15 | 7.5 | 0 | 0 | 14.5 | 7 | 0 | 0 | 0 | 0 | 0 | 0 | 56% | 3.2% | 37.4% |
| 4.4 | 1.2 | 6 | 0 | 0 | 15 | 6.5 | 0 | 0 | 0 | 0 | 0 | 0 | 56% | 0.0% | 38.2% |
| 4.5 | 1.35 | 6.5 | 0 | 0 | 15.5 | 6.5 | 0 | 0 | 0 | 0 | 0 | 0 | 56% | 0.0% | 39.9% |
| 4.5 | 1.4 | 6 | 0 | 0 | 15 | 7 | 0 | 0 | 0 | 0 | 0 | 0 | 56% | 0.0% | 39.2% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.4 | 1.05 | 7 | 0 | 0 | 15.5 | 6.5 | 0 | 0 | 0 | 0 | 0 | 0 | 56% | 0.6% | 39.8% |
| 4.4 | 1.15 | 7 | 0 | 0 | 14.5 | 6.5 | 0 | 0 | 0 | 0 | 0 | 0 | 56% | 0.0% | 39.9% |
| 4.6 | 1.25 | 7.5 | 0 | 0 | 15 | 5 | 0 | 0 | 0 | 0 | 0 | 0 | 56% | 0.0% | 41.7% |
| 4.5 | 1.15 | 7.5 | 0 | 0 | 15.5 | 5 | 0 | 0 | 0 | 0 | 0 | 0 | 56% | 3.7% | 36.5% |
| 4.5 | 1.4 | 6 | 0 | 0 | 14.5 | 7 | 0 | 0 | 0 | 0 | 0 | 0 | 56% | 0.0% | 39.0% |
| 4.6 | 1.25 | 7 | 0 | 0 | 15.5 | 5 | 0 | 0 | 0 | 0 | 0 | 0 | 56% | 0.0% | 41.0% |
| 4.4 | 1 | 6.5 | 0 | 0 | 15.5 | 5.5 | 0 | 0 | 0 | 0 | 0 | 0 | 56% | 0.0% | 39.0% |
| 4.5 | 1.4 | 6 | 0 | 0 | 14 | 7 | 0 | 0 | 0 | 0 | 0 | 0 | 56% | 0.0% | 38.9% |
| 4.4 | 1.2 | 6.5 | 0 | 0 | 14.5 | 6.5 | 0 | 0 | 0 | 0 | 0 | 0 | 56% | 0.0% | 38.9% |
| 4.4 | 1.05 | 6.5 | 0 | 0 | 15.5 | 6 | 0 | 0 | 0 | 0 | 0 | 0 | 56% | 0.0% | 39.3% |
| 4.6 | 1.3 | 7.5 | 0 | 0 | 15.5 | 5.5 | 0 | 0 | 0 | 0 | 0 | 0 | 56% | 0.3% | 41.7% |
| 4.5 | 1.35 | 7.5 | 0 | 0 | 14 | 6.5 | 0 | 0 | 0 | 0 | 0 | 0 | 56% | 0.0% | 41.2% |
| 4.4 | 1.2 | 6 | 0 | 0 | 15.5 | 7 | 0 | 0 | 0 | 0 | 0 | 0 | 56% | 0.0% | 38.7% |
| 4.4 | 1.05 | 7.5 | 0 | 0 | 14.5 | 6.5 | 0 | 0 | 0 | 0 | 0 | 0 | 56% | 3.3% | 37.1% |
| 4.4 | 1.15 | 6.5 | 0 | 0 | 15.5 | 7 | 0 | 0 | 0 | 0 | 0 | 0 | 56% | 0.0% | 39.8% |
| 4.4 | 1.15 | 7.5 | 0 | 0 | 13.5 | 6.5 | 0 | 0 | 0 | 0 | 0 | 0 | 56% | 0.0% | 40.5% |
| 4.4 | 1.1 | 6 | 0 | 0 | 16 | 6.5 | 0 | 0 | 0 | 0 | 0 | 0 | 56% | 0.0% | 38.8% |
| 4.5 | 1.35 | 6.5 | 0 | 0 | 15 | 6.5 | 0 | 0 | 0 | 0 | 0 | 0 | 56% | 0.0% | 39.8% |
| 4.5 | 1.35 | 7 | 0 | 0 | 14.5 | 6.5 | 0 | 0 | 0 | 0 | 0 | 0 | 56% | 0.0% | 40.5% |
| 4.4 | 1 | 7.5 | 0 | 0 | 15.5 | 7 | 0 | 0 | 0 | 0 | 0 | 0 | 56% | 3.8% | 34.3% |
| 4.5 | 1.35 | 6.5 | 0 | 0 | 14.5 | 6.5 | 0 | 0 | 0 | 0 | 0 | 0 | 56% | 0.0% | 39.7% |
| 4.4 | 1.15 | 7 | 0 | 0 | 14 | 6.5 | 0 | 0 | 0 | 0 | 0 | 0 | 56% | 0.0% | 39.8% |
| 4.4 | 1.05 | 7 | 0 | 0 | 14.5 | 6 | 0 | 0 | 0 | 0 | 0 | 0 | 56% | 0.0% | 39.8% |
| 4.5 | 1.15 | 7.5 | 0 | 0 | 15 | 5 | 0 | 0 | 0 | 0 | 0 | 0 | 56% | 1.9% | 38.5% |
| 4.4 | 1.1 | 7 | 0 | 0 | 14.5 | 6.5 | 0 | 0 | 0 | 0 | 0 | 0 | 56% | 0.0% | 40.1% |
| 4.4 | 1.05 | 7 | 0 | 0 | 15 | 6.5 | 0 | 0 | 0 | 0 | 0 | 0 | 56% | 0.0% | 40.4% |
| 4.4 | 1.05 | 6 | 0 | 0 | 15.5 | 6 | 0 | 0 | 0 | 0 | 0 | 0 | 56% | 0.0% | 38.4% |
| 4.4 | 1.25 | 6.5 | 0 | 0 | 14 | 7 | 0 | 0 | 0 | 0 | 0 | 0 | 56% | 0.0% | 39.1% |
| 4.6 | 1.35 | 6 | 0 | 0 | 15 | 6 | 0 | 0 | 0 | 0 | 0 | 0 | 56% | 0.0% | 42.6% |
| 4.4 | 1.15 | 6.5 | 0 | 0 | 14.5 | 6.5 | 0 | 0 | 0 | 0 | 0 | 0 | 56% | 0.0% | 39.1% |
| 4.5 | 1.4 | 6.5 | 0 | 0 | 15.5 | 7 | 0 | 0 | 0 | 0 | 0 | 0 | 56% | 0.0% | 40.2% |
| 4.5 | 1.15 | 6.5 | 0 | 0 | 16 | 5 | 0 | 0 | 0 | 0 | 0 | 0 | 56% | 0.0% | 39.4% |
| 4.4 | 1.1 | 6.5 | 0 | 0 | 15 | 6.5 | 0 | 0 | 0 | 0 | 0 | 0 | 56% | 0.0% | 39.4% |
| 4.5 | 1.2 | 7.5 | 0 | 0 | 15.5 | 5.5 | 0 | 0 | 0 | 0 | 0 | 0 | 56% | 3.6% | 36.9% |
| 4.4 | 1.2 | 6.5 | 0 | 0 | 14.5 | 7 | 0 | 0 | 0 | 0 | 0 | 0 | 56% | 0.0% | 39.4% |
| 4.4 | 1.1 | 6.5 | 0 | 0 | 15.5 | 7 | 0 | 0 | 0 | 0 | 0 | 0 | 56% | 0.0% | 39.9% |
| 4.4 | 1.2 | 6 | 0 | 0 | 14.5 | 7 | 0 | 0 | 0 | 0 | 0 | 0 | 56% | 0.0% | 38.5% |
| 4.4 | 1 | 6.5 | 0 | 0 | 16 | 6.5 | 0 | 0 | 0 | 0 | 0 | 0 | 56% | 0.0% | 39.9% |
| 4.4 | 1.05 | 7.5 | 0 | 0 | 14.5 | 7 | 0 | 0 | 0 | 0 | 0 | 0 | 56% | 0.0% | 38.5% |
| 4.5 | 1.2 | 7 | 0 | 0 | 16 | 5.5 | 0 | 0 | 0 | 0 | 0 | 0 | 56% | 0.0% | 40.5% |
| 4.6 | 1.1 | 7.5 | 0 | 0 | 16 | 4 | 0 | 0 | 0 | 0 | 0 | 0 | 56% | 2.3% | 38.9% |
| 4.6 | 1.35 | 7.5 | 0 | 0 | 15.5 | 6 | 0 | 0 | 0 | 0 | 0 | 0 | 56% | 0.2% | 42.1% |
| 4.4 | 1.2 | 7 | 0 | 0 | 13.5 | 7 | 0 | 0 | 0 | 0 | 0 | 0 | 56% | 0.0% | 39.9% |
| 4.5 | 1.4 | 6.5 | 0 | 0 | 15 | 7 | 0 | 0 | 0 | 0 | 0 | 0 | 56% | 0.0% | 40.0% |
| 4.4 | 1.15 | 6 | 0 | 0 | 15 | 7 | 0 | 0 | 0 | 0 | 0 | 0 | 56% | 0.0% | 38.7% |
| 4.4 | 1 | 7 | 0 | 0 | 15.5 | 7 | 0 | 0 | 0 | 0 | 0 | 0 | 56% | 0.0% | 38.1% |
| 4.5 | 1.4 | 6.5 | 0 | 0 | 14.5 | 7 | 0 | 0 | 0 | 0 | 0 | 0 | 56% | 0.0% | 39.9% |
| 4.4 | 1.1 | 7 | 0 | 0 | 14.5 | 7 | 0 | 0 | 0 | 0 | 0 | 0 | 56% | 0.0% | 40.5% |
| 4.6 | 1.35 | 7 | 0 | 0 | 16 | 6 | 0 | 0 | 0 | 0 | 0 | 0 | 56% | 0.0% | 41.7% |
| 4.4 | 1 | 6 | 0 | 0 | 15.5 | 6 | 0 | 0 | 0 | 0 | 0 | 0 | 56% | 0.0% | 38.5% |
| 4.6 | 1.4 | 6 | 0 | 0 | 16 | 6.5 | 0 | 0 | 0 | 0 | 0 | 0 | 56% | 0.0% | 40.2% |
| 4.5 | 1.4 | 6.5 | 0 | 0 | 14 | 7 | 0 | 0 | 0 | 0 | 0 | 0 | 56% | 0.0% | 39.8% |
| 4.4 | 1 | 6.5 | 0 | 0 | 15.5 | 6 | 0 | 0 | 0 | 0 | 0 | 0 | 56% | 0.0% | 39.8% |
| 4.6 | 1.4 | 7.5 | 0 | 0 | 16 | 6.5 | 0 | 0 | 0 | 0 | 0 | 0 | 56% | 1.8% | 40.5% |
| 4.6 | 1.4 | 6 | 0 | 0 | 15 | 6.5 | 0 | 0 | 0 | 0 | 0 | 0 | 56% | 0.0% | 42.8% |
| 4.4 | 1 | 6.5 | 0 | 0 | 16 | 7 | 0 | 0 | 0 | 0 | 0 | 0 | 56% | 0.0% | 37.3% |
| 4.4 | 1.05 | 6.5 | 0 | 0 | 15.5 | 7 | 0 | 0 | 0 | 0 | 0 | 0 | 56% | 0.0% | 40.1% |
| 4.6 | 1.4 | 6 | 0 | 0 | 14.5 | 6.5 | 0 | 0 | 0 | 0 | 0 | 0 | 56% | 0.0% | 42.7% |
| 4.4 | 1 | 7.5 | 0 | 0 | 14.5 | 7 | 0 | 0 | 0 | 0 | 0 | 0 | 56% | 0.0% | 38.7% |
| 4.5 | 1.4 | 7.5 | 0 | 0 | 13.5 | 7 | 0 | 0 | 0 | 0 | 0 | 0 | 56% | 0.0% | 41.3% |
| 4.5 | 1.25 | 7.5 | 0 | 0 | 15.5 | 6 | 0 | 0 | 0 | 0 | 0 | 0 | 56% | 3.5% | 37.3% |
| 4.4 | 1.15 | 7 | 0 | 0 | 13.5 | 7 | 0 | 0 | 0 | 0 | 0 | 0 | 56% | 0.0% | 40.1% |
| 4.5 | 1.4 | 7 | 0 | 0 | 14 | 7 | 0 | 0 | 0 | 0 | 0 | 0 | 56% | 0.0% | 40.6% |
| 4.4 | 1.05 | 7 | 0 | 0 | 14.5 | 7 | 0 | 0 | 0 | 0 | 0 | 0 | 56% | 0.0% | 40.6% |
| 4.4 | 1 | 7 | 0 | 0 | 15 | 7 | 0 | 0 | 0 | 0 | 0 | 0 | 56% | 0.0% | 37.9% |
| 4.4 | 1.15 | 6.5 | 0 | 0 | 14 | 7 | 0 | 0 | 0 | 0 | 0 | 0 | 56% | 0.0% | 39.4% |
| 4.6 | 1.15 | 7.5 | 0 | 0 | 16 | 4.5 | 0 | 0 | 0 | 0 | 0 | 0 | 56% | 2.2% | 39.2% |
| 4.4 | 1.1 | 6.5 | 0 | 0 | 14.5 | 7 | 0 | 0 | 0 | 0 | 0 | 0 | 56% | 0.0% | 39.7% |
| 4.5 | 1.2 | 7 | 0 | 0 | 15 | 5.5 | 0 | 0 | 0 | 0 | 0 | 0 | 56% | 0.0% | 40.3% |
| 4.5 | 1.25 | 6 | 0 | 0 | 16 | 6 | 0 | 0 | 0 | 0 | 0 | 0 | 56% | 0.0% | 39.1% |
| 4.4 | 1.1 | 7.5 | 0 | 0 | 13 | 7 | 0 | 0 | 0 | 0 | 0 | 0 | 56% | 0.0% | 40.9% |
| 4.4 | 1 | 6.5 | 0 | 0 | 15.5 | 7 | 0 | 0 | 0 | 0 | 0 | 0 | 56% | 0.0% | 37.2% |
| 4.4 | 1.05 | 7.5 | 0 | 0 | 13.5 | 7 | 0 | 0 | 0 | 0 | 0 | 0 | 56% | 0.0% | 41.2% |
| 4.4 | 1.1 | 6 | 0 | 0 | 14.5 | 7 | 0 | 0 | 0 | 0 | 0 | 0 | 56% | 0.0% | 38.8% |
| 4.5 | 1.25 | 7.5 | 0 | 0 | 15 | 6 | 0 | 0 | 0 | 0 | 0 | 0 | 56% | 1.7% | 39.3% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.4 | 1 | 6 | 0 | 0 | 16 | 7 | 0 | 0 | 0 | 0 | 0 | 0 | 56% | 0.0% | 39.5% |
| 4.5 | 1.25 | 7 | 0 | 0 | 15.5 | 6 | 0 | 0 | 0 | 0 | 0 | 0 | 56% | 0.0% | 40.7% |
| 4.4 | 1 | 6 | 0 | 0 | 15 | 6.5 | 0 | 0 | 0 | 0 | 0 | 0 | 56% | 0.0% | 38.8% |
| 4.5 | 1.25 | 6.5 | 0 | 0 | 16 | 6 | 0 | 0 | 0 | 0 | 0 | 0 | 56% | 0.0% | 40.0% |
| 4.5 | 1.3 | 7.5 | 0 | 0 | 15.5 | 6.5 | 0 | 0 | 0 | 0 | 0 | 0 | 56% | 3.4% | 37.7% |
| 4.4 | 1.05 | 6.5 | 0 | 0 | 14.5 | 7 | 0 | 0 | 0 | 0 | 0 | 0 | 56% | 0.0% | 39.8% |
| 4.6 | 1.4 | 7 | 0 | 0 | 15.5 | 6.5 | 0 | 0 | 0 | 0 | 0 | 0 | 56% | 0.0% | 41.8% |
| 4.5 | 1.3 | 7 | 0 | 0 | 16 | 6.5 | 0 | 0 | 0 | 0 | 0 | 0 | 56% | 0.0% | 41.0% |
| 4.5 | 1.4 | 7 | 0 | 0 | 13 | 7 | 0 | 0 | 0 | 0 | 0 | 0 | 57% | 0.0% | 40.4% |
| 4.6 | 1.2 | 7.5 | 0 | 0 | 16 | 5 | 0 | 0 | 0 | 0 | 0 | 0 | 57% | 2.1% | 39.6% |
| 4.6 | 1.4 | 6.5 | 0 | 0 | 15.5 | 6.5 | 0 | 0 | 0 | 0 | 0 | 0 | 57% | 0.0% | 41.0% |
| 4.5 | 1.3 | 6 | 0 | 0 | 16 | 6.5 | 0 | 0 | 0 | 0 | 0 | 0 | 57% | 0.0% | 39.3% |
| 4.4 | 1 | 7 | 0 | 0 | 14 | 7 | 0 | 0 | 0 | 0 | 0 | 0 | 57% | 0.0% | 37.7% |
| 4.6 | 1.4 | 6.5 | 0 | 0 | 14 | 6.5 | 0 | 0 | 0 | 0 | 0 | 0 | 57% | 0.0% | 40.6% |
| 4.4 | 1 | 6 | 0 | 0 | 15 | 7 | 0 | 0 | 0 | 0 | 0 | 0 | 57% | 0.0% | 39.2% |
| 4.6 | 1.4 | 7 | 0 | 0 | 15 | 6.5 | 0 | 0 | 0 | 0 | 0 | 0 | 57% | 0.0% | 41.7% |
| 4.6 | 1.15 | 7 | 0 | 0 | 15.5 | 4.5 | 0 | 0 | 0 | 0 | 0 | 0 | 57% | 0.0% | 41.0% |
| 4.4 | 1 | 7.5 | 0 | 0 | 13 | 7 | 0 | 0 | 0 | 0 | 0 | 0 | 57% | 0.0% | 38.3% |
| 4.5 | 1.3 | 6 | 0 | 0 | 15 | 6.5 | 0 | 0 | 0 | 0 | 0 | 0 | 57% | 0.0% | 39.1% |
| 4.5 | 1.25 | 7.5 | 0 | 0 | 14 | 6 | 0 | 0 | 0 | 0 | 0 | 0 | 57% | 0.0% | 41.1% |
| 4.5 | 1.35 | 7.5 | 0 | 0 | 15.5 | 7 | 0 | 0 | 0 | 0 | 0 | 0 | 57% | 3.3% | 38.0% |
| 4.4 | 1 | 6 | 0 | 0 | 14.5 | 7 | 0 | 0 | 0 | 0 | 0 | 0 | 57% | 0.0% | 39.1% |
| 4.4 | 1 | 7 | 0 | 0 | 13.5 | 7 | 0 | 0 | 0 | 0 | 0 | 0 | 57% | 0.0% | 40.6% |
| 4.5 | 1.25 | 6.5 | 0 | 0 | 14.5 | 6 | 0 | 0 | 0 | 0 | 0 | 0 | 57% | 0.0% | 39.6% |
| 4.6 | 1.25 | 7.5 | 0 | 0 | 16 | 5.5 | 0 | 0 | 0 | 0 | 0 | 0 | 57% | 2.0% | 40.0% |
| 4.6 | 1.25 | 6 | 0 | 0 | 16 | 5.5 | 0 | 0 | 0 | 0 | 0 | 0 | 57% | 0.0% | 39.9% |
| 4.6 | 1.25 | 6 | 0 | 0 | 15.5 | 5.5 | 0 | 0 | 0 | 0 | 0 | 0 | 57% | 0.0% | 39.8% |
| 4.5 | 1.35 | 7.5 | 0 | 0 | 15 | 7 | 0 | 0 | 0 | 0 | 0 | 0 | 57% | 1.5% | 40.0% |
| 4.6 | 1.2 | 7.5 | 0 | 0 | 15 | 5 | 0 | 0 | 0 | 0 | 0 | 0 | 57% | 0.0% | 41.9% |
| 4.6 | 1.2 | 7 | 0 | 0 | 15.5 | 5 | 0 | 0 | 0 | 0 | 0 | 0 | 57% | 0.0% | 41.2% |
| 4.5 | 1.1 | 7 | 0 | 0 | 16 | 5 | 0 | 0 | 0 | 0 | 0 | 0 | 57% | 0.0% | 40.5% |
| 4.6 | 1.25 | 7.5 | 0 | 0 | 15.5 | 5.5 | 0 | 0 | 0 | 0 | 0 | 0 | 57% | 0.3% | 42.0% |
| 4.5 | 1.35 | 6 | 0 | 0 | 14.5 | 7 | 0 | 0 | 0 | 0 | 0 | 0 | 57% | 0.0% | 39.2% |
| 4.6 | 1.2 | 6.5 | 0 | 0 | 15.5 | 5 | 0 | 0 | 0 | 0 | 0 | 0 | 57% | 0.0% | 40.4% |
| 4.6 | 1.2 | 7.5 | 0 | 0 | 14.5 | 5 | 0 | 0 | 0 | 0 | 0 | 0 | 57% | 0.0% | 41.8% |
| 4.6 | 1.3 | 7.5 | 0 | 0 | 16 | 6 | 0 | 0 | 0 | 0 | 0 | 0 | 57% | 1.9% | 40.4% |
| 4.5 | 1.3 | 6.5 | 0 | 0 | 14 | 6.5 | 0 | 0 | 0 | 0 | 0 | 0 | 57% | 0.0% | 39.7% |
| 4.6 | 1.2 | 7 | 0 | 0 | 15 | 5 | 0 | 0 | 0 | 0 | 0 | 0 | 57% | 0.0% | 41.1% |
| 4.5 | 1.3 | 7.5 | 0 | 0 | 13.5 | 6.5 | 0 | 0 | 0 | 0 | 0 | 0 | 57% | 0.0% | 41.2% |
| 4.6 | 1.3 | 6 | 0 | 0 | 15 | 6 | 0 | 0 | 0 | 0 | 0 | 0 | 57% | 0.0% | 39.9% |
| 4.6 | 1.25 | 7 | 0 | 0 | 15.5 | 5.5 | 0 | 0 | 0 | 0 | 0 | 0 | 57% | 0.0% | 41.5% |
| 4.5 | 1.15 | 7 | 0 | 0 | 16 | 5.5 | 0 | 0 | 0 | 0 | 0 | 0 | 57% | 0.0% | 40.7% |
| 4.5 | 1.35 | 7.5 | 0 | 0 | 14 | 7 | 0 | 0 | 0 | 0 | 0 | 0 | 57% | 0.0% | 41.6% |
| 4.6 | 1.05 | 7.5 | 0 | 0 | 16 | 4 | 0 | 0 | 0 | 0 | 0 | 0 | 57% | 2.3% | 39.1% |
| 4.6 | 1.3 | 7.5 | 0 | 0 | 15.5 | 6 | 0 | 0 | 0 | 0 | 0 | 0 | 57% | 0.2% | 42.3% |
| 4.6 | 1.25 | 6.5 | 0 | 0 | 15 | 5.5 | 0 | 0 | 0 | 0 | 0 | 0 | 57% | 0.0% | 40.5% |
| 4.5 | 1.35 | 6.5 | 0 | 0 | 14.5 | 7 | 0 | 0 | 0 | 0 | 0 | 0 | 57% | 0.0% | 40.1% |
| 4.6 | 1.25 | 7.5 | 0 | 0 | 14.5 | 5.5 | 0 | 0 | 0 | 0 | 0 | 0 | 57% | 0.0% | 42.0% |
| 4.6 | 1.25 | 7 | 0 | 0 | 15 | 5.5 | 0 | 0 | 0 | 0 | 0 | 0 | 57% | 0.0% | 41.4% |
| 4.5 | 1 | 7.5 | 0 | 0 | 15.5 | 4.5 | 0 | 0 | 0 | 0 | 0 | 0 | 57% | 3.8% | 36.6% |
| 4.6 | 1.35 | 6 | 0 | 0 | 16 | 6.5 | 0 | 0 | 0 | 0 | 0 | 0 | 57% | 0.0% | 40.4% |
| 4.5 | 1.2 | 7.5 | 0 | 0 | 15 | 6 | 0 | 0 | 0 | 0 | 0 | 0 | 57% | 1.7% | 39.5% |
| 4.6 | 1.35 | 6 | 0 | 0 | 15.5 | 6.5 | 0 | 0 | 0 | 0 | 0 | 0 | 57% | 0.0% | 40.3% |
| 4.5 | 1.25 | 7.5 | 0 | 0 | 15 | 6.5 | 0 | 0 | 0 | 0 | 0 | 0 | 57% | 1.6% | 39.9% |
| 4.5 | 1 | 7 | 0 | 0 | 16 | 4.5 | 0 | 0 | 0 | 0 | 0 | 0 | 57% | 0.0% | 40.4% |
| 4.6 | 1.35 | 6 | 0 | 0 | 14.5 | 6.5 | 0 | 0 | 0 | 0 | 0 | 0 | 57% | 0.0% | 40.0% |
| 4.5 | 1.05 | 7 | 0 | 0 | 16 | 5 | 0 | 0 | 0 | 0 | 0 | 0 | 57% | 0.0% | 40.6% |
| 4.5 | 1.2 | 7 | 0 | 0 | 15.5 | 6 | 0 | 0 | 0 | 0 | 0 | 0 | 57% | 0.0% | 40.8% |
| 4.5 | 1.15 | 7 | 0 | 0 | 16 | 6 | 0 | 0 | 0 | 0 | 0 | 0 | 57% | 0.0% | 41.1% |
| 4.5 | 1.2 | 7 | 0 | 0 | 16 | 6.5 | 0 | 0 | 0 | 0 | 0 | 0 | 57% | 0.0% | 41.4% |
| 4.5 | 1.3 | 7 | 0 | 0 | 15.5 | 7 | 0 | 0 | 0 | 0 | 0 | 0 | 57% | 0.0% | 41.3% |
| 4.6 | 1.3 | 6.5 | 0 | 0 | 15.5 | 6 | 0 | 0 | 0 | 0 | 0 | 0 | 57% | 0.0% | 40.9% |
| 4.6 | 1.3 | 6.5 | 0 | 0 | 15 | 6 | 0 | 0 | 0 | 0 | 0 | 0 | 57% | 0.0% | 40.8% |
| 4.5 | 1.1 | 7.5 | 0 | 0 | 15 | 5.5 | 0 | 0 | 0 | 0 | 0 | 0 | 57% | 1.8% | 39.3% |
| 4.5 | 1.25 | 6.5 | 0 | 0 | 16 | 6.5 | 0 | 0 | 0 | 0 | 0 | 0 | 57% | 0.0% | 40.4% |
| 4.5 | 1.2 | 6 | 0 | 0 | 16 | 6 | 0 | 0 | 0 | 0 | 0 | 0 | 57% | 0.0% | 39.3% |
| 4.5 | 1.3 | 6.5 | 0 | 0 | 16 | 7 | 0 | 0 | 0 | 0 | 0 | 0 | 57% | 0.0% | 40.7% |
| 4.6 | 1.4 | 7.5 | 0 | 0 | 16 | 7 | 0 | 0 | 0 | 0 | 0 | 0 | 57% | 1.7% | 41.1% |
| 4.5 | 1.1 | 7.5 | 0 | 0 | 15.5 | 6 | 0 | 0 | 0 | 0 | 0 | 0 | 57% | 3.5% | 37.8% |
| 4.5 | 1.3 | 7.5 | 0 | 0 | 14.5 | 7 | 0 | 0 | 0 | 0 | 0 | 0 | 57% | 0.0% | 41.9% |
| 4.5 | 1.05 | 7 | 0 | 0 | 15.5 | 5 | 0 | 0 | 0 | 0 | 0 | 0 | 57% | 0.0% | 40.5% |
| 4.5 | 1.2 | 7.5 | 0 | 0 | 15.5 | 7 | 0 | 0 | 0 | 0 | 0 | 0 | 57% | 3.3% | 38.6% |
| 4.6 | 1.4 | 6 | 0 | 0 | 16 | 7 | 0 | 0 | 0 | 0 | 0 | 0 | 57% | 0.0% | 40.7% |
| 4.5 | 1.15 | 7 | 0 | 0 | 15.5 | 6 | 0 | 0 | 0 | 0 | 0 | 0 | 57% | 0.0% | 41.0% |
| 4.5 | 1.05 | 7 | 0 | 0 | 16 | 5.5 | 0 | 0 | 0 | 0 | 0 | 0 | 57% | 0.0% | 41.1% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.5 | 1.3 | 6 | 0 | 0 | 16 | 7 | 0 | 0 | 0 | 0 | 0 | 0 | 57% | 0.0% | 39.8% |
| 4.5 | 1.1 | 7 | 0 | 0 | 16 | 6 | 0 | 0 | 0 | 0 | 0 | 0 | 57% | 0.0% | 41.3% |
| 4.5 | 1.15 | 7 | 0 | 0 | 16 | 6.5 | 0 | 0 | 0 | 0 | 0 | 0 | 57% | 0.0% | 41.6% |
| 4.5 | 1.1 | 6.5 | 0 | 0 | 16 | 5.5 | 0 | 0 | 0 | 0 | 0 | 0 | 57% | 0.0% | 40.1% |
| 4.5 | 1 | 7.5 | 0 | 0 | 15 | 5 | 0 | 0 | 0 | 0 | 0 | 0 | 57% | 1.9% | 39.1% |
| 4.5 | 1.35 | 7 | 0 | 0 | 13 | 7 | 0 | 0 | 0 | 0 | 0 | 0 | 57% | 0.0% | 40.6% |
| 4.5 | 1.2 | 7 | 0 | 0 | 16 | 7 | 0 | 0 | 0 | 0 | 0 | 0 | 57% | 0.0% | 41.8% |
| 4.6 | 1.4 | 6 | 0 | 0 | 14 | 7 | 0 | 0 | 0 | 0 | 0 | 0 | 57% | 0.0% | 40.2% |
| 4.5 | 1.2 | 6.5 | 0 | 0 | 16 | 6.5 | 0 | 0 | 0 | 0 | 0 | 0 | 57% | 0.0% | 40.6% |
| 4.5 | 1.15 | 7.5 | 0 | 0 | 14.5 | 6 | 0 | 0 | 0 | 0 | 0 | 0 | 57% | 0.0% | 41.6% |
| 4.5 | 1 | 7.5 | 0 | 0 | 15.5 | 5.5 | 0 | 0 | 0 | 0 | 0 | 0 | 57% | 3.6% | 37.7% |
| 4.5 | 1.25 | 6.5 | 0 | 0 | 16 | 7 | 0 | 0 | 0 | 0 | 0 | 0 | 57% | 0.0% | 40.8% |
| 4.5 | 1.3 | 7.5 | 0 | 0 | 14 | 7 | 0 | 0 | 0 | 0 | 0 | 0 | 57% | 0.0% | 41.8% |
| 4.5 | 1.3 | 6 | 0 | 0 | 15.5 | 7 | 0 | 0 | 0 | 0 | 0 | 0 | 57% | 0.0% | 39.7% |
| 4.5 | 1.2 | 7 | 0 | 0 | 14.5 | 6 | 0 | 0 | 0 | 0 | 0 | 0 | 57% | 0.0% | 40.6% |
| 4.5 | 1.1 | 7 | 0 | 0 | 15 | 5.5 | 0 | 0 | 0 | 0 | 0 | 0 | 57% | 0.0% | 40.7% |
| 4.5 | 1.15 | 6 | 0 | 0 | 16 | 6 | 0 | 0 | 0 | 0 | 0 | 0 | 57% | 0.0% | 39.4% |
| 4.6 | 1.35 | 7.5 | 0 | 0 | 14.5 | 6.5 | 0 | 0 | 0 | 0 | 0 | 0 | 57% | 0.0% | 42.6% |
| 4.6 | 1.35 | 6.5 | 0 | 0 | 15 | 6.5 | 0 | 0 | 0 | 0 | 0 | 0 | 57% | 0.0% | 41.1% |
| 4.6 | 1.35 | 6.5 | 0 | 0 | 14.5 | 6.5 | 0 | 0 | 0 | 0 | 0 | 0 | 57% | 0.0% | 41.0% |
| 4.5 | 1.1 | 7 | 0 | 0 | 15.5 | 6 | 0 | 0 | 0 | 0 | 0 | 0 | 57% | 0.0% | 41.2% |
| 4.5 | 1.2 | 6 | 0 | 0 | 16 | 6.5 | 0 | 0 | 0 | 0 | 0 | 0 | 57% | 0.0% | 39.7% |
| 4.5 | 1 | 7 | 0 | 0 | 16 | 5.5 | 0 | 0 | 0 | 0 | 0 | 0 | 57% | 0.0% | 41.2% |
| 4.5 | 1.25 | 6 | 0 | 0 | 16 | 7 | 0 | 0 | 0 | 0 | 0 | 0 | 57% | 0.0% | 40.0% |
| 4.5 | 1.1 | 7 | 0 | 0 | 16 | 6.5 | 0 | 0 | 0 | 0 | 0 | 0 | 57% | 0.0% | 41.7% |
| 4.5 | 1.1 | 6.5 | 0 | 0 | 15.5 | 5.5 | 0 | 0 | 0 | 0 | 0 | 0 | 57% | 0.0% | 39.9% |
| 4.5 | 1.05 | 6.5 | 0 | 0 | 16 | 5.5 | 0 | 0 | 0 | 0 | 0 | 0 | 57% | 0.0% | 40.3% |
| 4.5 | 1.15 | 7 | 0 | 0 | 16 | 7 | 0 | 0 | 0 | 0 | 0 | 0 | 57% | 0.0% | 42.0% |
| 4.5 | 1.2 | 6.5 | 0 | 0 | 15.5 | 6.5 | 0 | 0 | 0 | 0 | 0 | 0 | 57% | 0.0% | 40.5% |
| 4.5 | 1.3 | 7.5 | 0 | 0 | 13.5 | 7 | 0 | 0 | 0 | 0 | 0 | 0 | 57% | 0.0% | 41.7% |
| 4.5 | 1.25 | 6.5 | 0 | 0 | 15.5 | 7 | 0 | 0 | 0 | 0 | 0 | 0 | 57% | 0.0% | 40.7% |
| 4.6 | 1.15 | 7.5 | 0 | 0 | 15.5 | 5 | 0 | 0 | 0 | 0 | 0 | 0 | 57% | 0.3% | 41.8% |
| 4.5 | 1 | 7.5 | 0 | 0 | 15.5 | 6 | 0 | 0 | 0 | 0 | 0 | 0 | 57% | 3.5% | 38.2% |
| 4.5 | 1.15 | 7.5 | 0 | 0 | 14.5 | 6.5 | 0 | 0 | 0 | 0 | 0 | 0 | 57% | 0.0% | 42.0% |
| 4.5 | 1.15 | 6 | 0 | 0 | 15.5 | 6 | 0 | 0 | 0 | 0 | 0 | 0 | 57% | 0.0% | 39.3% |
| 4.5 | 1.2 | 6.5 | 0 | 0 | 16 | 7 | 0 | 0 | 0 | 0 | 0 | 0 | 57% | 0.0% | 41.0% |
| 4.5 | 1.25 | 6 | 0 | 0 | 15.5 | 7 | 0 | 0 | 0 | 0 | 0 | 0 | 57% | 0.0% | 39.8% |
| 4.5 | 1.3 | 7 | 0 | 0 | 14 | 7 | 0 | 0 | 0 | 0 | 0 | 0 | 57% | 0.0% | 41.0% |
| 4.5 | 1.3 | 6 | 0 | 0 | 14.5 | 7 | 0 | 0 | 0 | 0 | 0 | 0 | 57% | 0.0% | 39.4% |
| 4.5 | 1.15 | 7 | 0 | 0 | 14.5 | 6 | 0 | 0 | 0 | 0 | 0 | 0 | 57% | 0.0% | 40.8% |
| 4.6 | 1.15 | 7 | 0 | 0 | 16 | 5 | 0 | 0 | 0 | 0 | 0 | 0 | 57% | 0.0% | 41.5% |
| 4.6 | 1.2 | 7.5 | 0 | 0 | 16 | 5.5 | 0 | 0 | 0 | 0 | 0 | 0 | 57% | 2.0% | 40.2% |
| 4.5 | 1.25 | 7 | 0 | 0 | 14.5 | 7 | 0 | 0 | 0 | 0 | 0 | 0 | 57% | 0.0% | 41.3% |
| 4.5 | 1.1 | 6 | 0 | 0 | 16 | 6 | 0 | 0 | 0 | 0 | 0 | 0 | 57% | 0.0% | 39.6% |
| 4.6 | 1.4 | 6.5 | 0 | 0 | 15.5 | 7 | 0 | 0 | 0 | 0 | 0 | 0 | 57% | 0.0% | 41.5% |
| 4.5 | 1.15 | 6.5 | 0 | 0 | 15 | 6 | 0 | 0 | 0 | 0 | 0 | 0 | 57% | 0.0% | 40.1% |
| 4.5 | 1.2 | 6.5 | 0 | 0 | 15 | 6.5 | 0 | 0 | 0 | 0 | 0 | 0 | 57% | 0.0% | 40.3% |
| 4.5 | 1.15 | 7 | 0 | 0 | 15.5 | 7 | 0 | 0 | 0 | 0 | 0 | 0 | 57% | 0.0% | 41.9% |
| 4.5 | 1.25 | 6.5 | 0 | 0 | 14 | 6.5 | 0 | 0 | 0 | 0 | 0 | 0 | 57% | 0.0% | 39.9% |
| 4.5 | 1.25 | 7.5 | 0 | 0 | 13 | 6.5 | 0 | 0 | 0 | 0 | 0 | 0 | 57% | 0.0% | 41.3% |
| 4.5 | 1.25 | 6 | 0 | 0 | 15 | 7 | 0 | 0 | 0 | 0 | 0 | 0 | 57% | 0.0% | 39.7% |
| 4.5 | 1.1 | 6.5 | 0 | 0 | 15.5 | 6 | 0 | 0 | 0 | 0 | 0 | 0 | 57% | 0.0% | 40.4% |
| 4.6 | 1.4 | 6.5 | 0 | 0 | 14.5 | 7 | 0 | 0 | 0 | 0 | 0 | 0 | 57% | 0.0% | 41.2% |
| 4.5 | 1 | 7.5 | 0 | 0 | 14.5 | 5.5 | 0 | 0 | 0 | 0 | 0 | 0 | 57% | 0.0% | 41.7% |
| 4.5 | 1.2 | 6.5 | 0 | 0 | 15.5 | 7 | 0 | 0 | 0 | 0 | 0 | 0 | 57% | 0.0% | 40.9% |
| 4.5 | 1.15 | 6.5 | 0 | 0 | 16 | 7 | 0 | 0 | 0 | 0 | 0 | 0 | 57% | 0.0% | 41.2% |
| 4.5 | 1.15 | 7.5 | 0 | 0 | 14 | 6.5 | 0 | 0 | 0 | 0 | 0 | 0 | 57% | 0.0% | 41.9% |
| 4.5 | 1.15 | 6 | 0 | 0 | 15.5 | 7 | 0 | 0 | 0 | 0 | 0 | 0 | 57% | 0.0% | 39.7% |
| 4.5 | 1.05 | 7.5 | 0 | 0 | 15 | 6.5 | 0 | 0 | 0 | 0 | 0 | 0 | 57% | 1.6% | 40.5% |
| 4.6 | 1.4 | 7 | 0 | 0 | 15 | 7 | 0 | 0 | 0 | 0 | 0 | 0 | 57% | 0.0% | 42.2% |
| 4.5 | 1 | 7.5 | 0 | 0 | 15.5 | 6.5 | 0 | 0 | 0 | 0 | 0 | 0 | 57% | 3.4% | 38.7% |
| 4.5 | 1.25 | 7 | 0 | 0 | 13.5 | 6.5 | 0 | 0 | 0 | 0 | 0 | 0 | 57% | 0.0% | 40.6% |
| 4.5 | 1.2 | 7 | 0 | 0 | 14 | 6.5 | 0 | 0 | 0 | 0 | 0 | 0 | 57% | 0.0% | 40.9% |
| 4.5 | 1.05 | 7.5 | 0 | 0 | 15.5 | 7 | 0 | 0 | 0 | 0 | 0 | 0 | 57% | 3.3% | 39.0% |
| 4.5 | 1 | 7 | 0 | 0 | 15 | 5.5 | 0 | 0 | 0 | 0 | 0 | 0 | 57% | 0.0% | 41.0% |
| 4.5 | 1.05 | 7 | 0 | 0 | 15 | 6 | 0 | 0 | 0 | 0 | 0 | 0 | 57% | 0.0% | 41.2% |
| 4.5 | 1.3 | 6.5 | 0 | 0 | 13.5 | 7 | 0 | 0 | 0 | 0 | 0 | 0 | 57% | 0.0% | 40.1% |
| 4.5 | 1.2 | 7 | 0 | 0 | 14.5 | 7 | 0 | 0 | 0 | 0 | 0 | 0 | 57% | 0.0% | 41.5% |
| 4.6 | 1.2 | 7.5 | 0 | 0 | 15.5 | 5.5 | 0 | 0 | 0 | 0 | 0 | 0 | 57% | 0.2% | 42.2% |
| 4.5 | 1.05 | 6 | 0 | 0 | 16 | 6 | 0 | 0 | 0 | 0 | 0 | 0 | 57% | 0.0% | 39.8% |
| 4.6 | 1.35 | 7 | 0 | 0 | 13.5 | 6.5 | 0 | 0 | 0 | 0 | 0 | 0 | 57% | 0.0% | 41.6% |
| 4.5 | 1.1 | 6 | 0 | 0 | 16 | 6.5 | 0 | 0 | 0 | 0 | 0 | 0 | 57% | 0.0% | 40.1% |
| 4.5 | 1.15 | 7 | 0 | 0 | 15 | 7 | 0 | 0 | 0 | 0 | 0 | 0 | 57% | 0.0% | 41.7% |
| 4.5 | 1 | 6.5 | 0 | 0 | 15.5 | 5.5 | 0 | 0 | 0 | 0 | 0 | 0 | 57% | 0.0% | 40.3% |
| 4.5 | 1.15 | 7.5 | 0 | 0 | 13.5 | 6.5 | 0 | 0 | 0 | 0 | 0 | 0 | 57% | 0.0% | 41.8% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.5 | 1.05 | 7 | 0 | 0 | 16 | 7 | 0 | 0 | 0 | 0 | 0 | 0 | 57% | 0.0% | 42.3% |
| 4.5 | 1.1 | 6.5 | 0 | 0 | 15.5 | 6.5 | 0 | 0 | 0 | 0 | 0 | 0 | 57% | 0.0% | 40.8% |
| 4.5 | 1.05 | 7.5 | 0 | 0 | 14 | 6 | 0 | 0 | 0 | 0 | 0 | 0 | 57% | 0.0% | 41.8% |
| 4.5 | 1.25 | 6 | 0 | 0 | 14 | 7 | 0 | 0 | 0 | 0 | 0 | 0 | 57% | 0.0% | 39.5% |
| 4.5 | 1.3 | 7 | 0 | 0 | 13 | 7 | 0 | 0 | 0 | 0 | 0 | 0 | 57% | 0.0% | 40.8% |
| 4.6 | 1.15 | 7 | 0 | 0 | 15 | 5 | 0 | 0 | 0 | 0 | 0 | 0 | 57% | 0.0% | 41.3% |
| 4.5 | 1.2 | 7.5 | 0 | 0 | 13.5 | 7 | 0 | 0 | 0 | 0 | 0 | 0 | 57% | 0.0% | 42.0% |
| 4.5 | 1 | 7.5 | 0 | 0 | 15 | 6.5 | 0 | 0 | 0 | 0 | 0 | 0 | 57% | 1.6% | 40.7% |
| 4.5 | 1.15 | 7.5 | 0 | 0 | 14 | 7 | 0 | 0 | 0 | 0 | 0 | 0 | 57% | 0.0% | 42.3% |
| 4.5 | 1.05 | 7 | 0 | 0 | 14.5 | 6 | 0 | 0 | 0 | 0 | 0 | 0 | 57% | 0.0% | 41.1% |
| 4.5 | 1.15 | 6 | 0 | 0 | 15.5 | 7 | 0 | 0 | 0 | 0 | 0 | 0 | 57% | 0.0% | 40.2% |
| 4.5 | 1.15 | 7 | 0 | 0 | 14.5 | 7 | 0 | 0 | 0 | 0 | 0 | 0 | 57% | 0.0% | 41.6% |
| 4.5 | 1.2 | 7 | 0 | 0 | 14 | 7 | 0 | 0 | 0 | 0 | 0 | 0 | 57% | 0.0% | 41.4% |
| 4.5 | 1.2 | 6.5 | 0 | 0 | 14.5 | 7 | 0 | 0 | 0 | 0 | 0 | 0 | 57% | 0.0% | 40.6% |
| 4.5 | 1 | 6 | 0 | 0 | 16 | 6 | 0 | 0 | 0 | 0 | 0 | 0 | 57% | 0.0% | 40.0% |
| 4.5 | 1.05 | 7 | 0 | 0 | 15 | 6.5 | 0 | 0 | 0 | 0 | 0 | 0 | 57% | 0.0% | 41.7% |
| 4.6 | 1.4 | 7.5 | 0 | 0 | 13.5 | 7 | 0 | 0 | 0 | 0 | 0 | 0 | 57% | 0.0% | 42.6% |
| 4.5 | 1.05 | 6.5 | 0 | 0 | 15 | 6 | 0 | 0 | 0 | 0 | 0 | 0 | 57% | 0.0% | 40.4% |
| 4.5 | 1 | 7 | 0 | 0 | 16 | 7 | 0 | 0 | 0 | 0 | 0 | 0 | 57% | 0.0% | 39.5% |
| 4.6 | 1.2 | 6.5 | 0 | 0 | 16 | 5.5 | 0 | 0 | 0 | 0 | 0 | 0 | 57% | 0.0% | 41.0% |
| 4.6 | 1.4 | 7 | 0 | 0 | 14 | 7 | 0 | 0 | 0 | 0 | 0 | 0 | 57% | 0.0% | 41.9% |
| 4.5 | 1.1 | 6.5 | 0 | 0 | 15 | 6.5 | 0 | 0 | 0 | 0 | 0 | 0 | 57% | 0.0% | 40.7% |
| 4.5 | 1 | 6.5 | 0 | 0 | 16 | 6.5 | 0 | 0 | 0 | 0 | 0 | 0 | 57% | 0.0% | 41.2% |
| 4.5 | 1.15 | 7.5 | 0 | 0 | 13.5 | 7 | 0 | 0 | 0 | 0 | 0 | 0 | 57% | 0.0% | 42.2% |
| 4.5 | 1.15 | 6 | 0 | 0 | 15 | 7 | 0 | 0 | 0 | 0 | 0 | 0 | 57% | 0.0% | 40.1% |
| 4.5 | 1.1 | 6.5 | 0 | 0 | 15.5 | 7 | 0 | 0 | 0 | 0 | 0 | 0 | 57% | 0.0% | 41.2% |
| 4.5 | 1.1 | 7.5 | 0 | 0 | 14 | 7 | 0 | 0 | 0 | 0 | 0 | 0 | 57% | 0.0% | 42.4% |
| 4.5 | 1.05 | 6.5 | 0 | 0 | 16 | 7 | 0 | 0 | 0 | 0 | 0 | 0 | 57% | 0.0% | 41.5% |
| 4.5 | 1.05 | 7.5 | 0 | 0 | 14.5 | 7 | 0 | 0 | 0 | 0 | 0 | 0 | 57% | 0.0% | 42.7% |
| 4.5 | 1.15 | 7 | 0 | 0 | 14 | 7 | 0 | 0 | 0 | 0 | 0 | 0 | 57% | 0.0% | 41.5% |
| 4.5 | 1 | 7.5 | 0 | 0 | 15 | 7 | 0 | 0 | 0 | 0 | 0 | 0 | 57% | 0.0% | 40.1% |
| 4.5 | 1.1 | 7 | 0 | 0 | 14 | 6.5 | 0 | 0 | 0 | 0 | 0 | 0 | 57% | 0.0% | 41.3% |
| 4.6 | 1.2 | 7 | 0 | 0 | 15 | 5.5 | 0 | 0 | 0 | 0 | 0 | 0 | 57% | 0.0% | 41.6% |
| 4.5 | 1.1 | 7 | 0 | 0 | 14.5 | 7 | 0 | 0 | 0 | 0 | 0 | 0 | 57% | 0.0% | 41.8% |
| 4.5 | 1.15 | 6.5 | 0 | 0 | 14.5 | 7 | 0 | 0 | 0 | 0 | 0 | 0 | 58% | 0.0% | 40.8% |
| 4.5 | 1 | 6 | 0 | 0 | 16 | 6.5 | 0 | 0 | 0 | 0 | 0 | 0 | 58% | 0.0% | 40.4% |
| 4.5 | 1.05 | 7.5 | 0 | 0 | 13.5 | 6.5 | 0 | 0 | 0 | 0 | 0 | 0 | 58% | 0.0% | 42.1% |
| 4.6 | 1.25 | 7.5 | 0 | 0 | 15 | 6 | 0 | 0 | 0 | 0 | 0 | 0 | 58% | 0.0% | 42.6% |
| 4.5 | 1.05 | 6 | 0 | 0 | 15 | 6.5 | 0 | 0 | 0 | 0 | 0 | 0 | 58% | 0.0% | 39.9% |
| 4.5 | 1 | 7.5 | 0 | 0 | 14 | 6.5 | 0 | 0 | 0 | 0 | 0 | 0 | 58% | 0.0% | 42.4% |
| 4.6 | 1.3 | 6 | 0 | 0 | 15.5 | 6.5 | 0 | 0 | 0 | 0 | 0 | 0 | 58% | 0.0% | 40.5% |
| 4.5 | 1.05 | 7.5 | 0 | 0 | 14 | 7 | 0 | 0 | 0 | 0 | 0 | 0 | 58% | 0.0% | 42.6% |
| 4.5 | 1.15 | 6.5 | 0 | 0 | 14 | 7 | 0 | 0 | 0 | 0 | 0 | 0 | 58% | 0.0% | 40.7% |
| 4.6 | 1.3 | 7.5 | 0 | 0 | 15.5 | 6.5 | 0 | 0 | 0 | 0 | 0 | 0 | 58% | 0.0% | 43.0% |
| 4.5 | 1.05 | 7 | 0 | 0 | 14 | 6.5 | 0 | 0 | 0 | 0 | 0 | 0 | 58% | 0.0% | 41.4% |
| 4.6 | 1.3 | 6 | 0 | 0 | 14.5 | 6.5 | 0 | 0 | 0 | 0 | 0 | 0 | 58% | 0.0% | 40.2% |
| 4.6 | 1.4 | 7.5 | 0 | 0 | 12.5 | 7 | 0 | 0 | 0 | 0 | 0 | 0 | 58% | 0.0% | 42.4% |
| 4.6 | 1.3 | 7 | 0 | 0 | 16 | 6.5 | 0 | 0 | 0 | 0 | 0 | 0 | 58% | 0.0% | 42.3% |
| 4.5 | 1.1 | 6.5 | 0 | 0 | 14.5 | 7 | 0 | 0 | 0 | 0 | 0 | 0 | 58% | 0.0% | 41.0% |
| 4.5 | 1 | 7 | 0 | 0 | 15 | 7 | 0 | 0 | 0 | 0 | 0 | 0 | 58% | 0.0% | 39.3% |
| 4.6 | 1.25 | 7.5 | 0 | 0 | 14.5 | 6 | 0 | 0 | 0 | 0 | 0 | 0 | 58% | 0.0% | 42.5% |
| 4.5 | 1 | 7.5 | 0 | 0 | 13.5 | 6.5 | 0 | 0 | 0 | 0 | 0 | 0 | 58% | 0.0% | 42.3% |
| 4.6 | 1.25 | 7 | 0 | 0 | 15 | 6 | 0 | 0 | 0 | 0 | 0 | 0 | 58% | 0.0% | 41.8% |
| 4.5 | 1 | 6 | 0 | 0 | 16 | 7 | 0 | 0 | 0 | 0 | 0 | 0 | 58% | 0.0% | 40.8% |
| 4.6 | 1.3 | 7.5 | 0 | 0 | 15 | 6.5 | 0 | 0 | 0 | 0 | 0 | 0 | 58% | 0.0% | 42.8% |
| 4.5 | 1.1 | 7 | 0 | 0 | 13.5 | 7 | 0 | 0 | 0 | 0 | 0 | 0 | 58% | 0.0% | 41.6% |
| 4.6 | 1.3 | 7 | 0 | 0 | 15.5 | 6.5 | 0 | 0 | 0 | 0 | 0 | 0 | 58% | 0.0% | 42.2% |
| 4.6 | 1.05 | 7 | 0 | 0 | 16 | 4.5 | 0 | 0 | 0 | 0 | 0 | 0 | 58% | 0.0% | 41.5% |
| 4.6 | 1.25 | 7.5 | 0 | 0 | 14 | 6 | 0 | 0 | 0 | 0 | 0 | 0 | 58% | 0.0% | 42.4% |
| 4.6 | 1.35 | 6 | 0 | 0 | 15 | 7 | 0 | 0 | 0 | 0 | 0 | 0 | 58% | 0.0% | 40.6% |
| 4.5 | 1.05 | 6.5 | 0 | 0 | 14.5 | 7 | 0 | 0 | 0 | 0 | 0 | 0 | 58% | 0.0% | 41.1% |
| 4.6 | 1.3 | 6.5 | 0 | 0 | 15.5 | 6.5 | 0 | 0 | 0 | 0 | 0 | 0 | 58% | 0.0% | 41.4% |
| 4.6 | 1.35 | 7 | 0 | 0 | 16 | 7 | 0 | 0 | 0 | 0 | 0 | 0 | 58% | 0.0% | 42.6% |
| 4.5 | 1 | 6.5 | 0 | 0 | 15 | 7 | 0 | 0 | 0 | 0 | 0 | 0 | 58% | 0.0% | 41.4% |
| 4.6 | 1.3 | 7 | 0 | 0 | 15 | 6.5 | 0 | 0 | 0 | 0 | 0 | 0 | 58% | 0.0% | 42.1% |
| 4.5 | 1.05 | 6.5 | 0 | 0 | 14 | 7 | 0 | 0 | 0 | 0 | 0 | 0 | 58% | 0.0% | 41.0% |
| 4.5 | 1 | 7 | 0 | 0 | 14 | 7 | 0 | 0 | 0 | 0 | 0 | 0 | 58% | 0.0% | 42.0% |
| 4.6 | 1.25 | 7 | 0 | 0 | 14 | 6 | 0 | 0 | 0 | 0 | 0 | 0 | 58% | 0.0% | 41.6% |
| 4.5 | 1 | 7.5 | 0 | 0 | 13 | 7 | 0 | 0 | 0 | 0 | 0 | 0 | 58% | 0.0% | 39.6% |
| 4.6 | 1.35 | 6.5 | 0 | 0 | 16 | 7 | 0 | 0 | 0 | 0 | 0 | 0 | 58% | 0.0% | 41.8% |
| 4.6 | 1.3 | 7 | 0 | 0 | 14.5 | 6.5 | 0 | 0 | 0 | 0 | 0 | 0 | 58% | 0.0% | 42.0% |
| 4.5 | 1 | 7 | 0 | 0 | 13.5 | 7 | 0 | 0 | 0 | 0 | 0 | 0 | 58% | 0.0% | 41.9% |
| 4.6 | 1.35 | 6.5 | 0 | 0 | 15 | 7 | 0 | 0 | 0 | 0 | 0 | 0 | 58% | 0.0% | 41.5% |
| 4.6 | 1.35 | 7 | 0 | 0 | 15 | 7 | 0 | 0 | 0 | 0 | 0 | 0 | 58% | 0.0% | 42.4% |
| 4.6 | 1.3 | 7.5 | 0 | 0 | 13.5 | 6.5 | 0 | 0 | 0 | 0 | 0 | 0 | 58% | 0.0% | 42.5% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.6 | 1.35 | 6.5 | 0 | 0 | 13.5 | 7 | 0 | 0 | 0 | 0 | 0 | 0 | 58% | 0.0% | 41.2% |
| 4.6 | 1.15 | 7.5 | 0 | 0 | 15.5 | 5.5 | 0 | 0 | 0 | 0 | 0 | 0 | 58% | 0.2% | 42.4% |
| 4.6 | 1.35 | 7.5 | 0 | 0 | 14 | 7 | 0 | 0 | 0 | 0 | 0 | 0 | 58% | 0.0% | 42.9% |
| 4.6 | 1.3 | 7.5 | 0 | 0 | 13 | 6.5 | 0 | 0 | 0 | 0 | 0 | 0 | 58% | 0.0% | 42.4% |
| 4.6 | 1.3 | 7.5 | 0 | 0 | 16 | 7 | 0 | 0 | 0 | 0 | 0 | 0 | 58% | 1.7% | 41.6% |
| 4.6 | 1.2 | 6 | 0 | 0 | 16 | 6 | 0 | 0 | 0 | 0 | 0 | 0 | 58% | 0.0% | 40.5% |
| 4.6 | 1.2 | 6 | 0 | 0 | 15.5 | 6 | 0 | 0 | 0 | 0 | 0 | 0 | 58% | 0.0% | 40.4% |
| 4.6 | 1 | 7.5 | 0 | 0 | 16 | 4.5 | 0 | 0 | 0 | 0 | 0 | 0 | 58% | 2.1% | 39.9% |
| 4.6 | 1.15 | 6.5 | 0 | 0 | 15.5 | 5.5 | 0 | 0 | 0 | 0 | 0 | 0 | 58% | 0.0% | 41.0% |
| 4.6 | 1.15 | 7.5 | 0 | 0 | 14.5 | 5.5 | 0 | 0 | 0 | 0 | 0 | 0 | 58% | 0.0% | 42.4% |
| 4.6 | 1.35 | 7 | 0 | 0 | 13 | 7 | 0 | 0 | 0 | 0 | 0 | 0 | 58% | 0.0% | 41.9% |
| 4.6 | 1.2 | 7.5 | 0 | 0 | 16 | 6.5 | 0 | 0 | 0 | 0 | 0 | 0 | 58% | 1.7% | 41.4% |
| 4.6 | 1.15 | 7 | 0 | 0 | 15 | 5.5 | 0 | 0 | 0 | 0 | 0 | 0 | 58% | 0.0% | 41.8% |
| 4.6 | 1 | 7.5 | 0 | 0 | 15.5 | 4.5 | 0 | 0 | 0 | 0 | 0 | 0 | 58% | 0.4% | 41.9% |
| 4.6 | 1 | 7.5 | 0 | 0 | 16 | 5 | 0 | 0 | 0 | 0 | 0 | 0 | 58% | 2.0% | 40.5% |
| 4.6 | 1.25 | 6 | 0 | 0 | 16 | 6.5 | 0 | 0 | 0 | 0 | 0 | 0 | 58% | 0.0% | 40.8% |
| 4.6 | 1.2 | 6.5 | 0 | 0 | 16 | 6 | 0 | 0 | 0 | 0 | 0 | 0 | 58% | 0.0% | 41.4% |
| 4.6 | 1.2 | 7.5 | 0 | 0 | 15.5 | 6.5 | 0 | 0 | 0 | 0 | 0 | 0 | 58% | 0.0% | 43.3% |
| 4.6 | 1.3 | 7.5 | 0 | 0 | 15 | 7 | 0 | 0 | 0 | 0 | 0 | 0 | 58% | 0.0% | 43.3% |
| 4.6 | 1.25 | 6 | 0 | 0 | 15.5 | 6.5 | 0 | 0 | 0 | 0 | 0 | 0 | 58% | 0.0% | 40.7% |
| 4.6 | 1.25 | 7.5 | 0 | 0 | 15.5 | 7 | 0 | 0 | 0 | 0 | 0 | 0 | 58% | 0.0% | 43.6% |
| 4.6 | 1.1 | 7 | 0 | 0 | 16 | 5.5 | 0 | 0 | 0 | 0 | 0 | 0 | 58% | 0.0% | 42.2% |
| 4.6 | 1.15 | 7 | 0 | 0 | 16 | 6 | 0 | 0 | 0 | 0 | 0 | 0 | 58% | 0.0% | 42.4% |
| 4.6 | 1.05 | 7.5 | 0 | 0 | 15 | 5 | 0 | 0 | 0 | 0 | 0 | 0 | 58% | 0.0% | 42.5% |
| 4.6 | 1.2 | 6.5 | 0 | 0 | 15 | 6 | 0 | 0 | 0 | 0 | 0 | 0 | 58% | 0.0% | 41.2% |
| 4.6 | 1.2 | 7 | 0 | 0 | 15 | 6 | 0 | 0 | 0 | 0 | 0 | 0 | 58% | 0.0% | 42.0% |
| 4.6 | 1.05 | 7.5 | 0 | 0 | 15.5 | 5.5 | 0 | 0 | 0 | 0 | 0 | 0 | 58% | 0.1% | 42.9% |
| 4.6 | 1.25 | 7.5 | 0 | 0 | 14.5 | 6.5 | 0 | 0 | 0 | 0 | 0 | 0 | 58% | 0.0% | 42.9% |
| 4.6 | 1.3 | 6.5 | 0 | 0 | 16 | 7 | 0 | 0 | 0 | 0 | 0 | 0 | 58% | 0.0% | 41.9% |
| 4.6 | 1.1 | 7.5 | 0 | 0 | 15.5 | 6 | 0 | 0 | 0 | 0 | 0 | 0 | 58% | 0.0% | 43.2% |
| 4.6 | 1.05 | 7 | 0 | 0 | 15.5 | 5 | 0 | 0 | 0 | 0 | 0 | 0 | 58% | 0.0% | 41.8% |
| 4.6 | 1.1 | 7.5 | 0 | 0 | 16 | 6.5 | 0 | 0 | 0 | 0 | 0 | 0 | 58% | 1.7% | 41.7% |
| 4.6 | 1.15 | 7 | 0 | 0 | 15.5 | 6 | 0 | 0 | 0 | 0 | 0 | 0 | 58% | 0.0% | 42.3% |
| 4.6 | 1.3 | 6.5 | 0 | 0 | 15.5 | 7 | 0 | 0 | 0 | 0 | 0 | 0 | 58% | 0.0% | 41.8% |
| 4.6 | 1.3 | 7 | 0 | 0 | 15 | 7 | 0 | 0 | 0 | 0 | 0 | 0 | 58% | 0.0% | 42.5% |
| 4.6 | 1.3 | 6 | 0 | 0 | 15.5 | 7 | 0 | 0 | 0 | 0 | 0 | 0 | 58% | 0.0% | 41.0% |
| 4.6 | 1.1 | 6 | 0 | 0 | 16 | 5.5 | 0 | 0 | 0 | 0 | 0 | 0 | 58% | 0.0% | 40.5% |
| 4.6 | 1.1 | 7.5 | 0 | 0 | 14.5 | 5.5 | 0 | 0 | 0 | 0 | 0 | 0 | 58% | 0.0% | 42.6% |
| 4.6 | 1.2 | 7 | 0 | 0 | 16 | 7 | 0 | 0 | 0 | 0 | 0 | 0 | 58% | 0.0% | 43.1% |
| 4.6 | 1 | 7.5 | 0 | 0 | 15 | 5 | 0 | 0 | 0 | 0 | 0 | 0 | 58% | 0.0% | 42.7% |
| 4.6 | 1.2 | 6.5 | 0 | 0 | 16 | 6.5 | 0 | 0 | 0 | 0 | 0 | 0 | 58% | 0.0% | 41.9% |
| 4.6 | 1.1 | 7.5 | 0 | 0 | 15 | 6 | 0 | 0 | 0 | 0 | 0 | 0 | 58% | 0.0% | 43.1% |
| 4.6 | 1.25 | 6.5 | 0 | 0 | 15 | 6.5 | 0 | 0 | 0 | 0 | 0 | 0 | 58% | 0.0% | 41.5% |
| 4.6 | 1 | 7.5 | 0 | 0 | 15.5 | 5.5 | 0 | 0 | 0 | 0 | 0 | 0 | 58% | 0.1% | 43.0% |
| 4.6 | 1.3 | 6 | 0 | 0 | 15 | 7 | 0 | 0 | 0 | 0 | 0 | 0 | 58% | 0.0% | 40.8% |
| 4.6 | 1.25 | 7 | 0 | 0 | 14.5 | 6.5 | 0 | 0 | 0 | 0 | 0 | 0 | 58% | 0.0% | 42.2% |
| 4.6 | 1.1 | 6.5 | 0 | 0 | 15.5 | 5.5 | 0 | 0 | 0 | 0 | 0 | 0 | 58% | 0.0% | 41.2% |
| 4.6 | 1.15 | 7.5 | 0 | 0 | 15.5 | 7 | 0 | 0 | 0 | 0 | 0 | 0 | 58% | 0.0% | 43.9% |
| 4.6 | 1 | 7.5 | 0 | 0 | 16 | 6 | 0 | 0 | 0 | 0 | 0 | 0 | 58% | 1.8% | 41.6% |
| 4.6 | 1.15 | 6.5 | 0 | 0 | 15.5 | 6 | 0 | 0 | 0 | 0 | 0 | 0 | 58% | 0.0% | 41.5% |
| 4.6 | 1.25 | 7 | 0 | 0 | 15 | 7 | 0 | 0 | 0 | 0 | 0 | 0 | 58% | 0.0% | 42.7% |
| 4.6 | 1.05 | 7 | 0 | 0 | 15.5 | 5.5 | 0 | 0 | 0 | 0 | 0 | 0 | 58% | 0.0% | 42.2% |
| 4.6 | 1.2 | 6.5 | 0 | 0 | 15.5 | 6 | 0 | 0 | 0 | 0 | 0 | 0 | 58% | 0.0% | 41.8% |
| 4.6 | 1.15 | 7 | 0 | 0 | 15.5 | 6.5 | 0 | 0 | 0 | 0 | 0 | 0 | 58% | 0.0% | 42.7% |
| 4.6 | 1.3 | 6 | 0 | 0 | 14 | 7 | 0 | 0 | 0 | 0 | 0 | 0 | 58% | 0.0% | 40.6% |
| 4.6 | 1.25 | 6.5 | 0 | 0 | 15.5 | 7 | 0 | 0 | 0 | 0 | 0 | 0 | 58% | 0.0% | 42.0% |
| 4.6 | 1.3 | 6.5 | 0 | 0 | 14.5 | 7 | 0 | 0 | 0 | 0 | 0 | 0 | 58% | 0.0% | 41.6% |
| 4.6 | 1.05 | 7.5 | 0 | 0 | 14.5 | 5.5 | 0 | 0 | 0 | 0 | 0 | 0 | 58% | 0.0% | 42.8% |
| 4.6 | 1.15 | 7 | 0 | 0 | 16 | 7 | 0 | 0 | 0 | 0 | 0 | 0 | 58% | 0.0% | 43.3% |
| 4.6 | 1.1 | 6.5 | 0 | 0 | 16 | 6 | 0 | 0 | 0 | 0 | 0 | 0 | 58% | 0.0% | 41.8% |
| 4.6 | 1.15 | 6 | 0 | 0 | 15 | 6 | 0 | 0 | 0 | 0 | 0 | 0 | 58% | 0.0% | 40.5% |
| 4.6 | 1 | 7.5 | 0 | 0 | 15 | 5.5 | 0 | 0 | 0 | 0 | 0 | 0 | 58% | 0.0% | 43.1% |
| 4.6 | 1.2 | 6 | 0 | 0 | 15 | 6.5 | 0 | 0 | 0 | 0 | 0 | 0 | 58% | 0.0% | 40.8% |
| 4.6 | 1.15 | 7.5 | 0 | 0 | 14.5 | 6.5 | 0 | 0 | 0 | 0 | 0 | 0 | 58% | 0.0% | 43.3% |
| 4.6 | 1.2 | 6.5 | 0 | 0 | 15 | 6.5 | 0 | 0 | 0 | 0 | 0 | 0 | 58% | 0.0% | 41.6% |
| 4.6 | 1.05 | 7.5 | 0 | 0 | 15 | 6 | 0 | 0 | 0 | 0 | 0 | 0 | 58% | 0.0% | 43.3% |
| 4.6 | 1.25 | 6.5 | 0 | 0 | 15 | 7 | 0 | 0 | 0 | 0 | 0 | 0 | 58% | 0.0% | 41.9% |
| 4.6 | 1.25 | 6 | 0 | 0 | 15 | 7 | 0 | 0 | 0 | 0 | 0 | 0 | 58% | 0.0% | 41.0% |
| 4.6 | 1.15 | 7.5 | 0 | 0 | 15 | 7 | 0 | 0 | 0 | 0 | 0 | 0 | 58% | 0.0% | 43.8% |
| 4.6 | 1.1 | 7 | 0 | 0 | 15 | 6 | 0 | 0 | 0 | 0 | 0 | 0 | 58% | 0.0% | 42.4% |
| 4.6 | 1 | 7.5 | 0 | 0 | 16 | 6.5 | 0 | 0 | 0 | 0 | 0 | 0 | 58% | 1.7% | 42.1% |
| 4.6 | 1.15 | 6.5 | 0 | 0 | 14.5 | 6 | 0 | 0 | 0 | 0 | 0 | 0 | 58% | 0.0% | 41.3% |
| 4.6 | 1.15 | 7 | 0 | 0 | 15 | 6.5 | 0 | 0 | 0 | 0 | 0 | 0 | 58% | 0.0% | 42.6% |
| 4.6 | 1.2 | 6 | 0 | 0 | 14.5 | 6.5 | 0 | 0 | 0 | 0 | 0 | 0 | 58% | 0.0% | 40.6% |
| 4.6 | 1.15 | 6.5 | 0 | 0 | 15.5 | 6.5 | 0 | 0 | 0 | 0 | 0 | 0 | 58% | 0.0% | 41.9% |

TABLE 2-continued

List of Alloys Compositions in wt. %, balance Fe, and calculated criteria which meet the thermodynamic embodiments of this disclosure.

| B | C | Cr | Cu | Mn | Mo | Nb | Ni | Si | Ti | V | W | Zr | Total | Rod | Sphere |
|---|---|---|---|---|---|---|---|---|---|---|---|---|---|---|---|
| 4.6 | 1.25 | 7.5 | 0 | 0 | 13 | 6.5 | 0 | 0 | 0 | 0 | 0 | 0 | 58% | 0.0% | 42.6% |
| 4.6 | 1.1 | 7 | 0 | 0 | 15.5 | 6.5 | 0 | 0 | 0 | 0 | 0 | 0 | 58% | 0.0% | 42.9% |
| 4.6 | 1.05 | 7 | 0 | 0 | 16 | 6.5 | 0 | 0 | 0 | 0 | 0 | 0 | 58% | 0.0% | 43.2% |
| 4.6 | 1 | 6.5 | 0 | 0 | 16 | 5.5 | 0 | 0 | 0 | 0 | 0 | 0 | 58% | 0.0% | 41.7% |
| 4.6 | 1.2 | 7.5 | 0 | 0 | 13.5 | 6.5 | 0 | 0 | 0 | 0 | 0 | 0 | 58% | 0.0% | 42.9% |
| 4.6 | 1.1 | 7 | 0 | 0 | 16 | 7 | 0 | 0 | 0 | 0 | 0 | 0 | 58% | 0.0% | 43.4% |
| 4.6 | 1.05 | 6.5 | 0 | 0 | 16 | 6 | 0 | 0 | 0 | 0 | 0 | 0 | 58% | 0.0% | 42.0% |
| 4.6 | 1.1 | 7.5 | 0 | 0 | 14.5 | 6.5 | 0 | 0 | 0 | 0 | 0 | 0 | 58% | 0.0% | 43.5% |
| 4.6 | 1.1 | 6.5 | 0 | 0 | 16 | 6.5 | 0 | 0 | 0 | 0 | 0 | 0 | 58% | 0.0% | 42.2% |
| 4.6 | 1 | 7.5 | 0 | 0 | 15 | 6 | 0 | 0 | 0 | 0 | 0 | 0 | 58% | 0.0% | 43.5% |
| 4.6 | 1.15 | 7.5 | 0 | 0 | 14.5 | 7 | 0 | 0 | 0 | 0 | 0 | 0 | 58% | 0.0% | 43.7% |
| 4.6 | 1.1 | 6 | 0 | 0 | 16 | 6.5 | 0 | 0 | 0 | 0 | 0 | 0 | 59% | 0.0% | 41.3% |
| 4.6 | 1.1 | 7 | 0 | 0 | 14.5 | 6 | 0 | 0 | 0 | 0 | 0 | 0 | 59% | 0.0% | 42.3% |
| 4.6 | 1.15 | 7 | 0 | 0 | 14.5 | 6.5 | 0 | 0 | 0 | 0 | 0 | 0 | 59% | 0.0% | 42.5% |
| 4.6 | 1.2 | 6.5 | 0 | 0 | 15 | 7 | 0 | 0 | 0 | 0 | 0 | 0 | 59% | 0.0% | 42.1% |
| 4.6 | 1.1 | 7.5 | 0 | 0 | 15 | 7 | 0 | 0 | 0 | 0 | 0 | 0 | 59% | 0.0% | 44.0% |
| 4.6 | 1.3 | 7 | 0 | 0 | 13 | 7 | 0 | 0 | 0 | 0 | 0 | 0 | 59% | 0.0% | 42.1% |
| 4.6 | 1 | 6.5 | 0 | 0 | 15.5 | 5.5 | 0 | 0 | 0 | 0 | 0 | 0 | 59% | 0.0% | 41.6% |
| 4.6 | 1.05 | 6 | 0 | 0 | 15.5 | 6 | 0 | 0 | 0 | 0 | 0 | 0 | 59% | 0.0% | 41.0% |
| 4.6 | 1.15 | 7 | 0 | 0 | 15 | 7 | 0 | 0 | 0 | 0 | 0 | 0 | 59% | 0.0% | 43.0% |
| 4.6 | 1.05 | 6.5 | 0 | 0 | 15.5 | 6 | 0 | 0 | 0 | 0 | 0 | 0 | 59% | 0.0% | 41.8% |
| 4.6 | 1.05 | 7 | 0 | 0 | 15.5 | 6.5 | 0 | 0 | 0 | 0 | 0 | 0 | 59% | 0.0% | 43.1% |
| 4.6 | 1.15 | 7.5 | 0 | 0 | 13.5 | 6.5 | 0 | 0 | 0 | 0 | 0 | 0 | 59% | 0.0% | 43.1% |
| 4.6 | 1.2 | 6.5 | 0 | 0 | 14.5 | 7 | 0 | 0 | 0 | 0 | 0 | 0 | 59% | 0.0% | 42.0% |
| 4.6 | 1 | 7 | 0 | 0 | 16 | 6.5 | 0 | 0 | 0 | 0 | 0 | 0 | 59% | 0.0% | 43.3% |
| 4.6 | 1.25 | 6.5 | 0 | 0 | 13.5 | 7 | 0 | 0 | 0 | 0 | 0 | 0 | 59% | 0.0% | 41.5% |
| 4.6 | 1.2 | 7.5 | 0 | 0 | 13.5 | 7 | 0 | 0 | 0 | 0 | 0 | 0 | 59% | 0.0% | 43.3% |
| 4.6 | 1.05 | 7 | 0 | 0 | 16 | 7 | 0 | 0 | 0 | 0 | 0 | 0 | 59% | 0.0% | 43.6% |
| 4.6 | 1 | 6 | 0 | 0 | 16 | 6 | 0 | 0 | 0 | 0 | 0 | 0 | 59% | 0.0% | 41.3% |
| 4.6 | 1.05 | 7.5 | 0 | 0 | 14.5 | 6.5 | 0 | 0 | 0 | 0 | 0 | 0 | 59% | 0.0% | 43.6% |
| 4.6 | 1.05 | 6.5 | 0 | 0 | 15 | 6 | 0 | 0 | 0 | 0 | 0 | 0 | 59% | 0.0% | 41.7% |
| 4.6 | 1.2 | 7 | 0 | 0 | 14 | 7 | 0 | 0 | 0 | 0 | 0 | 0 | 59% | 0.0% | 42.7% |
| 4.6 | 1.1 | 6 | 0 | 0 | 16 | 7 | 0 | 0 | 0 | 0 | 0 | 0 | 59% | 0.0% | 41.8% |
| 4.6 | 1.05 | 7 | 0 | 0 | 14.5 | 6 | 0 | 0 | 0 | 0 | 0 | 0 | 59% | 0.0% | 42.4% |
| 4.6 | 1.15 | 6.5 | 0 | 0 | 14 | 6.5 | 0 | 0 | 0 | 0 | 0 | 0 | 59% | 0.0% | 41.6% |
| 4.6 | 1.15 | 7 | 0 | 0 | 14.5 | 7 | 0 | 0 | 0 | 0 | 0 | 0 | 59% | 0.0% | 42.9% |
| 4.6 | 1.2 | 6.5 | 0 | 0 | 14 | 7 | 0 | 0 | 0 | 0 | 0 | 0 | 59% | 0.0% | 41.8% |
| 4.6 | 1.05 | 7 | 0 | 0 | 15 | 6.5 | 0 | 0 | 0 | 0 | 0 | 0 | 59% | 0.0% | 43.0% |
| 4.6 | 1 | 6.5 | 0 | 0 | 15.5 | 6 | 0 | 0 | 0 | 0 | 0 | 0 | 59% | 0.0% | 42.0% |
| 4.6 | 1.1 | 6.5 | 0 | 0 | 14.5 | 6.5 | 0 | 0 | 0 | 0 | 0 | 0 | 59% | 0.0% | 41.9% |
| 4.6 | 1.2 | 7.5 | 0 | 0 | 13 | 7 | 0 | 0 | 0 | 0 | 0 | 0 | 59% | 0.0% | 43.2% |
| 4.6 | 1.15 | 6 | 0 | 0 | 14.5 | 7 | 0 | 0 | 0 | 0 | 0 | 0 | 59% | 0.0% | 41.2% |
| 4.6 | 1.1 | 6.5 | 0 | 0 | 15.5 | 7 | 0 | 0 | 0 | 0 | 0 | 0 | 59% | 0.0% | 42.5% |
| 4.6 | 1.05 | 7.5 | 0 | 0 | 14 | 6.5 | 0 | 0 | 0 | 0 | 0 | 0 | 59% | 0.0% | 43.5% |
| 4.6 | 1 | 6.5 | 0 | 0 | 16 | 6.5 | 0 | 0 | 0 | 0 | 0 | 0 | 59% | 0.0% | 42.5% |
| 4.6 | 1 | 7.5 | 0 | 0 | 14.5 | 6.5 | 0 | 0 | 0 | 0 | 0 | 0 | 59% | 0.0% | 43.8% |
| 4.6 | 1.05 | 6.5 | 0 | 0 | 16 | 7 | 0 | 0 | 0 | 0 | 0 | 0 | 59% | 0.0% | 42.8% |
| 4.6 | 1.05 | 6.5 | 0 | 0 | 15 | 6.5 | 0 | 0 | 0 | 0 | 0 | 0 | 59% | 0.0% | 42.1% |
| 4.6 | 1.05 | 7 | 0 | 0 | 14.5 | 6.5 | 0 | 0 | 0 | 0 | 0 | 0 | 59% | 0.0% | 42.8% |
| 4.6 | 1 | 6 | 0 | 0 | 16 | 6.5 | 0 | 0 | 0 | 0 | 0 | 0 | 59% | 0.0% | 41.7% |
| 4.6 | 1.1 | 6.5 | 0 | 0 | 15 | 7 | 0 | 0 | 0 | 0 | 0 | 0 | 59% | 0.0% | 42.4% |
| 4.6 | 1.2 | 7.5 | 0 | 0 | 12.5 | 7 | 0 | 0 | 0 | 0 | 0 | 0 | 59% | 0.0% | 43.1% |
| 4.6 | 1.05 | 7 | 0 | 0 | 15 | 7 | 0 | 0 | 0 | 0 | 0 | 0 | 59% | 0.0% | 43.4% |
| 4.6 | 1 | 7 | 0 | 0 | 15.5 | 7 | 0 | 0 | 0 | 0 | 0 | 0 | 59% | 0.0% | 43.6% |
| 4.6 | 1.1 | 7.5 | 0 | 0 | 13.5 | 7 | 0 | 0 | 0 | 0 | 0 | 0 | 59% | 0.0% | 43.6% |
| 4.6 | 1.05 | 6 | 0 | 0 | 15.5 | 7 | 0 | 0 | 0 | 0 | 0 | 0 | 59% | 0.0% | 41.8% |
| 4.6 | 1.15 | 7 | 0 | 0 | 13.5 | 7 | 0 | 0 | 0 | 0 | 0 | 0 | 59% | 0.0% | 42.7% |
| 4.6 | 1.15 | 6.5 | 0 | 0 | 13.5 | 7 | 0 | 0 | 0 | 0 | 0 | 0 | 59% | 0.0% | 41.9% |
| 4.6 | 1.05 | 7 | 0 | 0 | 14 | 6.5 | 0 | 0 | 0 | 0 | 0 | 0 | 59% | 0.0% | 42.7% |
| 4.6 | 1 | 6 | 0 | 0 | 15 | 6.5 | 0 | 0 | 0 | 0 | 0 | 0 | 59% | 0.0% | 41.4% |
| 4.6 | 1.05 | 6 | 0 | 0 | 15 | 7 | 0 | 0 | 0 | 0 | 0 | 0 | 59% | 0.0% | 41.7% |
| 4.6 | 1.15 | 7 | 0 | 0 | 13 | 7 | 0 | 0 | 0 | 0 | 0 | 0 | 59% | 0.0% | 42.6% |
| 4.6 | 1 | 7 | 0 | 0 | 15 | 7 | 0 | 0 | 0 | 0 | 0 | 0 | 59% | 0.0% | 43.5% |
| 4.6 | 1.05 | 7.5 | 0 | 0 | 13.5 | 7 | 0 | 0 | 0 | 0 | 0 | 0 | 59% | 0.0% | 43.8% |
| 4.6 | 1.05 | 6 | 0 | 0 | 14.5 | 7 | 0 | 0 | 0 | 0 | 0 | 0 | 59% | 0.0% | 41.6% |
| 4.6 | 1 | 6.5 | 0 | 0 | 15.5 | 7 | 0 | 0 | 0 | 0 | 0 | 0 | 59% | 0.0% | 42.8% |
| 4.6 | 1.05 | 7 | 0 | 0 | 14 | 7 | 0 | 0 | 0 | 0 | 0 | 0 | 59% | 0.0% | 43.1% |
| 4.6 | 1 | 6 | 0 | 0 | 15 | 7 | 0 | 0 | 0 | 0 | 0 | 0 | 59% | 0.0% | 41.8% |
| 4.6 | 1 | 7.5 | 0 | 0 | 13.5 | 7 | 0 | 0 | 0 | 0 | 0 | 0 | 59% | 0.0% | 44.0% |
| 4.6 | 1.05 | 7 | 0 | 0 | 13.5 | 7 | 0 | 0 | 0 | 0 | 0 | 0 | 59% | 0.0% | 43.0% |
| 4.6 | 1 | 7.5 | 0 | 0 | 13 | 7 | 0 | 0 | 0 | 0 | 0 | 0 | 59% | 0.0% | 43.9% |
| 3.2 | 1 | 0 | 0 | 0 | 12.5 | 0 | 0 | 0 | 0 | 0 | 0 | 0 | 61% | 0.0% | 13.6% |
| 3.2 | 1.25 | 0 | 0 | 0 | 12.5 | 0 | 0 | 0 | 0 | 0 | 0 | 0 | 64% | 0.0% | 13.3% |

Microstructural Criteria

In some embodiments, the alloy can be described fully by microstructural criteria.

Embodiments of this disclosure teach a microstructure which can be composed of 1) hypereutectic spherical borides or borocarbides, 2) in an Fe based matrix, and 3) which has a limit on hypereutectic, rod like carbides, borides, and borocarbides. Conventionally, hypereutectic boride, carbide, and borocarbide forming alloys will have a microstructure with a significant portion of rod like phases. Rod-like phases can create undesirable performance characteristics such as low toughness, severe cracking, and poor impact resistance. However, hypereutectic phases may be advantageous for wear resistance. The unique alloys described herein do not contain hypereutectic rod shaped phases but instead contain hypereutectic borides and/or borocarbides that form a near spherical morphology. The result is alloys that have the good wear characteristics of hypereutectic hard phases without the embrittling rod like phases.

In the first microstructural criteria, there can be one or more boride and/or borocarbide phases with a near spherical morphology. These phases can improve wear resistance without substantially decreasing toughness. This hardphase will be known as: spherical boride. This hardphase can have a hardness in excess of 2000HV (or in excess of about 2000HV) and thus increasing phase fraction can have a dramatic effect on wear resistance. In addition this phase can have a near spherical morphology, so high toughness can be retained while still maintaining wear performance.

Figure 3:
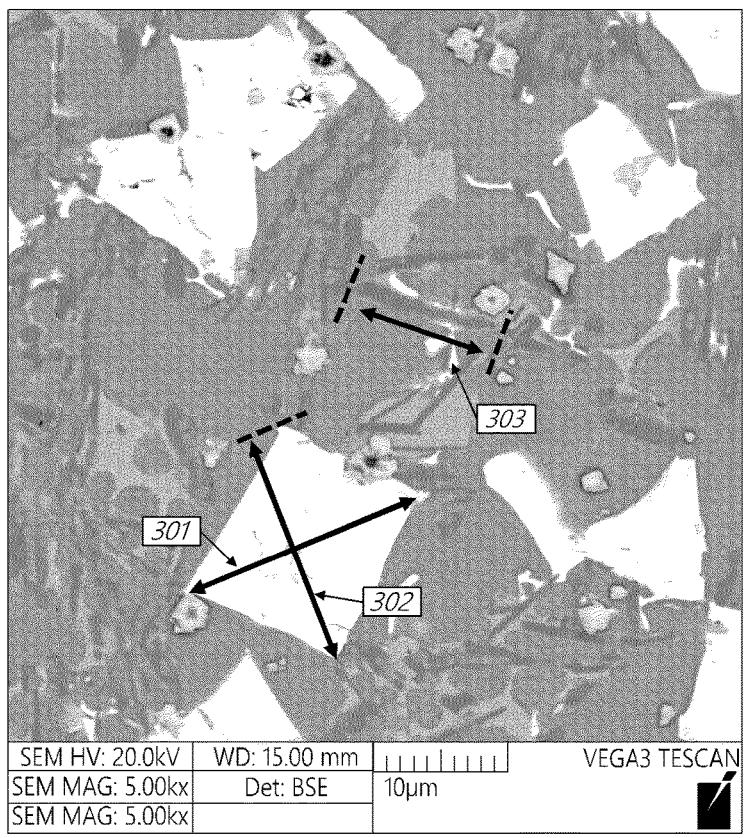
FIG. 3 shows an SEM micrograph of an embodiment of an alloy (MW-X47C).

The near spherical phase morphology in this disclosure has as an aspect ratio in cross section of ≤2:1 (or about ≤2:1). As shown in FIG. 3, where aspect ratio is defined as the ratio between the major axis [301] and the orthogonal ferret diameter [302]. Phases with a ratio greater than 2:1 are said to be rod like and result in embrittlement of an alloy.

In the example of FIG. 3, the major axis [301] is about 17.9 micrometers, and the orthogonal ferret diameter [302] is about 17.0 micrometers. Thus, the aspect ratio is 1.06.

Phases that form near spherical borides or borocarbides can include $M_2B$ and $M_3B_2$ where 1) M comprises Fe, Cr, Mo, and/or W where Mo+W is ≥15 wt % (or ≥ about 15 wt %); and 2) Fe+Cr+Mo+W can be ≥70 wt % (or ≥ about 70 wt %) of M.

In some embodiments, spherical boride can have a volume fraction ≥5% (or ≥ about 5%). In some embodiments, spherical boride can have a volume fraction ≥10% (or ≥ about 10%). In some embodiments, spherical boride can have a volume fraction ≥15% (or ≥ about 15%). In some embodiments, spherical boride can have a volume fraction between 5% and 30% (or between about 5% and about 30%). In some embodiments, spherical boride can have a volume fraction between 10% and 25% (or between about 10% and about 25%).

Figure 2:
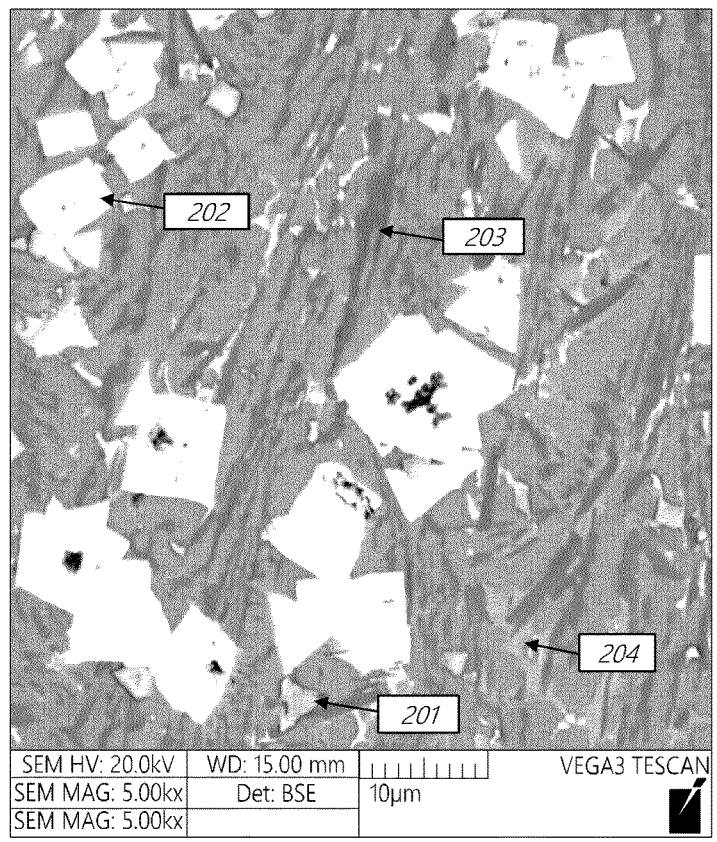
FIG. 2 shows an SEM micrograph of an embodiment of an alloy (X47).

The second microstructural criteria is the total volume fraction of borides and borocarbides. This criteria contributes to elevated wear resistance. FIG. 2 demonstrates a microstructure that meets this criteria with the volume fraction of borides ≥10% which comprise $(Mo,W)_2B$ [202] and $Cr_2B$ [203].

This criteria will be known as total boride. In some embodiments, the total boride volume fraction can be ≥10% (or ≥ about 10%). In some embodiments, the total boride volume fraction can be ≥15% (or ≥ about 15%). In some embodiments, the total boride volume fraction can be ≥20% (or ≥ about 20%). In some embodiments, the total boride volume fraction can be between 5% and 80% (or between about 5% and about 80%). In some embodiments, the (Fe,Cr) boride volume fraction can be between 10% and 70% (or between about 10% and about 70%). In some embodiments, the (Fe,Cr) boride volume fraction can be between 20% and 60% (or between about 20% and about 60%).

Figure 4:
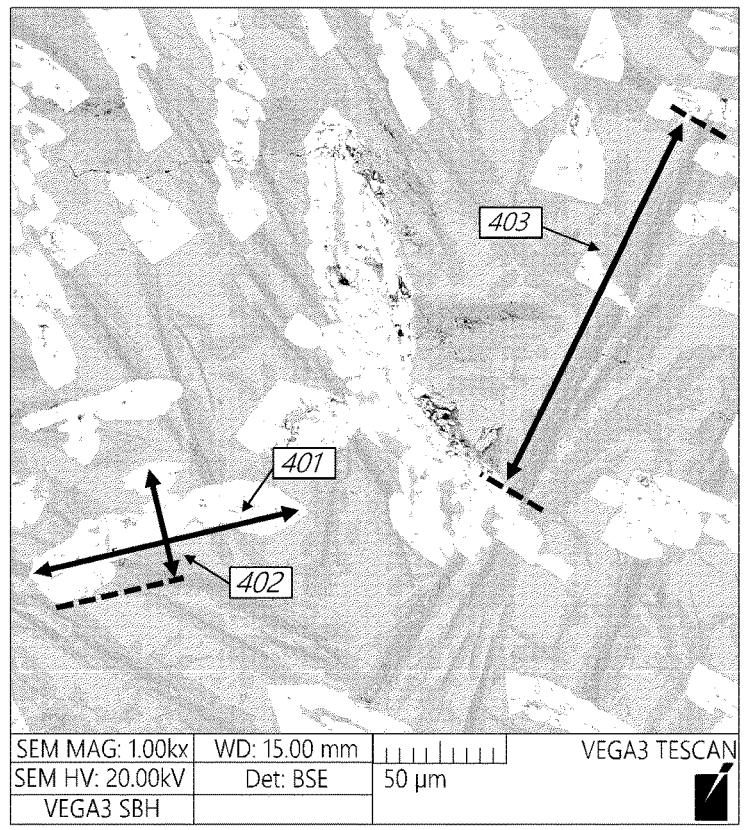
FIG. 4 shows an SEM micrograph of an embodiment of an alloy (X78).

In the third microstructural criteria there is a limit on the volume fraction of hypereutectic hardphases exceeding 50 µm [403] with an aspect ratio greater than 2:1 as shown in FIG. 4. These phases are known to result in embrittlement of the alloy. This criteria will be referred to as: embrittling rod like phase The dark grey phases in FIG. 4 are $Cr_2B$ and, as shown, they exceed 50 micrometers in dimension. In the highlighted $Cr_2B$ phase, the major axis of the phase [403] measures at about 148 micrometers. The orthogonal ferret diameter of this phase [404] is about 25 micrometers. Thus, the aspect ratio of the $Cr_2B$ phase is about 6:1. In contrast, the alloy shown in FIG. 3 does not contain any large rod-like phases. Any phases which possess aspect rations above 2:1 are relatively small, below 50 micrometers in their largest dimension. The $Cr_2B$ [303] phase shown in FIG. 3 is about 10 micrometers in its largest dimension. These small rods-like phases due not reduce the toughness of the material in a significant manner, In some embodiments, the volume fraction of embrittling rod like phase can be ≤20% (or ≤ about 20%). In some embodiments, the volume fraction embrittling rod like phase can be ≤15% (or ≤ about 15%). In some embodiments, the volume fraction embrittling rod like phase can be ≤10% (or ≤ about 10%). In some preferred embodiments, embrittling rod like phase can be 0% (or about 0%).

In some embodiments, there can be one or more spherical borocarbide and/or carbide phase(s) with a metallic constituent ≥90 wt % (or ≥ about 90 wt %) of one or more of the following elements: Ti, V, Zr, W, Mo, Hf [201]. This hardphase will be known as isolated carbide.

In some embodiments, this isolated carbide can have a volume fraction ≥1% (or ≥ about 1%). In some embodiments, this isolated carbide can have a volume fraction ≥2% (or ≥ about 2%). In some embodiments, the isolated carbide can have a volume fraction ≥3% (or ≥ about 3%). In some embodiments, the isolated carbide can have a volume fraction between 1% and 10% (or between about 1% and about 10%). In some embodiments, the isolated carbide can have a volume fraction between 1% and 5% (or between about 1% and about 5%).

In some exemplary embodiments, there may be limits on the volume fraction of $M_7(C,B)_3$ and $M_{23}(C,B)_6$ with a eutectic structure. These phases are known to result in embrittling the alloy in this space by forming an interconnected network. This phase is identified by EBSD, XRD, and other metallographic methods. In FIG. 2 it is the phase labeled [204].

This criteria is known as embrittling eutectic phase. In some embodiments the embrittling eutectic phase can have a volume fraction of ≤20% (or ≤ about 20%). In some embodiments, the embrittling eutectic phase can have a volume fraction of ≤15% (or ≤ about 15%). In some embodiments, the embrittling eutectic phase can have a volume fraction of ≤10% (or ≤ about 10%). In some embodiments, the embrittling eutectic phase can have a volume fraction of ≤5% (or ≤ about 5%). In some embodiments, the embrittling eutectic phase can have a volume fraction of 0% (or about 0%).

Table 3 lists chemical compositions of some embodiments of this disclosure which meet the microstructural criteria:
1) hypereutectic spherical borides or borocarbides,
2) in an Fe based matrix, and
3) which has a limit on hypereutectic, rod like carbides, borides, and borocarbides.

All of the alloys shown in this table were manufactured into an ingot or a welding wire. Welding wires were subsequently re-melted or deposited via a welding process. In all cases the listed chemistry of the resultant metal was measured via glow discharge spectroscopy. The microstructural features were evaluated using scanning electron microscopy and image analysis software to measure the spherical boride phase fraction, the total boride phase fraction, and the amount of rod-like borides by volume. The volume fraction of each phase type is listed in Table 3. In some cases, the manufactured metal was so similar to previous alloy compositions that the microstructural features were not re-measured, but would be expected by those skilled in the art to fit within the microstructural criteria described herein. In Table 3, alloy chemistries were manufactured into ingots and welding wires which meet the hardness and microstructural criteria disclosed herein. Alloy names given in the W(X##) format were created by remelting a single welding wire. Alloy names given in this format MW(X##) are mig weld deposits. Otherwise alloys are experimental ingots made from a collection of raw materials.

TABLE 3

Compositions and Microstructural Criteria

| Alloy | B | C | Cr | Mo | Ti | W | OTHER | HRC | Spherical Borides | Total Boride | Rod Like Phase |
|---|---|---|---|---|---|---|---|---|---|---|---|
| X47 | 2.18 | 0.79 | 12 | 4.78 | 1.74 | 6.76 | | 70.2 | 18.9 | 48 | ≤5 |
| X48 | 1.99 | 0.63 | 17.1 | 4.33 | 5.06 | 6.97 | | 38 | ≥5 | ≥10 | ≤5 |
| X48A | 2.79 | 0.81 | 16.9 | 3.7 | 5.26 | 6.87 | | 51 | ≥5 | ≥10 | ≤5 |
| X55 | 4.04 | 1.01 | 1.52 | 9.61 | 2.26 | 17.5 | | 68.2 | 32.9 | 70 | ≤5 |
| X55.1 | 3.89 | 1.46 | 1.95 | 10 | 2.8 | 19 | | 71 | | | ≤5 |
| X56 | 3 | 0.6 | 4 | 14 | 0 | 16 | | 69 | 24 | | ≤5 |
| X57 | 3.08 | 1.42 | 0 | 7.56 | 0 | 8.61 | | 65.2 | 29.4 | | ≤5 |
| X59 | 3.43 | 0 | 0 | 10.4 | 0 | 10.6 | | 59.6 | 28.8 | | ≤5 |
| X62 | 4.16 | 0.04 | 6.59 | 4.51 | 0 | 8.22 | | 69.2 | 22.8 | | ≤5 |
| X67 | 2 | 2.4 | 4 | 12 | 0 | 12 | 12 V | 68.4 | | | ≤5 |
| X72 | 2.53 | 2 | 14.1 | 6.12 | 5.79 | 7.95 | | 68.6 | 12.79 | 41 | ≤5 |
| X73 | 3.91 | 1.88 | 22.2 | 8.18 | 5.32 | 19.2 | | 68 | 27.07 | ≥30 | ≤5 |
| X74 | 3.97 | 0.83 | 24.8 | 8.95 | 4.13 | 19.1 | | 50.6 | 28.95 | ≥30 | ≤5 |
| X76 | 3 | 0.29 | 11.7 | 5.35 | 0 | 7.87 | | 70.4 | | | ≤5 |
| X77 | 1.87 | 0.03 | 12.9 | 5.74 | 0 | 10.4 | | 48.8 | | | ≤5 |
| X80 | 2.13 | 0.58 | 9.2 | 4.2 | 1.13 | 8.77 | | 67.8 | | | ≤5 |
| X81 | 2.19 | 0.57 | 12.9 | 4.49 | 1.27 | 8.3 | | 69.2 | | | ≤5 |
| X82 | 1.87 | 0.48 | 12.8 | 4.57 | 1.43 | 8.58 | | 68.8 | | | ≤5 |
| X83 | 2.49 | 0.22 | 10 | 0 | 1.71 | 11 | | 64 | | | ≤5 |
| X84 | 2.41 | 0.45 | 9.26 | 0 | 2.38 | 13.1 | | 60 | | | ≤5 |
| W(X47A) | 3.2 | 0.85 | 12 | 6 | 2 | 8 | | 67.6 | 17.37 | 45 | ≤5 |
| W(X47B) | 2.9 | 0.85 | 12 | 6 | 2 | 8 | | 67 | 17.74 | 45 | ≤5 |
| MW(X47C)-1 | 2.57 | 0.94 | 11.5 | 5.52 | 2.16 | 7.73 | 0.47 Mn | 68.6 | 17.46 | 46.5 | ≤5 |
| MW(X47C)-2 | 2.75 | 0.9 | 10.9 | 5.22 | 1.99 | 7.46 | 0.4 Mn | 68 | | | ≤5 |
| MW(X47C)-3 | 2.94 | 0.87 | 12.6 | 5.88 | 2.21 | 8.52 | | 68.5 | 17 | 45 | ≤5 |
| MW(X47C)-4 | 2.52 | 0.79 | 11.9 | 5.32 | 1.92 | 7.97 | | 67 | 19.4 | 45 | ≤5 |
| MW(X47C)-6.1 | 3.2 | 0.77 | 11.35 | 5.76 | 1.89 | 7.71 | 0.45 Mn | 67 | 15.94 | 47.2 | ≤5 |
| MW(X47C)-6 | 2.51 | 0.76 | 10.9 | 5.14 | 2 | 7.55 | | 67 | | | ≤5 |
| MW(X47C)-7 | 2.49 | 0.82 | 13.4 | 6.12 | 2 | 9.05 | | 67 | 15.25 | 48.7 | ≤5 |
| MW(X47C)-8 | 2.15 | 0.75 | 15.4 | 6.34 | 1.9 | 10.7 | | 66.5 | 17.5 | 48 | ≤5 |
| P42-X47C-0.1C | 2.94 | 0.7 | 14.8 | 6.05 | 2.04 | 10.7 | | 69.8 | 16.41 | 46.5 | ≤5 |
| P42-X47C-0.2C | 2.96 | 0.6 | 14.9 | 6.4 | 2.11 | 8.89 | | 70.8 | 17 | 45.5 | ≤5 |
| P42-X47C + .5Ti | 2.37 | 0.56 | 13 | 5.56 | 2.53 | 9.07 | | 65.8 | | | ≤5 |
| P42-X47C + 1Ti | 2.51 | 0.61 | 13.7 | 5.65 | 2.82 | 9.49 | | 65 | | | ≤5 |
| MW(P42-X47C1)-1 | 2.7 | 0.87 | 14.8 | 6.61 | 2.16 | 9.96 | | 67 | 23.06 | 58.2 | ≤5 |
| MW(P42-X47C2)-1 | 2.65 | 0.87 | 14.4 | 6.44 | 2.13 | 9.86 | | 67 | 12.69 | 39.3 | ≤5 |
| MW(P42-X47C3)-1 | 2.52 | 0.89 | 14.6 | 6.52 | 2.09 | 10.2 | | 67 | 16.43 | 46.5 | ≤5 |
| MW(P42-X47C4)-1 | 2.51 | 0.86 | 14.5 | 6.57 | 2 | 9.82 | | 67 | 15.35 | 44.7 | ≤5 |
| X47C 2.25B | 1.99 | 0.71 | 13.9 | 6.21 | 2.2 | 9.12 | | 68.2 | | | ≤5 |
| X47C 2.4B | 2.05 | 0.69 | 13.9 | 6.29 | 2.17 | 9.24 | | 70 | | | ≤5 |
| X47C 6.5Mo | 2.2 | 0.73 | 14 | 8.66 | 2.19 | 9.11 | | 69.6 | | | ≤5 |
| X47A Wire 14Cr | 3.25 | 1.08 | 16.3 | 6.32 | 2.2 | 9.95 | | 69.4 | 16.1 | ≥30 | ≤5 |
| P42-X47A Diluted | 2.01 | 0.6 | 8.07 | 4.22 | 1.53 | 6.24 | | 68.8 | 12.7 | ≥25 | ≤5 |
| P42-X47C Diluted | 2.57 | 0.77 | 10.7 | 4.87 | 1.8 | 7.6 | | 68.8 | 18 | 45 | ≤5 |
| P42-X47D Diluted | 2.39 | 0.7 | 8.03 | 3.95 | 1.62 | 6.81 | | 70.2 | 11.2 | 44 | ≤5 |
| MW(P42-X47D)-1 | 2.43 | 0.8 | 8.04 | 3.81 | 1.66 | 6.1 | | 68 | 10.12 | 47 | ≤5 |
| MW(P42-X47D)-2 | 2.29 | 0.73 | 7.33 | 3.63 | 1.56 | 5.82 | | 67 | 10 | 47 | ≤5 |
| MW(P42-X47A)-4 | 1.95 | 0.57 | 8.66 | 4.04 | 1.78 | 6.17 | | 65 | ≥5 | 34 | ≤5 |
| MW(P42-X47B) | 1.73 | 0.5 | 7.94 | 3.99 | 1.76 | 5.97 | | 65 | ≥5 | 38 | ≤5 |
| X90 | 2.13 | 1.01 | 11.1 | 11.4 | 2.34 | 1.37 | | 62 | ≥20 | 50 | ≤5 |
| X91 | 2.79 | 1.1 | 13.2 | 15.6 | 3.42 | 4.47 | | 68 | ≥20 | 50 | ≤5 |
| X92 | 2.99 | 1.19 | 13.7 | 14.4 | 2.78 | 5.5 | | 71 | ≥20 | 50 | ≤5 |
| X93 | 3.34 | 1.34 | 13.2 | 15.3 | 2.65 | 5.88 | | 71 | ≥20 | 50 | ≤5 |
| X93T | 4.1 | 1.175 | 8 | 14.3 | 3.2 | 2.5 | | 71 | ≥20 | 50 | ≤5 |

Performance Criteria

In some embodiments alloys can be fully described by performance characteristics. It can be advantageous for tough and wear resistant alloys to simultaneously have 1) high resistance to wear, 2) high resistance to impact, and 3) a high bulk hardness.

The wear resistance of alloys is commonly characterized by the ASTM G65 dry sand abrasion test. The resistance to impact is characterized by repeatedly subjecting a welded sample of the material to impacts with 20 J of energy. Bulk hardness is measured with a Rockwell C hardness test and reported as the average of 5 values.

In some embodiments the alloy can have an ASTM G65 abrasion loss of ≤0.3 g (or ≤ about 0.3 g). In some embodiments, the alloy can have an ASTM G65 abrasion loss of ≤0.2 g (or ≤ about 0.2 g). In some embodiments, the alloy has an ASTM G65 abrasion loss of ≤0.15 g (or ≤ about 0.15 g). In some embodiments, the alloy can have an ASTM G65 abrasion loss of ≤0.10 g (or ≤ about 0.10 g).

In some embodiments, the alloy can withstand ≥500 (or ≥ about 500) impacts with 20 J of energy until failure. In some embodiments, the alloy can withstand ≥1000 (or ≥ about 1000) impacts with 20 J of energy until failure. In some embodiments, the alloy can withstand ≥2000 (or ≥ about 2000) impacts with 20 J of energy until failure.

In some embodiments, the alloy can have a hardness of ≥30HRC (or ≥ about 30HRC). In some embodiments, the alloy can have a hardness of ≥40HRC. In some embodiments, the alloy can have a hardness of ≥50HRC (or ≥ about 50HRC). In some embodiments, the alloy can have a hardness of ≥55HRC (or ≥ about 55HRC). In some embodiments, the alloy can have a hardness of ≥60HRC (or ≥ about 60HRC). In some embodiments, the alloy can have a hardness of ≥62HRC (or ≥ about 62HRC). In some embodiments, the alloy can have a hardness of ≥64HRC (or ≥ about 64HRC).

Table 4 details some the performance characteristics of the preferred alloy embodiments. All of the alloys meet the hardness and wear resistance goals (ASTM G65).

tures and phase fractions. 100% of the 34 evaluated alloys met the microstructural criteria described in this disclosure.

Table 1 lists the corresponding thermodynamic criteria for these alloys. 27 out of the 34 total alloys which met the microstructural criteria also meet the thermodynamic criteria. This indicates a predictive rate of 80% which shows good correlation between thermodynamic and microstructural criteria. Alloys which do not meet the thermodynamic criteria are outside of the specification by small amounts. The thermodynamic criteria are computed from experimentally measured chemistries using glow discharge spectroscopy. All of the intended or nominal chemistries of these alloys meet the thermodynamic criteria, which would indicate 100% correlation. The discrepancy between nominal and measured chemistries can be due to errors in the glow discharge spectrometer measurements. This analysis demonstrates that alloys which meet the thermodynamic criteria will be highly likely to possess the desired microstructural features. However, it can be demonstrated using alloys manufactured in this study as well as pre-existing art that alloys which do not exhibit the specified thermodynamic criteria will also not possess the desired microstructural features.

There are several examples of hardfacing alloys which utilize hyper-eutectic hard phases to provide wear resistance. The most common is referred to as chromium carbide overlay, and refers to alloys which do not contain boron or borides and thus fall outside the scope of this disclosure. However, there are many hyper-eutectic boride alloys that appear similar, but also fall outside the distinction of this patent. Several examples of such alloys are provided in Table 5, which shows the alloy compositions and calculated thermodynamic criteria of alloys presented in U.S. Pat. No. 7,553,382 B2 (R1-R10) and U.S. Pat. No. 7,935,198 B2 (R11-15) respectively, the entirety of each of which is hereby incorporated by reference. All of these alloys show

TABLE 4

Demonstration of Performance Criteria in Some Embodiments, Nominal Chemistry is Listed for Each Alloy in Weight %, Fe makes the balance.

| ALLOY NUMBER | INGOT HRC | WELD HRC | G65 MASS LOSS | B | C | CR | MO | TI | W | OTHER |
|---|---|---|---|---|---|---|---|---|---|---|
| P42-X47A | 68 | 62.2 | 0.117 | 3.2 | 0.85 | 12 | 6 | 2 | 8 | |
| P42-X47B | 67 | 62.6 | | 2.9 | 0.85 | 12 | 6 | 2 | 8 | |
| P42-X47C | 67 | 67.4 | 0.068 | 4.25 | 1.15 | 16.2 | 8.1 | 2.7 | 11.5 | |
| P42-X47D | | 68 | 0.083 | 4.2 | 1.15 | 12 | 6 | 2 | 8.75 | |
| P42-X93MOD | | 64 | 0.0703 | 6.15 | 1.65 | 12.8 | 21 | 6.45 | 3.2 | |
| P42-X47E | 71 | 67 | 0.093 | 4.25 | 1.07 | 14.8 | 7.1 | 4 | 11.5 | |
| X93B 0.063 | | 69 | 0.068 | 5.85 | 1.55 | 10.7 | 17.2 | 4.95 | | 1 Mn 0.5 Si |
| P42-X84 | 70 | 58 | 0.112 | 4 | 0.76 | 10.7 | | 2.8 | 15.8 | |

Correlations Between Criteria

The thermodynamic, microstructural, and performance embodiments disclosed herein are shown to be related in this disclosure. For example, the thermodynamic criteria can accurately predict the microstructure of the alloy. Further, the microstructure of the alloy can accurately predict the performance of the alloy.

The compositions listed in Table 3 detail those which meet the unique microstructural embodiments of this disclosure. 34 of the alloys manufactured into test ingots or welded were thoroughly evaluated for microstructural feaa high fraction of rod-like borides according to the thermodynamic model. Furthermore, each specification shows microstructures which demonstrate high aspect ratio borides, which are defined as rod-like within the definition of this disclosure. Table 5 again demonstrates that the thermodynamic models are accurate in predicting the presence or lack of hyper-eutectic rod-like boride phases. Furthermore, this demonstrates that alloys containing a high fraction of spherical hypereutectic borides, and simultaneously lack rod-like hypereutectic borides is a unique microstructure not inherent to a wide compositional space.

TABLE 5

Thermodynamic Criteria of Alloys Presented in Existing Art

| Example | B | C | Cr | Fe | Mn | Mo | Nb | Ni | Si | W | Total Boride | Rod-Like | Spherical |
|---|---|---|---|---|---|---|---|---|---|---|---|---|---|
| R1 | 3.6 | 1 | 20.3 | 60.1 | 2.3 | 4.9 | 0 | 0 | 1.4 | 6.4 | 46% | 36% | 5% |
| R2 | 3.4 | 1 | 19.6 | 57.7 | 2.2 | 4.7 | 3.8 | 0 | 1.4 | 6.2 | 45% | 32% | 0% |
| R3 | 3.3 | 0.9 | 18.8 | 55.6 | 2.1 | 4.6 | 7.4 | 0 | 1.3 | 6 | 44% | 30% | 0% |
| R4 | 3.4 | 1.7 | 19.4 | 57.3 | 2.2 | 4.7 | 3.8 | 0 | 1.4 | 6.1 | 44% | 34% | 4% |
| R5 | 3.3 | 1.6 | 18.6 | 55.2 | 2.1 | 4.5 | 7.5 | 0 | 1.3 | 5.9 | 43% | 31% | 0% |
| R6 | 3.3 | 0.9 | 18.6 | 55 | 2.1 | 4.5 | 3.7 | 4.7 | 1.3 | 5.9 | 44% | 30% | 1% |
| R7 | 3.5 | 0.1 | 20.8 | 60.7 | 2.3 | 4.8 | 0 | 0 | 1.2 | 6.6 | 47% | 31% | 0% |
| R8 | 3.4 | 0.1 | 20 | 58.6 | 2.2 | 4.6 | 3.6 | 0 | 1.2 | 6.3 | 46% | 31% | 0% |
| R9 | 3.3 | 0.4 | 19.3 | 56.2 | 2.1 | 4.4 | 7.1 | 0 | 1.1 | 6.1 | 45% | 32% | 0% |
| R10 | 3.1 | 0.1 | 18.6 | 54.3 | 2.1 | 4.3 | 10.5 | 0 | 1.1 | 5.9 | 44% | 32% | 0% |
| R11 | 4.3 | 1.2 | 14.8 | 76.7 | 0.1 | 0 | 2.5 | 0 | 0.4 | 0 | 51% | 40% | 0% |
| R12 | 4.3 | 1.3 | 14.8 | 75.8 | 0.1 | 0 | 3.3 | 0 | 0.4 | 0 | 51% | 40% | 0% |
| R13 | 4.3 | 1.3 | 14.7 | 74.3 | 0.1 | 0 | 4.9 | 0 | 0.4 | 0 | 53% | 41% | 0% |
| R14 | 4.3 | 1.3 | 14.7 | 72.6 | 0.1 | 0 | 6.5 | 0 | 0.5 | 0 | 55% | 40% | 0% |
| R15 | 4.3 | 1.3 | 14.7 | 71.1 | 0.1 | 0 | 7.9 | 0 | 0.6 | 0 | 55% | 41% | 0% |

EXAMPLES

The following examples are illustrative and non-limiting.

Example 1

Example 1 demonstrates the advantageous microstructural features specified in this disclosure and how the chemistry of the hypereutectic boride phases is an indication of the morphology.

An example SEM micrograph of an alloy that meets the thermodynamic, microstructural, and performance embodiments, alloy X47, is presented in FIG. 2. This microstructure shows that spherical boride volume fraction is ≥5% [202]. The micrograph shows that total boride volume fraction is ≥10% [203]. The volume fraction of embrittling rod like phase in this alloy is 0%. The micrograph shows that isolated carbide [201], in this case (Ti,W)C, is present with a volume fraction ≥1%. The volume fraction of embrittling eutectic phase, in this case $M_{23}(C,B)6$, is ≤10% [204].

In addition to the phase fraction data, the elemental composition of the phases was evaluated, specifically the hypereutectic boride phase. As mentioned, it is advantageous for the hypereutectic boride to have a certain chemistry to form the spherical shape instead of the rod-like shape. In order to evaluate the chemistry of these phases energy dispersive spectroscopy can be used in parallel with scanning electron microscopy.

Table 6 shows typical energy dispersive spectroscopy (EDS) measurements for two alloys dominated by different hypereutectic boride types, X47 and X78. It should be noted that the EDS measurements denote only the metallic constituents of the phase and do not include the non-metallic elements which are present, such as boron. One can infer the final metal concentration by inserting the measured metal content into the formula $M_2B$ or $M_3B_2$ depending on the known phase structure. The spherical morphology hypereuteuctic boride phase tends to possess greater than 15 wt. % W+Mo. The rod-like morphology tends to possess less than 15 wt. % W+Mo and furthermore tends to be more Cr-rich. The hypereutectic boride phase in the X47 alloy has 59.2 wt. % W+Mo measured via EDS, and the hypereutectic boride phase in X78 has 7.1 wt. % W+Mo measured via EDS.

TABLE 6

Phase Chemistry in Weight % of Spherical and Rod-Like Hypereutectic Borides

| Alloy | Phase | Cr | Mo | Ti | W | Fe |
|---|---|---|---|---|---|---|
| X47 | Spherical | 16.4 | 24.6 | 2.9 | 34.6 | BAL |
| X78 | Rod-Like | 29.9 | 2.1 | 0 | 5 | BAL |

FIG. 1 displays the solidification diagram for alloy X47 demonstrating all the thermodynamic criteria described in this disclosure. Alloy X47 exhibited an ASTM G65 abrasion loss of 0.065-0.085 g. The hardness was 67HRC and a welded sample withstood on average 5,260 impacts until failure.

Alloy X47 meets the thermodynamic criteria, the microstructural criteria, and the performance criteria of this disclosure.

Example 2

Example 2 demonstrates the role of microstructure on impact resistance. In this study the P42-X47 C and E variations were compared against several known commercial alloys, some which are known to contain rod-like borides, and chromium carbide overlay which is known to contain rod-like carbides. Each alloy was welded onto a steel plate in order to form the test coupon. The resultant test coupon was impacted with a rotating tool steel hammer with 20 J of total energy until the test coupon fails. Failure is defined as at least 1 gram of weld material spalling or chipping from the test coupon as a result of the impact. It is often necessary to test several identical samples and compute an average impacts till failure as a high degree of scatter is inherent in impact testing. Table 7 shows the testing results comparing alloys and microstructural type with the average impacts till failure. As shown only the alloys containing a spherical boride microstructure survive greater than 2,000 impacts till failure.

TABLE 7

Comparison of alloys and microstructure
on the impact resistance of the weld

| Alloy | Microstructure | Impacts till Failure |
|---|---|---|
| MW(P42-X47C) | Spherical Boride | 5,268 |
| MW(P42-X47E) | Spherical Boride | 4,490 |
| Commercial Alloy | Rod-Like Boride | 965 |
| Commercial Alloy | Rod-Like Boride | 1,300 |
| Chromium Carbide Overlay | Rod-Like Carbide | 850 |

This testing demonstrates the correlation between microstructure and impact resistance. Alloys which possess only spherical hypereutectic borides can possess higher impact resistance than alloys which also possess rod-like hypereutectic borides or carbides.

Example 3

Example 3 demonstrates the ability to make modifications to the alloy utilizing the thermodynamic model in order to reduce alloy cost. In this example, W was removed from the alloy composition and replaced with Mo. This modification was not a simple 1:1 exchange of W for Mo, rather the thermodynamic modelling tools were employed to identify W-free alloys which exhibited the specified criteria.

Furthermore, alloys can be modified to increase the weldability with certain process. Specifically, it was determined through extensive experimentation that Ti bearing alloys can lead to unacceptable flux sticking in submerged arc welding (SAW) processes. Therefore, when designing alloys for the SAW process it can be advantageous to eliminate Ti.

Table 8 details alloy compositions where both cost reduction and SAW processing capability are considered. Adding these additional constraints in addition to the thermodynamic, microstructural, and performance criteria adds additional complexity into the system and requires the use of high throughput computational metallurgy.

TABLE 8

Alloys further designed for lowering cost
and increasing processing capabilities

| Alloy | B | C | Cr | Mo | Nb | V |
|---|---|---|---|---|---|---|
| P42-X94 | 3.85 | 1.19 | 7.5 | 11.5 | 0 | 5.25 |
| P42-X95 | 3.4 | 1.55 | 7.5 | 9.8 | 0 | 7 |
| P42-X96 | 3.4 | 1.55 | 7.5 | 9.8 | 2 | 6 |
| P42-X97 | 4 | 0.55 | 7.5 | 12.5 | 0 | 0 |
| P42-X98 | 4 | 1.16 | 7.5 | 12.5 | 6 | 0 |
| P42-X99 | 4.4 | 1.2 | 7.5 | 13 | 4 | 0 |

Table 9 discloses alloy compositions which further can have cost reductions.

TABLE 9

Alloys further designed for lowering cost

| Alloy | B | C | Cr | Mo | Ti |
|---|---|---|---|---|---|
| P42-X47F | 3 | 0.8 | 11.25 | 10.15 | 2 |
| P42-X47G | 3 | 0.8 | 7.5 | 10.15 | 2 |
| P42-X47H | 3 | 0.8 | 7.5 | 10.15 | 2.6 |
| P42-X47I | 3.25 | 0.88 | 7.5 | 10.15 | 2 |
| P42-X47J | 3.5 | 0.95 | 7.5 | 10.15 | 2 |
| P42-X93D | 4.1 | 1.1 | 7.5 | 13 | 2 |

Example 4

Example 4 demonstrates the role of phase chemistry on the resultant morphology of the carbides and borides in the microstructure. Specifically, the lack of high concentrations of chromium in any of the phases is indicative of microstructural morphology. Table 10 details the phase chemistry as measured via EDS of each of the phases present in the example alloys. It should be noted that EDS is not capable of measuring carbon or boron, which are present in these phases in significant amount. Thus, atom percent is provided for each measurement, such that the measured metal content can be inserted into the known phase stoichiometry (ex. $M_3B_2$) to understand the actual chemistry of the phase, non-metals included. Matrix refers to the martensitic iron, spherical refers to the hypereutectic spherical boride particles (either $M_3B_2$ or $M_2B$), isolated refers to the (Nb,Ti,V) carbides, eutectic 1 refers to the $Cr_2B$ and eutectic 2 refers to the $M_{23}(C,B)_6$.

TABLE 10

Phase Chemistry in Atom Percent of Exemplary
Alloys Manufactured in this Study

| Alloy | Phase | Cr | Mo | Nb | Ti | W | Fe |
|---|---|---|---|---|---|---|---|
| X47C | Matrix | 10 | 1 | 0 | 0 | 0.7 | BAL |
| | Spherical | 27.7 | 19.8 | 0 | 4.6 | 16.8 | BAL |
| | Isolated | 11 | 2.9 | 0 | 2.61 | 5.4 | BAL |
| | Eutectic 1 | 22.8 | 1.6 | 0 | 0 | 1.1 | BAL |
| | Eutectic 2 | 16.8 | 5 | 0 | 0 | 2.2 | BAL |
| X99 | Matrix | 5.1 | 0 | 0 | 0 | 0 | BAL |
| | Spherical | 11 | 45.7 | 12.4 | 0 | 0 | BAL |
| | Isolated | 0 | 0 | 95.5 | 0 | 0 | BAL |
| | Eutectic 1 | 17.6 | 1.8 | 0 | 0 | 0 | BAL |
| | Eutectic 2 | 7.9 | 5.7 | 0 | 0 | 0 | BAL |
| X47I | Matrix | 5.4 | 1 | 0 | 0 | 0 | BAL |
| | Spherical | 18.4 | 42.5 | 0 | 5.1 | 0 | BAL |
| | Isolated | 20 | 0 | 0 | 0 | 0 | BAL |
| | Eutectic 1 | 20 | 0 | 0 | 0 | 0 | BAL |
| | Eutectic 2 | 9.2 | 5.1 | 0 | 0 | 0 | BAL |

Specific Hardphase Alloys

In some embodiments, alloys can be defined by certain types of hardphases within the compositions.

Embodiments with Two or More Hardphases

In some embodiments, an alloy can have two or more hardphases.

Thermodynamic Criteria

Figure 6:
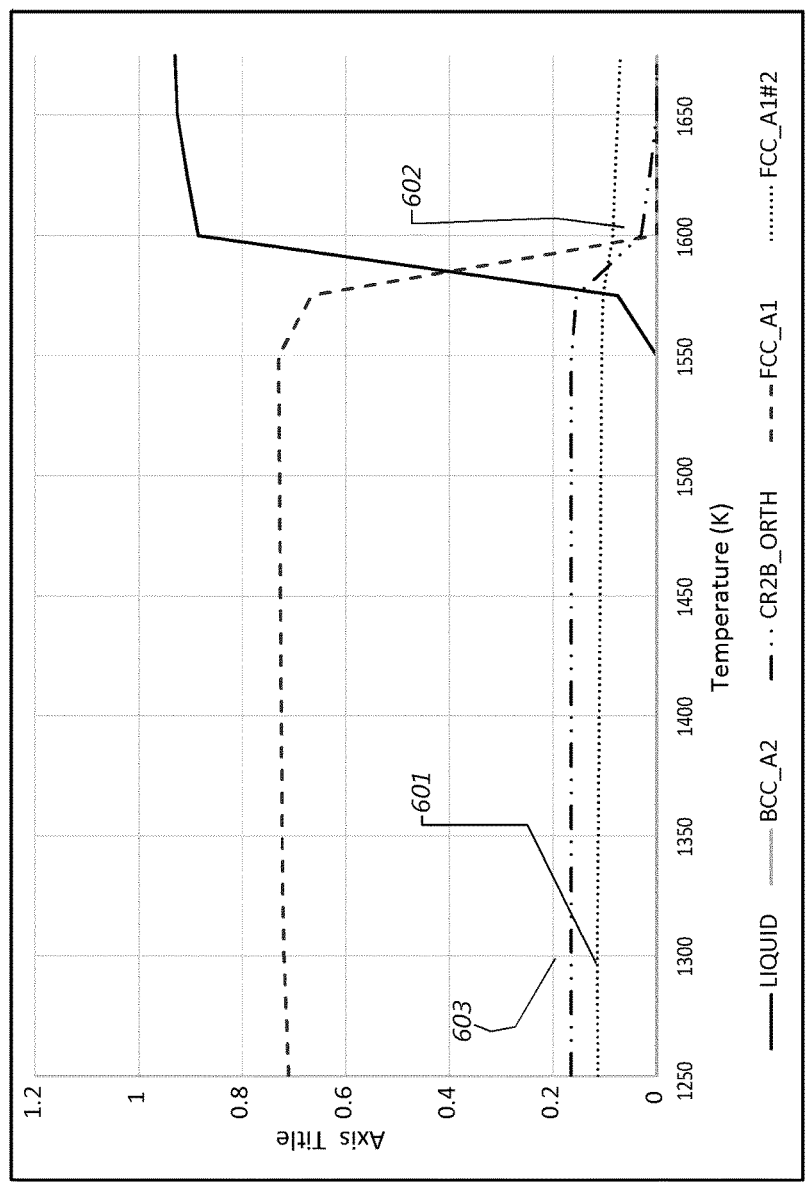
FIG. 6 shows an equilibrium solidification diagram of an embodiment of the disclosure containing: Fe: Balance, B: 1.2, C: 1.6 Cr: 18 Ti: 5.

In some embodiments, the alloy can be described by thermodynamic models. Four thermodynamic criteria can be used to describe embodiments of a boride containing wear resistant alloy described herein: 1) The mole fraction of (Fe,Cr)Boride formed during cooling from a liquid state; 2) The mole fraction of (Fe,Cr)Boride formed before the beginning of solidification of the ferrous matrix; 3) The mole fraction of carbides or borocarbides with a metallic constituent/component consisting primarily of Fe and/or Cr that form before the complete solidification of the material from a molten state; and 4) The mole fraction of carbides, borides, and/or borocarbides consisting primarily of one or more of the following elements: Nb, V, Ti, Zr, Hf, W, Mo. An example solidification diagram is shown in FIG. 6, which demonstrates the thermodynamic criteria described in this disclosure.

In the first thermodynamic criteria, the mole fraction of (Fe,Cr)Boride formed during cooling from a liquid state can provide an indication as to the wear resistance of the material. This criteria will be abbreviated as: (Fe,Cr)Boride max. The general trend is for increased wear resistance with increasing phase fraction of (Fe,Cr)Boride max. (Fe,Cr) Boride is defined as a boride phase with a metallic element content ≥75 wt % (or ≥ about 75 wt %) of Fe+Cr. For practical purposes (Fe,Cr)Boride max can be measured at 1300K [601]. Due to the low solubility of boron in all solidified ferrous phases there may be very little change in the phase fraction of (Fe,Cr)Boride between the solidus temperature of a given alloy and 1300K. In some embodiments, the (Fe,Cr)Boride max can be ≥5% (or ≥ about 5%). In some embodiments, the (Fe,Cr)Boride max can be ≥7.5% (or ≥ about 7.5%). In some embodiments, the (Fe,Cr)Boride max can be ≥10% (or ≥ about 10%). In some embodiments, the (Fe,Cr)Boride max can be ≥15% (or ≥15%).

In the second thermodynamic criteria, the mole fraction of (Fe,Cr)Boride formed before the beginning of solidification of the ferrous matrix [602], can indicate the morphology of the (Fe,Cr)Boride phase and can correlate with toughness. This criteria will be abbreviated as: segregated (Fe,Cr) Boride fraction. The general trend is for reduced toughness as segregated (Fe,Cr)Boride fraction increases. By limiting the segregated (Fe,Cr)Boride fraction, the impact of this criteria's toughness reducing effect can be minimized to certain levels. In some embodiments, the segregated (Fe,Cr) Boride fraction can be ≤15% (or ≤ about 15%). In some embodiments, the segregated (Fe,Cr)Boride fraction can be ≤10% (or ≤ about 10%). In some embodiments, the segregated (Fe,Cr)Boride fraction can be ≤5% (or ≤ about 5%). In some embodiments, the segregated (Fe,Cr)Boride fraction can be 0% (or about 0%).

The third thermodynamic criteria is the mole fraction of carbides or borocarbides with a metallic constituent consisting primarily (≥75% (or ≥ about 75%)) of Fe and/or Cr that can form before the complete solidification of the material (the solidus) from a molten state. This criteria can indicate that any hardphases that have a metallic constituent of primarily Fe and/or Cr will form as borides. This criteria will be abbreviated as: (boro)carbide fraction at solidus. FIG. 6 shows an alloy without any (boro)carbides forming in the liquid. This criteria can allow precise control over the microstructure of the alloys described in this disclosure. Specifically it can allow for one to avoid the formation of primary Fe and/or Cr based carbides or borocarbides and can ensure that (Fe,Cr)Boride forms. In some embodiments, the (boro)carbide fraction at solidus is ≤5% (or ≤ about 5%). In some embodiments, the (boro)carbide fraction at solidus is 0% (or about 0%).

In the fourth thermodynamic criteria, the mole fraction of carbides, borides, and/or borocarbides with a metallic constituent ≥90 wt % (or ≥ about 90 wt %) of one or more of the following elements: Nb, V, Ti, Zr, Hf, W, Mo can give an indication as to the wear resistance of the material. This criteria will be abbreviated as: isolated hardphase fraction. Increasing amounts of isolated hardphase fraction can be correlated with increasing wear resistance. This criteria can allow the alloys to exhibit increased wear resistance over those in the Fe—Cr—B—C system due to the extreme hardness of these phases and the ability to increase overall hardphase fraction while retaining the desired fine grained morphology of the microstructure. The isolated hardphase fraction can be measured at 1300K [603] as the low solubility of the described elements in solid ferrous phases results in very little change between the phase fraction at 1300K and those observed in alloys at room temperature. In some embodiments, the isolated hardphase fraction can be between 0% and 25%. In some embodiments, the isolated hardphase fraction can be between 1% and 25% (or between about 1% and about 25%). In some embodiments, the isolated hardphase fraction can be between 2% and 20% (or between about 2% and about 20%). In some embodiments, the isolated hardphase fraction can be between 10% and 20% (or between about 10% and about 20%). In some embodiments, the isolated hardphase fraction can be between 10% and 15% (or between about 10% and about 15%). In some embodiments, the isolated hardphase fraction can be between 5% and 15% (or between about 5% and about 15%). In some embodiments, the isolated hardphase fraction can be ≥5% (or ≥ about 5%). In some embodiments, the isolated hardphase fraction can be ≥10% (or ≥ about 10%).

Microstructural Criteria

In some embodiments, the alloy can be described by its microstructural features. Like the thermodynamic criteria embodiments, the microstructure of these alloys can be ferrous with (Fe,Cr)Boride and one or more other hardphase consisting predominantly of one or more of Nb, V, Ti, Zr, Hf, W, Mo that are free from primary Fe and/or Cr based carbides or borocarbides that form in the liquid during solidification. These microstructural criteria can be calculated and verified using three main techniques. 1) Quantitative metallography of micrographs obtained from a scanning electron microscope (SEM) and/or an optical microscope can be used to measure the phase fraction. 2) Energy dispersive X-ray spectrometry (EDX) can be used to identify the type and percent of elements present in each phase that have an atomic number ≥ that of carbon. 3) X-ray diffraction (XRD) can be used to verify the crystallographic structure of phases present in the microstructure and to provide another measurement of the volume fraction of each phase.

The first microstructural criteria is the volume fraction of (Fe,Cr)Boride in the alloy. Similar to the first thermodynamic criteria described above, the phase fraction of (Fe, Cr)Boride can correlate directly with an increase in abrasion resistance. In some embodiments, the measured volume fraction of (Fe,Cr)Boride can be ≥5% (or ≥ about 5%). In some embodiments, the measured volume fraction of (Fe, Cr)Boride can be ≥7.5% (or ≥ about 7.5%). In some embodiments, the measured volume fraction of (Fe,Cr)Boride can be ≥10% (or ≥ about 10%). In some embodiments, the measured volume fraction of (Fe,Cr)Boride can be ≥15% (or ≥ about 15%).

The second microstructural criteria is the volume fraction of hardphases with its largest single dimension in excess of 40 microns (or in excess of about 40 microns). This criteria will be known as: >40 μm hardphase volume fraction. This phase is the microstructural analogue to the thermodynamic criteria 'segregated (Fe,Cr)Boride phase fraction'. Similar to the second thermodynamic criteria described above, an excess of >40 μm hardphase volume fraction can be deleterious to toughness of an alloy and can result in poor performance. In some embodiments, >40 μm hardphase volume fraction can be ≤15% (or ≤ about 15%). In some embodiments, >40 μm hardphase volume fraction can be ≤10%. In some embodiments, >40 μm hardphase volume fraction can be ≤5% (or ≤ about 5%). In some embodiments, >40 μm hardphase volume fraction can be 0% (or about 0%).

The third microstructural criteria is the volume fraction of primary carbides or borocarbides that form from the liquid with a metallic constituent ≥75 wt % (or ≥ about 75 wt %) of Fe and/or Cr. In this disclosure, primary can be defined as a phase that forms from the liquid during solidification. This criteria will be abbreviated as: volume fraction of primary (boro)carbides. In addition to the 3 analytical techniques outlined above, the distinction between primary (boro)carbides that form from the liquid and secondary carbides that form from the solid can be analyzed by one skilled in the art (a skilled metallurgist). For example phases such as pearlite, divorced pearlite, bainite, and others, which can be readily identified by one skilled in the art, can contain carbides with a metallic constituent predominantly consisting of Fe and/or Cr. However, these phases can form after the alloy has fully solidified and as a result are not included in this criteria. In some embodiments, the volume fraction of primary (boro) carbides can be ≤5% (or ≤ about 5%). In some embodiments the volume fraction of primary (boro)carbides can be ≤2.5% (or ≤ about 2.5%). In some embodiments the volume fraction of primary (boro)carbides can be 0% (or about 0%).

The fourth microstructural criteria is the volume fraction of carbides, borides, and/or borocarbides with a metallic constituent ≥90% (or ≥ about 90%) of one or more of the following elements: Nb, V, Ti, Zr, Hf, W, Mo. This criteria will be known as: isolated hardphase volume fraction. Similar to the fourth thermodynamic criteria described above, this phase, due to its hardness, near spherical morphology, and isolated distribution in the microstructure, can improve the wear performance of the alloy without undue negative effects on toughness. In some embodiments, isolated hardphase volume fraction can be between 2% and 20% (or between about 2% and about 20%). In some embodiments, isolated hardphase volume fraction can be between 5% and 20% (or between about 5% and about 20%). In some embodiments, isolated hardphase volume fraction can be between 5% and 15% (or about 5% and about 15%). In some embodiments, isolated hardphase volume fraction can be between 10% and 20%. In some embodiments, isolated hardphase volume fraction can be between 5% and 10%. In some embodiments, isolated hardphase volume fraction can be between 10% and 15%. In some embodiments, isolated hardphase fraction can be ≥5%. In some embodiments, isolated hardphase fraction can be ≥10%

Figure 7:
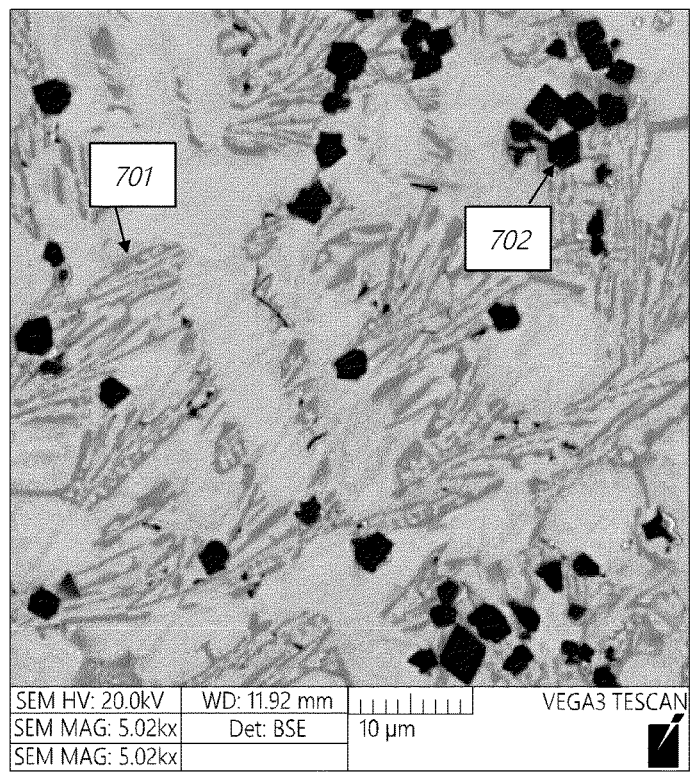
FIG. 7 shows an SEM micrograph of an embodiment of an alloy (X42).

An example SEM micrograph of an alloy that meets the microstructural embodiments, alloy X42, is presented in FIG. 7. The micrograph shows (Fe,Cr)Boride ≥15% of the microstructure [701] and isolated hardphase volume fraction [702]≥5%. X42 satisfies the other criteria as well with 0% >40 μm (Fe,Cr)Boride volume fraction and a volume fraction of primary (boro)carbides of 0%.

Figure 8:
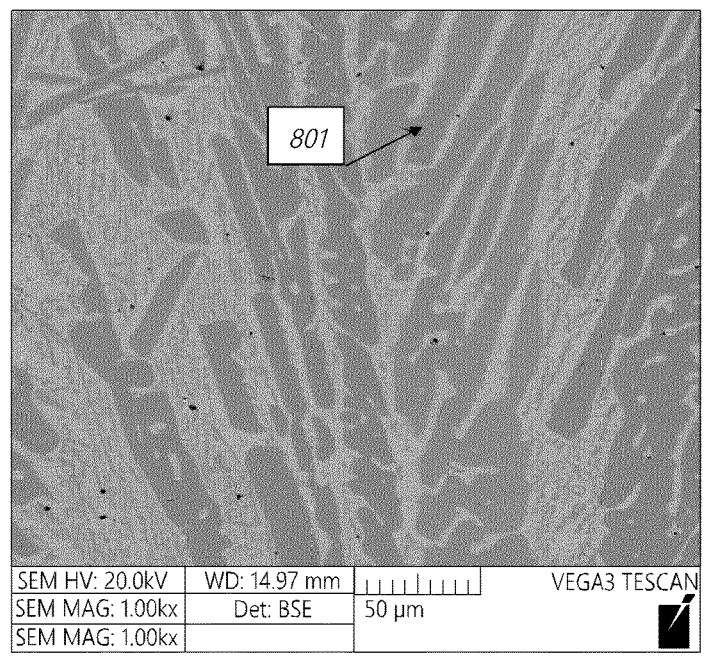
FIG. 8 shows an SEM micrograph of an embodiment of an alloy (X8).
Figure 9:
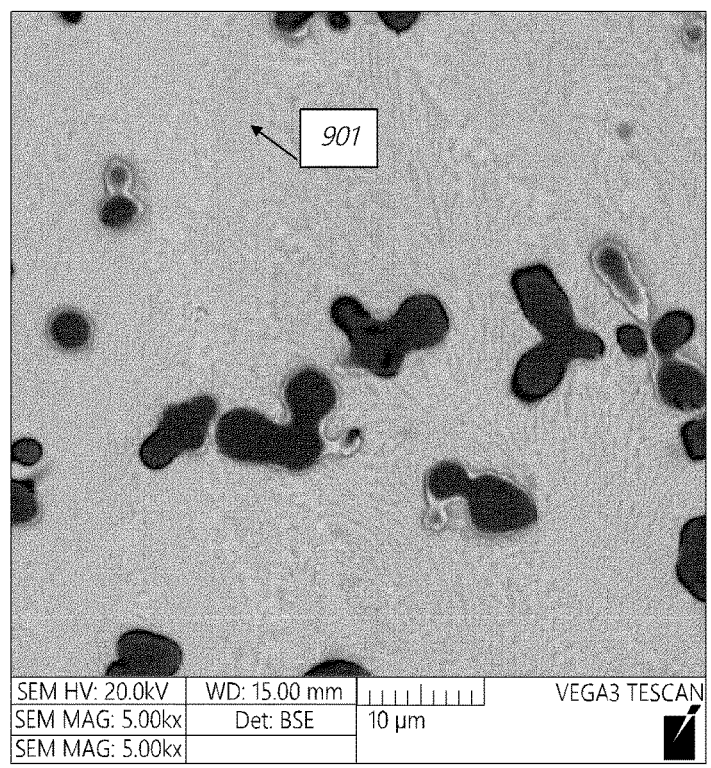
FIG. 9 shows an SEM micrograph of an embodiment of an alloy (X53).

Both X8 and X53, shown in FIGS. 8-9, have similar compositions to X42 but the microstructures of the two do not meet the above microstructural criteria nor do these alloys meet the specified thermodynamic criteria. X8 has a >40 μm (Fe,Cr)Boride volume fraction ≥10% [801] and has 0% isolated hardphase volume fraction. X53 meets microstructural criteria 1, 2, and 4 but XRD and analysis by one skilled in the art shows that there are the volume fraction of primary (boro)carbides is ≥5% [901].

Embodiments with Three or More Distinct Hardphases

In some embodiments, an alloy can have three or more hardphases.

Thermodynamic Criteria

Figure 10:
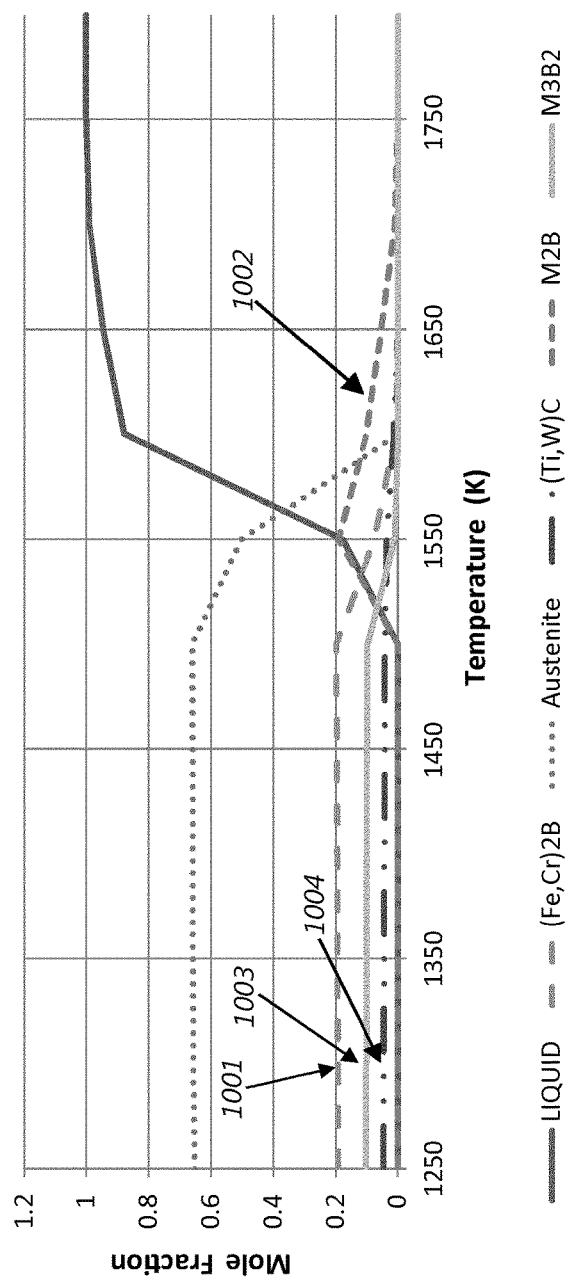
FIG. 10 shows an equilibrium solidification diagram of an embodiment of the disclosure containing: B:2.2 C:0.8 Cr:12 Mo:4.8 Ti:1.7 W:6.8.

In some embodiments, the alloy can be described fully by thermodynamic models. Four thermodynamic criteria were used to describe the boride containing wear resistant alloys described herein: 1) The mole fraction of (Fe,Cr)boride formed during cooling from a liquid state; 2) The mole fraction of phase(s) with the formula M2B and/or M3B2 where M contains a defined range of: Fe, Cr, Mo, and W; 3) The mole fraction of carbides or borocarbides with a metallic constituent consisting primarily of Fe and/or Cr that form before the complete solidification of the material from a molten state; and 4) The mole fraction of carbides consisting primarily of one or more of the following elements: Nb, V, Ti, Zr, Hf, W, Mo. An example solidification diagram is shown in FIG. 10 where it demonstrates all the thermodynamic criteria described in this disclosure.

In the first thermodynamic criteria, the mole fraction of (Fe,Cr)boride formed during cooling from a liquid state, can provide an indication as to the wear resistance of the material. This criteria will be abbreviated as: (Fe,Cr)boride max. The general trend is for increased wear resistance with increasing phase fraction of (Fe,Cr)boride max. (Fe,Cr) boride can be defined as a boride phase with a metallic element content ≥75% (or ≥ about 75%) of Fe+Cr. For practical purposes (Fe,Cr)boride max is measured at 1300K [1001]. Due to the low solubility of boron in all solidified ferrous phases there may be very little change in the phase fraction of (Fe,Cr)boride between the solidus temperature of a given alloy and 1300K. In some embodiments, the (Fe,Cr)boride max can be ≥2% (or ≥ about 2%). In some embodiments, the (Fe,Cr)boride max can be ≥5% (or ≥ about 5%). In some embodiments, the (Fe,Cr)boride max can be ≥10% (or ≥ about 10%). In some embodiments, the (Fe,Cr)boride max can be ≥15% (or ≥ about 15%).

The second thermodynamic criteria is the mole fraction of phase(s) with the formula $M_2B$ and/or $M_3B_2$ where a portion of one or more of these phase(s) form before the liquidus of the matrix [1002]. These phases can have a composition such that M in $M_2B$ comprises ≥10 wt % (or ≥ about 10 wt %) of each of: Fe, Cr, Mo, and W; M in $M_3B_2$ can comprise ≥15 wt % (or ≥ about 15 wt %) of each of: Fe, Mo and W; and Fe+Cr+Mo+W can be ≥70 wt % (or ≥ about 70 wt %) of M for both phases. This phase is abbreviated as (Fe,Cr,Mo,W) boride. For practical purposes the mole fraction of this phase can be measured at 1300K [1003]. In some embodiments, (Fe,Cr,Mo,W) boride has a mole fraction ≥5% (or ≥ about 5%). In some embodiments, (Fe,Cr,Mo,W) boride has a mole fraction ≥10% (or ≥ about 10%). In some embodiments, (Fe,Cr,Mo,W) boride has a mole fraction ≥15% (or ≥ about 15%).

The third thermodynamic criteria is the mole fraction of carbides or borocarbides with a metallic constituent consisting primarily (≥75 wt % or ≥ about 75 wt %) of Fe and/or Cr that form before the complete solidification of the material (the solidus) from a molten state. When this criteria is 0% (or about 0%), no iron and/or chromium based carbides or borocarbides may form from the liquid. This criteria will be abbreviated as: (boro)carbide fraction at solidus. FIG. 10 shows an alloy without any (boro)carbides forming in the liquid. This criteria can allow precise control over the microstructure of the alloys described in this patent. Specifically it can allow for one to avoid the formation of primary Fe and/or Cr based carbides or borocarbides and can ensure that (Fe,Cr)Boride forms. In some embodiments, the (boro)carbide fraction at solidus can be ≤5% (or ≤ about 5%). In some embodiments, the (boro)carbide fraction at solidus can be 0% (or about 0%).

In the fourth thermodynamic criteria, The mole fraction of borides, borocarbides, and/or carbides with a metallic constituent of ≥90 wt % (or ≥ about 90 wt %) of one or more of the following elements: Nb, V, Ti, Zr, Hf, W, Mo, can give an indication as to the wear resistance of the material. This criteria will be abbreviated as: isolated carbide fraction. Increasing amounts of isolated carbide fraction can be correlated with increasing wear resistance. This criteria can allow the alloys to exhibit increased wear resistance over those in the Fe—Cr—B—C system due to the extreme hardness of these phases and the ability to increase overall hardphase fraction while retaining specific fine grained morphology of the microstructure. The isolated carbide fraction can be measured at 1300K [1004] as the low solubility of the described elements in solid ferrous phases results in very little change between the phase fraction at 1300K and those observed in alloys at room temperature. In some embodiments, the isolated hardphase fraction can be between 0% and 25% (or between about 0% and about 25%). In some embodiments, the isolated hardphase fraction can be between 1% and 25% (or between about 1% and about 25%). In some embodiments, the isolated hardphase fraction can be between 2% and 15% (or between about 2% and about 15%). In some embodiments, the isolated hardphase fraction can be between 2% and 10% (or between about 2% and about 10%). In some embodiments, the isolated hardphase fraction can be between 4% and 10% (or between about 4% and about 10%). In some embodiments, the isolated hardphase fraction can be between 5% and 15% (or between about 5% and about 15%). In some embodiments, the isolated hardphase fraction can be ≥1% (or ≥ about 1%). In some embodiments, the isolated hardphase fraction can be ≥4% (or ≥ about 4%).

Microstructural Criteria

The following described microstructural criteria can define an alloy space that exhibits exceptional toughness and exceptional wear resistance. The ferrous alloys described can consist of at least 3 distinct hardphases that can form from the liquid and can adhere to the following microstructural criteria.

In some embodiments, there can be one or more boride, borocarbide, and/or carbide phase(s) with a metallic constituent ≥90 wt % (or ≥ about 90 wt %) of one or more of the following elements: Nb, Ti, V, Zr, W, Mo, Hf. This hardphase will be known as isolated carbide. In some embodiments, this isolated carbide can have a volume fraction ≥1%. In some embodiments, this isolated carbide can have a volume fraction ≥2% (or ≥ about 2%). In some embodiments, the isolated carbide can have a volume fraction ≥3% (or ≥ about 3%). In some embodiments, the isolated carbide can have a volume fraction between 1% and 10% (or between about 1% and about 10%). In some embodiments, the isolated carbide can have a volume fraction between 1% and 5% (or between about 1% and about 5%).

In some embodiments, there can be one or more boride phases with a formula of $M_2B$ and/or $M_3B_2$ where the phases can have 3 specific properties. 1) M in $M_2B$ can consist of ≥10 wt % (or ≥ about 10 wt %) of each of the following elements: Fe, Cr, Mo, and W and M in $M_3B_2$ can consist of ≥15 wt % (or ≥ about 15 wt %) of each of the following: Fe, Mo, and W. 2) Fe+Cr+Mo+W can be ≥70 wt % (or ≥ about 70 wt %) of M. 3) a portion of one or more of the phases volume fraction may not form in a eutectic structure but instead a near spherical morphology. This hardphase will be known as (Fe,Cr,Mo,W) boride. This hardphase can have a hardness in excess of 2000HV (or in excess of about 2000HV) and thus increasing phase fraction can have a dramatic effect on wear resistance. In addition this phase can have a near spherical morphology, so high toughness can be retained while still maintaining wear performance. In some embodiments, (Fe,Cr,Mo,W) boride can have a volume fraction ≥5% (or ≥ about 5%). In some embodiments, (Fe,Cr,Mo,W) boride can have a volume fraction ≥10% (or ≥ about 10%). In some embodiments, (Fe,Cr,Mo,W) boride can have a volume fraction ≥15% (or ≥ about 15%). In some embodiments, (Fe,Cr,Mo,W) boride can have a volume fraction between 5% and 30% (or between about 5% and about 30%). In some embodiments, (Fe,Cr,Mo,W) boride can have a volume fraction between 10% and 25% (or between about 10% and about 25%).

In some embodiments, there can be a boride phase where Fe+Cr is ≥75 wt % (or ≥ about 75 wt %) of the metallic constituent. This will be known as (Fe,Cr) boride. In some embodiments, the (Fe,Cr) boride volume fraction can be ≥2% (or ≥ about 2%). In some embodiments, the (Fe,Cr) boride volume fraction can be ≥5% (or ≥ about 5%). In some embodiments, the (Fe,Cr) boride volume fraction can be ≥10% (or ≥ about 10%). In some embodiments, the (Fe,Cr) boride volume fraction can be between 2% and 25% (or between about 2% and about 25%). In some embodiments, the (Fe,Cr) boride volume fraction can be between 5% and 20% (or between about 5% and about 20%). In some embodiments, the (Fe,Cr) boride volume fraction can be between 10% and 20%.

In some embodiments, there may be no primary carbides or borocarbides with a metallic constituent of Fe+Cr ≥75 wt % (or ≥ about 75 wt %). This criteria can allow for precise control over the type and chemistry and thus of each phase present in the alloys described.

In some embodiments, the volume fraction of hardphases exceeding 50 μm (or about 50 μm) in the largest dimension can be ≤25% (or ≤ about 25%). In some embodiments, the volume fraction of hardphases exceeding 50 μm (or about 50 μm) in the largest dimension can be ≤20% (or ≤ about 20%). In some embodiments, the volume fraction of hardphases exceeding 50 μm (or about 50 μm) in the largest dimension can be ≤15% (or ≤ about 15%). In some embodiments, the volume fraction of hardphases exceeding 50 μm (or about 50 μm) in the largest dimension can be ≤10% (or ≤ about 10%). In some embodiments, no hardphase may exceed 50 μm (or about 50 μm) in its largest dimension.

An example SEM micrograph of an alloy that meets the microstructural embodiments, alloy X47, is presented in FIG. 2. The micrograph shows that isolated carbide [201], in this case (Ti,W)C, is present with a volume fraction ≥1%. This microstructure shows that (Fe,Cr,Mo,W) boride volume fraction is ≥5% [202]. The micrograph shows that (Fe,Cr) boride volume fraction is ≥5% [203].

Embodiments with No Primary Carbides or Boro-Carbides and Two or More Distinct Hardphases In some embodiments, an alloy can have two or more boride hardphases and no primary carbides and/or borocarbides that form from the liquid during solidification.

Thermodynamic Criteria

In some embodiments, the alloy can be described fully by thermodynamic models. Four thermodynamic criteria were used to describe the boride containing wear resistant alloys described herein: 1) The mole fraction of (Fe,Cr)boride formed during cooling from a liquid state; 2) The mole fraction of phase(s) with the formula $M_2B$ and/or $M_3B_2$ where M contains a defined range of: Fe, Cr, Mo, and W; and 3) The mole fraction of carbides or borocarbides that form before the complete solidification of the material from a molten state.

In the first thermodynamic criteria, the mole fraction of (Fe,Cr)boride formed during cooling from a liquid state can provide an indication as to the wear resistance of the material. This criteria will be abbreviated as: (Fe,Cr)boride max. The general trend is for increased wear resistance with increasing phase fraction of (Fe,Cr)boride max. (Fe,Cr) boride can be defined as a boride phase with a metallic element content ≥75% (or ≥ about 75%) of Fe+Cr. For practical purposes (Fe,Cr)boride max is measured at 1300K (501). Due to the low solubility of boron in all solidified ferrous phases there may be very little change in the phase fraction of (Fe,Cr)boride between the solidus temperature of a given alloy and 1300K. In some embodiments, the (Fe,Cr)boride max can be ≥2% (or ≥ about 2%). In some embodiments, the (Fe,Cr)boride max can be ≥5% (or ≥ about 5%). In some embodiments, the (Fe,Cr)boride max can be ≥10% (or ≥ about 10%). In some embodiments, the (Fe,Cr)boride max can be ≥15% (or ≥ about 15%).

The second thermodynamic criteria is the mole fraction of phase(s) with the formula $M_2B$ and/or $M_3B_2$ where a portion of one or more of these phase(s) form before the liquidus of the matrix [1002]. These phases can have a composition such that M in $M_2B$ comprises ≥10 wt % (or ≥ about 10 wt %) of each of: Fe, Cr, Mo, and W; M in $M_3B_2$ can comprise ≥15 wt % (or ≥ about 15 wt %) of each of: Fe, Mo and W; and Fe+Cr+Mo+W can be ≥70 wt % (or ≥ about 70 wt %) of M for both phases. This phase is abbreviated as (Fe,Cr,Mo,W) boride. For practical purposes the mole fraction of this phase can be measured at 1300K [1003]. In some embodiments, (Fe,Cr,Mo,W) boride has a mole fraction ≥5% (or ≥ about 5%). In some embodiments, (Fe,Cr,Mo,W) boride has a mole fraction ≥10% (or ≥ about 10%). In some embodiments, (Fe,Cr,Mo,W) boride has a mole fraction ≥15% (or ≥ about 15%). In some embodiments, (Fe,Cr,Mo,W) boride has a mole fraction ≥20% (or ≥ about 15%).

The third thermodynamic criteria is the mole fraction of carbides or borocarbides with a metallic constituent consisting primarily that form before the complete solidification of the material (the solidus) from a molten state. When this criteria is 0% (or about 0%), no carbides or borocarbides may form from the liquid. This criteria will be abbreviated as: (boro)carbide fraction at solidus. This criteria can allow precise control over the microstructure of the alloys described in this patent. Specifically it can allow for one to avoid the formation of primary carbides or borocarbides and can ensure that (Fe,Cr)Boride forms. In some embodiments, the (boro)carbide fraction at solidus can be ≤5% (or ≤ about 5%). In some embodiments, the (boro)carbide fraction at solidus can be 0% (or about 0%).

Microstructural Criteria

The following described microstructural criteria can define an alloy space that exhibits exceptional toughness and exceptional wear resistance. The ferrous alloys described can consist of at least 2 distinct hardphases that can form from the liquid and can adhere to the following microstructural criteria.

In some embodiments, there can be one or more boride phases with a formula of $M_2B$ and/or $M_3B_2$ where the phases can have 3 specific properties. 1) M in $M_2B$ can consist of ≥10 wt % (or ≥ about 10 wt %) of each of the following elements: Fe, Cr, Mo, and W and M in $M_3B_2$ can consist of ≥15 wt % (or ≥ about 15 wt %) of each of the following: Fe, Mo, and W. 2) Fe+Cr+Mo+W can be ≥70 wt % (or ≥ about 70 wt %) of M. 3) a portion of one or more of the phases volume fraction may not form in a eutectic structure but instead a near spherical morphology. This hardphase will be known as (Fe,Cr,Mo,W) boride. This hardphase can have a hardness in excess of 2000HV (or in excess of about 2000HV) and thus increasing phase fraction can have a dramatic effect on wear resistance. In addition this phase can have a near spherical morphology, so high toughness can be retained while still maintaining wear performance. In some embodiments, (Fe,Cr,Mo,W) boride can have a volume fraction ≥5% (or ≥ about 5%). In some embodiments, (Fe,Cr,Mo,W) boride can have a volume fraction ≥10% (or ≥ about 10%). In some embodiments, (Fe,Cr,Mo,W) boride can have a volume fraction ≥15% (or ≥ about 15%). In some embodiments, (Fe,Cr,Mo,W) boride can have a volume fraction between 5% and 30% (or between about 5% and about 30%). In some embodiments, (Fe,Cr,Mo,W) boride can have a volume fraction between 10% and 25% (or between about 10% and about 25%).

In some embodiments, there can be a boride phase where Fe+Cr is ≥75 wt % (or ≥ about 75 wt %) of the metallic constituent. This will be known as (Fe,Cr) boride. In some embodiments, the (Fe,Cr) boride volume fraction can be ≥2% (or ≥ about 2%). In some embodiments, the (Fe,Cr) boride volume fraction can be ≥5% (or ≥ about 5%). In some embodiments, the (Fe,Cr) boride volume fraction can be ≥10% (or ≥ about 10%). In some embodiments, the (Fe,Cr) boride volume fraction can be between 2% and 25% (or between about 2% and about 25%). In some embodiments, the (Fe,Cr) boride volume fraction can be between 5% and 20% (or between about 5% and about 20%). In some embodiments, the (Fe,Cr) boride volume fraction can be between 10% and 20%.

In some embodiments, the volume fraction of primary carbides or borocarbides that form from the liquid can be ≤5%. In some embodiments, there may be no primary carbides or borocarbides.

In some embodiments, the volume fraction of hardphases exceeding 50 μm (or about 50 μm) in the largest dimension are ≤25%. In some embodiments, the volume fraction of hardphases exceeding 50 μm (or about 50 μm) in the largest dimension are ≤20%. In some embodiments, the volume fraction of hardphases exceeding 50 μm (or about 50 μm) in the largest dimension are ≤15%. In some embodiments, the volume fraction of hardphases exceeding 50 μm (or about 50 μm) in the largest dimension are ≤10%. In some preferred embodiments, no hardphase may exceed 50 μm (or about 50 μm) in its largest dimension.

Applications and Processes for Use:

The alloys described in this patent can be used in a variety of applications and industries. Some non-limiting examples of applications of use include:

Surface Mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and hardfacing for ground engaging tools, wear plate for buckets and dumptruck liners, heel blocks and hardfacing for heel blocks on mining shovels, grader blades and hardfacing for grader blades, stacker reclaimers, sizer crushers, general wear packages for mining components and other comminution components.

Downstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods.

Upstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers and other dryers, calendar rolls, machine rolls, press rolls, digesters, pulp mixers, pulpers, pumps, boilers, shredders, tissue machines, roll and bale handling machines, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, troughs, primary fan blades, secondary fan blades, augers and other agricultural applications.

Construction applications include the following components and coatings for the following components: cement chutes, cement piping, bag houses, mixing equipment and other construction applications Machine element applications include the following components and coatings for the following components: Shaft journals, paper rolls, gear boxes, drive rollers, impellers, general reclamation and dimensional restoration applications and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding.

From the foregoing description, it will be appreciated that an inventive ferrous alloys are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:
1. A ferrous alloy, the ferrous alloy configured to form a matrix comprising:
near spherical and hypereutectic borides and/or borocarbides;
wherein a volume fraction of the near spherical and hypereutectic borides and/or borocarbides is >5%, where a near spherical phase has an aspect ratio <2:1, the aspect ratio being defined as the ratio between a major axis in cross section to an orthogonal diameter of the near spherical and hypereutectic borides and/or borocarbides;
wherein a volume fraction of hypereutectic and rod-like phases with a maximum dimension in cross section >50 µm and an aspect ratio greater than 2:1 is <5%;
wherein a total volume fraction of borides and borocarbides is >10%;
wherein the alloy comprises Fe and the following in wt %:
B: 1.95-5.5;
C: 0-2.08;
Cr: 1.52-24;
Mo: 2.9-22;
Ti: 0-7.21;
W: 0-19.2.
2. The alloy of claim 1, wherein the near spherical and hypereutectic borides and/or borocarbides comprise $M_2(C,B)$ or $M_3(C,B)_2$, wherein M comprises and W and where M is ≥15 wt % Mo+W.

3. The alloy of claim 1, wherein all hardphases in the matrix have a maximum dimension in cross section of ≤50 µm.
4. The alloy of claim 1, the matrix further comprising a volume fraction of carbides that form from a liquid between 1% and 25%, wherein said carbides have a metallic constituent ≥75 wt % of one or more of: Ti, V, Zr, W, Mo, Hf, Nb.
5. The alloy of claim 1, the matrix further comprising a volume fraction of borocarbides with one or more of the formulas: $M_{23}(C,B)_6$, $M_7(C,B)_3$, and $M_3(C,B)$ that form in a liquid of ≤15%.
6. The alloy of claim 1, wherein Mo+W is greater than or equal to 8 wt %.
7. A wear resistant layer formed from the alloy of claim 1.
8. The wear resistant layer of claim 7, wherein the layer is formed via GMAW, GTAW, OAW, SAW, PTAW, bulk welding, laser welding, casting, or any other welding or coating process.
9. The wear resistant layer of claim 7 applied on a SAG mill component, an AG mill component, a downhole tool for oil drilling, a crusher tooth, a ground engaging tool, a wear plate, a shaker screen, a slurry pipe, a comminution tool, a wear package tool, or an agricultural tool.
10. A wear resistant ferrous alloy comprising:
a mole fraction of $M_2B$ or $M_3B_2$ at a liquidus of ≥5%, wherein M comprises Mo and W and where M is ≥15 wt % Mo+W; and
a mole fraction of hypereutectic and rod like phases at the liquidus of ≤5%;
wherein a total mole fraction of all borides and borocarbides at 1300K is ≥10%.
11. The alloy of claim 10, wherein the total mole fraction of borides and borocarbides is ≥10%.
12. The alloy of claim 10, further comprising a mole fraction of carbides at 1300K between 1% and 25%, and wherein said carbides have a metallic constituent ≥75 wt % of one or more of: Ti, V, Zr, W, Mo, Hf, Nb.
13. The alloy of claim 10, further comprising, under scheil and equilibrium solidification, a mole fraction of borides or borocarbides with one or more of the formulas: $M_{23}(C,B)_6$, $M_7(C,B)_3$, and $M_3(C,B)$ at the solidus of ≤15%.
14. The alloy of claim 10, wherein the alloy comprises Fe and the following in wt %:
B: 1.95-5.5;
C: 0-2.08;
Cr: 1.52-24;
Mo: 2.9-22;
Ti: 0-7.21;
W: 0-19.2;
Nb: 0-6; and
Zr: 0-3.2.
15. A wear resistant layer formed from the alloy of claim 10.
16. The wear resistant layer of claim 15 applied on a SAG mill component, an AG mill component, a downhole tool for oil drilling, a crusher tooth, a ground engaging tool, a wear plate, a shaker screen, a slurry pipe, a comminution tool, a wear package tool, or an agricultural tool.
17. A ferrous alloy, the ferrous alloy configured to form a matrix comprising:
one or more of ferrite, austenite, martensite, pearlite, and/or bainite;
wherein a mole fraction, measured at 1300K, of borides with a metallic constituent of ≥75 wt % iron plus chromium is ≥5%;

wherein a mole fraction, when measured at 1300K, of one or more carbides, borides, and/or borocarbides with a metallic constituent ≥75 wt % of one or more of Nb, Ti, V, Zr, W, Mo, Hf is ≥5%; and wherein a mole fraction of borides that are hyper eutectic and have a metallic constituent of ≥75 wt % iron plus chromium is ≤15%.

18. The alloy of claim 17, wherein a mole fraction, measured at the solidus during solidification, of carbides or borocarbides with a metallic constituent ≥75 wt % iron plus chromium is ≤5%.

19. The alloy of claim 17, wherein the alloy comprises iron and a composition, in wt %, selected form the group consisting of:

B:2.62 C:1.84 Cr:20.7 Si:1.2 Ti:4.2 W:4.6;
B:1.56 C:2.01 Cr:18.8 Si:1.2 Zr:14;
B:1.91 C:2.57 Cr:21.1 Si:1.2 Ti:3.8 Zr:5.7;
B:1.2 C:1.94 Cr:16.7 Si:1.36 Zr:12;
B:3.16 C:2.15 Cr:14.9 Si:1 Ti:7.5 Zr:6.5;
B:1.3 C:2.16 Cr:18.5 Zr:10.7;
B:1.68 C:1.65 Cr:21.6 Ti:4.93; and
B:1.1 C:1.46 Cr:19.4 Ti:4.57.

20. The alloy of claim 17, wherein the alloy comprises Fe and the following in wt %:

B: 1.1-2.62;
C: 1.46-2.57;
Cr: 14.9-21.6;
Si: 0-1.36;
Ti: 0-7.5;
W: 0-4.6;
Zr: 0-14; and
Nb: 0-10.

21. A wear resistant layer formed from the alloy of claim 17.

* * * * *